US008290857B1

(12) United States Patent
Barie et al.

(10) Patent No.: US 8,290,857 B1
(45) **Date of Patent: *Oct. 16, 2012**

(54) SYSTEMS AND METHODS FOR CREDIT MANAGEMENT RISK RATING AND APPROVAL

(75) Inventors: Cynthia Barie, Coraopolis, PA (US); Douglas Wicker, Sewickley, PA (US); Michael Harrington, Wexford, PA (US); Alan McCrum, Bethel Park, PA (US); Holly Kuhs, Dravosburg, PA (US); Bobbie Zielonka, Pittsburgh, PA (US); Berenice Huffner, Morganville, NJ (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,723

(22) Filed: Apr. 2, 2012

Related U.S. Application Data

(63) Continuation of application No. 12/861,523, filed on Aug. 23, 2010, now Pat. No. 8,150,765, which is a continuation of application No. 11/143,701, filed on Jun. 2, 2005, now Pat. No. 7,797,230.

(51) Int. Cl.
*G06Q 40/00* (2006.01)

(52) U.S. Cl. .............................. 705/38; 705/1.1; 705/35

(58) Field of Classification Search .................. 705/1.1, 705/35, 38
See application file for complete search history.

(56) References Cited

U.S. PATENT DOCUMENTS

| | | | | |
|---|---|---|---|---|
| 3,940,742 | A * | 2/1976 | Hudspeth et al. | 600/301 |
| 2002/0116322 | A1* | 8/2002 | Schnall | 705/38 |
| 2002/0123960 | A1* | 9/2002 | Ericksen | 705/38 |
| 2002/0143626 | A1* | 10/2002 | Voltmer et al. | 705/14 |
| 2002/0188533 | A1* | 12/2002 | Sanchez et al. | 705/30 |
| 2002/0198797 | A1* | 12/2002 | Cooper et al. | 705/35 |
| 2003/0172025 | A1* | 9/2003 | Gallina | 705/38 |
| 2003/0229556 | A1* | 12/2003 | Neagu et al. | 705/36 |
| 2004/0107161 | A1* | 6/2004 | Tanaka et al. | 705/38 |
| 2004/0267660 | A1* | 12/2004 | Greenwood et al. | 705/38 |
| 2006/0059073 | A1* | 3/2006 | Walzak | 705/35 |
| 2006/0085325 | A1* | 4/2006 | Jammal et al. | 705/38 |

OTHER PUBLICATIONS

Berns, Dave. "MGM Mirage, Park Place Debt Ratings Downgraded," Knight Ridder Tribune Business News, (Jan. 2002) p. 1.*
Schuermann, Til. "What Do We Know About Loss Given Default?" (Feb. 2004).*

* cited by examiner

*Primary Examiner* — Elizabeth Rosen
(74) *Attorney, Agent, or Firm* — Buchanan Ingersoll & Rooney PC; Robert J. Pugh

(57) ABSTRACT

A method for one of approving and denying a credit offering to a borrower is disclosed. The method includes calculating a probability of default rating of the borrower and calculating a loss given default rating for the borrower. The method also includes integrating the probability of default rating and the loss given default rating with other information relating to the credit offering to produce a credit memorandum and automatically outputting the credit memorandum to a user so that the user can recommend one of approval and denial of the credit offering.

16 Claims, 170 Drawing Sheets

| QUALITATIVE QUESTIONS | |
|---|---|
| QUESTION | CONSIDERATIONS |
| HOW MANY YEARS HAS THIS DEALERSHIP BEEN IN BUSINESS UNDER CURRENT OWNERSHIP? | NEW OWNERSHIP AT A DEALERSHIP MAY EVIDENCE THE INCREASED LIKELIHOOD OF A DEFAULT. RECENT CHANGES IN OWNERSHIP MAY INDICATE INHERENT HISTORICAL PROBLEMS ASSOCIATED WITH THE PRODUCT, MARKET, OR LOCATION OF THE EXISTING DEALERSHIP. |
| HOW LONG HAS THE OWNER OF THIS DEALERSHIP BEEN IN THE AUTO DEALER BUSINESS? | OWNERS WHO ARE NEW TO THE AUTO DEALER BUSINESS MAY BE MORE LIKELY TO DEFAULT THAN THOSE WHO HAVE MORE EXPERIENCE. |
| HOW HAS THE CURRENT MANAGEMENT TEAM PERFORMED IN ADVERSE MARKET CONDITIONS? | A TRUE TEST OF MANAGEMENT QUALITY IS PERFORMANCE DURING ADVERSE ECONOMIC CONDITIONS. MANAGERS WHO HAVE EXPERIENCED NEGATIVE ECONOMIC CYCLES MAY BE BETTER PREPARED FOR THE OPERATIONAL ADJUSTMENTS NECESSARY TO OUTLAST DIFFICULT TIMES. |
| HOW STRONG ARE THIS DEALERSHIP'S FRANCHISES? | THE STRENGTH OF THE BRANDS SOLD BY A GIVEN DEALERSHIP WILL AFFECT THE STABILITY OF ITS CASH FLOWS AND ULTIMATELY ITS ABILITY TO REPAY ITS OBLIGATIONS. |
| WHAT IS THE DEALERSHIP'S POSITION IN ITS LOCAL MARKET? | THE COMPETITIVE POSITION OF THE DEALERSHIP WITHIN THE LOCAL MARKET WILL IMPACT ITS STABILITY OF REVENUES AND A STRONG POSITION INCREASES THE LIKELIHOOD OF A STABLE ENTITY. |
| HOW PRO-ACTIVE HAS THE DEALERSHIP OWNER BEEN IN COMMUNICATION WITH THE BANK DURING TIMES OF FINANCIAL DISTRESS? (DISTRESS COULD INCLUDE: SIGNIFICANT LOSS IN CASH FLOW OR NET WORTH, COVENANT VIOLATION, SIGNIFICANT INTERNAL FRAUD DISCOVERY, SIGNIFICANT MANUFACTURER/FRANCHISE DISPUTE ETC.) | THIS QUESTION ATTEMPTS TO ASSESS THE LEVEL OF MANAGEMENT COOPERATION WITH LENDER WHILE ENCOUNTERING A SITUATION OF FINANCIAL DISTRESS. DISTRESS COULD INCLUDE SIGNIFICANT LOSS IN CASH FLOW OR NET WORTH, COVENANT BREACH, MARGIN CALLS, PAST DUES, ETC. |
| WHAT IS THIS DEALERSHIP'S ADMINISTRATIVE AND CASH HANDLING (CURTAILMENT, TERM LOAN, INTEREST AND/OR SOLD VEHICLE) HISTORY WITH LENDER? | IF THE DEALERSHIP HAS EXPERIENCED PAYMENT PROBLEMS WITH LENDER IN THE PAST, IT COULD REPRESENT INHERENT CASH MANAGEMENT ISSUES LIKELY TO RECUR IN TIMES OF CYCLICAL ECONOMIC STRESS. |

*FIG. 3*

| | | POINTS |
|---|---|---|
| 1. | **HOW MANY YEARS HAS THIS DEALERSHIP BEEN IN BUSINESS UNDER CURRENT OWNERSHIP?** | |
| A. | <2 YEARS | 5.17 |
| B. | 2-5 YEARS | 5.13 |
| C. | 5-10 YEARS | 5.08 |
| D. | 10-15 YEARS | 5.00 |
| E. | MORE THAN 15 YEARS | 4.82 |
| 2. | **HOW LONG HAS THE OWNER OF THIS DEALERSHIP BEEN IN THE AUTO DEALER BUSINESS?** | |
| A. | <2 YEARS | 6.00 |
| B. | 2-5 YEARS | 5.67 |
| C. | 5-10 YEARS | 4.92 |
| D. | 10-15 YEARS | 4.83 |
| E. | MORE THAN 15 YEARS | 4.00 |
| 3. | **HOW HAS THE CURRENT MANAGEMENT TEAM PERFORMED IN ADVERSE MARKET CONDITIONS?** | |
| A. | STRONG PERFORMANCE THROUGH ADVERSE CONDITIONS | 4.68 |
| B. | UNCHANGED PERFORMANCE THROUGH ADVERSE CONDITIONS | 5.23 |
| C. | HAS NOT EXPERIENCED ADVERSE CONDITIONS | 4.95 |
| 4. | **HOW STRONG ARE THIS DEALERSHIP'S FRANCHISES?** | |
| A. | STRONG | 4.70 |
| B. | AVERAGE | 5.14 |
| C. | WEAK | 5.34 |
| 5. | **WHAT IS THIS DEALERSHIP'S POSITION IN THE LOCAL MARKET?** | |
| A. | FIRST TIER | 4.88 |
| B. | SECOND TIER | 5.19 |
| C. | LOWER THAN SECOND TIER OR NEW ENTRANT | 6.00 |
| 6. | **HOW PRO-ACTIVE HAS THE DEALERSHIP OWNER BEEN IN COMMUNICATION WITH THE BANK DURING TIMES OF FINANCIAL DISTRESS?** | |
| A. | THE CLIENT PROACTIVELY NOTIFIED BANK, WAS RESPONSIVE/TOOK PROACTIVE STEPS TO CURE THE SITUATION. | 5.00 |
| B. | THE CLIENT PROACTIVELY NOTIFIED BANK, WAS RESPONSIVE/TOOK STEPS TO CURE THE SITUATION ONLY AFTER BEING PRODDED BY BANK. | 5.38 |
| C. | THE CLIENT DID NOT PROACTIVELY NOTIFY BANK, BUT TOOK PROACTIVE STEPS TO CURE THE SITUATION. | 5.22 |
| D. | THE CLIENT DID NOT PROACTIVELY NOTIFY BANK, BUT TOOK STEPS TO CURE THE SITUATION ONLY AFTER BEING PRODDED BY BANK. | 5.50 |
| E. | THE CLIENT HAS NEVER EXPERIENCED OPERATING DISTRESS. | 4.74 |
| F. | INFORMATION NOT AVAILABLE. | 4.86 |
| 7. | **WHAT IS THIS DEALERSHIP'S ADMINISTRATIVE AND CASH HANDLING (CURTAILMENT, TERM LOAN, INTEREST AND/OR SOLD VEHICLE) HISTORY WITH BANK?** | |
| A. | PROMPT & SATISFACTORY | 4.85 |
| B. | SATISFACTORY | 5.25 |
| C. | OCCASIONALLY LATE | 5.60 |
| D. | FREQUENTLY LATE | 6.00 |

*FIG. 4*

| QUALITATIVE QUESTIONS | |
|---|---|
| QUESTION | CONSIDERATIONS |
| 1. WHAT IS THE COMPOSITION OF THE BOARD? | |
| 2. WHAT PERCENTAGE OF REVENUE DOES GOVERNMENT PAYMENT REPRESENT? | |
| 3. HOW HAVE THE OPERATING CASH FLOWS CHANGED IN THE LAST THREE YEARS? | |
| 4. DOES THE COMPANY HAVE ACCESS TO ALTERNATIVE SOURCES OF FINANCING? | ASSESSED ALONG TWO DIMENSIONS - THE QUALITY AND DEPTH OF ALTERNATE FUNDING SOURCES AS WELL AS CAPACITY TO TAKE ON ADDITIONAL DEBT FROM THESE SOURCES. |

*FIG.5*

| | | POINTS |
|---|---|---|
| 1. | WHAT IS THE COMPOSITION OF THE BOARD? | |
| A. | SARBANES-OXLEY FULLY COMPLIANT BOARD (DIVERSE, KNOWLEDGEABLE, AND INDEPENDENT) | 4.18 |
| B. | DIVERSE, KNOWLEDGEABLE AND INDEPENDENT, INCLUDING FINANCIAL EXPERTS, BUT NOT FULLY SARBANES-OXLEY COMPLIANT | 4.31 |
| C. | MOSTLY COMMUNITY-ORIENTED BOARD | 4.38 |
| D. | DON'T KNOW | 4.55 |
| 2. | WHAT PERCENTAGE OF REVENUE DOES GOVERNMENT PAYMENT REPRESENT? | |
| A. | MORE THAN 75% | 4.92 |
| B. | 50% - 75% | 4.61 |
| C. | 25% - 50% | 4.52 |
| D. | LESS THAN 25% | 3.86 |
| 3. | HOW HAVE THE OPERATING CASH FLOWS CHANGED IN THE LAST THREE YEARS? | |
| A. | >5% DECLINE | 4.94 |
| B. | STABLE (WITHIN 5%) | 4.85 |
| C. | INCREASE BETWEEN 5% AND 15% | 4.24 |
| D. | INCREASE OVER 15% | 3.81 |
| 4. | DOES THE COMPANY HAVE ACCESS TO ALTERNATIVE SOURCES OF FINANCING? | |
| A. | WIDE ACCESS TO CAPITAL MARKETS AND BANKS | 3.96 |
| B. | READY ACCESS TO BANK FINANCING | 5.07 |
| C. | ACCESS TO NON-BANK FINANCING ONLY | 5.67 |
| D. | NO OTHER EXTERNAL SOURCE | 6.00 |
| E. | NO INFORMATION AVAILABLE | 5.18 |

*FIG. 6*

| QUESTION | GOAL |
|---|---|
| ECONOMIC STABILITY OF INDUSTRY | ASSESS THE VULNERABILITY OF THE CUSTOMER TO TECHNOLOGICAL OR ECONOMIC TRENDS THAT COULD FUNDAMENTALLY AFFECT THE OUTLOOK FOR THE INDUSTRY AS A WHOLE. |
| STABILITY OF COMPANY'S EARNINGS | TWO SEPARATE BUT RELATED CONSIDERATIONS:<br>a) THE PROPORTION OF EARNINGS THAT ARE GENERATED FROM NON-CORE OPERATIONS<br>b) THE VARIABILITY OF EARNINGS GENERATED BY CORE OPERATIONS<br><br>EVALUATE THE FOLLOWING FACTORS:<br>(1) TYPE OF PRODUCT/TECHNOLOGY/SERVICE<br>(2) THE COMPETITIVE ENVIRONMENT OF THE MARKETPLACE<br>(3) THE REGIONAL/U.S./INTERNATIONAL ECONOMY<br>(4) EXCHANGE RATES<br>(5) IMPORT/EXPORT QUOTAS<br>(6) GOVERNMENT LEGISLATION<br>(7) CUSTOMER CONCENTRATION |
| ACCESS TO ALTERNATIVE FUNDING SOURCES | ASSESSED ALONG TWO DIMENSIONS - THE QUALITY AND DEPTH OF ALTERNATE FUNDING SOURCES AS WELL AS CAPACITY TO TAKE ON ADDITIONAL DEBT FROM THESE SOURCES. |
| MANAGEMENT PERFORMANCE IN ADVERSE CONDITIONS | A TRUE TEST OF MANAGEMENT QUALITY IS ITS PERFORMANCE DURING ADVERSE ECONOMIC CONDITIONS. THE PERFORMANCE OF A MANAGEMENT TEAM SHOULD BE ASSESSED AGAINST THOSE OF THEIR PEERS IN THE INDUSTRY. EXPERIENCE AT ANOTHER FIRM/INDUSTRY SHOULD BE CONSIDERED WHEN ASSESSING WHETHER MANAGEMENT HAS HAD EXPERIENCE MANAGING IN ADVERSE CONDITIONS. |
| CLIENT RESPONSE IN SITUATIONS OF FINANCIAL DISTRESS | ATTEMPT TO ASSESS THE LEVEL OF MANAGEMENT COOPERATION WITH LENDER WHILE ENCOUNTERING A SITUATION OF FINANCIAL DISTRESS. DISTRESS COULD INCLUDE SIGNIFICANT LOSS IN CASH FLOW OR NET WORTH, COVENANT BREACH, MARGIN CALLS, PAST DUES, ETC. |
| COMPANY LIQUIDITY | ASSESS CUSTOMER'S LIQUIDITY AS MEASURED AGAINST ITS NEEDS. |
| COVENANT COMPLIANCE WITHIN THE PAST 2 YEARS | DETERMINE IF THE CUSTOMER IS ROUTINELY OUT OF FORMULA OR IF COVENANTS ARE BREACHED. THIS COULD BE INDICATIVE OF A PROBLEM WITHIN THE COMPANY. |
| BORROWER'S TRACK RECORD IN MEETING PROJECTIONS OR EARNINGS ESTIMATES | ASSESS WHETHER THE BORROWER HAS BEEN ABLE TO CONSISTENTLY MEET REVENUE/PROFIT PROJECTIONS OR PUBLICLY AVAILABLE EARNINGS ESTIMATES, WHERE AVAILABLE. |

*FIG. 7*

| 1. ECONOMIC STABILITY OF INDUSTRY | POINTS |
|---|---|
| A. MINIMAL INDUSTRY CYCLICALITY AND VULNERABILITY TO SUDDEN ECONOMIC OR TECHNOLOGICAL CHANGES. | 1 |
| B. MODERATE SUSCEPTIBILITY TO UNFAVORABLE CHANGES IN THE ECONOMY (MAY INCLUDE REGIONAL OR LOCAL CONDITIONS)/SOME CYCLICALITY EXISTS. SERIOUS FINANCIAL DETERIORATION IN INDUSTRY IS UNLIKELY. | 11 |
| C. INDUSTRY IS SUSCEPTIBLE TO UNFAVORABLE CHANGES IN THE ECONOMY (MAY INCLUDE REGIONAL OR LOCAL CONDITIONS) AND CYCLICALITY EXITS. FINANCIAL DETERIORATION IS POSSIBLE. | 32 |
| D. INDUSTRY HAS SIGNIFICANT PROBLEMS THAT ADVERSELY AFFECT A HIGH PERCENTAGE OF PARTICIPANTS (MAY BE LIMITED TO REGIONAL OR LOCAL CONDITIONS), INCLUDING DOMINANT PLAYERS. | 100 |

| 2. HOW DO YOU CHARACTERIZE THE COMPANY'S EARNINGS? | |
|---|---|
| A. STRONG, RELIABLE/PREDICTABLE, EMANATING FROM ITS CORE BUSINESS. | 1 |
| B. STABLE, EMANATING FROM ITS CORE BUSINESS. | 6 |
| C. MODERATELY STABLE, EMANATING MOSTLY FROM ITS CORE BUSINESS. | 23 |
| D. UNSTABLE, MAY BE EMANATING FROM VARIED AND/OR CHANGING SOURCES. | 100 |

| 3. ACCESS TO ALTERNATIVE FUNDING SOURCES | |
|---|---|
| A. SUBSTANTIAL DEBT CAPACITY WITH ACCESS TO GLOBAL OR NATIONAL CAPITAL MARKETS VIRTUALLY ASSURED AT ALL TIMES. SUBSTANTIAL EXCESS DEBT CAPACITY. | 1 |
| B. READILY ABLE TO REFINANCE DEBT WITH OTHER FINANCIAL INSTITUTIONS AT SIMILAR RATES AND TERMS. STABLE AND HIGHLY DESIRABLE RELATIONSHIP WITH WELL-REGARDED BANKS. ACCESS TO TRADE CREDIT/SPONSORS/SUBORDINATED DEBT ARE SUPPLEMENTAL SOURCE OF FINANCE. | 13 |
| C. LIMITED ACCESS TO ALTERNATIVE BANKS, STRONG RELIANCE ON DEBT FINANCING, COULD EXPERIENCE SOME DIFFICULTY REFINANCING WITH ANOTHER BANK AT SIMILAR RATES AND TERMS BUT MAY HAVE ACCESS TO ALTERNATIVE SOURCES, INCLUDING TRADE. BANK RELATIONSHIP SATISFACTORY. | 31 |
| D. NO PRESENT ACCESS TO ADDITIONAL BANK FINANCING. MAY EXHIBIT CHRONIC OR SERIOUS OVERDRAFTS, UNCOLLECTED FUNDS, AND/OR LOAN DELINQUENCIES. | 100 |

*FIG. 8A*

4. MANAGEMENT PERFORMANCE DURING ADVERSE INDUSTRY CONDITIONS

| | |
|---|---|
| A. STRONGER PERFORMANCE THAN INDUSTRY AVERAGE. | 1 |
| B. PERFORMANCE SIMILAR TO INDUSTRY AVERAGE. | 5 |
| C. WEAKER PERFORMANCE THAN INDUSTRY AVERAGE. | 100 |
| D. DOES NOT HAVE EXPERIENCE MANAGING DURING ADVERSE CONDITIONS. | 47 |

5. HOW HAS THE CLIENT RESPONDED TO SITUATIONS OF FINANCIAL DISTRESS? (DISTRESS COULD INCLUDE: SIGNIFICANT LOSS IN CASH FLOW OR NET WORTH, COVENANT BREACH, MARGIN CALLS, PAST DUES, ETC ...)

| | |
|---|---|
| A. THE CLIENT FOREWARNED LENDER, WAS RESPONSIVE AND TOOK SIGNIFICANT STEPS TO CURE THE SITUATION. | 1 |
| B. THE CLIENT FOREWARNED LENDER, WAS RESPONSIVE AND DID NOT TAKE SIGNIFICANT STEPS TO CURE THE SITUATION. | 20 |
| C. THE CLIENT DID NOT FOREWARN LENDER AND/OR WAS NOT RESPONSIVE AND TOOK SIGNIFICANT STEPS TO CURE THE SITUATION. | 75 |
| D. THE CLIENT DID NOT FOREWARN LENDER, AND/OR WAS NOT RESPONSIVE, AND DID NOT TAKE SIGNIFICANT STEPS TO CURE THE SITUATION. | 100 |
| E. THE CLIENT HAS NEVER EXPERIENCED FINANCIAL DISTRESS. | 10 |
| F. INFORMATION NOT AVAILABLE OR NOT KNOWN TO LENDER. | 10 |

*FIG.8B*

1. WHAT TYPE OF NON-CASH LIQUID ASSET COMPRISES THE LARGEST REMAINING ITEM?
   A. INVESTMENT-GRADE BONDS/MUTUAL FUNDS
   B. NON-INVESTMENT GRADE BONDS
   C. STOCKS TRADED IN MAJOR EXCHANGES
   D. RETIREMENT ACCOUNTS

2. WHAT IS THE MAJOR SOURCE OF THIS INDIVIDUAL'S RECURRING CASHFLOW?
   A. INVESTMENT INCOME FROM A DIVERSIFIED PORTFOLIO
   B. SALARY/WAGES/OTHER WORK-RELATED COMPENSATION
   C. PARTNERSHIP AND SUB-S DISTRIBUTIONS
   D. DIVIDEND PAYMENTS FROM A NON-DIVERSIFIED PORTFOLIO
   E. RENTAL CASHFLOW
   F. RETIREMENT DISTRIBUTIONS (INCLUDING SOCIAL SECURITY AND IRA)

3. HOW CONCENTRATED IS THE MAJOR SOURCE OF RECURRENT CASHFLOW?
   A. DIVERSIFIED ACROSS INDUSTRIES OR GEOGRAPHIES
   B. CONCENTRATED IN INDUSTRY OR GEOGRAPHY

4. WHAT LEGAL AND REGULATORY CHALLENGES DO THE MAJOR SOURCE OF CASHFLOW FACE?
   A. NONE (OR CASHFLOW IS DIVERSIFIED)
   B. SAME AS ANY BUSINESS (I.E. FISCAL)
   C. SUBJECT TO INDUSTRY-SPECIFIC REGULATOR OR INDUSTRY IS CURRENTLY BEING SCRUTINIZED (I.E. REGULATORS, PRESS)
   D. SPECIFIC SOURCE (I.E. COMPANY OR INDUSTRY) IS UNDER INVESTIGATION OR SUPERVISION BY A GOVERNMENT BODY

5. HOW HAS THE CLIENT RESPONDED TO SITUATIONS OF FINANCIAL DISTRESS?
   A. THE CLIENT FOREWARNED LENDER, WAS RESPONSIVE AND TOOK SIGNIFICANT STEPS TO CURE THE SITUATION.
   B. THE CLIENT DID NOT FOREWARN LENDER BUT WAS RESPONSIVE AND TOOK SIGNIFICANT STEPS TO CURE THE SITUATION.
   C. THE CLIENT DID NOT FOREWARN LENDER AND/OR WAS NOT RESPONSIVE, AND DID NOT TAKE SIGNIFICANT STEPS TO CURE THE SITUATION.
   D. THE CLIENT HAS NEVER EXPERIENCED FINANCIAL DISTRESS.
   E. INFORMATION NOT AVAILABLE OR NOT KNOWN TO LENDER.

*FIG. 9*

| FACTORS | GENERAL | EDUCATION | GOVERNMENT |
|---|---|---|---|
| **FINANCIAL FACTORS** | | | |
| F1. CASHFLOW / DEBT SERVICE | 10.0% | 10.0% | 10.0% |
| F2. LIQUIDITY | 5.0% | 5.0% | 7.5% |
| F3. COMPARATIVE LIQUIDITY | 5.0% | 5.0% | 7.5% |
| F4. LEVERAGE | 7.5% | 7.5% | 7.5% |
| F5. DIVERSITY OF REVENUE GENERATION MIX | 5.0% | 5.0% | 5.0% |
| F6. REVENUE TREND | 7.5% | 7.5% | 7.5% |
| F7. PROFITABILITY | 5.0% | | |
| F8. GROWTH | 5.0% | | |
| TOTAL FINANCIAL | 50.0% | 40.0% | 45.0% |
| **NON-FINANCIAL FACTORS** | | | |
| NF1. ECONOMIC STABILITY OF SECTOR | 7.5% | 7.5% | 7.5% |
| NF2. ACCESS TO ALTERNATIVE FUNDING SOURCES | 7.5% | 7.5% | 7.5% |
| NF3. MANAGEMENT FINANCIAL PERFORMANCE DURING ADVERSE BUSINESS CONDITIONS | 7.5% | 7.5% | 7.5% |
| NF4. RESPONSE TO FINANCIAL DISTRESS | 5.0% | 5.0% | 5.0% |
| NF5. COVENANT COMPLIANCE | 5.0% | 5.0% | |
| NF6. TRACK RECORD IN MEETING PROJECTIONS | 5.0% | | |
| NF7. MANAGEMENT EXPERIENCE | 7.5% | | |
| NF8. TIMELINESS OF FINANCIAL REPORTING | 5.0% | | 5.0% |
| TOTAL NON-FINANCIAL | 50.0% | 32.5% | 32.5% |
| **SECTOR-SPECIFIC FACTORS** | | | |
| E1. ENROLLMENT TRENDS | | 15.0% | |
| E2. LEVEL OF TUITION DISCOUNTING | | 5.0% | |
| E3. ABILITY TO RAISE TUITION | | 7.5% | |
| G1. POPULATION GROWTH TRENDS | | | 15.0% |
| G2. WEALTH INDICATORS | | | 7.5% |
| TOTAL SECTOR-SPECIFIC FACTORS | | 27.5% | 22.5% |
| TOTAL WEIGHT | | 100% | 100% |

*FIG. 10*

| F1. CASHFLOW / DEBT SERVICE | POINTS |
|---|---|
| A. MORE THAN ADEQUATE CASHFLOW TO COVER DEBT OBLIGATIONS, DIVIDENDS AND CAPEX; AND<br>DEBT SERVICE RATIO IS IN THE TOP 10% RELATIVE TO OTHERS IN ITS SECTOR | 1 |
| B. ADEQUATE CASHFLOW TO COVER DEBT OBLIGATIONS AND ALL BUT DISCRETIONARY CAPEX; AND<br>DEBT SERVICE RATIO IS BETTER THAN AVERAGE WHEN COMPARED TO PEERS | 10 |
| C. ADEQUATE CASHFLOW TO COVER ALL BUT DISCRETIONARY CAPEX; AND<br>DEBT SERVICE RATIO IS AVERAGE WHEN COMPARED TO PEERS | 20 |
| D. INADEQUATE CASHFLOW TO COVER MAINTENANCE CAPEX; OR<br>DEBT SERVICE RATIO IS BELOW AVERAGE WHEN COMPARED TO PEERS | 50 |
| E. BELOW ACCEPTABLE CASHFLOW LEVELS TO SERVICE DEBT; OR<br>DEBT SERVICE RATIO IS SUBSTANTIALLY BELOW AVERAGE WHEN COMPARED TO PEERS | 100 |
| F. NOT APPLICABLE OR RELEVANT TO BORROWERS IN THIS SECTOR | |

| F2. LIQUIDITY | |
|---|---|
| A. HIGH LIQUIDITY COMPARED WITH NEEDS / LIABILITY STRUCTURE | 1.0<br>GOV: 1.0 |
| B. SLIGHTLY HIGHER THAN AVERAGE LIQUIDITY COMPARED WITH NEEDS / LIABILITY STRUCTURE | 5.0<br>GOV: 7.5 |
| C. AVERAGE LIQUIDITY COMPARED WITH NEEDS / LIABILITY STRUCTURE | 10.0<br>GOV: 15.0 |
| D. LOWER THAN AVERAGE LIQUIDITY COMPARED WITH NEEDS / LIABILITY STRUCTURE; OR COULD NOT PAY OUT ALL CURRENT MATURITIES AND SHORT-TERM OBLIGATIONS WITHOUT DIFFICULTY | 50.0<br>GOV: 75.0 |
| E. NOT APPLICABLE OR RELEVANT TO BORROWERS IN THIS SECTOR | |

| F3. COMPARATIVE LIQUIDITY | |
|---|---|
| A. LIQUIDITY POSITION IS IN THE TOP 10% RELATIVE TO OTHERS IN ITS SECTOR; AND IMPROVED LIQUIDITY TREND | 1.0<br>GOV: 1.0 |
| B. LIQUIDITY POSITION IS BETTER THAN AVERAGE WHEN COMPARED TO PEERS; AND STABLE OR IMPROVED LIQUIDITY TREND | 15.0<br>GOV: 22.5 |
| C. LIQUIDITY POSITION IS AT OR BELOW AVERAGE WHEN COMPARED TO PEERS; AND DETERIORATING LIQUIDITY POSITION OVER THE PAST 3 YEARS | 50.0<br>GOV: 75.0 |
| D. NOT APPLICABLE OR RELEVANT TO BORROWERS IN THIS SECTOR | |

*FIG. 11A*

F4. LEVERAGE

| | |
|---|---|
| A. LEVERAGE POSITION, INCLUDING ANY OFF-BALANCE SHEET LEVERAGE, IS IN THE TOP 10% RELATIVE TO OTHERS IN ITS SECTOR | 1.0 |
| B. LEVERAGE POSITION, INCLUDING ANY OFF-BALANCE SHEET LEVERAGE, IS BETTER THAN AVERAGE RELATIVE TO PEERS | 7.5 |
| C. LEVERAGE POSITION, INCLUDING ANY OFF-BALANCE SHEET LEVERAGE, IS AT OR BELOW AVERAGE RELATIVE TO PEERS | 15.0 |
| D. LEVERAGE POSITION, INCLUDING ANY OFF-BALANCE SHEET LEVERAGE, IS SUBSTANTIALLY BELOW AVERAGE RELATIVE TO PEERS | 75.0 |
| E. NOT APPLICABLE OR RELEVANT TO BORROWERS IN THIS SECTOR | |

F5. DIVERSITY OF REVENUE GENERATION MIX

| | |
|---|---|
| A. HIGHLY DIVERSIFIED BUSINESS / ACTIVITY / REVENUE GENERATION MIX WITH EACH BUSINESS ACTIVITY CONSTITUTING LESS THAN 30% OF TOTAL REVENUES | 1.0 |
| B. WELL DIVERSIFIED BUSINESS / ACTIVITY / REVENUE GENERATION MIX WITH TOP 2 BUSINESS ACTIVITIES TOGETHER CONSTITUTING LESS THAN 50% OF TOTAL REVENUES | 12.5 |
| C. MODERATELY DIVERSIFIED BUSINESS / ACTIVITY / REVENUE GENERATION MIX WITH TOP 2 BUSINESS ACTIVITIES TOGETHER CONSTITUTING MORE THAN 50% OF TOTAL REVENUES | 37.5 |
| D. UNDIVERSIFLED BUSINESS / ACTIVITY / REVENUE GENERATION MIX WITH ONE BUSINESS LINE / ACTIVITY CONSTITUTING MORE THAN 80% OF TOTAL REVENUES | 50.0 |
| E. NOT APPLICABLE OR RELEVANT TO BORROWERS IN THIS SECTOR | |

F6. REVENUE TREND OVER THE PAST 3 YEARS

| | |
|---|---|
| A. STRONG, RELIABLE / PREDICTABLE, EMANATING FROM CORE ACTIVITY | 1.00 |
| B. STABLE, EMANATING MOSTLY FROM CORE ACTIVITY | 4.50 |
| C. UNSTABLE, MAY BE EMANATING FROM VARIED AND / OR CHANGING SOURCES | 17.75 |
| D. STEADILY DECLINING | 75.00 |
| E. NOT APPLICABLE OR RELEVANT TO BORROWERS IN THIS SECTOR | |

F7. PROFITABILITY

| | |
|---|---|
| A. PROFITABILITY IS IN THE TOP 10% OF ITS SECTOR | 1 |
| B. PROFITABILITY IS BETTER THAN AVERAGE WHEN COMPARED TO PEERS | 5 |
| C. PROFITABILITY IS AT OR BELOW AVERAGE WHEN COMPARED TO PEERS | 10 |
| D. PROFITABILITY IS SUBSTANTIALITY BELOW AVERAGE WHEN COMPARED TO PEERS | 25 |
| E. NOT APPLICABLE OR RELEVANT TO BORROWERS IN THIS SECTOR | 50 |

*FIG. 11B*

| F8. GROWTH IN THE PAST 3 YEARS | |
|---|---|
| A. THE GROWTH EXPERIENCE HAS BEEN POSITIVE OVER THE PAST 3 YEARS, AND NOT VOLATILE; AND<br>THIS GROWTH PROFILE IS VIEWED AS SUSTAINABLE IN THE FUTURE | 1 |
| B. THE GROWTH EXPERIENCE HAS SHOWN SOME VOLATILITY, THOUGH IT HAS BEEN POSITIVE OVER THE PAST 3 YEARS; AND<br>THIS GROWTH PROFILE IS VIEWED AS SUSTAINABLE IN THE FUTURE | 5 |
| C. SOME DOUBTS ABOUT THE FUTURE PROSPECTS OF GROWTH, THOUGH GROWTH EXPERIENCE HAS BEEN POSITIVE OVER THE PAST 3 YEARS, POSSIBLY WITH SOME VOLATILITY | 25 |
| D. THE GROWTH EXPERIENCE HAS BEEN A CONCERN OVER THE PAST 3+ YEARS (NEGATIVE TREND, HIGH VOLATILITY); OR<br>START-UP | 50 |
| E. NOT APPLICABLE OR RELEVANT TO BORROWERS IN THIS SECTOR | |

| NF1. ECONOMIC STABILITY OF SECTOR | |
|---|---|
| A. MINIMUM CYCLICALITY AND VULNERABILITY TO SUDDEN ECONOMIC, REGULATORY OR TECHNICAL CHANGES | 1 |
| B. MODERATE SUSCEPTIBILITY TO UNFAVORABLE CHANGES IN THE ECONOMY, OR SOME CYCLICALITY EXISTS. SERIOUS FINANCIAL DETERIORATION IS UNLIKELY. | 8 |
| C. SECTOR IS SUSCEPTIBLE TO UNFAVORABLE CHANGES IN THE ECONOMY AND CYCLICALITY EXISTS. FINANCIAL DETERIORATION IS POSSIBLE. | 24 |
| D. SECTOR HAS SIGNIFICANT PROBLEMS THAT ADVERSELY AFFECT A HIGH PERCENTAGE OF PARTICIPANTS, INCLUDING MAJOR PLAYERS | 75 |
| E. NOT APPLICABLE OR RELEVANT TO BORROWERS IN THIS SECTOR | |

| NF2. ACCESS TO ALTERNATIVE FUNDING SOURCES | |
|---|---|
| A. WIDE ACCESS TO CAPITAL MARKETS AND BANKS | 1 |
| B. READILY ABLE TO REFINANCE DEBT WITH OTHER FINANCIAL INSTITUTIONS AT SIMILAR RETURNS AND TERMS. STABLE AND HIGHLY DESIRABLE RELATIONSHIP WITH WELL-REGARDED BANK. ACCESS TO OTHER CREDITS / SPONSORS / SUBORDINATED DEBT ARE SUPPLEMENTAL SOURCE OF FINANCE | 10 |
| C. LIMITED ACCESS TO BANKS, STRONG RELIANCE ON DEBT FINANCING, COULD EXPERIENCE SOME DIFFICULTY REFINANCING WITH ANOTHER BANK AT SIMILAR RATES AND TERMS BUT MAY HAVE ACCESS TO ALTERNATIVE SOURCES | 23 |
| D. NO OTHER EXTERNAL SOURCE OF FUNDING AVAILABLE | 75 |
| E. NOT APPLICABLE OR RELEVANT TO BORROWERS IN THIS SECTOR | |

| NF3. MANAGEMENT FINANCIAL PERFORMANCE DURING ADVERSE CONDITIONS | |
|---|---|
| A. STRONGER PERFORMANCE THAN SECTOR AVERAGE | 1 |
| B. PERFORMANCE SIMILAR TO SECTOR AVERAGE | 4 |
| C. WEAKER PERFORMANCE THAN SECTOR AVERAGE | 75 |
| D. DOES NOT HAVE EXPERIENCE MANAGING FINANCES DURING ADVERSE CONDITIONS' | 35 |
| E. NOT APPLICABLE OR RELEVANT TO BORROWERS IN THIS SECTOR | |

*FIG.11C*

NF4. HOW HAS THE CLIENT RESPONDED TO SITUATIONS OF FINANCIAL DISTRESS?

| | |
|---|---|
| A. THE CLIENT FOREWARNED LENDER, AND TOOK SIGNIFICANT STEPS TO CURE THE SITUATION | 1 |
| B. THE CLIENT FOREWARNED LENDER, BUT DID NOT TAKE SIGNIFICANT STEPS TO CURE THE SITUATION | 10 |
| C. THE CLIENT DID NOT FOREWARN LENDER BUT WAS RESPONSIVE ONCE LENDER APPROACHED THEM | 38 |
| D. THE CLIENT DID NOT FOREWARN LENDER, AND WAS NOT RESPONSIVE ONCE LENDER APPROACHED THEM | 50 |
| E. THE CLIENT HAS NEVER KNOWN FINANCIAL DISTRESS | 5 |
| F. NOT APPLICABLE OR RELEVANT TO BORROWERS IN THIS SECTOR | |

NF5. COVENANT COMPLIANCE

| | |
|---|---|
| A. NO COVENANT VIOLATIONS | 1 |
| B. THERE HAVE BEEN MINOR COVENANT VIOLATIONS | 7 |
| C. THERE HAVE BEEN MAJOR COVENANT VIOLATIONS | 50 |
| D. NO COVENANTS | 18 |

NF6. THE BORROWER'S TRACK RECORD IN MEETING CASHFLOW PROJECTIONS PROVIDED TO LENDERS OR EARNINGS PROJECTIONS PUBLICLY PROVIDED OVER THE PAST 3 YEARS:

| | |
|---|---|
| A. HAVE CONSISTENTLY BEEN MET OR EXCEEDED | 1 |
| B. HAVE BEEN MET OR EXCEEDED A MAJORITY OF THE TIME | 9 |
| C. HAVE CONSISTENTLY FAILED TO BE MET | 50 |
| D. PROJECTIONS UNAVAILABLE | 11 |
| E. NOT APPLICABLE OR RELEVANT TO BORROWERS IN THIS SECTOR | |

NF7. MANAGEMENT EXPERIENCE

| | |
|---|---|
| A. BROAD EXPERIENCE IN THE SECTOR. HIGHLY EXPERIENCED MANAGEMENT TEAM | 1 |
| B. ACCEPTABLE SECTOR EXPERIENCE | 29 |
| C. LIMITED SECTOR EXPERIENCE | 35 |
| D. INEXPERIENCED MANAGEMENT TEAM | 75 |
| E. NOT APPLICABLE OR RELEVANT TO BORROWERS IN THIS SECTOR | |

NF8. TIMELINESS OF FINANCIAL REPORTING

| | |
|---|---|
| A. FINANCIAL REPORTING IS NEVER LATE | 1 |
| B. FINANCIAL REPORTING IS OCCASIONALLY LATE < 30 DAYS | 13 |
| C. FINANCIAL REPORTING IS FREQUENTLY LATE < 30 DAYS | 33 |
| D. FINANCIAL REPORTING IS FREQUENTLY LATE > 30 DAYS | 50 |
| E. NOT APPLICABLE OR RELEVANT TO BORROWERS IN THIS SECTOR | |

*FIG. 11D*

E1. ENROLLMENT TRENDS OVER THE PAST 3 YEARS

| | | |
|---|---|---|
| A. | IMPROVING ( >2%) | 1 |
| B. | FLAT (-2% TO 2%) | 30 |
| C. | DECLINING ( >2%) | 75 |
| D. | INFORMATION NOT AVAILABLE | 150 |

E2. LEVEL OF TUITION DISCOUNTING

| | | |
|---|---|---|
| A. | HIGH ( >=30%) | 1 |
| B. | MODERATE ( >=20% AND <30%) | 10 |
| C. | LOW ( < 20%) | 25 |
| D. | INFORMATION NOT AVAILABLE | 50 |

E3. ABILITY TO INCREASE TUITION

| | | |
|---|---|---|
| A. | ABLE TO INCREASE TUITION WELL ABOVE THE NATIONAL AVERAGE WITHOUT IMPACTING ENROLLMENT | 1.0 |
| B. | ABLE TO INCREASE TUITION SLIGHTLY ABOVE THE NATIONAL AVERAGE WITHOUT IMPACTING ENROLLMENT | 7.5 |
| C. | CAN ONLY INCREASE TUITION AT THE NATIONAL AVERAGE WITHOUT IMPACTING ENROLLMENT | 15.0 |
| D. | CANNOT INCREASE TUITION WITHOUT IMPACTING ENROLLMENT | 37.5 |
| E. | INFORMATION NOT AVAILABLE | 75.0 |

G1. POPULATION GROWTH TREND

| | | |
|---|---|---|
| A. | THE POPULATION HAS INCREASED OVER THE PAST 3 YEARS AT A RATE ABOVE THE STATE / NATIONAL LEVEL | 1.0 |
| B. | THE POPULATION HAS INCREASED OVER THE PAST 3 YEARS AT A RATE COMPARABLE TO THE STATE / NATIONAL AVERAGE | 7.5 |
| C. | THE POPULATION HAS INCREASED OVER THE PAST 3 YEARS AT A RATE BELOW THE STATE / NATIONAL AVERAGE | 15.0 |
| D. | THE POPULATION HAS REMAINED STABLE OVER THE PAST 3 YEARS | 37.5 |
| E. | THE POPULATION HAS DECREASED OVER THE PAST 3 YEARS | 75.0 |
| F. | INFORMATION NOT AVAILABLE | 150.0 |

G2. WEALTH INDICATORS

| | | |
|---|---|---|
| A. | AVERAGE ANNUAL FAMILY / HOUSEHOLD INCOME IS ABOVE STATE / NATIONAL LEVEL | 1.0 |
| B. | AVERAGE ANNUAL FAMILY / HOUSEHOLD INCOME IS COMPARABLE TO STATE / NATIONAL LEVEL | 15.0 |
| C. | AVERAGE ANNUAL FAMILY / HOUSEHOLD INCOME IS BELOW STATE / NATIONAL AVERAGES | 37.5 |
| D. | INFORMATION NOT AVAILABLE | 75.0 |

*FIG. 11E*

| COLLATERAL | BASE LTV | MIN LGD | COLLATERAL REC RATE |
|---|---|---|---|
| LIQUID ASSETS | | | |
| CASH/CERTIFICATE OF DEPOSIT | 100% | 5% | 95% |
| LETTERS OF CREDIT | 100% | 5% | 95% |
| MARKETABLE SECURITIES - BONDS ONLY | 80% | 5% | 76% |
| MARKETABLE SECURITIES - ALL OTHER | 75% | 5% | 71% |
| CORPORATE CURRENT ASSETS | | | |
| ASSET SECURITIZATION | 100% | 10% | 90% |
| ACCOUNTS RECEIVABLE - FULLY MONITORED | 85% | 10% | 68% |
| INVENTORY - FULLY MONITORED | 70% | 10% | 56% |
| ACCOUNTS RECEIVABLE - NOT FULLY MONITORED | 80% | 20% | 56% |
| INVENTORY - NOT FULLY MONITORED | 60% | 20% | 42% |
| MOTOR VEHICLE FLOORPLAN (AUTOMOBILES) | 100% | 10% | 90% |
| CORPORATE FIXED ASSETS | | | |
| MANUFACTURING EQUIPMENT | 80% | 20% | 60% |
| ROLLING STOCK (RAIL CARS, TRUCKS, BOATS, ETC.) | 100% | 20% | 75% |
| OFFICE/BUSINESS EQUIPMENT | 40% | 35% | 24% |
| CORPORATE PROPERTY & PLANT-APPRAISAL DATED < 2 YEARS | 85% | 25% | 60% |
| CORPORATE PROPERTY & PLANT-APPRAISAL DATED > 2 YEARS | 85% | 25% | 60% |
| OTHER ASSETS | 40% | 35% | 24% |
| LEASING | | | |
| CROSS BORDER COLLATERAL PACKAGE | 100% | 5% | 95% |
| CLASS I EQUIPMENT | 100% | 15% | 85% |
| CLASS II EQUIPMENT | 100% | 25% | 75% |
| CLASS III EQUIPMENT | 100% | 30% | 70% |
| CLASS IV EQUIPMENT | 100% | 40% | 60% |

*FIG.14A*

| | | | |
|---|---|---|---|
| **REAL ESTATE - INCOME PRODUCING** | | | |
| INVESTMENT-GRADE TENANT BUILDING | 95% | 15% | 71% |
| MULTI-FAMILY | 80% | 15% | 60% |
| INDUSTRIAL | 75% | 15% | 56% |
| RETAIL | 75% | 15% | 56% |
| OFFICE | 75% | 15% | 56% |
| AFFORDABLE HOUSING | 80% | 15% | 60% |
| HOTEL | 65% | 20% | 42% |
| **REAL ESTATE - CONSTRUCTION & LEASE UP** | | | |
| INVESTMENT-GRADE TENANT BUILDING | 95% | 15% | 71% |
| MULTI-FAMILY | 80% | 15% | 60% |
| INDUSTRIAL | 75% | 15% | 56% |
| RETAIL | 75% | 15% | 56% |
| OFFICE | 75% | 15% | 56% |
| AFFORDABLE HOUSING | 80% | 15% | 60% |
| HOTEL | 65% | 20% | 42% |
| LAND | 50% | 30% | 30% |
| RESIDENTIAL DEVELOPMENT | 75% | 25% | 56% |
| **OTHER** | | | |
| PERSONAL RESIDENCE | 80%. | 10% | 72% |
| REVENUE PLEDGE/ GOVERNMENT GRANT | 100% | 5% | 65% |
| REIT/ POOLS/ NATIONAL HOME BUILDERS | 60% | 15% | 45% |
| UNSECURED | NA | NA | NA |
| UNSECURED - STRUCTURALLY SUBORDINATED | NA | NA | NA |

*FIG.14B*

| FACILITY | LOAN AMOUNT | SECURED AMOUNT | LGD RATE | LGD GRADE |
|---|---|---|---|---|
| 1 | 100 | | | |
| 2 | 200 | | | |
| 3 | 300 | | | |
| 4 | | | | |
| 5 | | | | |
| TOTAL | 600 | 745 | 0.201 | D |

| COLLATERAL | TYPE | AMOUNT | COLLATERAL RECOVERY RATE | RECOVERY AMT | ADJUSTED RECOVERY AMT | BASE LTV | MINLGD | RECOVERY RANK |
|---|---|---|---|---|---|---|---|---|
| A | INVENTORY - NOT FULLY MONITORED | 100 | 0.42 | 42.00 | 42.00 | 0.60 | 0.20 | 4 |
| B | ACCOUNTS RECEIVABLE - NOT FULLY MONITORED | 200 | 0.56 | 112.0 | 112.00 | 0.80 | 0.20 | 3 |
| C | CASH/CERTIFICATE OF DEPOSIT | 100 | 0.95 | 95.00 | 95.00 | 1.00 | 0.05 | 1 |
| D | CORPORATE PROPERTY & PLANT - APPRAISAL DATED > 2 YEARS | 500 | 0.60 | 297.50 | 297.50 | 0.85 | 0.25 | 2 |
| E | | | 0.00 | 0.00 | 0.00 | 0.00 | 0.00 | 5 |
| TOTAL | | 900 | | | 546.50 | | 0.201 | |

FIG. 15

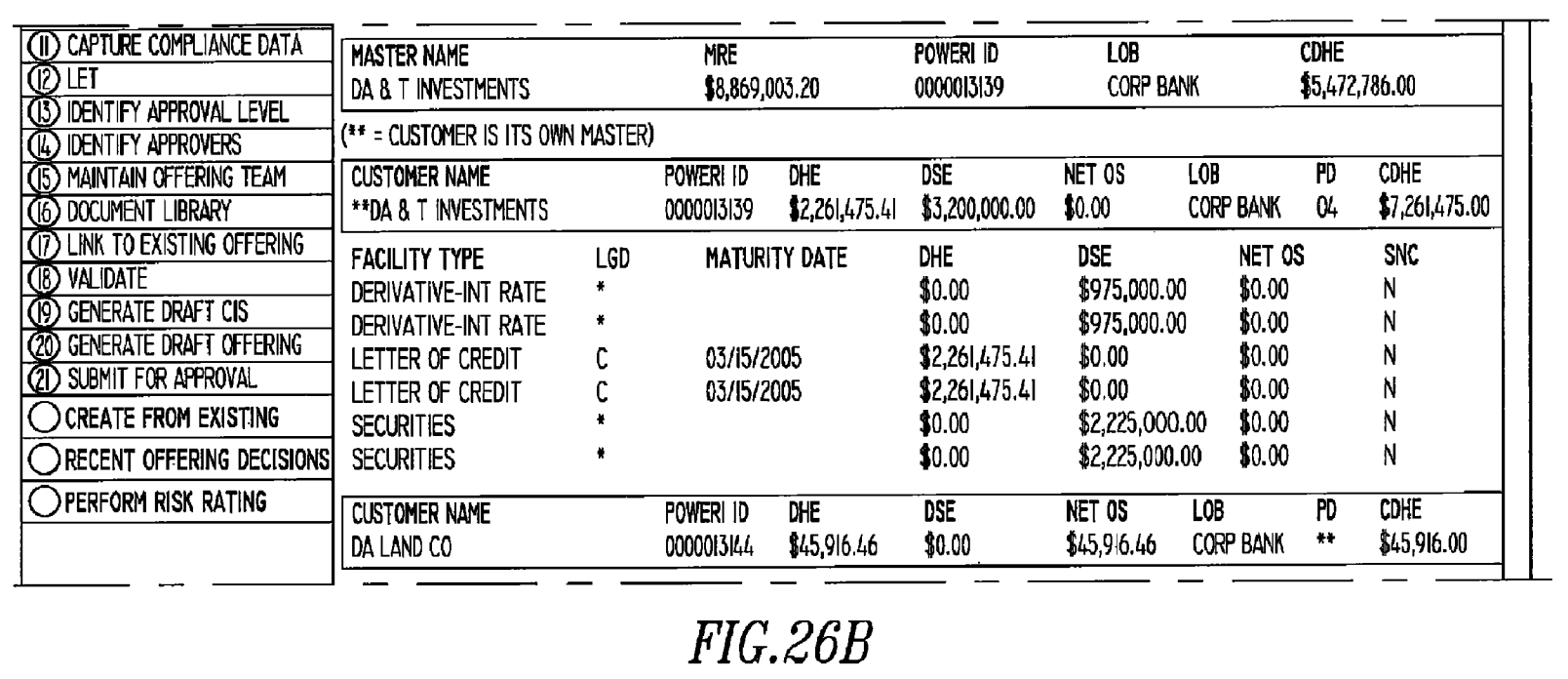

| |
|---|
| (11) CAPTURE COMPLIANCE DATA |
| (12) LET |
| (13) IDENTIFY APPROVAL LEVEL |
| (14) IDENTIFY APPROVERS |
| (15) MAINTAIN OFFERING TEAM |
| (16) DOCUMENT LIBRARY |
| (17) LINK TO EXISTING OFFERING |
| (18) VALIDATE |
| (19) GENERATE DRAFT CIS |
| (20) GENERATE DRAFT OFFERING |
| (21) SUBMIT FOR APPROVAL |
| ○ CREATE FROM EXISTING |
| ○ RECENT OFFERING DECISIONS |
| ○ PERFORM RISK RATING |

| MASTER NAME | MRE | POWERI ID | LOB | CDHE |
|---|---|---|---|---|
| DA & T INVESTMENTS | $8,869,003.20 | 0000013139 | CORP BANK | $5,472,786.00 |

(** = CUSTOMER IS ITS OWN MASTER)

| CUSTOMER NAME | POWERI ID | DHE | DSE | NET OS | LOB | PD | CDHE |
|---|---|---|---|---|---|---|---|
| **DA & T INVESTMENTS | 0000013139 | $2,261,475.41 | $3,200,000.00 | $0.00 | CORP BANK | 04 | $7,261,475.00 |

| FACILITY TYPE | LGD | MATURITY DATE | DHE | DSE | NET OS | SNC |
|---|---|---|---|---|---|---|
| DERIVATIVE-INT RATE | * | | $0.00 | $975,000.00 | $0.00 | N |
| DERIVATIVE-INT RATE | * | | $0.00 | $975,000.00 | $0.00 | N |
| LETTER OF CREDIT | C | 03/15/2005 | $2,261,475.41 | $0.00 | $0.00 | N |
| LETTER OF CREDIT | C | 03/15/2005 | $2,261,475.41 | $0.00 | $0.00 | N |
| SECURITIES | * | | $0.00 | $2,225,000.00 | $0.00 | N |
| SECURITIES | * | | $0.00 | $2,225,000.00 | $0.00 | N |

| CUSTOMER NAME | POWERI ID | DHE | DSE | NET OS | LOB | PD | CDHE |
|---|---|---|---|---|---|---|---|
| DA LAND CO | 0000013144 | $45,916.46 | $0.00 | $45,916.46 | CORP BANK | ** | $45,916.00 |

*FIG.26B*

WARNING SIGNALS:

PLEASE CHECK OFF ANY WARNING SIGNAL THAT MIGHT BE APPLICABLE. FOR EACH WARNING SIGNAL CHECKED OFF, PLEASE DETERMINE THE LIKELY IMPACT ON THE LOSS GIVEN DEFAULT, AS WELL AS BRIEF COMMENTS.

| | |
|---|---|
| MARKET DOWNTURN FOR SPECIFIC SECURITY OR TYPE OF MACHINERY, EQUIPMENT, REAL ESTATE: | ☐ |
| DETERIORATION IN PHYSICAL CONDITION OF COLLATERAL: | ☐ |
| ISSUES WITH ELIGIBILITY OF COLLATERAL: | ☐ |
| NEGATIVE FINANCIAL TRENDS IN TURNOVER: | ☐ |
| SIGNIFICANT ASSET DILUTION RISK: | ☐ |
| ISSUES WITH INDEPENDENCE, QUALITY AND TIMELINESS OF COLLATERAL VALUATIONS: | ☐ |
| POTENTIAL FORECLOSURE ISSUES: | ☐ |
| SPECIAL USE EQUIPMENT: | ☐ |
| DOCUMENTATION EXCEPTIONS/DEFICIENCIES: | ☐ |
| INADEQUATE INSURANCE COVERAGE: | ☐ |
| ISSUES WITH CONTROL OVER COLLATERAL: | ☐ |
| ISSUES WITH ACCESSIBILITY TO COLLATERAL: | ☐ |
| RISK OF FRAUDULENT CONVEYANCE: | ☐ |
| INTERVENING LIENS: | ☐ |
| RISK OF COLLATERAL FRAUD BY THE BORROWER: | ☐ |
| CONSIDERATION AND PREFERENCE RISK: | ☐ |
| LACK OF CASH DOMINION WHEN APPROPRIATE: | ☐ |
| INCREASES IN SIVs AT SPECIFIC OR RELATED GROUPS OF DEALERSHIPS: | ☐ |

*FIG. 85*

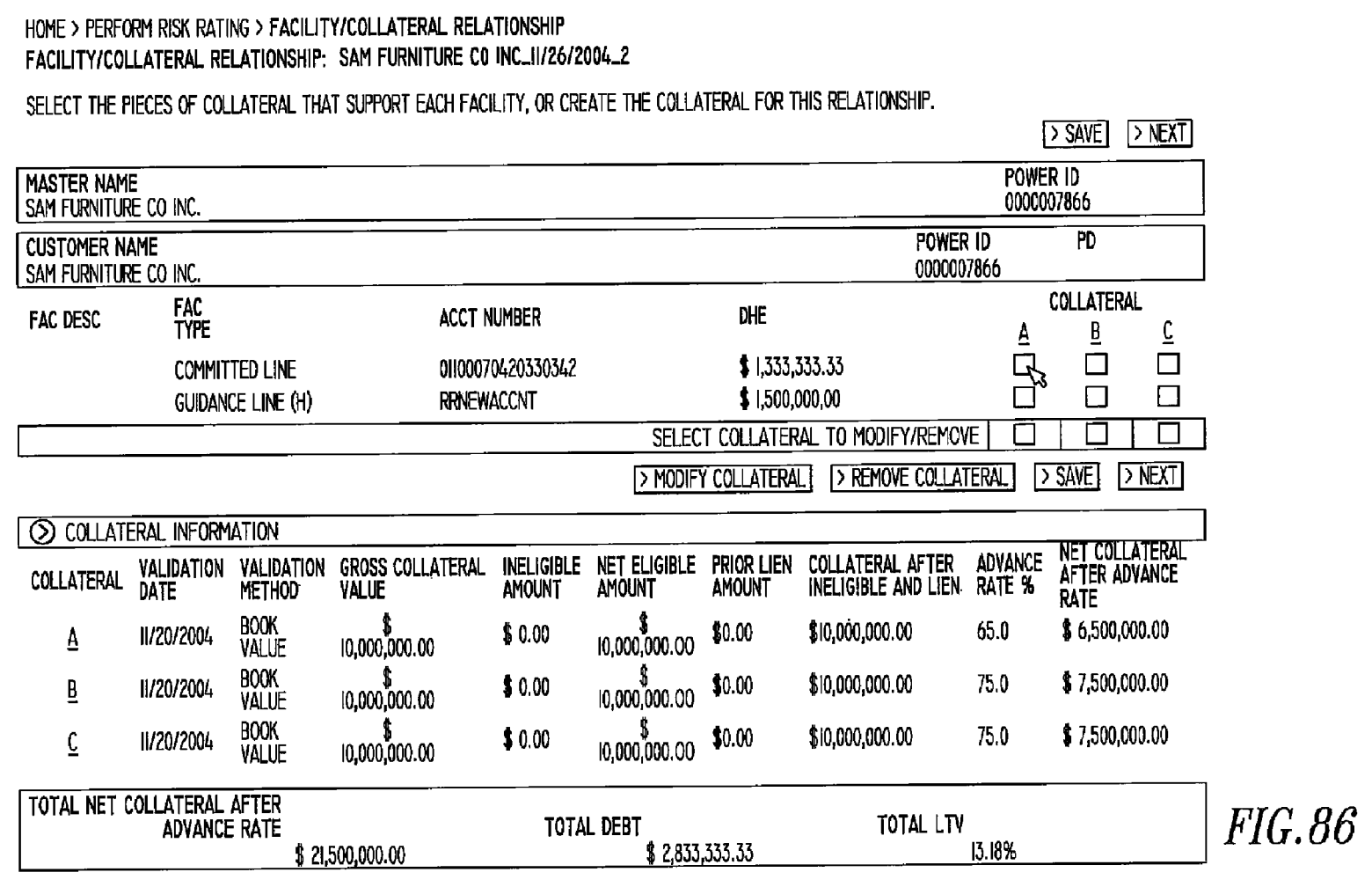

HOME > PERFORM RISK RATING > FACILITY/COLLATERAL RELATIONSHIP

FACILITY/COLLATERAL RELATIONSHIP: SAM FURNITURE CO INC_11/26/2004_2

SELECT THE PIECES OF COLLATERAL THAT SUPPORT EACH FACILITY, OR CREATE THE COLLATERAL FOR THIS RELATIONSHIP.

> SAVE > NEXT

| MASTER NAME | POWER ID |
|---|---|
| SAM FURNITURE CO INC. | 0000007866 |

| CUSTOMER NAME | POWER ID | PD |
|---|---|---|
| SAM FURNITURE CO INC. | 0000007866 | |

| FAC DESC | FAC TYPE | ACCT NUMBER | DHE | COLLATERAL A | COLLATERAL B | COLLATERAL C |
|---|---|---|---|---|---|---|
| | COMMITTED LINE | 01100070420330342 | $ 1,333,333.33 | ☐ | ☐ | ☐ |
| | GUIDANCE LINE (H) | RRNEWACCNT | $ 1,500,000,00 | ☐ | ☐ | ☐ |
| | | | SELECT COLLATERAL TO MODIFY/REMOVE | ☐ | ☐ | ☐ |

> MODIFY COLLATERAL > REMOVE COLLATERAL > SAVE > NEXT

COLLATERAL INFORMATION

| COLLATERAL | VALIDATION DATE | VALIDATION METHOD | GROSS COLLATERAL VALUE | INELIGIBLE AMOUNT | NET ELIGIBLE AMOUNT | PRIOR LIEN AMOUNT | COLLATERAL AFTER INELIGIBLE AND LIEN | ADVANCE RATE % | NET COLLATERAL AFTER ADVANCE RATE |
|---|---|---|---|---|---|---|---|---|---|
| A | 11/20/2004 | BOOK VALUE | $ 10,000,000.00 | $ 0.00 | $ 10,000,000.00 | $0.00 | $10,000,000.00 | 65.0 | $ 6,500,000.00 |
| B | 11/20/2004 | BOOK VALUE | $ 10,000,000.00 | $ 0.00 | $ 10,000,000.00 | $0.00 | $10,000,000.00 | 75.0 | $ 7,500,000.00 |
| C | 11/20/2004 | BOOK VALUE | $ 10,000,000.00 | $ 0.00 | $ 10,000,000.00 | $0.00 | $10,000,000.00 | 75.0 | $ 7,500,000.00 |

| TOTAL NET COLLATERAL AFTER ADVANCE RATE | TOTAL DEBT | TOTAL LTV |
|---|---|---|
| $ 21,500,000.00 | $ 2,833,333.33 | 13.18% |

FIG. 86

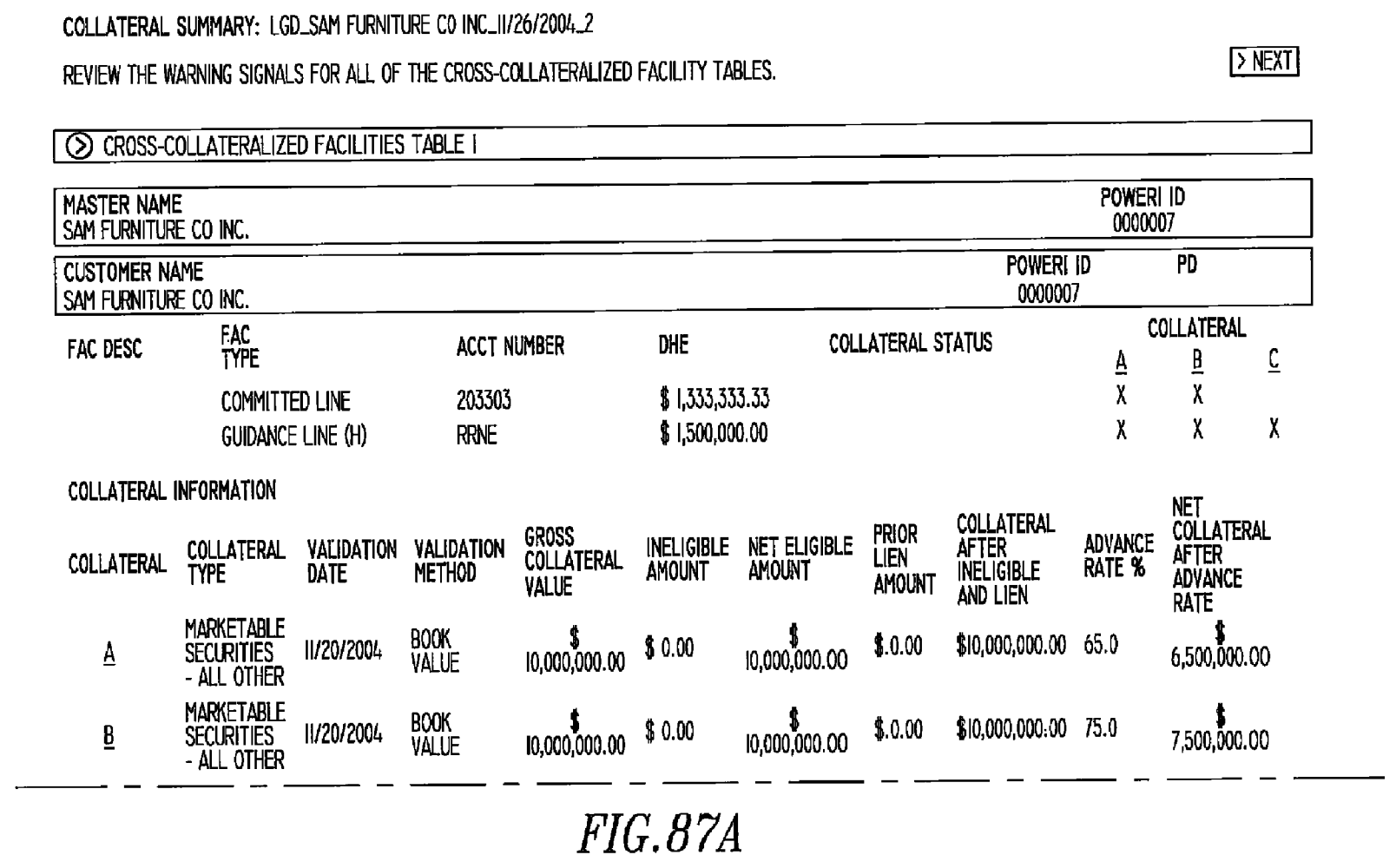

COLLATERAL SUMMARY: LGD_SAM FURNITURE CO INC_11/26/2004_2

REVIEW THE WARNING SIGNALS FOR ALL OF THE CROSS-COLLATERALIZED FACILITY TABLES.

> NEXT

CROSS-COLLATERALIZED FACILITIES TABLE 1

MASTER NAME: SAM FURNITURE CO INC. — POWERI ID: 0000007

CUSTOMER NAME: SAM FURNITURE CO INC. — POWERI ID: 0000007 — PD

| FAC DESC | FAC TYPE | ACCT NUMBER | DHE | COLLATERAL STATUS | COLLATERAL A | COLLATERAL B | COLLATERAL C |
|---|---|---|---|---|---|---|---|
| | COMMITTED LINE | 203303 | $ 1,333,333.33 | | X | X | |
| | GUIDANCE LINE (H) | RRNE | $ 1,500,000.00 | | X | X | X |

COLLATERAL INFORMATION

| COLLATERAL | COLLATERAL TYPE | VALIDATION DATE | VALIDATION METHOD | GROSS COLLATERAL VALUE | INELIGIBLE AMOUNT | NET ELIGIBLE AMOUNT | PRIOR LIEN AMOUNT | COLLATERAL AFTER INELIGIBLE AND LIEN | ADVANCE RATE % | NET COLLATERAL AFTER ADVANCE RATE |
|---|---|---|---|---|---|---|---|---|---|---|
| A | MARKETABLE SECURITIES - ALL OTHER | 11/20/2004 | BOOK VALUE | $ 10,000,000.00 | $ 0.00 | $ 10,000,000.00 | $.0.00 | $10,000,000.00 | 65.0 | $ 6,500,000.00 |
| B | MARKETABLE SECURITIES - ALL OTHER | 11/20/2004 | BOOK VALUE | $ 10,000,000.00 | $ 0.00 | $ 10,000,000.00 | $.0.00 | $10,000,000.00 | 75.0 | $ 7,500,000.00 |

FIG. 87A

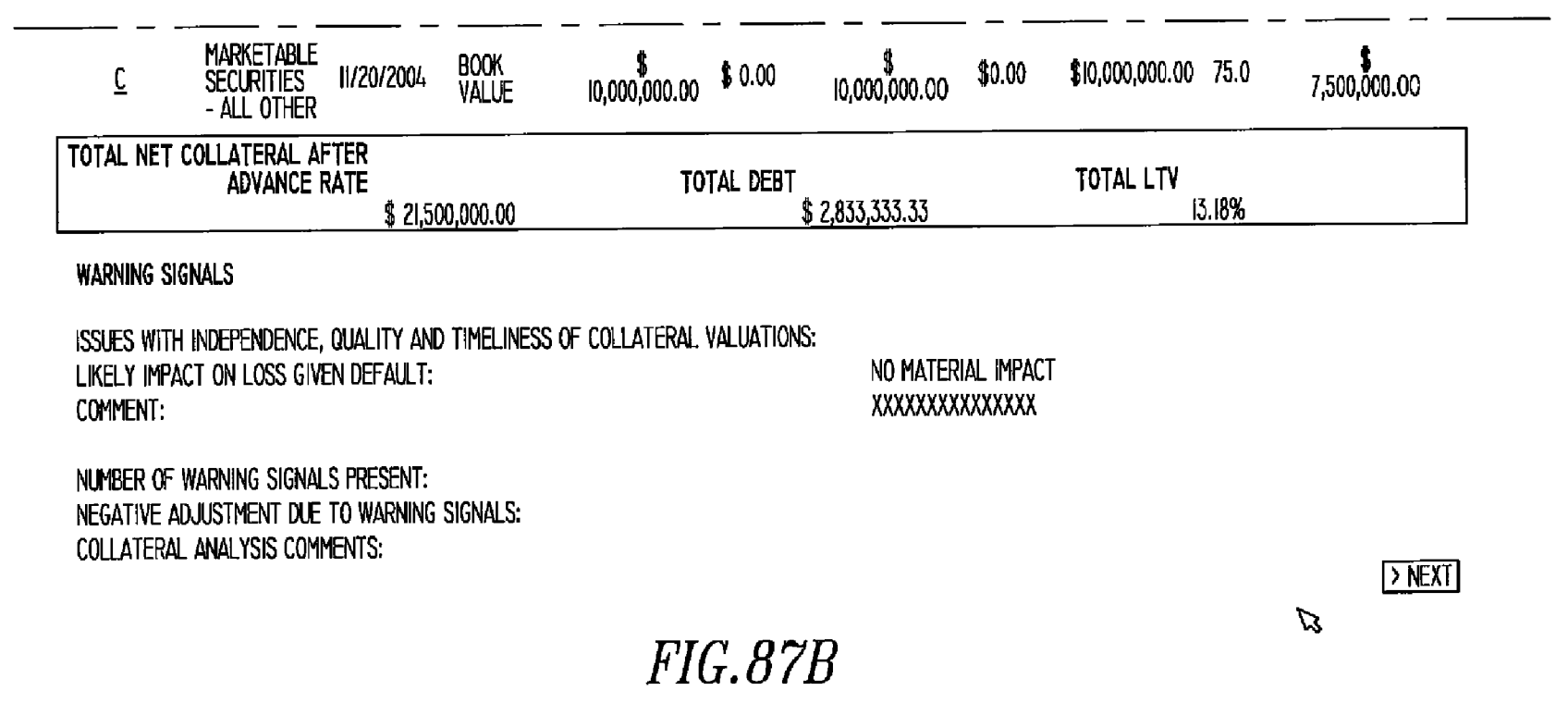

| | | | | | | | | | | |
|---|---|---|---|---|---|---|---|---|---|---|
| C | MARKETABLE SECURITIES - ALL OTHER | 11/20/2004 | BOOK VALUE | $ 10,000,000.00 | $ 0.00 | $ 10,000,000.00 | $0.00 | $10,000,000.00 | 75.0 | $ 7,500,000.00 |

| TOTAL NET COLLATERAL AFTER ADVANCE RATE | TOTAL DEBT | TOTAL LTV |
|---|---|---|
| $ 21,500,000.00 | $ 2,833,333.33 | 13.18% |

WARNING SIGNALS

ISSUES WITH INDEPENDENCE, QUALITY AND TIMELINESS OF COLLATERAL VALUATIONS:
LIKELY IMPACT ON LOSS GIVEN DEFAULT: NO MATERIAL IMPACT
COMMENT: XXXXXXXXXXXXXXX

NUMBER OF WARNING SIGNALS PRESENT:
NEGATIVE ADJUSTMENT DUE TO WARNING SIGNALS:
COLLATERAL ANALYSIS COMMENTS:

> NEXT

FIG.87B

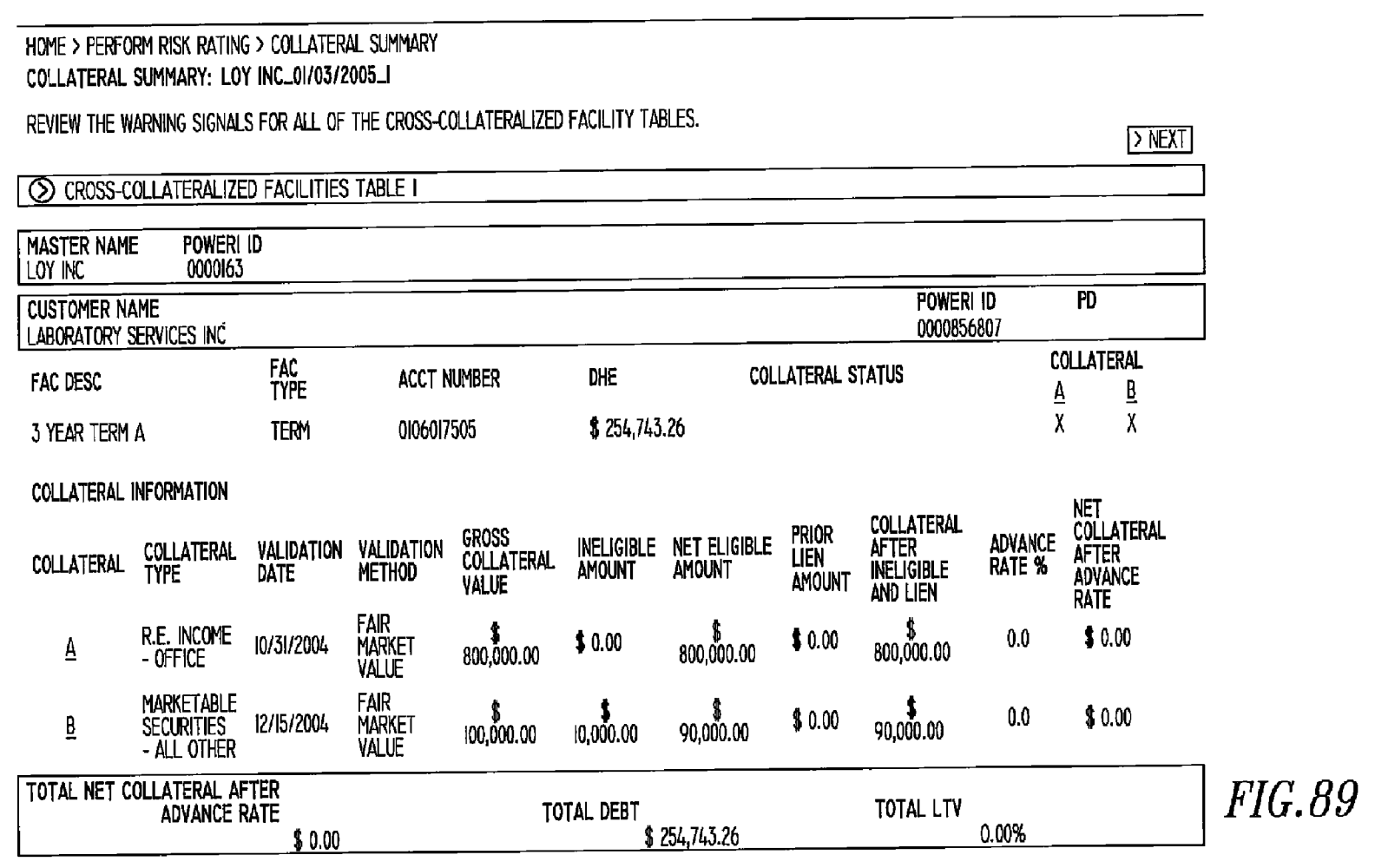

HOME > PERFORM RISK RATING > COLLATERAL SUMMARY

COLLATERAL SUMMARY: LOY INC_01/03/2005_I

REVIEW THE WARNING SIGNALS FOR ALL OF THE CROSS-COLLATERALIZED FACILITY TABLES.

> NEXT

CROSS-COLLATERALIZED FACILITIES TABLE I

| MASTER NAME | POWERI ID |
|---|---|
| LOY INC | 0000163 |

| CUSTOMER NAME | POWERI ID | PD |
|---|---|---|
| LABORATORY SERVICES INC | 0000856807 | |

| FAC DESC | FAC TYPE | ACCT NUMBER | DHE | COLLATERAL STATUS | COLLATERAL A | COLLATERAL B |
|---|---|---|---|---|---|---|
| 3 YEAR TERM A | TERM | 0106017505 | $ 254,743.26 | | X | X |

COLLATERAL INFORMATION

| COLLATERAL | COLLATERAL TYPE | VALIDATION DATE | VALIDATION METHOD | GROSS COLLATERAL VALUE | INELIGIBLE AMOUNT | NET ELIGIBLE AMOUNT | PRIOR LIEN AMOUNT | COLLATERAL AFTER INELIGIBLE AND LIEN | ADVANCE RATE % | NET COLLATERAL AFTER ADVANCE RATE |
|---|---|---|---|---|---|---|---|---|---|---|
| A | R.E. INCOME - OFFICE | 10/31/2004 | FAIR MARKET VALUE | $ 800,000.00 | $ 0.00 | $ 800,000.00 | $ 0.00 | $ 800,000.00 | 0.0 | $ 0.00 |
| B | MARKETABLE SECURITIES - ALL OTHER | 12/15/2004 | FAIR MARKET VALUE | $ 100,000.00 | $ 10,000.00 | $ 90,000.00 | $ 0.00 | $ 90,000.00 | 0.0 | $ 0.00 |

| TOTAL NET COLLATERAL AFTER ADVANCE RATE | TOTAL DEBT | TOTAL LTV |
|---|---|---|
| $ 0.00 | $ 254,743.26 | 0.00% |

FIG. 89

LIQUIDITY [A ▾] LIQUIDITY RATIO [2.1]

A. HIGH LIQUIDITY COMPARED WITH NEEDS / LIABILITY STRUCTURE.
B. SLIGHTLY HIGHER THAN AVERAGE LIQUIDITY COMPARED WITH NEEDS / LIABILITY STRUCTURE.
C. AVERAGE LIQUIDITY COMPARED WITH NEEDS / LIABILITY STRUCTURE.
D. LOWER THAN AVERAGE LIQUIDITY COMPARED TO NEEDS / LIABILITY STRUCTURE; OR COULD NOT PAY OUT ALL CURRENT MATURITIES AND SHORT-TERM OBLIGATIONS WITHOUT DIFFICULTY.
E. NOT APPLICABLE OR RELEVANT TO BORROWERS IN THIS SECTOR

DESCRIPTION OF LIQUIDITY RATIO [CASH /CURRENT LIABILITIES]

COMPARATIVE LIQUIDITY [B ▾]

A. LIQUIDITY POSITION IS IN THE TOP 10% RELATIVE TO OTHERS IN ITS SECTOR; AND IMPROVED LIQUIDITY TREND.
B. LIQUIDITY POSITION IS BETTER THAN AVERAGE WHEN COMPARED TO PEERS; AND STABLE OR IMPROVED LIQUIDITY TREND.
C. LIQUIDITY POSITION IS AT OR BELOW AVERAGE WHEN COMPARED TO PEERS; AND DETERIORATING LIQUIDITY POSITION OVER THE PAST 3 YEARS.
D. NOT APPLICABLE OR RELEVANT TO BORROWERS IN THIS SECTOR

LEVERAGE [C ▾] LEVERAGE RATIO [60]

A. LEVERAGE POSITION, INCLUDING ANY OFF=BALANCE SHEET LEVERAGE, IS IN THE TOP 10% RELATIVE TO OTHERS IN ITS SECTOR.
B. LEVERAGE POSITION, INCLUDING ANY OFF-BALANCE SHEET LEVERAGE, IS BETTER THAN AVERAGE RELATIVE TO PEERS.
C. LEVERAGE POSITION, INCLUDING ANY OFF-BALANCE SHEET LEVERAGE, IS AT OR BELOW AVERAGE RELATIVE TO PEERS.
D. LEVERAGE POSITION, INCLUDING AND OFF-BALANCE SHEET LEVERAGE, IS SUBSTANTIALLY BELOW AVERAGE RELATIVE TO PEERS.
E. NOT APPLICABLE OR RELEVANT TO BORROWERS IN THIS SECTOR

DESCRIPTION OF LEVERAGE RATIO [DEBT / EQUITY]

DIVERSITY OF REVENUE GENERATION MIX [C ▾]

A. HIGHLY DIVERSIFIED BUSINESS / ACTIVITY / REVENUE GENERATION MIX WITH EACH BUSINESS ACTIVITY CONSTITUTING LESS THAN 30% OF TOTAL REVENUES.

FIG. 96A

B. WELL DIVERSIFIED BUSINESS / ACTIVITY / REVENUE GENERATION MIX WITH TOP 2 BUSINESS ACTIVITIES TOGETHER CONSTITUTING LESS THAN 50% OF TOTAL REVENUES.
C. MODERATELY DIVERSIFIED BUSINESS / ACTIVITY / REVENUE GENERATION MIX WITH TOP 2 BUSINESS ACTIVITIES TOGETHER CONSTITUTING MORE THAN 50% OF TOTAL REVENUES.
D. UNDIVERSIFIED BUSINESS / ACTIVITY / REVENUE GENERATION MIX WITH ONE BUSINESS LINE / ACTIVITY CONSTITUTING MORE THAN .80% OF TOTAL REVENUES.
E. NOT APPLICABLE OR RELEVANT TO BORROWERS IN THIS SECTOR

REVENUE TREND OVER THE PAST THREE YEARS [B ▾]

A. STRONG, RELIABLE / PREDICTABLE, EMANATING FROM CORE ACTIVITY.
B. STABLE, EMANATING MOSTLY FROM ITS CORE ACTIVITY.
C. UNSTABLE, MAY BE EMANATING FROM VARIED AND / OR CHANGING SOURCES.
D. STEADILY DECLINING.
E. NOT APPLICABLE OR RELEVANT TO BORROWERS IN THIS SECTOR

PROFITABILITY [B ▾] PROFITABILITY % [14]

A. PROFITABILITY IS IN THE TOP 10% OF ITS SECTOR.
B. PROFITABILITY IS BETTER THAN AVERAGE WHEN COMPARED TO PEERS.
C. PROFITABILITY IS AT OR BELOW AVERAGE WHEN COMPARED TO PEERS.
D. PROFITABILITY IS SUBSTANTIALLY BELOW AVERAGE WHEN COMPARED TO PEERS.
E. NOT APPLICABLE OR RELEVANT TO BORROWERS IN THIS SECTOR

DESCRIPTION OF PROFITABILITY % [RETURN ON EQUITY]

GROWTH [B ▾]

A. THE GROWTH EXPERIENCE HAS BEEN POSITIVE OVER THE PAST 3 YEARS, AND NOT VOLATILE; AND THIS GROWTH PROFILE IS VIEWED AS SUSTAINABLE IN THE FUTURE.
B. THE GROWTH EXPERIENCE HAS SHOWN SOME VOLATILITY, THOUGH IT HAS BEEN POSITIVE OVER THE PAST 3 YEARS; AND THIS GROWTH PROFILE IS VIEWED AS SUSTAINABLE IN THE FUTURE
C. SOME DOUBTS ABOUT THE FUTURE PROSPECTS FOR GROWTH, THOUGH GROWTH HAS BEEN POSITIVE OVER THE PAST 3 YEARS, POSSIBLY WITH SOME VOLATILITY.
D. THE GROWTH EXPERIENCE HAS BEEN A CONCERN OVER THE PAST 3+ YEARS (NEGATIVE TREND, HIGH VOLATILITY); OR START-UP.
E. NOT APPLICABLE OR RELEVANT TO BORROWERS IN THIS SECTOR

DESCRIPTION OF GROWTH INFORMATION [REVENUE GROWTH ▾]

[> HELP] [> SAVE] [> NEXT]

*FIG. 96B*

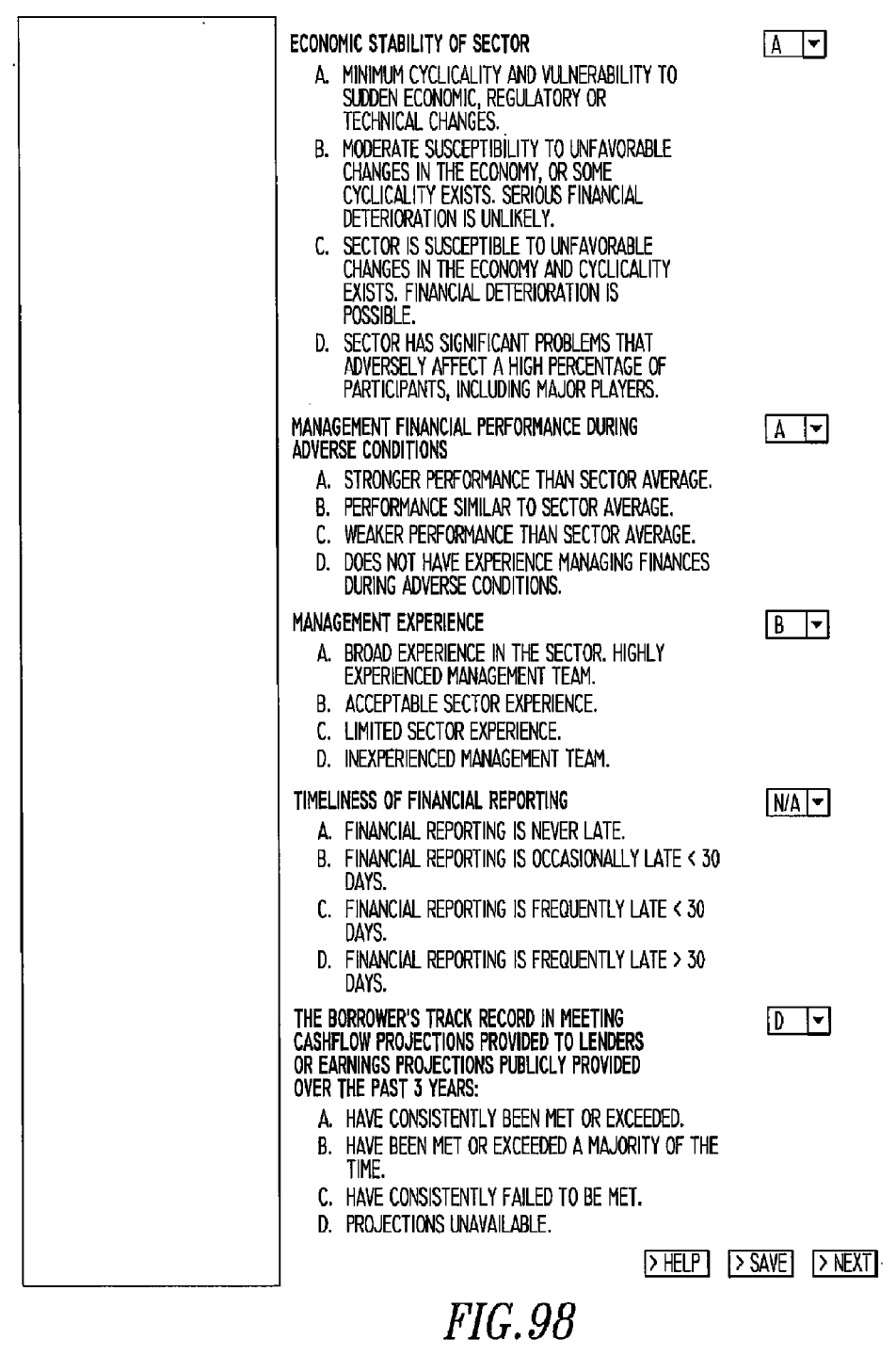

ECONOMIC STABILITY OF SECTOR [A ▾]

A. MINIMUM CYCLICALITY AND VULNERABILITY TO SUDDEN ECONOMIC, REGULATORY OR TECHNICAL CHANGES.
B. MODERATE SUSCEPTIBILITY TO UNFAVORABLE CHANGES IN THE ECONOMY, OR SOME CYCLICALITY EXISTS. SERIOUS FINANCIAL DETERIORATION IS UNLIKELY.
C. SECTOR IS SUSCEPTIBLE TO UNFAVORABLE CHANGES IN THE ECONOMY AND CYCLICALITY EXISTS. FINANCIAL DETERIORATION IS POSSIBLE.
D. SECTOR HAS SIGNIFICANT PROBLEMS THAT ADVERSELY AFFECT A HIGH PERCENTAGE OF PARTICIPANTS, INCLUDING MAJOR PLAYERS.

MANAGEMENT FINANCIAL PERFORMANCE DURING ADVERSE CONDITIONS [A ▾]

A. STRONGER PERFORMANCE THAN SECTOR AVERAGE.
B. PERFORMANCE SIMILAR TO SECTOR AVERAGE.
C. WEAKER PERFORMANCE THAN SECTOR AVERAGE.
D. DOES NOT HAVE EXPERIENCE MANAGING FINANCES DURING ADVERSE CONDITIONS.

MANAGEMENT EXPERIENCE [B ▾]

A. BROAD EXPERIENCE IN THE SECTOR. HIGHLY EXPERIENCED MANAGEMENT TEAM.
B. ACCEPTABLE SECTOR EXPERIENCE.
C. LIMITED SECTOR EXPERIENCE.
D. INEXPERIENCED MANAGEMENT TEAM.

TIMELINESS OF FINANCIAL REPORTING [N/A ▾]

A. FINANCIAL REPORTING IS NEVER LATE.
B. FINANCIAL REPORTING IS OCCASIONALLY LATE < 30 DAYS.
C. FINANCIAL REPORTING IS FREQUENTLY LATE < 30 DAYS.
D. FINANCIAL REPORTING IS FREQUENTLY LATE > 30 DAYS.

THE BORROWER'S TRACK RECORD IN MEETING CASHFLOW PROJECTIONS PROVIDED TO LENDERS OR EARNINGS PROJECTIONS PUBLICLY PROVIDED OVER THE PAST 3 YEARS: [D ▾]

A. HAVE CONSISTENTLY BEEN MET OR EXCEEDED.
B. HAVE BEEN MET OR EXCEEDED A MAJORITY OF THE TIME.
C. HAVE CONSISTENTLY FAILED TO BE MET.
D. PROJECTIONS UNAVAILABLE.

[> HELP] [> SAVE] [> NEXT]

FIG. 98

| | |
|---|---|
| INAPPROPRIATE STATEMENT QUALITY FOR SIZE OF FINANCIAL INSTITUTION: | ☐ |
| MATERIAL REPORTING ERROR FROM ENTITY TO BANK: | ☐ |
| RESIGNATION OR REMOVAL OF CPA: | ☐ |
| MATERIAL FRAUD OR EMBEZZLEMENT AT ENTITY: | ☐ |
| SIGNIFICANT DISRUPTIONS DUE TO LABOR STRIKES: | ☐ |
| UNAVAILABILITY OF INSURANCE: | ☐ |
| EXTERNAL CATASTROPHIC EVENT: | ☐ |
| LOSS OF SIGNIFICANT CUSTOMER / SOURCE OF REVENUE (OVER 25% OF REVENUE): | ☐ |
| RECENT SECTOR-WIDE OR INSTITUTION-SPECIFIC REGULATORY ACTION: | ☐ |
| INORDINATE PENSION LIABILITIES: | ☐ |
| CURRENTLY UNDERGOING OR EXPECTED MERGER INTEGRATION / MAJOR REORGANIZATION: | ☐ |
| CHANGES TO REPORTING PATTERN: | ☐ |
| PAYMENT DEFAULT WITHIN SWITCHING THE PAST THREE YEARS: | ☐ |
| EXCESSIVE RELIANCE ON MANUAL ADMINISTRATIVE PROCEDURES / OUTDATED MANAGEMENT INFORMATION SYSTEMS: | ☐ |
| BANK LINE USAGE IS OF CONCERN: | ☐ |
| NUMBER OF WARNING SIGNALS PRESENT: | 1 |
| NEGATIVE ADJUSTMENT DUE TO WARNING SIGNALS: | NO ADJUSTMENT ▾ |

> HELP > SAVE > NEXT

*FIG. 99B*

| | | | |
|---|---|---|---|
| DESCRIPTION OF DEBT SERVICE COVERAGE RATIO | NET OP INC/TOTAL DS | | |
| F2. LIQUIDITY | SELECTED RESPONSE: A | LIQUIDITY RATIO | 2.1 |

A. HIGH LIQUIDITY COMPARED WITH NEEDS / LIABILITY STRUCTURE.

B. SLIGHTLY HIGHER THAN AVERAGE LIQUIDITY COMPARED WITH NEEDS / LIABILITY STRUCTURE.

C. AVERAGE LIQUIDITY COMPARED WITH NEEDS / LIABILITY STRUCTURE.

D. LOWER THAN AVERAGE LIQUIDITY COMPARED WITH NEEDS / LIABILITY STRUCTURE; OR COULD NOT PAY OUT ALL CURRENT MATURITIES AND SHORT-TERM OBLIGATIONS WITHOUT DIFFICULTY.

E. NOT APPLICABLE OR RELEVANT TO BORROWERS IN THIS SECTOR

| | |
|---|---|
| DESCRIPTION OF LIQUIDITY RATIO | CASH / CURRENT LIABILITIES |
| F3. COMPARATIVE LIQUIDITY | SELECTED RESPONSE: B |

FIG.102B

A. LIQUIDITY POSITION IS IN THE TOP 10% RELATIVE TO OTHERS IN ITS SECTOR; AND IMPROVED LIQUIDITY TREND.

B. LIQUIDITY POSITION IS BETTER THAN AVERAGE WHEN COMPARED TO PEERS; AND STABLE OR IMPROVED LIQUIDITY TREND.

C. LIQUIDITY POSITION IS AT OR BELOW AVERAGE WHEN COMPARED TO PEERS; AND DETERIORATING LIQUIDITY POSITION OVER THE PAST 3 YEARS.

D. NOT APPLICABLE OR RELEVANT TO BORROWERS IN THIS SECTOR

F4. LEVERAGE — SELECTED RESPONSE: C — LEVERAGE RATIO — 6D

A. LEVERAGE POSITION, INCLUDING ANY OFF-BALANCE SHEET LEVERAGE, IS IN THE TOP 10% RELATIVE TO OTHERS IN ITS SECTOR.

B. LEVERAGE POSITION, INCLUDING ANY OFF-BALANCE SHEET LEVERAGE, IS BETTER THAN AVERAGE RELATIVE TO PEERS.

C. LEVERAGE POSITION, INCLUDING ANY OFF-BALANCE SHEET LEVERAGE, IS AT OR BELOW AVERAGE RELATIVE TO PEERS.

D. LEVERAGE POSITION, INCLUDING ANY OFF-BALANCE SHEET LEVERAGE, IS SUBSTANTIALLY BELOW AVERAGE RELATIVE TO PEERS.

E. NOT APPLICABLE OR RELEVANT TO BORROWERS IN THIS SECTOR

DESCRIPTION OF LEVERAGE RATIO — DEBT / EQUITY

F5. DIVERSITY OF REVENUE GENERATION MIX — SELECTED RESPONSE: C

A. HIGHLY DIVERSIFIED BUSINESS / ACTIVITY / REVENUE GENERATION MIX WITH EACH BUSINESS ACTIVITY CONSTITUTING LESS THAN 30% OF TOTAL REVENUES.

B. WELL DIVERSIFIED BUSINESS / ACTIVITY / REVENUE GENERATION MIX WITH TOP 2 BUSINESS ACTIVITIES TOGETHER CONSTITUTING LESS THAN 50% OF TOTAL REVENUES.

C. MODERATELY DIVERSIFIED BUSINESS / ACTIVITY / REVENUE GENERATION MIX WITH TOP 2 BUSINESS ACTIVITIES TOGETHER CONSTITUTING MORE THAN 50% OF TOTAL REVENUES.

D. UNDIVERSIFIED BUSINESS / ACTIVITY / REVENUE GENERATION MIX WITH ONE BUSINESS LINE / ACTIVITY CONSTITUTING MORE THAN .80% OF TOTAL REVENUES.

E. NOT APPLICABLE OR RELEVANT TO BORROWERS IN THIS SECTOR

*FIG. 103*

F6. REVENUE TREND OVER THE PAST 3 YEARS — SELECTED RESPONSE: B

A. STRONG, RELIABLE / PREDICTABLE, EMANATING FROM CORE ACTIVITY.
B. STABLE, EMANATING MOSTLY FROM CORE ACTIVITY.
C. UNSTABLE, MAY BE EMANATING FROM VARIED AND / OR CHANGING SOURCES.
D. STEADILY DECLINING.
E. NOT APPLICABLE OR RELEVANT TO BORROWERS IN THIS SECTOR

F7. PROFITABILITY — SELECTED RESPONSE: B — PROFITABILITY % 14

A. PROFITABILITY IS IN THE TOP 10% OF ITS SECTOR.
B. PROFITABILITY IS BETTER THAN AVERAGE WHEN COMPARED TO PEERS.
C. PROFITABILITY IS AT OR BELOW AVERAGE WHEN COMPARED TO PEERS.
D. PROFITABILITY IS SUBSTANTIALLY BELOW AVERAGE WHEN COMPARED TO PEERS.
E. NOT APPLICABLE OR RELEVANT TO BORROWERS IN THIS SECTOR

DESCRIPTION OF PROFITABILITY % — RETURN ON EQUITY

F8. GROWTH — SELECTED RESPONSE: B

A. THE GROWTH EXPERIENCE HAS BEEN POSITIVE OVER THE PAST 3 YEARS, AND NOT VOLATILE; AND THIS GROWTH PROFILE IS VIEWED AS SUSTAINABLE IN THE FUTURE
B. THE GROWTH EXPERIENCE HAS SHOWN SOME VOLATILITY, THOUGH IT HAS BEEN POSITIVE OVER THE PAST 3 YEARS; AND THIS GROWTH PROFILE IS VIEWED AS SUSTAINABLE IN THE FUTURE.
C. SOME DOUBTS ABOUT THE FUTURE PROSPECTS OF GROWTH, THOUGH GROWTH EXPERIENCE HAS BEEN POSITIVE OVER THE PAST 3 YEARS, POSSIBLY WITH SOME VOLATILITY.
D. THE GROWTH EXPERIENCE HAS BEEN A CONCERN OVER THE PAST 3+ YEARS (NEGATIVE TREND, HIGH VOLATILITY); OR START-UP.
E. NOT APPLICABLE OR RELEVANT TO BORROWERS IN THIS SECTOR

DESCRIPTION OF GROWTH INFORMATION — REVENUE GROWTH

FIG. 104A

BORROWER NON-FINANCIAL INFORMATION

| | SELECTED RESPONSE |
|---|---|
| COVENANT COMPLIANCE | A. NO COVENANT VIOLATIONS. |
| ACCESS TO ALTERNATIVE FUNDING SOURCES | C. LIMITED ACCESS TO BANKS, STRONG RELIANCE ON DEBIT FINANCING, COULD EXPERIENCE SOME DIFFICULTY REFINANCING WITH ANOTHER BANK AT SIMILAR RATES AND TERMS BUT MAY HAVE ACCESS TO ALTERNATIVE SOURCES. |
| HOW HAS THE CLIENT RESPONDED TO SITUATIONS OF FINANCIAL DISTRESS? | E. THE CLIENT HAS NEVER KNOWN FINANCIAL DISTRESS. |
| ECONOMIC STABILITY OF SECTOR | A. MINIMUM CYCLICALITY AND VULNERABILITY TO SUDDEN ECONOMIC, REGULATORY OR TECHNICAL CHANGES. |
| MANAGEMENT FINANCIAL PERFORMANCE DURING ADVERSE CONDITIONS | A. STRONGER PERFORMANCE THAN SECTOR AVERAGE. |
| MANAGEMENT EXPERIENCE | B. ACCEPTABLE SECTOR EXPERIENCE. |
| TIMELINESS OF FINANCIAL REPORTING | C. FINANCIAL REPORTING IS FREQUENTLY LATE < 30 DAYS. |
| THE BORROWER'S TRACK RECORD IN MEETING CASHFLOW PROJECTIONS PROVIDED TO LENDERS OR EARNINGS PROJECTIONS PUBLICLY PROVIDED OVER THE PAST 3 YEARS: | D. PROJECTIONS UNAVAILABLE. |

WARNING SIGNALS

MANAGEMENT SUCCESSION IS A CONCERN:

| | |
|---|---|
| LIKELY IMPACT ON PROBABILITY OF DEFAULT: | MARGINAL IMPACT |
| COMMENT: | CHILDREN OF OWNER NOT INTERESTED IN BUSINESS. |
| NUMBER OF WARNING SIGNALS PRESENT: | 1 |
| NEGATIVE ADJUSTMENTS DUE TO WARNING SIGNALS | NO ADJUSTMENT |

ANALYSIS / OVERRIDE

| | |
|---|---|
| OVERRIDE PD RATING | 05 |
| REASON(S) FOR OVERRIDE | NEIGHBORHOOD WHERE STOREFRONT IS LOCATED IS DETERIORATING. |
| OVERRIDE SOURCE | RATER |

*FIG. 104B*

SYSTEMS AND METHODS FOR CREDIT MANAGEMENT RISK RATING AND APPROVAL

CROSS-REFERENCE TO RELATED APPLICATIONS/PRIORITY CLAIM

The present application is a continuation of co-pending U.S. patent application Ser. No. 12/861,523, filed on Aug. 23, 2010, which is a continuation application, and hereby claims the benefit of priority, under 35 U.S.C. §120, to U.S. patent application Ser. No. 11/143,701, filed on Jun. 2, 2005, entitled "SYSTEMS AND METHODS FOR CREDIT MANAGEMENT RISK RATING AND APPROVAL." Each of the foregoing applications are hereby incorporated by reference in their entirety into the present application.

BACKGROUND

Entities in the financial services industry often must assess the risk of loss when extending credit or loaning money to another entity. For example, lenders often develop risk rating methodologies that assign risk values to borrowers or potential borrower so that the lender can assess whether a transaction should be approved and, if so, on what terms the transaction should proceed. Such rating methodologies are often ad hoc in nature and are subject to non-uniformity across various business units in an entity. Also, the results of such rating methodologies are often subject to interpretation by those who are responsible for approving a transaction or those who are responsible for assigning a risk value to a transaction or a proposed transaction. Further, when a risk rating is assigned to a borrower or potential borrower, the ratings are not seamlessly transmitted or presented along with other information relating to the credit offering via, for example, a credit offering document, to a person for approval or denial.

SUMMARY

In various embodiments, the present invention is directed to a method for one of approving and denying a credit offering to a borrower. The method includes calculating a probability of default rating of the borrower and calculating a loss given default rating for the borrower. The method also includes integrating the probability of default rating and the loss given default rating with other information relating to the credit offering to produce a credit memorandum and automatically outputting the credit memorandum to a user so that the user can recommend one of approval and denial of the credit offering.

In various embodiments, the present invention is directed to a system. The system includes a user computer and a server in communication with the user computer via a network, the server configured to execute software instructions to: calculate a probability of default rating of a borrower; calculate a loss given default rating for the borrower; integrate the probability of default rating and the loss given default rating with other information relating to a credit offering to produce a credit memorandum; and automatically output the credit memorandum to a user so that the user can recommend one of approval and denial of the credit offering.

In various embodiments, the present invention is directed to an apparatus. The apparatus includes means for calculating a probability of default rating of a borrower and means for calculating a loss given default rating for the borrower. The apparatus also includes means for integrating the probability of default rating and the loss given default rating with other information relating to a credit offering to produce a credit memorandum and means for automatically outputting the credit memorandum to a user so that the user can recommend one of approval and denial of the credit offering.

In various embodiments, the present invention is directed to a computer readable medium having stored thereon instructions which, when executed by a processor, cause the processor to: calculate a probability of default rating of a borrower; calculate a loss given default rating for the borrower; integrate the probability of default rating and the loss given default rating with other information relating to a credit offering to produce a credit memorandum; and automatically output the credit memorandum to a user so that the user can recommend one of approval and denial of the credit offering.

BRIEF DESCRIPTION OF THE DRAWINGS

Further advantages of the present invention may be better understood by referring to the following description taken in conjunction with the accompanying drawings, in which:

FIG. 3 illustrates an embodiment of an example of qualitative questions that may be asked when a borrower is an automobile dealership;

FIG. 4 illustrates an embodiment of non-financial questions that may be asked when a borrower is an automobile dealership;

FIG. 5 illustrates an embodiment of an example of qualitative questions that may be asked when a borrower is a healthcare entity;

FIG. 6 illustrates an embodiment of non-financial questions that may be asked when a borrower is a healthcare entity;

FIG. 7 illustrates an embodiment of an example of qualitative questions that may be asked when a borrower is an industrial entity;

FIGS. 8A-8B illustrate an embodiment of non-financial questions that may be asked when a borrower is an industrial entity;

FIG. 9 illustrates an embodiment of non-financial questions that may be asked when a borrower is an individual;

FIG. 10 illustrates an embodiment of factor weights that may be used;

FIGS. 11A through 11E illustrate answer options corresponding to each of the factors shown in FIG. 10 and the score allocation for each answer option;

FIGS. 14A-14B illustrate an example of assigned collateral LGD ratings based on a grid that combines collateral types with loan to value ratios for each facility;

FIG. 15 illustrates an example of the inputs and calculated values for a hypothetical LGD derivation is illustrated;

FIGS. 77 through 91B are computer screen shots illustrating an example of an implementation of a process for generating a loss given default according to various embodiments of the present invention; and FIGS. 92 through 104B are computer screen shots illustrating an example of an implementation of a process for generating a probability of default rating according to various embodiments of the present invention.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

As used herein, the term "borrower" includes any type of individual, entity, or the like, that has applied for or is contemplating applying for a loan, line of credit, etc. and any extensions, renewals, etc. of any loan, line of credit, etc. Such loans, lines of credit, etc. may be of any type and may be secured or unsecured. As used herein the term "lender" includes any type of individual, entity, or the like that acts on behalf of itself or an individual, entity or the like in deciding whether to grant a borrower's request. Examples of lenders include banks, thrift entities, mortgage lenders, financial services entities, brokers, loan originators, etc.

As used herein, the term "probability of default" is a value, whether numeric or otherwise, that measures a likelihood, or probability, that a borrower will default on a loan, line of credit, etc. In various embodiments, the probability of default is computed using a scorecard model that may include, for example, both financial and non-financial modeling.

Figure 1:
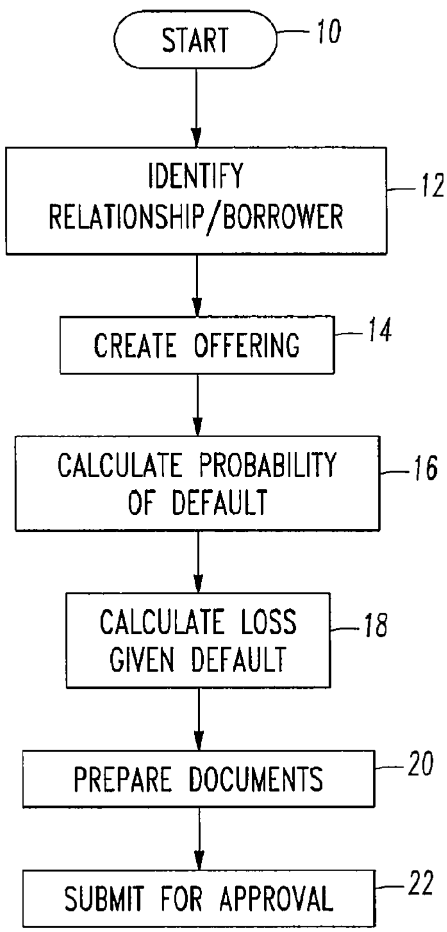
FIG. 1 is a diagram illustrating a credit approval process according to various embodiments of the present invention.

FIG. 1 is a diagram illustrating a credit approval process according to various embodiments of the present invention. At step 10, the process starts by, for example, a user logging into a secure credit approval system via, for example, a network such as a local area network (LAN), a wide area network (WAN), or the Internet. At step 12, the identity of the borrower and the relationship between the borrower and the lender are obtained through entry by the user via, for example, a user interface. At step 14, the particulars of the credit offering to be approved (or rejected) are obtained through entry by the user via, for example, a user interface.

At step 16, a probability of default (PD) rating of the borrower is calculated as described hereinbelow. At step 18, a loss given default (LGD) rating is calculated as described hereinbelow. At step 20, the documents associated with the credit offering are prepared and at step 22 the credit offering is submitted to the appropriate personnel for approval (or rejection). In various embodiments, the documents prepared at step 20 include one or more the ratings (i.e., the PD rating and the LGD rating) and other information relating to the credit offering such as information that was entered at step 14. In various embodiments, the documents are prepared automatically and are automatically submitted for approval at step 22. In various embodiments, at least one of the documents created at step 20 is a credit memorandum document. In various embodiments, such credit memorandum may be a unitary document, either in hardcopy or electronic format (e.g., as a pdf document). Also, in various embodiments the credit memorandum may include extraneous information relating to the credit offering such as, for example, pictures of a construction site and other documents relating to the construction site (e.g., architectural documents, excavation documents, etc.) when the credit offering relates to construction financing.

In various embodiments, the offering may be created after the probability of default rating and/or the loss given default rating are calculated.

Figure 2:
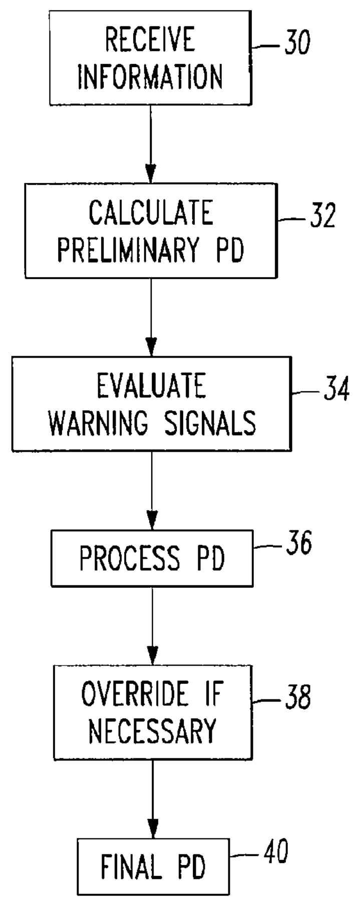
FIG. 2 is a diagram illustrating a process for determining a probability of default rating according to various embodiments of the present invention.

FIG. 2 is a diagram illustrating a process for determining a probability of default rating according to various embodiments of the present invention. At step 30, financial information and non-financial information are received relating to the borrower. In various embodiments, the information is gathered using questions that are qualitative and multiple choice questions with answer options ranging from A-F, with each question or a group of questions corresponding to a factor. Each answer option is assigned a score, where a larger score corresponds to a worse condition, and therefore to a higher probability of default by the borrower. For example, answer option A, corresponding to the best possible answer, may be allotted a score of 1. The score allocation to the "worst" answer option may depend upon the weight assigned to the particular question, with the more important factors having the larger maximum scores.

FIG. 3 illustrates an embodiment of an example of qualitative questions that may be asked when the borrower is an automobile dealership and FIG. 4 illustrates an embodiment of non-financial questions that may be asked when the borrower is an automobile dealership. FIG. 5 illustrates an embodiment of an example of qualitative questions that may be asked when the borrower is a healthcare entity and FIG. 6 illustrates an embodiment of non-financial questions that may be asked when the borrower is a healthcare entity. FIG. 7 illustrates an embodiment of an example of qualitative questions that may be asked when the borrower is an industrial entity and FIGS. 8A-8B illustrate an embodiment of non-financial questions that may be asked when the borrower is an industrial entity. FIG. 9 illustrates an embodiment of non-financial questions that may be asked when the borrower is an individual.

By way of example, a scorecard consists of three factors F1, F2 and F3, with weights of 50%, 30% and 20% respectively and the total score allocated on a scale of 1000 points. In this case, F1 will be allocated a maximum score of 500 points, while the remaining two factors will have maximum scores of 300 and 200 points, respectively. If answer option D corresponds to the worst answer in all three factors, then the total score when all three answers are D is the sum of 500, 300 and 200 (i.e., 1000) points. If all three answers are A, which corresponds to the best answer option, then the total score is 1+1+1=3. Therefore, for any given borrower, the score can range from 3 to 1000, with 3 being the best possible score and 1000 being the worst.

Examples of financial factors in various embodiments are as follows:

F1. Cashflow/Debt Service
F2. Liquidity
F3. Comparative Liquidity
F4. Leverage
F5. Diversity of Revenue Generation Mix
F6. Revenue Trend over the Past Three Years
F7. Profitability
F8. Growth in the Past Three Years Examples of non-financial factors in various embodiments are as follows:

NF1. Economic Stability of Sector
NF2. Access to Alternative Funding Sources NF3. Management Financial Performance During Adverse Conditions NF4. How has the client responded to situations of financial distress?

NF5. Covenant Compliance

NF6. The borrower's track record in meeting cashflow projections provided to lenders or earnings estimates publicly provided over the past three years NF7. Management Experience NF8. Timeliness of Financial Reporting Various embodiments may include factors that are specific to certain sectors. For example, the following factors may be considered for education institutions (E1-E3) or governmental entities (G1-G2):

E1. Enrollment Trends over the past Three Years

E2. Level of Tuition Discounting

E3. Ability to Increase Tuition

G1. Population Growth Trend

G2. Wealth Indicators

As discussed hereinabove, a total score is obtained by combining the information from the factors in a ratio, with some factors receiving more weight than others. FIG. 10 illustrates an embodiment of factor weights that may be used. As can be seen in FIG. 10, because neither profitability nor growth is considered relevant while evaluating either educational institutions or governmental entities, these factors are not assigned any weight for the sectors. Similarly, in the embodiment shown in FIG. 10, the weights from NF6 and NF7 were reassigned to the sector specific factors. While NF8 is not considered an issue for educational institutions, covenant compliance is considered less relevant for government entities. The answer options corresponding to each of the factors shown in FIG. 10 and the score allocation for each answer option is illustrated in FIGS. 11A through 11E.

As described hereinabove, in various embodiments each answer option for each question has a corresponding score. At step 32, the scores are added to obtain a total score on a 1000-point scale, with a higher score corresponding to a higher probability of default. However, not all questions may be relevant or applicable to the borrower being rated. Apart from sector-specific questions, many questions may have "Not Applicable" as one of the answer options. If such an answer option is selected for a given question, then the question is ignored in the final calculation of the score. The total score is determined by summing the scores of the remaining questions and scaling appropriately.

As an example, suppose a scorecard consists of three factors F1, F2 and F3 with weights 50%, 30% and 20% respectively. If F3 is not applicable to a particular borrower, the scores from F1 and F2 are summed. The sum of scores is then divided by 80% (=100%-20%) to give the total score. Once the total score has been determined, a rating along a 16-pont rating scale may be obtained by looking up the score in a calibration table as shown in Table 1 to arrive at the preliminary probability of default.

TABLE 1

| Calibration Table | | |
|---|---|---|
| Rating | Minimum Score | Maximum Score |
| 1 | | 50 |
| 2 | 51 | 90 |
| 3 | 91 | 159 |
| 4 | 160 | 243 |
| 5 | 244 | 292 |
| 6 | 293 | 341 |

TABLE 1-continued

| Calibration Table | | |
|---|---|---|
| Rating | Minimum Score | Maximum Score |
| 7 | 342 | 389 |
| 8 | 390 | 437 |
| 9 | 438 | 467 |
| 10 | 468 | 497 |
| 11 | 498 | 527 |
| 12 or Worse | | 528 |

In various embodiments, any borrower with a total score of 528 or greater is assigned a generic rating of "12 or Worse." In various embodiments, the rating assigned is not differentiated in the lower quality ratings, as the scorecard cannot differentiate the specific conditions that differentiate a credit beyond this point.

At step 34, the process determines whether any warning signals are present that would give rise to modification of the preliminary probability of default to create the process probability of default 36. In various embodiments, the warning signals are conditions that do not appear in, for example, the financial statements of the borrower, either because they are not considered material to the financial situation of the borrower or because they are relatively recent. The warning signals may also escape consideration through the non-financial assessment of the borrower or may be so rare in occurrence that they are difficult to incorporate into the preliminary probability of default analysis at step 32.

As used herein, the term "warning signals" includes uncommon situations that highlight potential credit vulnerabilities. Such warning signals may provide a structured way to view recent elements that might change the assessment of the borrower's creditworthiness, and capture additional elements that are not captured in the non-financial questions as presented at step 30. The warning signals may also serve as a checklist of potential risks for the borrower. The warning signals do not necessarily mean that a default is imminent, but in various embodiments server as a list of signals that could lead to credit quality issues. The warning signals do not always apply to all borrowers and even for those for whom they apply, their impact is different.

Once a preliminary rating is generated, a user may determine which warning signals are present and select those warning signals. In various embodiments, different sets of warning signals are presented to the user depending on the entity type of the borrower (e.g., individual, automobile dealer, financial institution, health care provider, etc.). Examples of warning signals are as follows:

1. Involuntary and/or unexpected changes in senior/critical management or ownership.

2. Significant contingent liabilities.

3. Negative information from reliable third parties (e.g. bad press).

4. Chronic overdrafts.

5. Information critical to the appropriate evaluation of the borrower is missing.

6. Management succession is a concern.

7. Inappropriate statement quality for size of financial institution.

8. Material reporting error from entity to bank.

9. Resignation or removal of CPA.

10. Material fraud or embezzlement at entity.

11. Significant disruptions due to labor strikes.

12. Unavailability of insurance.

13. External catastrophic event.

14. Loss of significant customer/source of revenue (over 25% of revenue).
15. Recent sector-wide or institution-specific regulatory action.
16. Inordinate pension liabilities.
17. Currently undergoing or expected merger integration/major reorganization.
18. Changes to reporting pattern.
19. Payment default within the past three years.
20. Excessive reliance on manual administrative procedures/outdated management information systems.
21. Bank line usage is of concern.

In various embodiments, the user assesses the effect of each selected warning signal. The presence of a single signal may not create a fundamental change in the quality of the borrower. If a signal is very powerful, and has a high potential to send the borrower to default, this might be an indication that the preliminary probability of default is no longer relevant. In that case, the user may estimate how the preliminary probability of default should be adjusted, depending on the severity of the warning signal. In various embodiments, each significant or "extremely adverse" warning signal suggests at least a one level downgrade.

There may be cases in which there are multiple marginal warning signals that do not differ significantly from the assessment accompanying the preliminary probability of default. However, if three or more signals appear, it might be an indication that the preliminary probability of default is no longer valid.

In various embodiments, a user may describe how the warning signals affect the general assessment of the borrower's credit quality, and propose a change to the preliminary probability of default to arrive at the process probability of default 36. In various embodiments, such a change may be constrained to, for example, two rating levels At step 38, overrides may be used to validate the quality of the process probability of default 36 to arrive at the final probability of default 40. The override process allows for specific considerations for individual borrowers or portfolios, the details of which are known by the user. In various embodiments, any overrides must be clearly explained by elements not covered elsewhere in the process.

Figure 12:
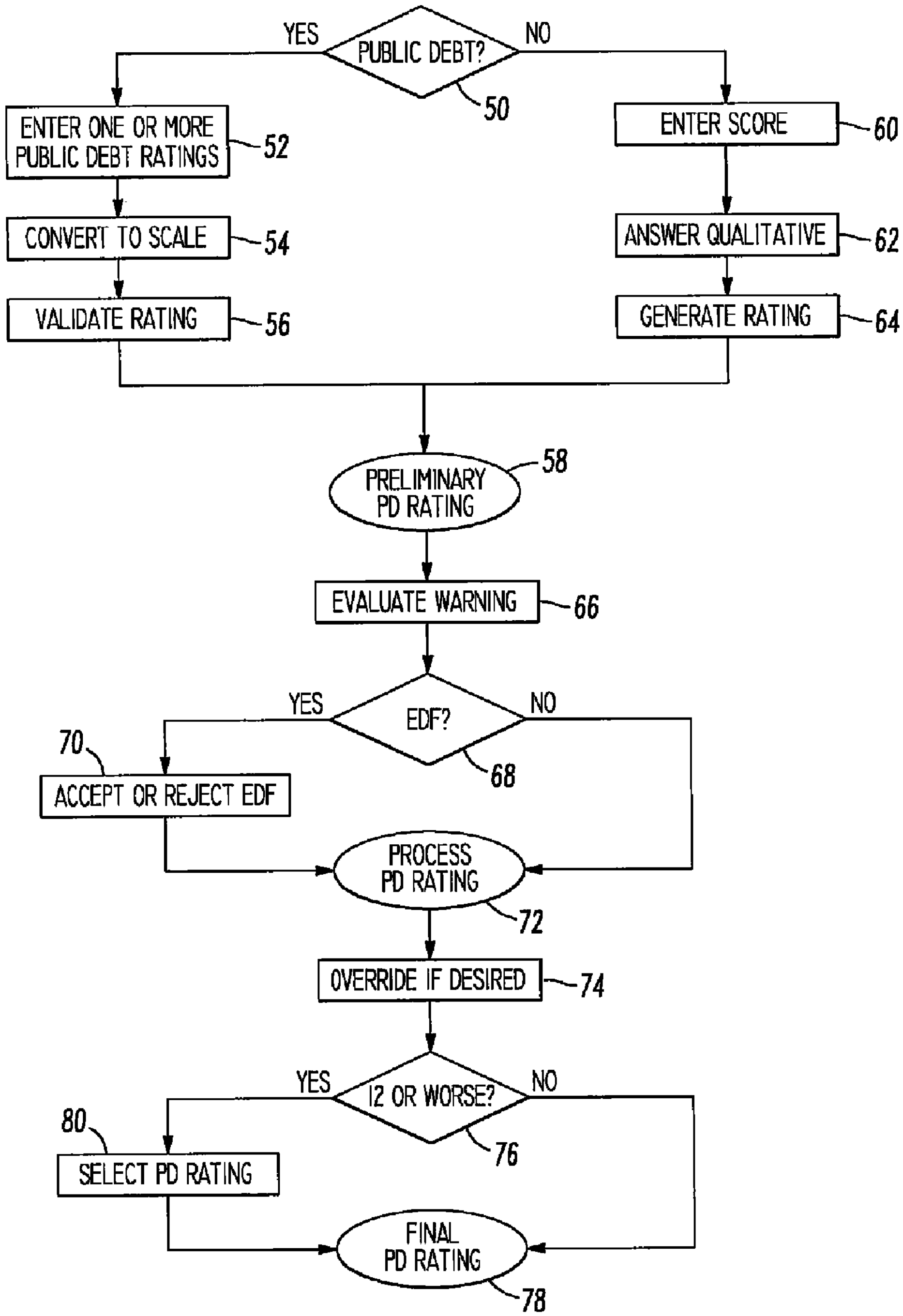
FIG. 12 is a diagram illustrating a process for determining a probability of default rating according to various embodiments of the present invention.

FIG. 12 is a diagram illustrating a process for determining a probability of default rating according to various embodiments of the present invention. At step 50, the process determines whether the borrower has one or more public debt ratings (e.g., a Moody's rating, a Fitch rating, an S&P rating, etc.). The determination may be made, for example, by accepting input from the user as to whether the borrower has one or more public debt ratings. At step 52 the rating(s) are entered by, for example, the user. At step 54, the public debt rating(s) are converted to a scaled value to be used by the process. For example, the following scale in Table 2 may be used to convert Moody's ratings.

TABLE 2

| Moody's Rating | Scale Equivalent |
|---|---|
| Aaa | 1 |
| Aa1 | 1 |
| Aa2 | 1 |
| Aa3 | 1 |
| A1 | 2 |
| A2 | 2 |
| A3 | 2 |
| Baa1 | 3 |
| Baa2 | 4 |
| Baa3 | 5 |
| Ba1 | 6 |
| Ba2 | 7 |
| Ba3 | 8 |
| B1 | 9 |
| B2 | 10 |
| B3 | 11 |
| Caa or lower | 12-16 |

By way of further example, the following scale in Table 3 may be used to convert S&P senior unsecured ratings:

TABLE 3

| S&P Rating | Scale Equivalent |
|---|---|
| AAA | 1 |
| AA+ | 1 |
| AA | 1 |
| AA− | 1 |
| A+ | 2 |
| A | 2 |
| A− | 2 |
| BBB+ | 3 |
| BBB | 4 |
| BBB− | 5 |
| BB+ | 6 |
| BB | 7 |
| BB− | 8 |
| B+ | 9 |
| B | 10 |
| B− | 11 |
| CCC or lower | 12-16 |

By way of further example, the following scale in Table 4 may be used to convert Fitch senior unsecured ratings:

TABLE 4

| Fitch Rating | Scale Equivalent |
|---|---|
| AAA | 1 |
| AA+ | 1 |
| AA | 1 |
| AA− | 1 |
| A+ | 2 |
| A | 2 |
| A− | 2 |
| BBB+ | 3 |
| BBB | 4 |
| BBB− | 5 |
| BB+ | 6 |
| BB | 7 |
| BB− | 8 |
| B+ | 9 |
| B | 10 |
| B− | 11 |
| CCC or lower | 12-16 |

In various embodiments, other types of public debt ratings can be used for an initial assessment of credit quality.

At step 56, the user can validate the scaled rating so that the rating reflects the current conditions of the borrower. For example, the public debt ratings might not be up-to-date, and, therefore, represent a picture that is no longer accurate. Also, validation of the rating may be desirable if the public debt rating was not a senior unsecured debt rating. Three broad criteria for validation may be included: timeliness; material changes in financial criteria since the last rating; and agreement on the evaluation of non-financial aspects. In various embodiments, if the borrower has been put on "negative watch" by the public rating agency, the user may downgrade the borrower one level.

In various embodiments, a user may assess whether there has been a material change in, for example, any of the following elements: leverage, cash flow, revenues/profit, liquidity and asset quality. In various embodiments, a user may compare the public rating agency assessment of management, industry characteristics and stability, company characteristics, for international banks—country risk and ownership characteristics (such as the support of the parent government), and any other elements used in the assessment. To do so, the user may review the inputs used by the rating agencies to rate the borrower, and to assess its current validity.

After the scaled rating is validated at step 56, the preliminary probability of default rating 58 results.

If at step 50 it is determined that the borrower does not have a public debt rating, the process advances to step 60. For those companies that do not have a public debt rating, the initial rating is obtained using financial and non-financial modeling. The financial modeling is based on previous financial statements. However, given that the financial statements present a backward look, it may be desirable to couple the financial information with other elements that capture the prospects of the borrower and other aspects that are not covered by the borrower's financial statements.

At step 60, a financial model score is entered. The financial model score may be generated using, for example, Moody's RiskCalc™ default model. Such an analysis provides an assessment of the creditworthiness of the borrower. The output of the default model is a probability of default that may be converted, using a logarithmic transformation, into a score. For example, in various embodiments financial scores from 1-500 are calculated such that 0.01% (1 bp) corresponds to a score of 1 and 20% (2000 bps) corresponds to a score of 500. In various embodiments, the output of the default model may be assigned in line with the Moody's ratings for those rated Aaa-Baa1 for ratings 1-3.

In various embodiments, the equation for the transformation is:

$$RC=\alpha*\beta S \quad (1)$$

where:

RC=the default model probability of default (expressed in basis points); S=Score (1-500 scale); α and β are calculated by equating 1 bp to 1 point and 2000 bps to 499 points.

At step 62, qualitative non-financial information is obtained by the process via, for example, obtaining answers to a series of questions posed to the user. The non-financial information may have five identically weighted factors that capture, by way of example, the following elements:

1. Economic stability of the industry;
2. Stability of the company's earnings;
3. Alternative sources of financing;
4. Quality of management performance during adverse business conditions; and
5. Management response to financial distress.

Information may also be collected for the following three other factors:

1. Company liquidity.
2. Covenant compliance.
3. Track record in meeting estimates.

In various embodiments, each scored question has an equal number of points assigned (100), and the distribution of points for each answer is based on the default rate observed for each answer in the development sample.

At step 64, the rating is generated. A total score between 0 and 1,000 is generated, where 0 is the best possible score, and 1,000 is the worst. The score is the result of adding the scores generated by the financial and non-financial modeling. Each model is equally weighted, with a total of 500 points each. The score provides a single grade that may be mapped to, for example, a 16-level master scale. In various embodiments, a ratings scale that ranges from 1 to 11 is used, and a generic rating is used for ratings 12 through 16.

After the preliminary probability of default rating 58 is created, the process advances to step 66 where warning signals are evaluated as described hereinabove with respect to FIG. 2.

At step 68, it is determined whether the borrower has a default frequency, such as, for example, a Moody's Expected Default Frequency™ (EDF) credit measure. An EDF is based on the analysis of equity prices, not on fundamental analysis. The EDF is usually more recent than the agency rating, providing, therefore, a more recent assessment of the borrower. As such, an EDF generated, when available, can be used as a double check for the preliminary probability of default rating 58.

If the borrower has an EDF, at step 70 the user determines if the EDF is appropriate by analyzing, for example, general stock market trends, EDFs of peers to the borrower. For example, if the overall stock market has been subject to extreme pressure by recent news, the EDF for the borrower might be capturing general market volatility, unrelated to the borrower's performance. Under these circumstances, the user may disregard the EDF at step 70. If no obvious element is affecting the EDF, its output will be consistent with the preliminary rating if it falls, for example, within the following ranges as illustrated in Table 5:

TABLE 5

| | EDF | |
|---|---|---|
| PD Rating | MIN | MAX |
| 1 | 0.02 | 0.18 |
| 2 | 0.04 | 0.28 |
| 3 | 0.16 | 0.42 |
| 4 | 0.19 | 0.54 |
| 5 | 0.29 | 0.66 |
| 6 | 0.43 | 0.91 |
| 7 | 0.55 | 1.27 |
| 8 | 0.67 | 2.09 |
| 9 | 0.92 | 3.89 |
| 10 | 1.28 | 6.27 |
| 11 | 2.35 | 14.50 |
| 12-16 | 6.28 | |

In various embodiments, if the EDF is outside this band, the preliminary rating will be the nearest rating for which the EDF fits within the allowed band. For example, if a borrower had a Moody's Baa2 implying a 4 probability of default rating, the rating would not change as long as its EDF were between 0.19% and 0.54%. However, if the borrower had a 0.75% EDF, the borrower would be downgraded to 6; if it were 1.00%, the rating would be a 7 to reflect the warning created during the EDF generation. In various embodiments, if there is a discrepancy, the user has the discretion to choose which rating to use: the preliminary rating 58 or the rating from the EDF process. The resulting rating is a process probability of default rating 72.

At step 74, the user may override the process probability of default rating 72 if desired. At step 76, it is determined if the process probability of default rating 72 is 12 or worse. If not, the process probability of default rating 72 becomes a final probability of default rating 78. If the process probability of default rating 72 is worse than 12, at step 80 the user may determine which specific rating the borrower should receive using, for example, a set of guidelines.

The techniques and methods described hereinabove in conjunction with FIGS. 2 and 12 may be used to calculate a probability of default of a borrower in the real estate industry. In such embodiments, a preliminary process probability of default value is determined using four different weightings depending on the type of borrower. The financial component and non-financial components are identically weighted for three types of borrowers, and the financial component is given a greater weight (60%) for REIT/Pool borrowers because of the better financial reporting of such borrowers. In various embodiments, scorecards include loan-to-value and/or debt service coverage are important factors.

In such embodiments, the qualitative criteria may have substantial variations between different types of borrowers due to the different characteristics that determine risk.

The answers for each qualitative question are labeled A through E, which in various embodiments have points assigned by the following in Table 6:

TABLE 6

| Answer | Points |
|---|---|
| A | 1 |
| B | 2 |
| C | 3 |
| D | 4 |
| E | 5 |

In various embodiments the weights for each element and the distribution between the financial and non-financial components are presented below in Table 7:

TABLE 7

| Factor | Resid. Tract | Project | Const./ Afford. | REIT | Pool |
|---|---|---|---|---|---|
| Loan-to-Value | 20% | 10% | 10% | 25% | 25% |
| Debt Service Coverage | | 40% | 20% | 35% | 35% |
| Pre-Leasing | | | 20% | | |
| Incentive of Equity Provider | 7.5% | | | | |
| Remaining mos to Repay at-risk $ | 15% | | | | |
| Sales Price Percentage | 7.5% | | | | |
| Total Financial | 50% | 50% | 50% | 60% | 60% |
| Market Conditions | 12.5% | 10% | 10% | | |
| Completion/Construction Risk | 12.5% | 10% | | | |
| HISTORY OF CREDIT RELATIONSHIP | 5% | | | | |
| Project Capitalization | 5% | | | | |
| Sponsor Financial Capacity | 15% | | | | |
| Access to External Capital | | | | 10% | 10% |
| Sponsor Capacity/Access to External Capital | | 10% | 10% | | |
| Diversity of Borrower's Assets | | | | 10% | 10% |
| Covenant Compliance | | | | 10% | 10% |
| Fund Investment Strategy/Stage in LC | | | | | 10% |
| Bank Line Usage | | | | 10% | |
| Equity | | 10% | 10% | | |
| Percent Recourse | | 10% | 10% | | |
| Stability of NOI: Rollover | | 10% | | | |
| Total Non-Financial | 50% | 50% | 50% | 40% | 40% |

In various embodiments, for those borrowers engaged in the residential tract development business the following ranges for quantitative factors are used as illustrated in Tables 8-10:

TABLE 8

| Loan to Value | | | | | |
|---|---|---|---|---|---|
| Home Construction | | | Site Improvement | | |
| > | <= | Rating | > | <= | Rating |
| 0.0% | 40.0% | 1 | 0.0% | 40.0% | 1 |
| 40.0% | 50.0% | 2 | 40.0% | 45.0% | 2 |
| 50.0% | 60.0% | 3 | 45.0% | 50.0% | 3 |
| 60.0% | 65.0% | 4 | 50.0% | 55.0% | 4 |
| 65.0% | 70.0% | 5 | 55.0% | 60.0% | 5 |
| 70.0% | 75.0% | 6 | 60.0% | 65.0% | 6 |
| 75.0% | 80.0% | 7 | 65.0% | 70.0% | 7 |
| 80.0% | 82.5% | 8 | 70.0% | 72.5% | 8 |
| 82.5% | 85.0% | 9 | 72.5% | 75.0% | 9 |
| 85.0% | 87.5% | 10 | 75.0% | 77.5% | 10 |
| 87.5% | 90.0% | 11 | 77.5% | 80.0% | 11 |
| 90.0% | 92.5% | 12 | 80.0% | 85.0% | 12 |
| 92.5% | 95.0% | 13 | 85.0% | 90.0% | 13 |
| 95.0% | 100.0% | 14 | 90.0% | 100.0% | 14 |
| 100.0% | | 15 | 100.0% | | 15 |

TABLE 9

| Approved/Unimproved | | | Unapproved | | |
|---|---|---|---|---|---|
| > | <= | Rating | > | <= | Rating |
| 0.0% | 30.0% | 1 | 0.0% | 2.5% | 1 |
| 30.0% | 35.0% | 2 | 2.5% | 5.0% | 2 |
| 35.0% | 40.0% | 3 | 5.0% | 10.0% | 3 |
| 40.0% | 45.0% | 4 | 10.0% | 20.0% | 4 |
| 45.0% | 50.0% | 5 | 20.0% | 30.0% | 5 |
| 50.0% | 55.0% | 6 | 30.0% | 40.0% | 6 |
| 55.0% | 60.0% | 7 | 40.0% | 50.0% | 7 |
| 60.0% | 62.5% | 8 | 50.0% | 55.0% | 8 |
| 62.5% | 65.0% | 9 | 55.0% | 60.0% | 9 |
| 65.0% | 70.0% | 10 | 60.0% | 65.0% | 10 |
| 70.0% | 75.0% | 11 | 65.0% | 70.0% | 11 |
| 75.0% | 80.0% | 12 | 70.0% | 80.0% | 12 |
| 80.0% | 90.0% | 13 | 80.0% | 90.0% | 13 |
| 90.0% | 100.0% | 14 | 90.0% | 100.0% | 14 |
| 100.0% | | 15 | 100.0% | | 15 |

TABLE 10

| Equity (% of Policy Requirement) | | | Remaining Months For At-Risk Dollars | | | Sales Price (%) | | |
|---|---|---|---|---|---|---|---|---|
| > | <= | Rating | >= | < | Rating | > | <= | Rating |
| 0% | 0% | 15 | — | 3 | 1 | 0% | 74% | 15 |
| 0% | 25% | 14 | 4 | 6 | 2 | 75% | 79% | 14 |
| 25% | 50% | 13 | 7 | 9 | 3 | 80% | 82% | 13 |
| 50% | 75% | 12 | 10 | 12 | 4 | 83% | 86% | 12 |
| 75% | 80% | 11 | 13 | 18 | 5 | 87% | 89% | 11 |
| 80% | 85% | 10 | 19 | 24 | 6 | 90% | 92% | 10 |
| 85% | 90% | 9 | 25 | 30 | 7 | 93% | 95% | 9 |
| 90% | 95% | 8 | 31 | 36 | 8 | 96% | 97% | 8 |
| 95% | 105% | 7 | 37 | 39 | 9 | 98% | 102% | 7 |
| 105% | 115% | 6 | 40 | 42 | 10 | 103% | 105% | 6 |
| 115% | 126% | 5 | 43 | 45 | 11 | 106% | 108% | 5 |
| 126% | 135% | 4 | 46 | 48 | 12 | 109% | 110% | 4 |
| 135% | 150% | 3 | 49 | 60 | 13 | 111% | 115% | 3 |
| 150% | 175% | 2 | 61 | 70 | 14 | 116% | 120% | 2 |
| 175% | 200% | 1 | 71 | 1,000 | 15 | 121% | 130% | 1 |

In various embodiments, the following are used for hotel borrowers as illustrated in Table 11:

TABLE 11

| Loan to Value | | | | Debt Service Coverage | | | |
|---|---|---|---|---|---|---|---|
| > | <= | Rating | Hotel | > = | < | Rating | Hotel |
| 0.0% | 35.0% | 1 | 4 | — | 0.90 | 15 | 15 |
| 35.0% | 45.0% | 2 | 5 | 0.90 | 0.95 | 14 | 14 |
| 45.0% | 50.0% | 3 | 6 | 0.95 | 1.00 | 13 | 14 |
| 50.0% | 55.0% | 4 | 8 | 1.00 | 1.10 | 12 | 14 |
| 55.0% | 60.0% | 5 | 9 | 1.10 | 1.20 | 11 | 13 |
| 60.0% | 65.0% | 6 | 10 | 1.20 | 1.30 | 10 | 13 |
| 65.0% | 67.5% | 7 | 11 | 1.30 | 1.35 | 9 | 12 |
| 67.5% | 70.0% | 8 | 12 | 1.35 | 1.40 | 8 | 12 |
| 70.0% | 75.0% | 9 | 12 | 1.40 | 1.50 | 7 | 11 |
| 75.0% | 80.0% | 10 | 13 | 1.50 | 1.60 | 6 | 10 |
| 80.0% | 82.5% | 11 | 13 | 1.60 | 1.75 | 5 | 9 |
| 82.5% | 85.0% | 12 | 14 | 1.75 | 2.00 | 4 | 8 |
| 85.0% | 90.0% | 13 | 14 | 2.00 | 2.25 | 3 | 6 |
| 90.0% | 95.0% | 14 | 14 | 2.25 | 2.50 | 2 | 5 |
| 95.0% | | 15 | 15 | 2.50 | | 1 | 4 |

In various embodiments, the following are used for construction and affordable housing borrowers as illustrated in Table 12:

TABLE 12

| Loan to Value | | | | Debt Service Coverage | | | | Pre-Leasing | | |
|---|---|---|---|---|---|---|---|---|---|---|
| > | <= | Rating | Hotel | >= | < | Rating | Hotel | >= | < | Rating |
| 0.0% | 35.0% | 1 | 4 | — | 0.90 | 15 | 15 | | 0% | 15 |
| 35.0% | 45.0% | 2 | 5 | 0.90 | 0.95 | 14 | 14 | | 0% | 14 |
| 45.0% | 50.0% | 3 | 6 | 0.95 | 1.00 | 13 | 14 | 0% | 10% | 13 |
| 50.0% | 55.0% | 4 | 8 | 1.00 | 1.10 | 12 | 14 | 10% | 25% | 12 |
| 55.0% | 60.0% | 5 | 9 | 1.10 | 1.20 | 11 | 13 | 25% | 35% | 11 |
| 60.0% | 65.0% | 6 | 10 | 1.20 | 1.30 | 10 | 13 | 35% | 45% | 10 |
| 65.0% | 67.5% | 7 | 11 | 1.30 | 1.35 | 9 | 12 | 45% | 50% | 9 |
| 67.5% | 70.0% | 8 | 12 | 1.35 | 1.40 | 8 | 12 | 50% | 55% | 8 |
| 70.0% | 75.0% | 9 | 12 | 1.40 | 1.50 | 7 | 11 | 55% | 60% | 7 |
| 75.0% | 80.0% | 10 | 13 | 1.50 | 1.60 | 6 | 10 | 60% | 70% | 6 |
| 80.0% | 82.5% | 11 | 13 | 1.60 | 1.75 | 5 | 9 | 70% | 80% | 5 |
| 82.5% | 85.0% | 12 | 14 | 1.75 | 2.00 | 4 | 8 | 80% | 90% | 4 |
| 85.0% | 90.0% | 13 | 14 | 2.00 | 2.25 | 3 | 6 | 90% | 95% | 3 |
| 90.0% | 95.0% | 14 | 14 | 2.25 | 2.50 | 2 | 5 | 95% | 100% | 2 |
| 95.0% | | 15 | 15 | 2.50 | | 1 | 4 | 100% | | 1 |

In various embodiments, the following warning signals may be considered for real estate borrowers:

1. Death of Founder.
2. Significant increase in discretionary compensation, distributions, and/or dividends to principals.
3. Significant changes in strategy, management personnel, of decision-making that gives the bank concern over the future direction of the company.
4. Deteriorated relationship between management and bank.
5. Sponsor is developing a product type or a project size that he has not completed to date.
6. Fraud or embezzlement has occurred.
7. Transactions between parent company, subsidiaries, or affiliates are not at arm's length.
8. Significant exposure through investments, key suppliers or key customers.
9. Use of subject financing for purposes other than those delineated in the transaction.
10. Material reporting error by company to a bank.
11. Change in CPA.
12. Significant legal action.
13. Loss of a major tenant or tenants aggregating >=10% of consolidated rental revenue.

In various embodiments, the following are used for pool and REIT borrowers as illustrated in Table 13:

TABLE 13

| Loan to Value | | | Debt Service Coverage | | |
|---|---|---|---|---|---|
| > | <= | Rating | >= | < | Rating |
| 0.0% | 20.0% | 1 | — | 1.00 | 15 |
| 20.0% | 30.0% | 2 | 1.00 | 1.05 | 14 |
| 30.0% | 40.0% | 3 | 1.05 | 1.10 | 13 |
| 40.0% | 45.0% | 4 | 1.10 | 1.20 | 12 |
| 45.0% | 50.0% | 5 | 1.20 | 1.30 | 11 |
| 50.0% | 55.0% | 6 | 1.30 | 1.35 | 10 |
| 55.0% | 60.0% | 7 | 1.35 | 1.40 | 9 |
| 60.0% | 65.0% | 8 | 1.40 | 1.50 | 8 |
| 65.0% | 67.5% | 9 | 1.50 | 1.60 | 7 |
| 67.5% | 70.0% | 10 | 1.60 | 1.75 | 6 |
| 70.0% | 75.0% | 11 | 1.75 | 2.00 | 5 |
| 75.0% | 80.0% | 12 | 2.00 | 2.25 | 4 |
| 80.0% | 85.0% | 13 | 2.25 | 2.50 | 3 |
| 85.0% | 90.0% | 14 | 2.50 | 3.00 | 2 |
| 90.0% | | 15 | 3.00 | | 1 |

14. Loss of a major anchor or tenant, regardless of its contribution to the income stream—in a retail property, for example, the loss of a shadow anchor.
15. Quality of overall tenancy has deteriorated to a level that creates the potential for marked instability in the cash flow.
16. For retail properties, sales levels are insufficient to support the underlying rents.
17. Leasing/absorption activity is substantially behind plan.
18. Significant variances between physical and economic occupancy.
19. Recent change in primary banking relationship.
20. Negative information form reliable third-party reports (e.g. appraisal, environmental, inspecting architect, site surveys etc.).
21. Chronic Overdrafts.
22. Chronic late payment on scheduled principal/interest.
23. Construction risk is significant and/or development costs of all assets under construction or with significant lease-up remaining (i.e. 25% or more of the space) exceed the following limits (based upon the full amount of the budget):

A) >20% of portfolio value with acceptable market risk/pre-leasing; or

B) >10% of portfolio value with:

i) significant market risk; or ii) concentration in a single development asset.

24. Work stoppages or material delays in construction.

25. Trade payables have been accumulating and/or mechanics liens have been filed.

26. Bank has stepped into the ownership position of the project.

27. For a REIT/Pool: Liquidity.

28. FFO Payout Ratio exceeds 90%. As much as possible use calculations provided within quarterly certificates.

Figure 13:
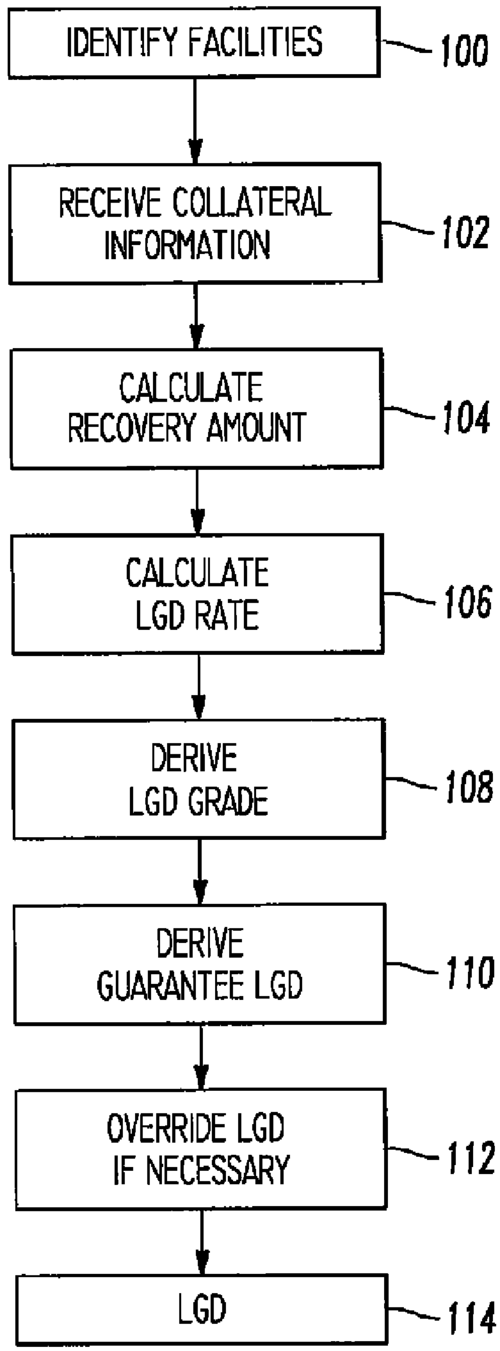
FIG. 13 is a diagram illustrating a process for determining a loss given default (LGD) rating according to various embodiments of the present invention.

FIG. 13 is a diagram illustrating a process for determining a loss given default (LGD) rating according to various embodiments of the present invention. At step 100, the facilities at issue are identified.

As used herein, a loss given default (hereinafter "LGD") grade, or rating, for a loan, set of loans, etc. is the percentage of exposure the lender expects to lose in the event the borrower defaults on an obligation. In various embodiments, the LGD rating is based on two factors: collateral and guarantees. In various embodiments, separate LGD grades are calculated; one based on collateral and the other based on guarantee and the better of the two is assigned to all credit facilities that are cross-collateralized and/or cross-guaranteed.

LGD ratings represent losses in the event of a default and are equal to one minus the recovery rate. In various embodiments, the LGD rating is represented in the form of an alphabetic rating that ranges from A to H, where A-rated facilities are expected to have the highest recovery rates in the event of a default and H-rated facilities are expected to have the lowest. When combined with a numeric probability of default rating, users of embodiments of the present invention are able to develop a combined expected loss rate for each facility.

In various embodiments, a recovery value is assigned to each piece of collateral and the LGD rating is the inverse of the recovery rate. FIGS. 14A-14B illustrate an example of assigned collateral LGD ratings based on a grid that combines collateral types with loan to value ratios for each facility. The example illustrated in FIGS. 14A-14B shows forty-two collateral types identified and grouped into seven categories. For the example illustrated in FIGS. 14A-14B, the base LTV ratio for each of the classifications is assumed to be 100% and groups are created above and below this ratio.

As used herein in conjunction with calculation of the LGD, "Loan Amount (LoanAmt)" means the available amount for business credit, direct hard exposure (DHE) for all other businesses and "collateral amount (ColAmt)" means net eligible amount—(prior lien amt/advance rate). The LoanAmt, the ColAmt, and the collateral type (ColTyp) are inputs to the LGD calculation process as determined at step 102. In various embodiments, there arc separate inputs for each loan amount and each collateral type/amount for all cross-collateralized facilities.

The following factors are derived based on the type of collateral: collateral recovery rate (ColRecRat); base loan to value (BaseLTV); and minimum LGD (MinLGD). The following parameters are calculated in the LGD calculation process: recovery amount (RecAmt); recovery rank (RecRnk); adjusted recovery amount (AdjRecAmt); secured amount (SecAmt); total adjusted recovery amount (TotAdjRecAmt); weighted average minimum LGD (WAMLGD); LGD rate (LGDRat); and LGD grade. In the process, RecAmt, AdjRecAmt, and RecRnk are calculated for each piece of collateral.

At step 104, the recovery amount is calculated. The recovery amount is the dollar value of expected recovery for each piece of collateral if it stood alone.

$$RecAmt=MIN[(ColrecRat)(ColAmt),(1-MinLGD)(LoanAmt)]$$

The recovery rank assigns a numeric rank to each piece of collateral based on the collateral recovery rate, in descending order so that the collateral with the highest recovery rate is ranked first. In various embodiments, if two pieces of collateral have the same recovery rate, the first one entered gets the lowest rank, and each subsequent entry with that recovery rate gets successively higher ranks.

The adjusted recovery amount is a systematically assigned value equal to the recovery amount starting with the best recovery rank, until the sum of the adjusted recovery amounts exceeds the sum of all loan amounts. The final piece of collateral required to do so is reassigned an adjusted recovery amount so that the sum of the adjusted recovery amounts is equal to the sum of all loan amounts. Any remaining pieces of collateral are assigned an adjusted recovery amount of zero. In other words, the best pieces of collateral use up their potential recovery amounts until no more collateral is required to cover the loan.

Calculation of the adjusted recovery amount for a piece of collateral, in various embodiments, is as follows:

1: Sum all recovery amounts whose corresponding recovery rank is smaller than the recovery rank of the collateral for which the calculation is being made.

2: Subtract the value generated in step 1 from the sum of all loan amounts associated with this set of collateral.

3: If the value from step 2 is less than or equal to zero, then the adjusted recovery amount for this piece of collateral is zero.

4: If the value from step 2 is greater than zero, then the adjusted recovery amount is the minimum of the recovery amount for this piece of collateral and the value in step 2.

Formulaically the adjusted recovery amount is:

$$AdjrecAmt = \mathrm{MAX}\left(0, \mathrm{MIN}\left(recAmt, \sum LoanAmt - \sum_{recRnk=1}^{recRnk-1} recAmt\right)\right)$$

The secured amount is the loan amount that would normally be advanced to a borrower given the mix of collateral entered.

$$SecAmt=\Sigma[(ColAmt)(BaseLTV)]$$

The total adjusted recovery amount is the sum of all adjusted recovery amounts plus a 35% recovery rate applied to any unsecured portion of the total loan amount.

$$TotAdjrecAmt=\Sigma AdjrecAmt+0.35(MAX(0,\Sigma LoanAmt-SecAmt))$$

The weighted average minimum LGD is the weighted average of the minimum LGD from each piece of collateral based on the adjusted recovery amount.

$$WAMLGD = \frac{\sum((AdjrecAmt)(\mathrm{Min}LGD))}{\sum AdjrecAmt}$$

The LGD rate is calculated at step 106. In various embodiments, if the collateral type chosen is "unsecured," the LGD rate is 45%. If the collateral type chosen is "unsecured— structurally subordinated," the LGD rate is 65%. Otherwise, the LGD rate is the maximum of the LGD rate implied by the total adjusted recovery amount and the minimum LGD rate.

$$LGDRat = \text{MAX}\left(\frac{\sum LoanAmt - AdjrecAmt}{\sum LoanAmt}, \text{Min}LGD\right)$$

At step 108, the LGD grade is derived using the calculated LGD rate and the following as illustrated in Table 14:

TABLE 14

| LGD Range | LGD |
|---|---|
| 0%-7% | A |
| >7%-12% | B |
| >12%-17% | C |
| >17%-22% | D |
| >22%-28% | E |
| >28%-39% | F |
| >39%-50% | G |
| >51%-100% | H |

An example of the inputs and calculated values for a hypothetical LGD derivation is illustrated in FIG. 15.

In addition to collateral, a facility's LGD can be affected by third-party guarantees. If a third party, who is of higher quality than the borrower, provides a guarantee to support the facility then the facility's LGD may improve. At step 110, a guarantee LGD is derived. Inputs used in deriving the guarantee LGD include borrower PD rating; guarantor PD rating; percent of exposure guaranteed; and type of guarantee (i.e., joint or several—only applicable if multiple guarantors are present).

If an exposure is supported by a single guarantor, the difference between the borrower's PD rating and the guarantor's PD rating is first determined. That figure along with the percent of exposure guaranteed are used to find the LGD rating on the grid below as illustrated in Table 15:

TABLE 15

| Borrower PD - Guarantor PD | Full Guarantee | Partial >75% | Partial >50% |
|---|---|---|---|
| 7 or More | C | D | E |
| 5-6 | D | E | F |
| 3-4 | E | F | G |
| 1-2 | F | G | G |

If multiple guarantors support an exposure or group of exposures, they are defined as either joint or several. Joint guarantees refer to multiple guarantors who all pledge to support the entire exposure amount. If an exposure has several guarantors, each guarantor only supports a portion of the total exposure amount. In the case of joint guarantors, the guarantor with the strongest PD rating is chosen, and the LGD is determined as though this were the only guarantee.

In the case of several guarantors, the percentage of the exposure amounts that each guarantees are summed. This amount is used as the percentage of exposure guaranteed in the grid above. The guarantor PD rating to be used to calculate the difference between the borrower and guarantor PD rating is the weighted average of the guarantors' PD ratings based on each guarantor's percentage guaranteed.

At step 112, the LGD rating may be overridden based on, for example, the judgment of the user and a final LGD rating 114 for an exposure is the better of its collateral driven LGD and its guarantor driven LGD.

Figure 16:
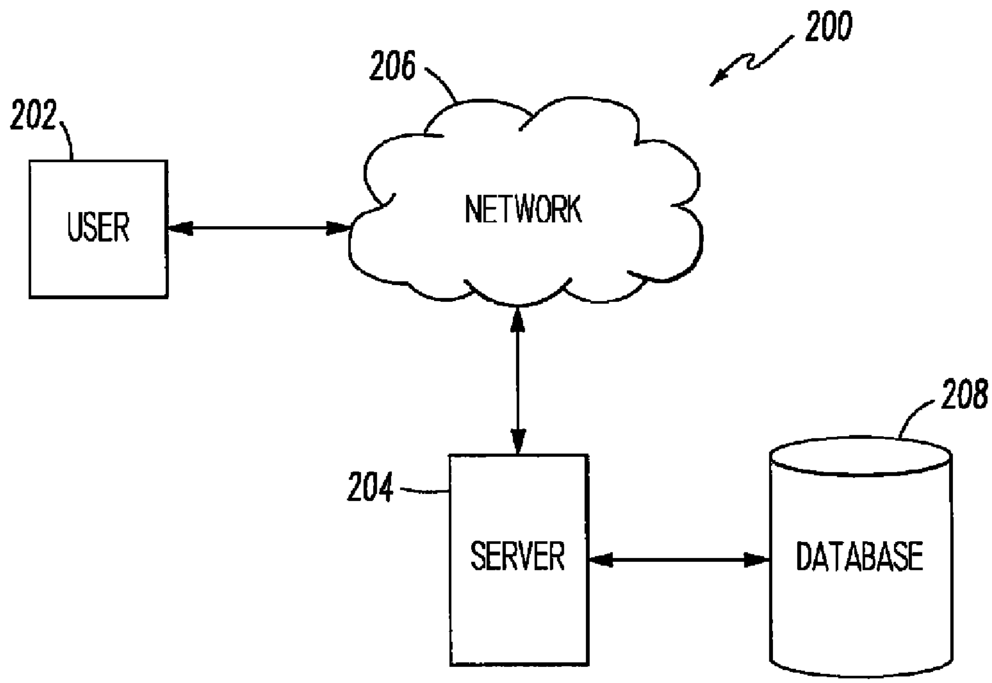
FIG. 16 illustrates an embodiment of a system in which the methods described herein may be implemented.

FIG. 16 illustrates an embodiment of a system 200 in which the methods described herein may be implemented. A user computer 202 is in communication with a server 204 via a network 206. The user computer 202 may be, for example, a personal computer or any other type of suitable computing device or computer terminal. The network 206 may be any type of computer network such as, for example, the Internet, a local area network (LAN), a wide area network (WAN), etc. The server 204 may implement the various software code instructions to execute the methods described herein. The server 204 is in communication with a database 208. The database 208 may store information such as, for example, information relating to borrowers.

Figure 17:
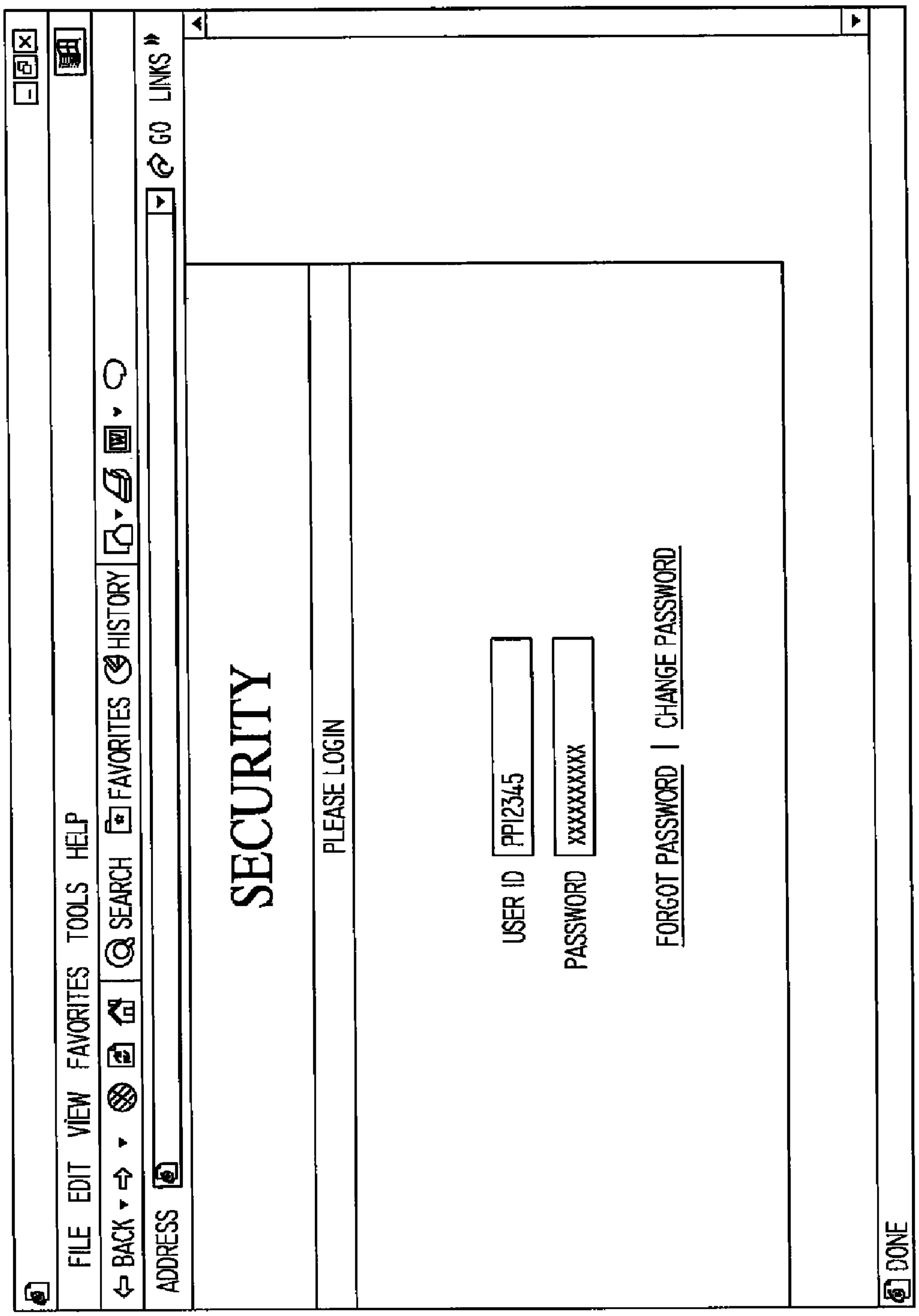
FIGS. 17 through 76B are computer screen shots illustrating an example of an implementation of the present invention.
Figure 18A:
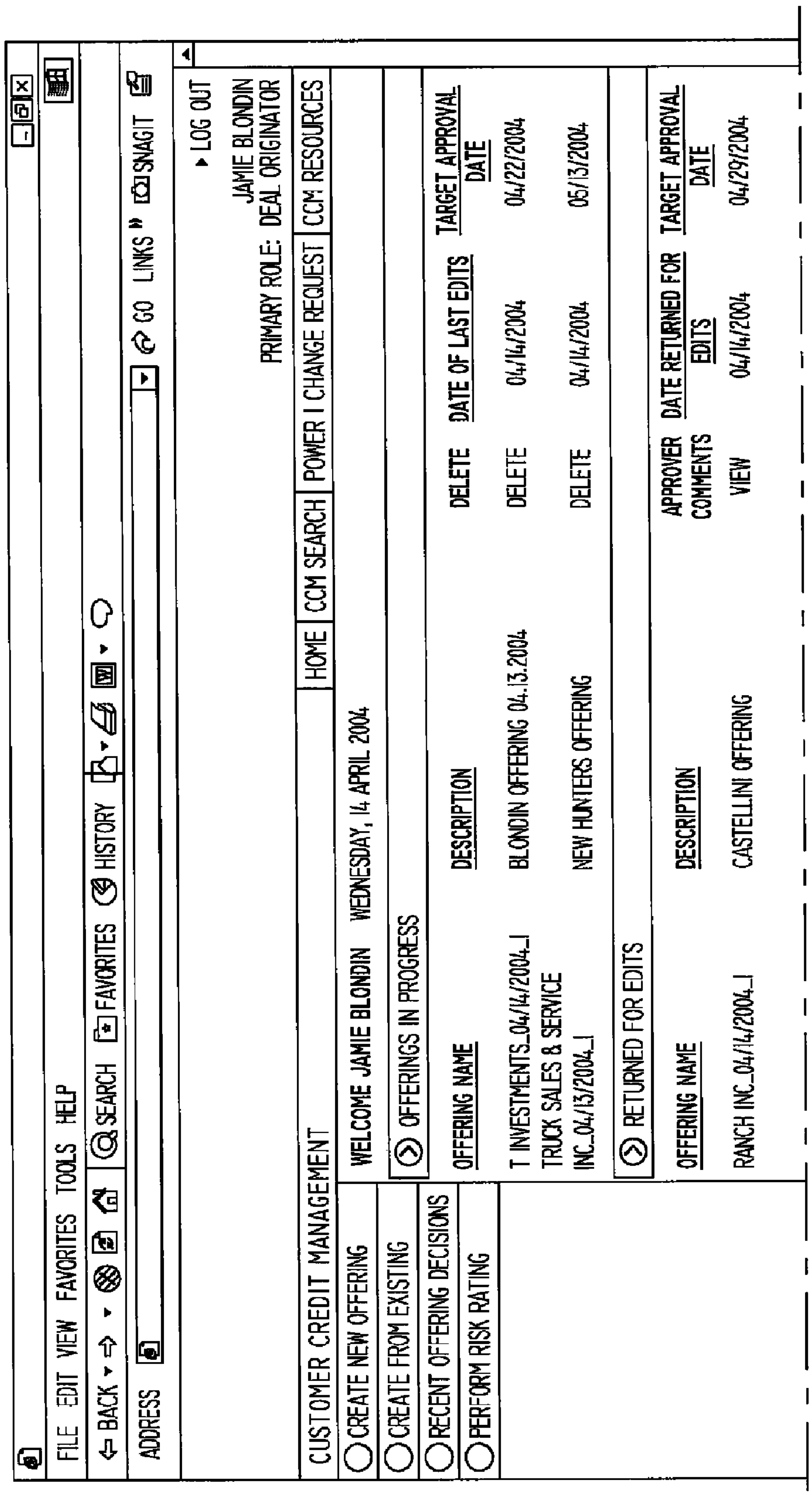
Figure 18B:
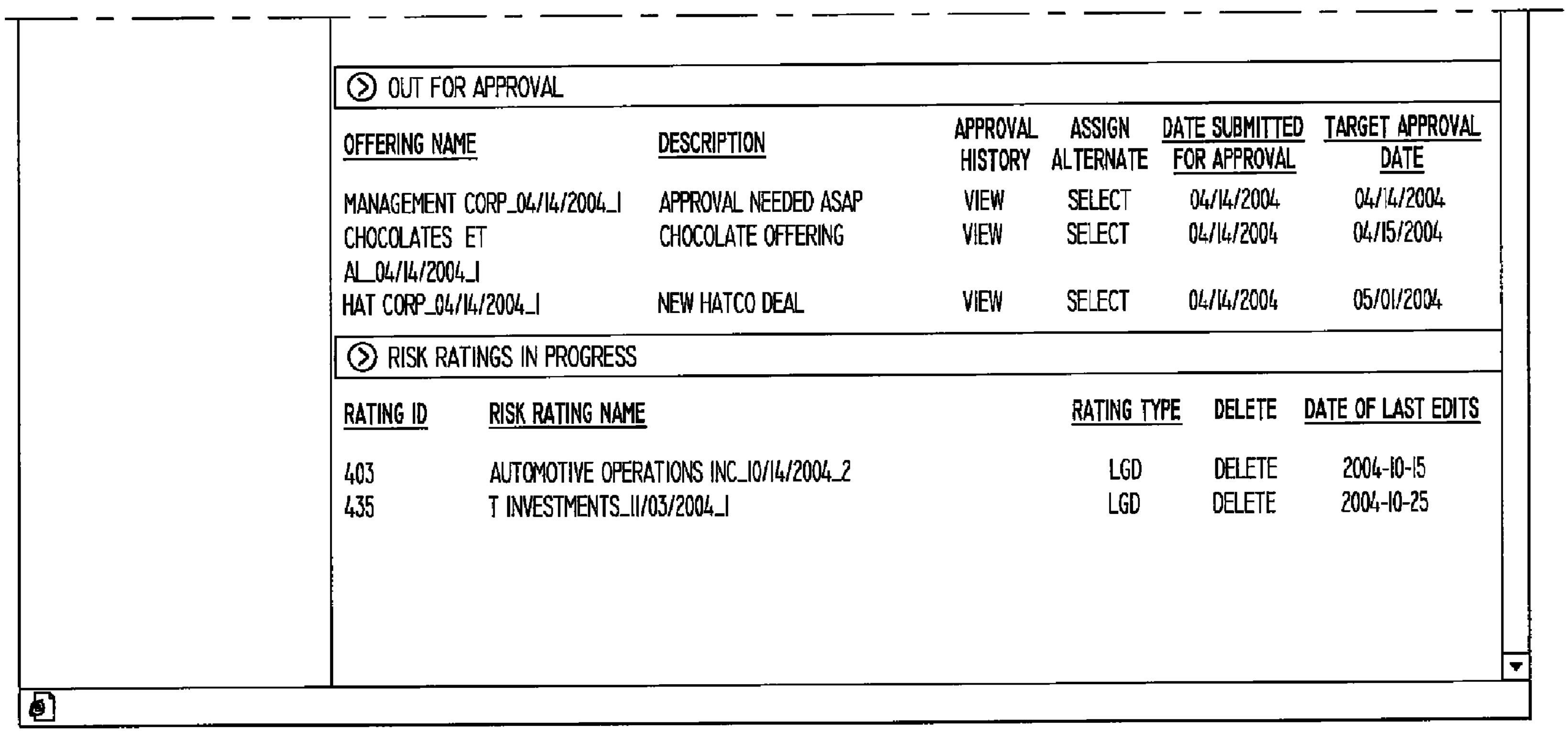
Figure 19A:
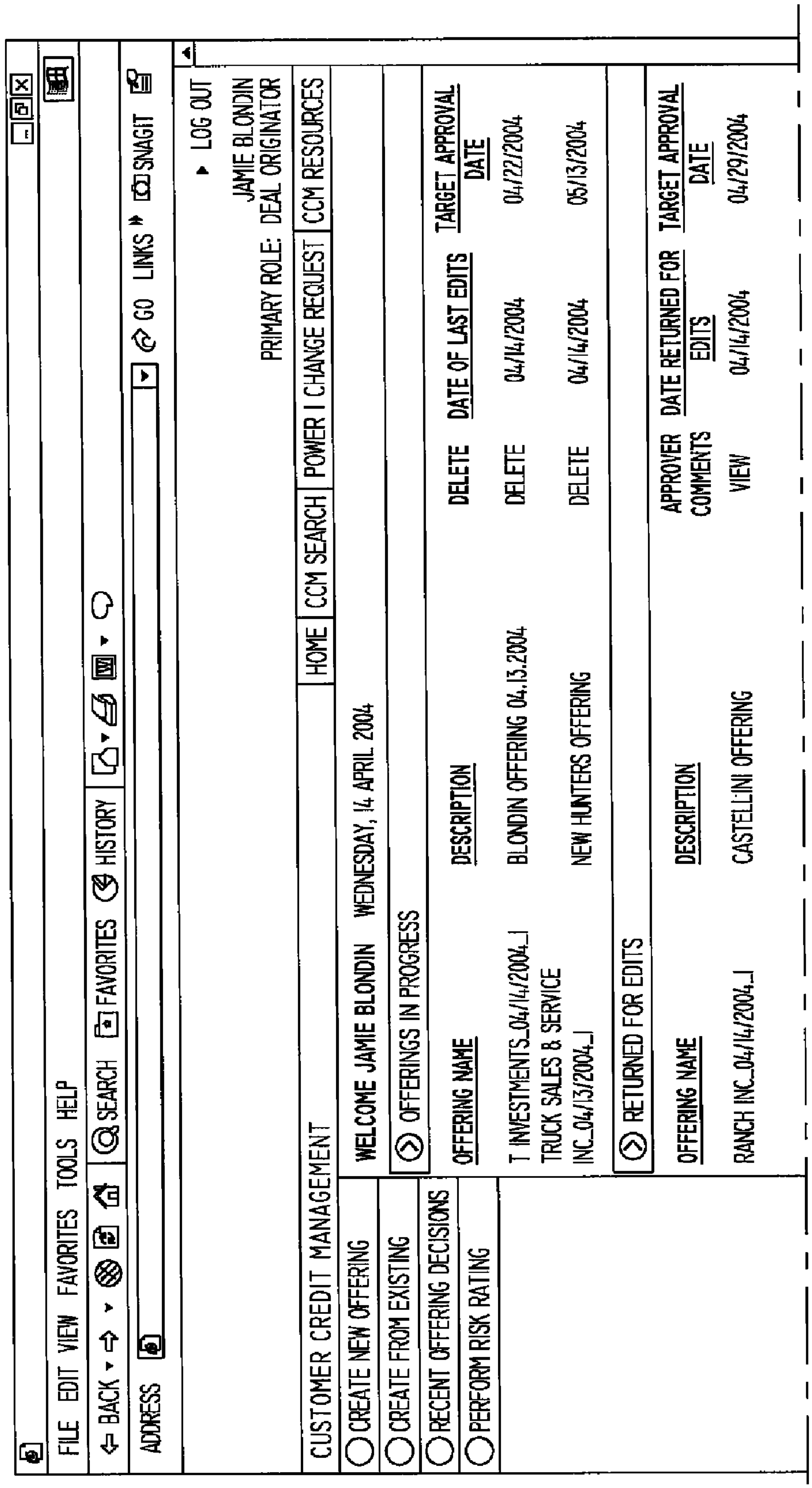
Figure 19B:
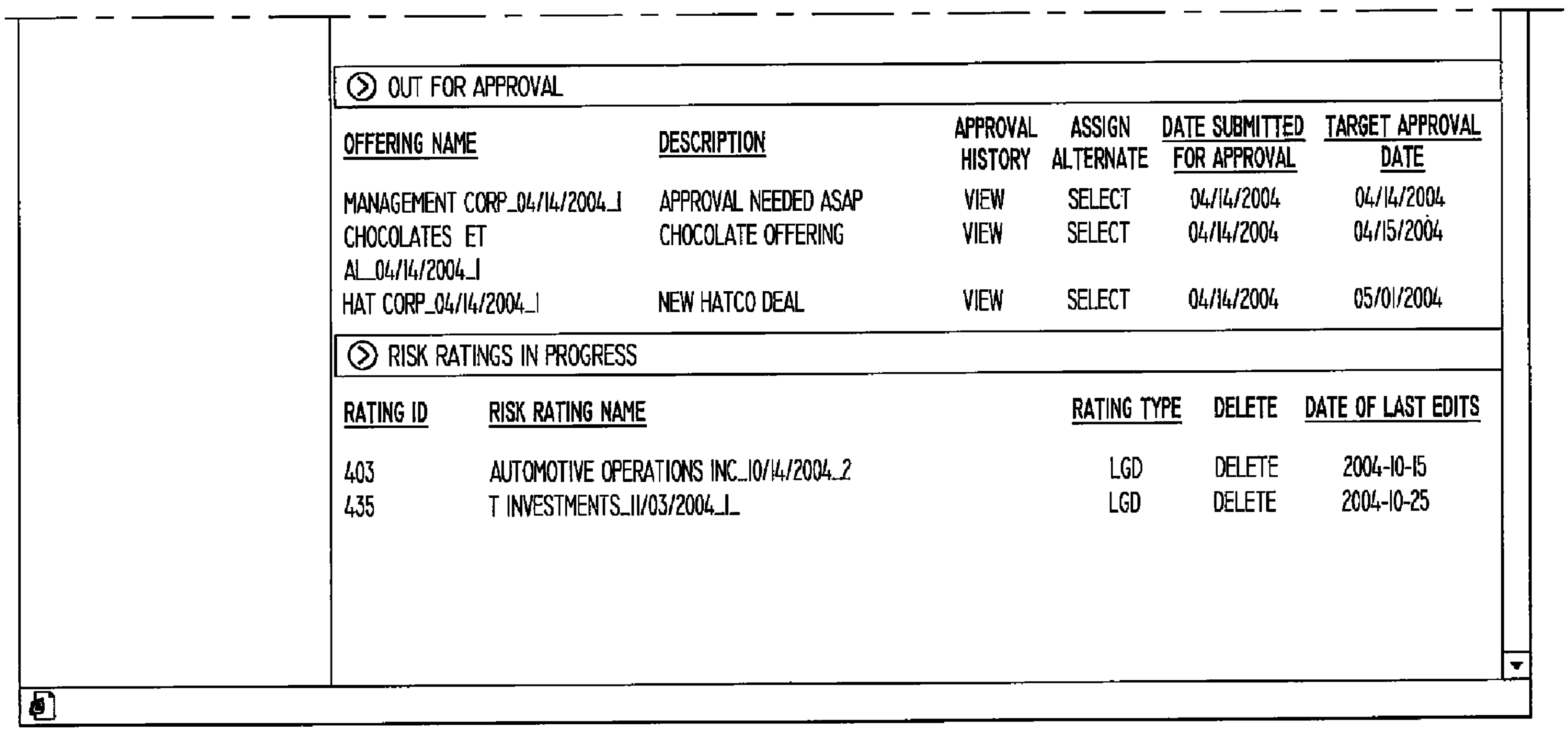
Figure 20A:
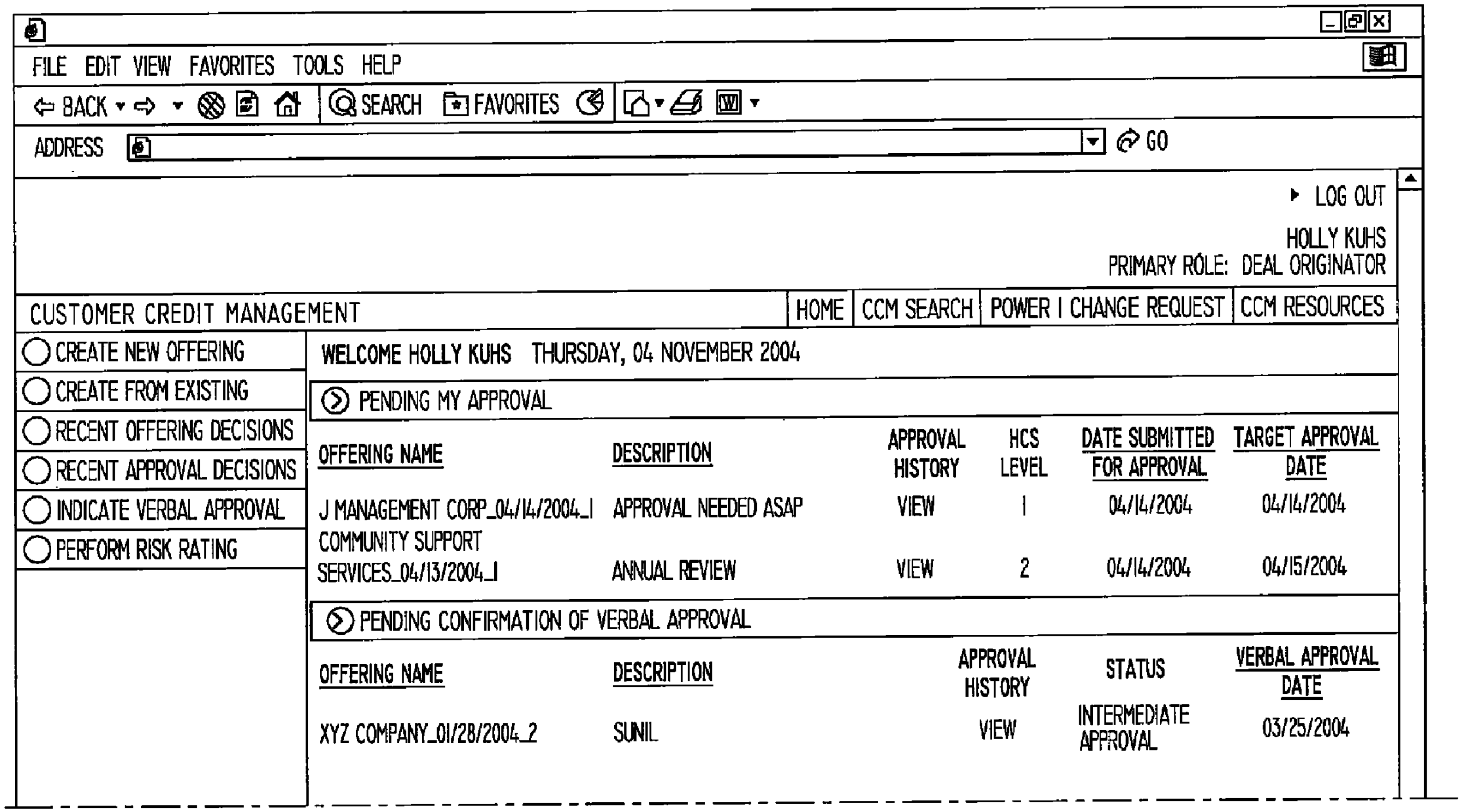
Figure 20B:
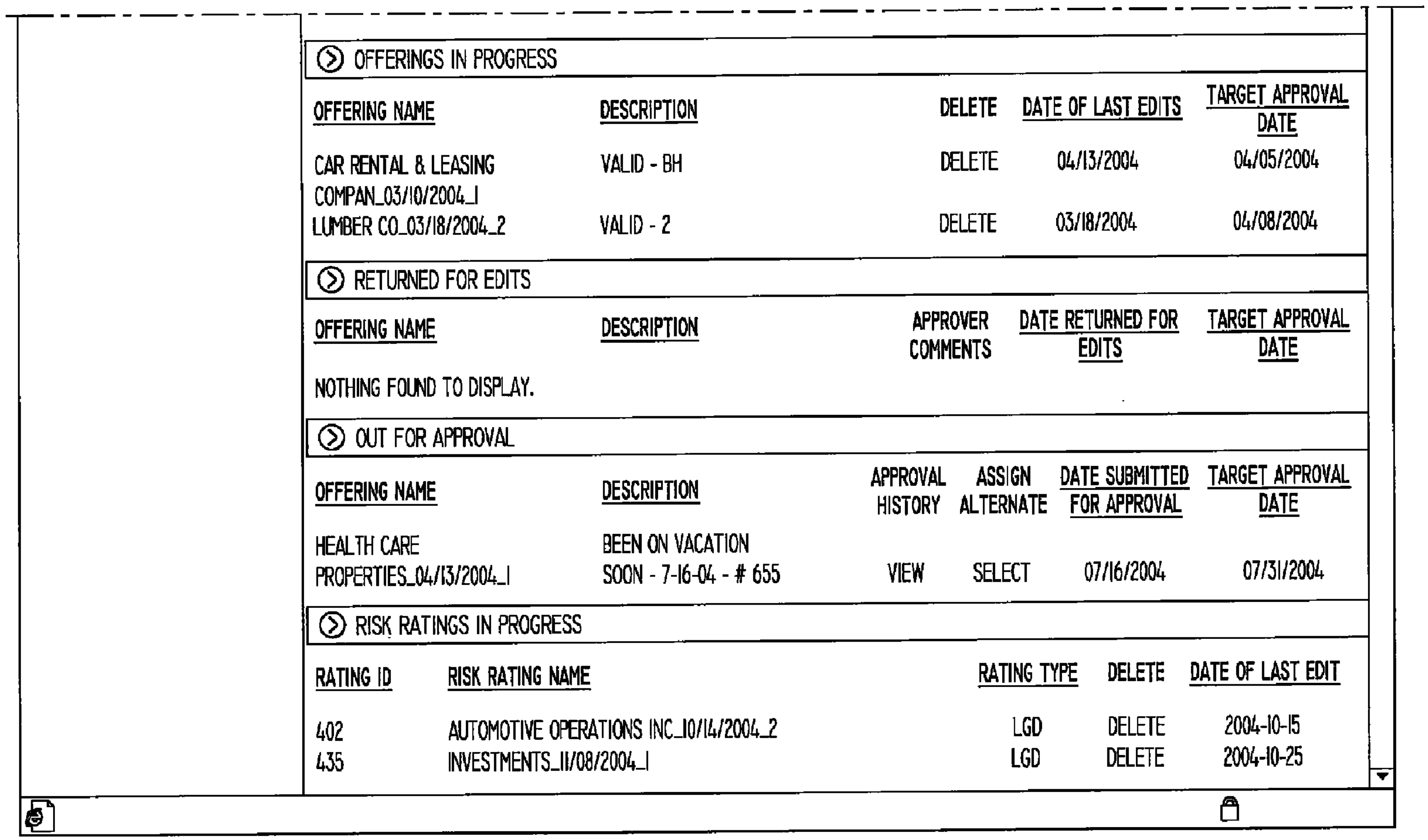
Figure 76A:
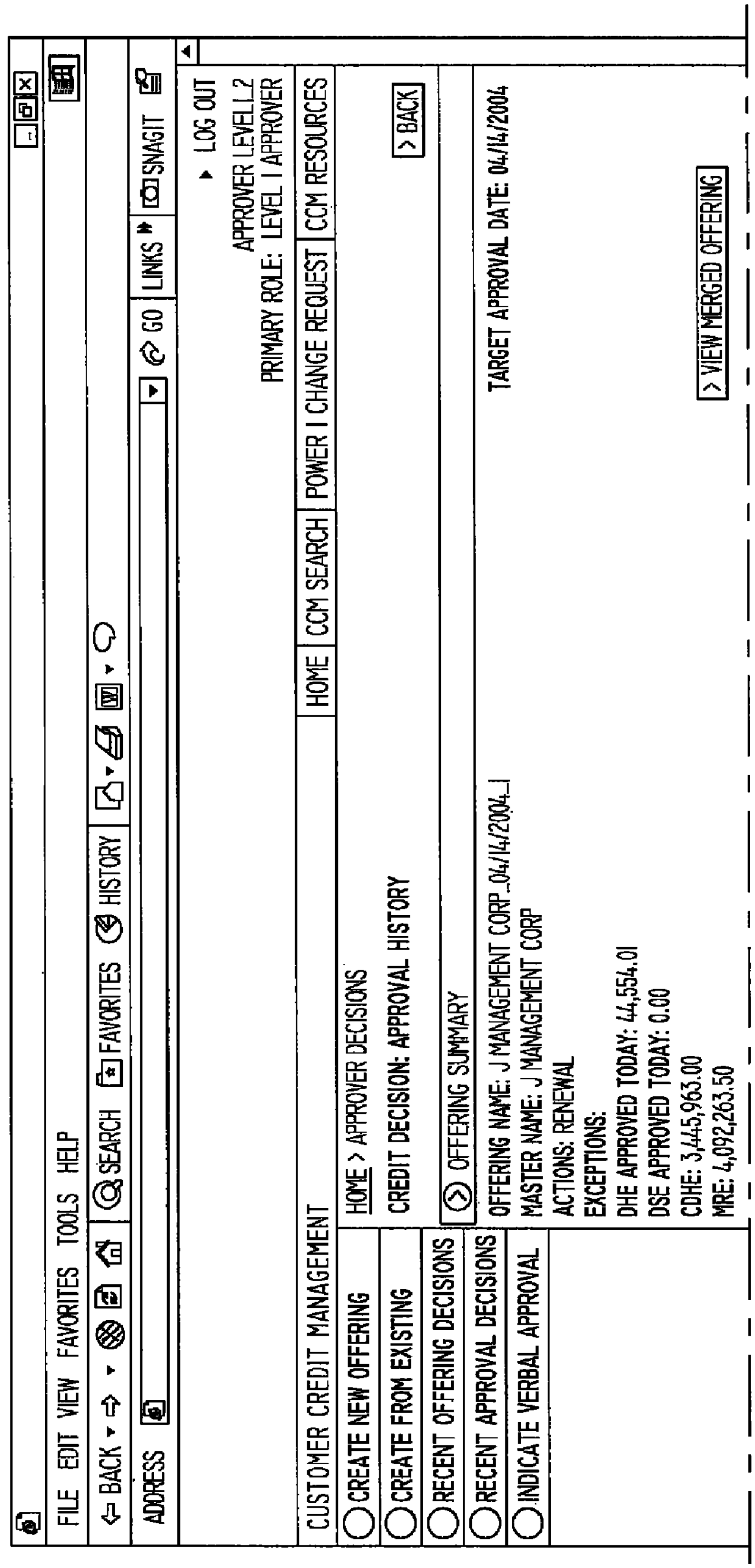
Figure 76B:
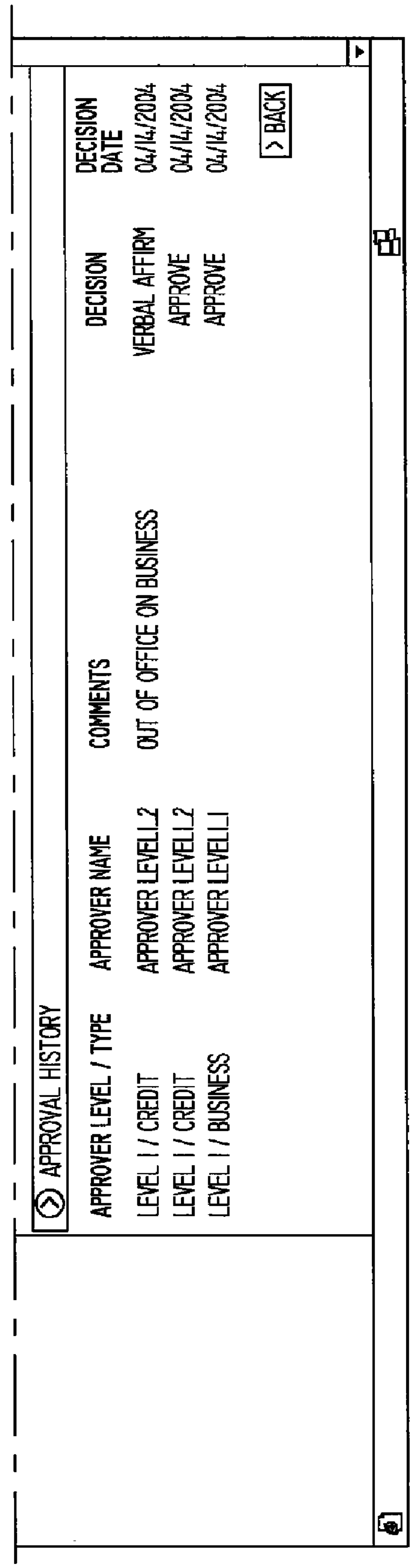

FIGS. 17 through 76B are computer screen shots illustrating an example of an implementation of the present invention. The computer screen shots of FIGS. 17 through 76B in various embodiments are those presented to a user at the user computer 202. In FIG. 17, a user can log into the system using a user id and a password. FIGS. 18A-18B illustrate a default homepage, FIGS. 19A-19B illustrate a homepage that a user with originator privileges in the system would see upon login to the system, and FIGS. 20A-20B show a homepage that a user with approval privileges in the system would see upon login to the system. The various pages illustrated in FIGS. 18A through 20B show the status of various credit offerings and allow a user to navigate throughout the system.

Figure 21:
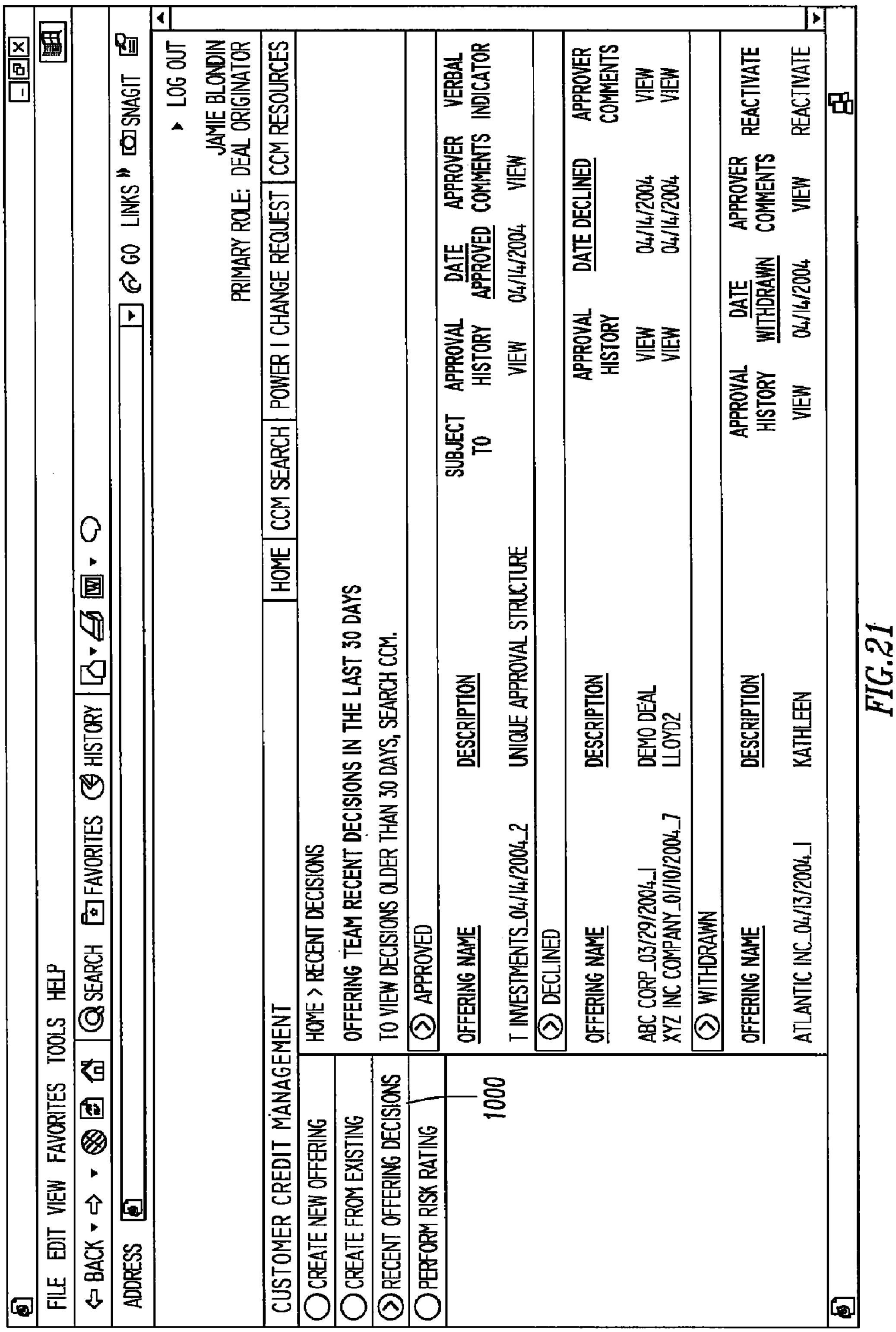
Figure 22A:
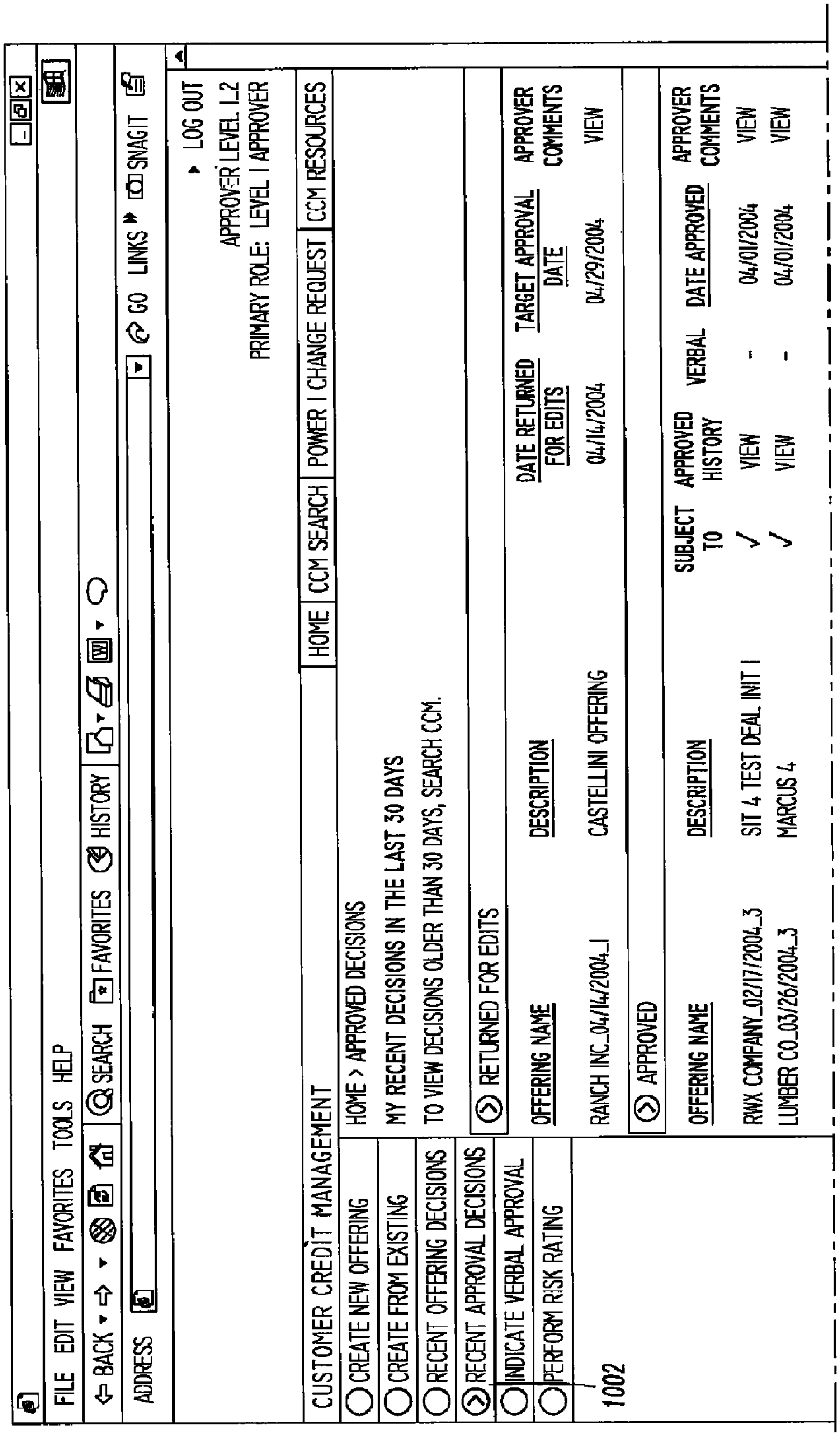
Figure 22B:
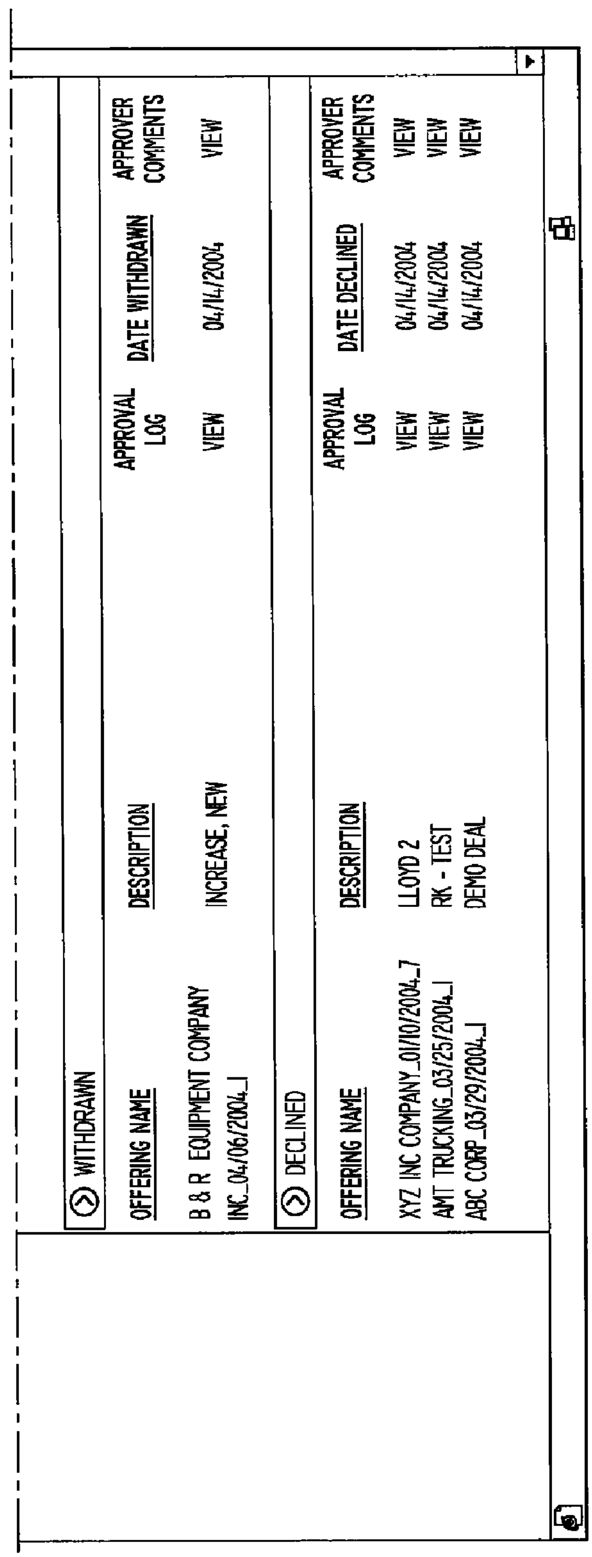

FIG. 21 shows recent offering decisions and provides a list of offerings in which a decision was made in a prior time period (e.g., 30 days). The page in FIG. 21 results when the "recent offering decisions" tab 1000 is selected. FIGS. 22A-22B show recent approval decisions and provides a list of offerings in which an approval decision was made in a prior time period (e.g., 30 days). The page in FIGS. 22A-22B results when the "recent approval decisions" tab 1002 (FIG. 22A) is selected.

Figure 23A:
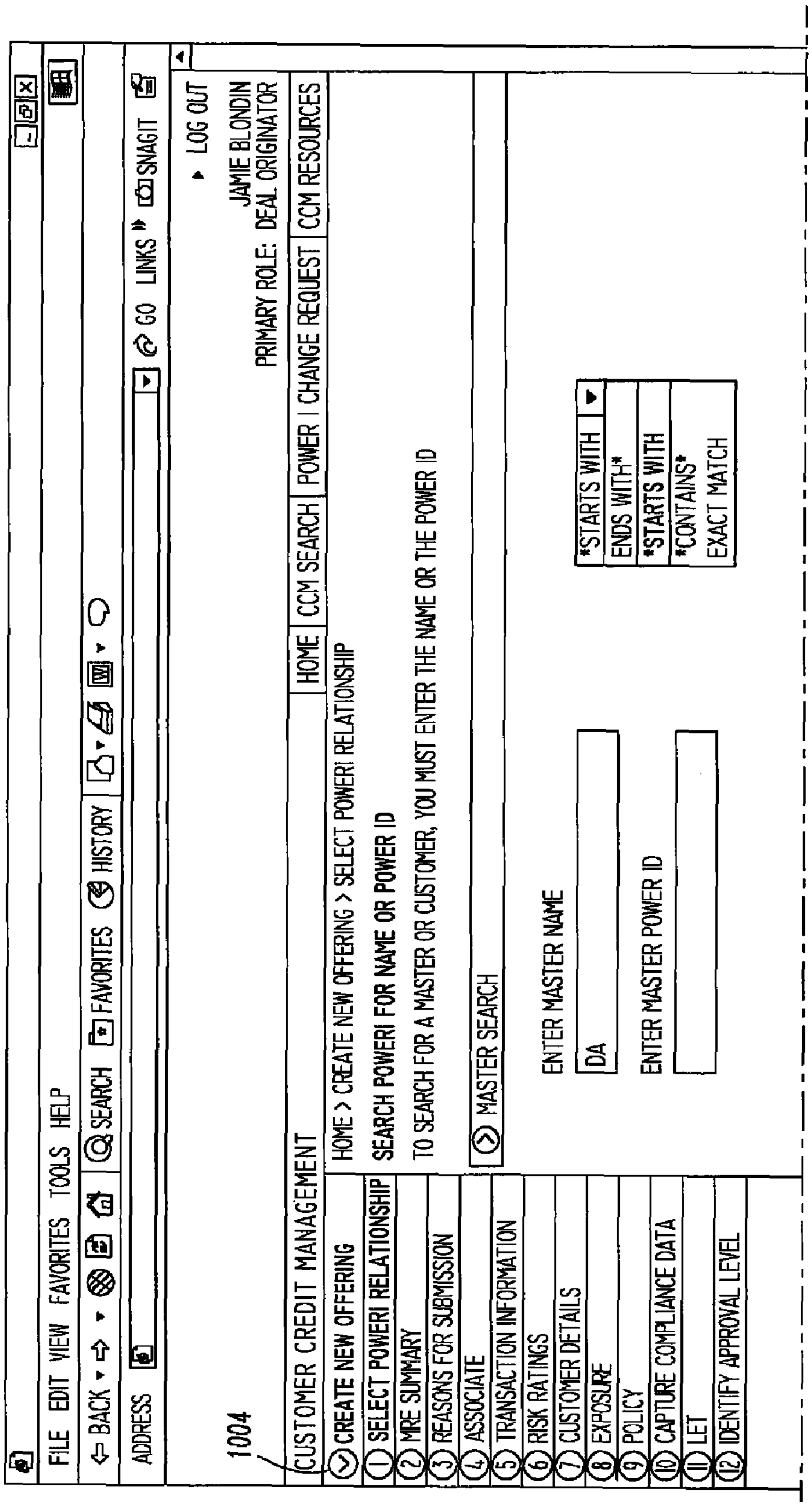
Figure 23B:
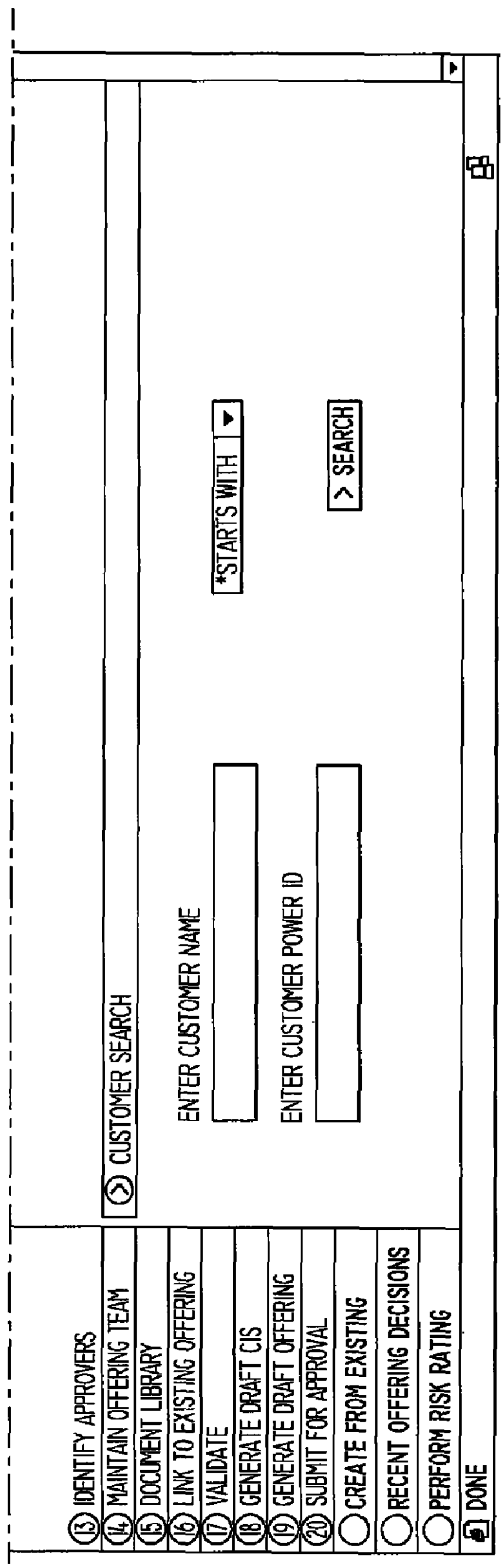
Figure 24A:
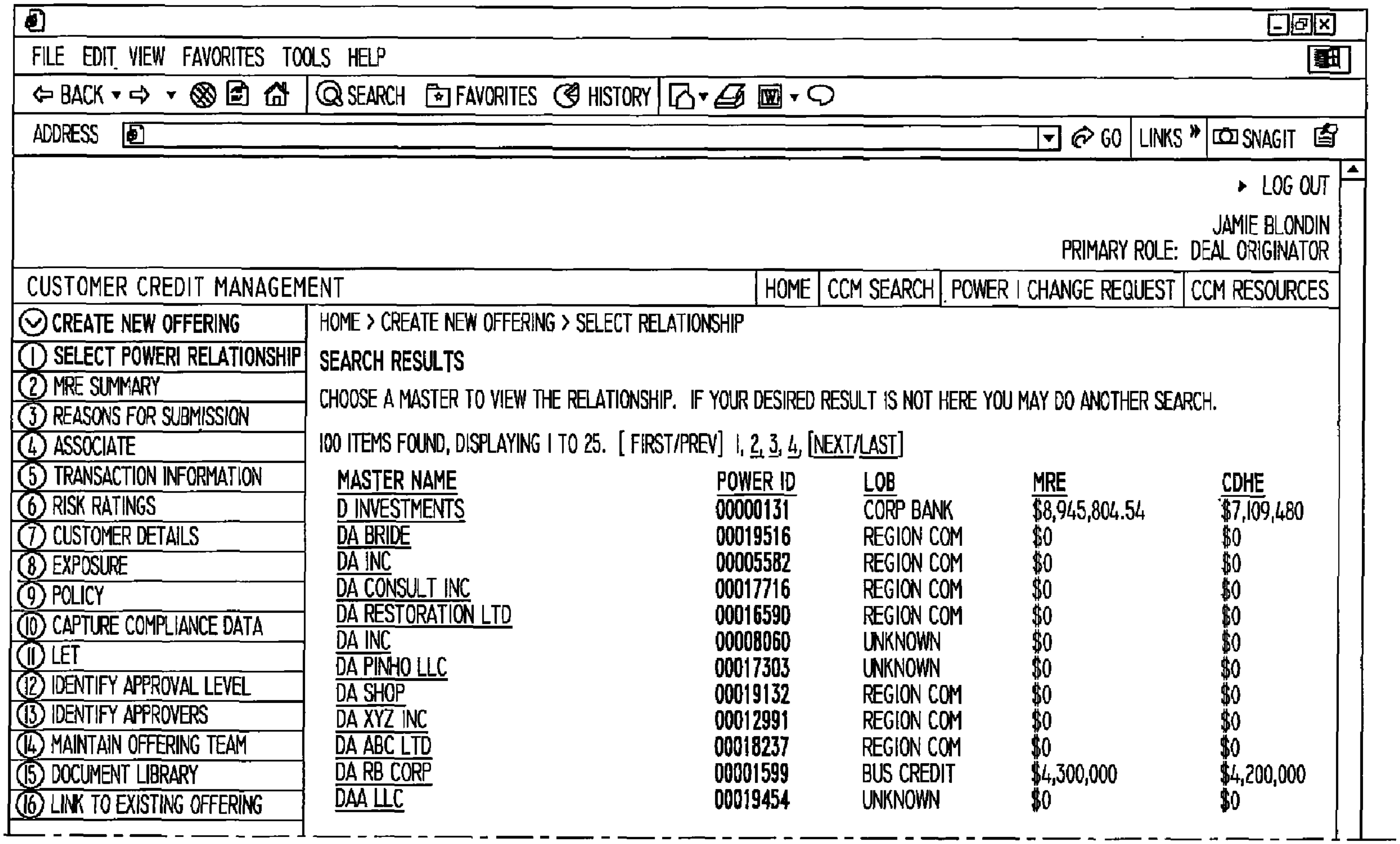
Figure 24B:
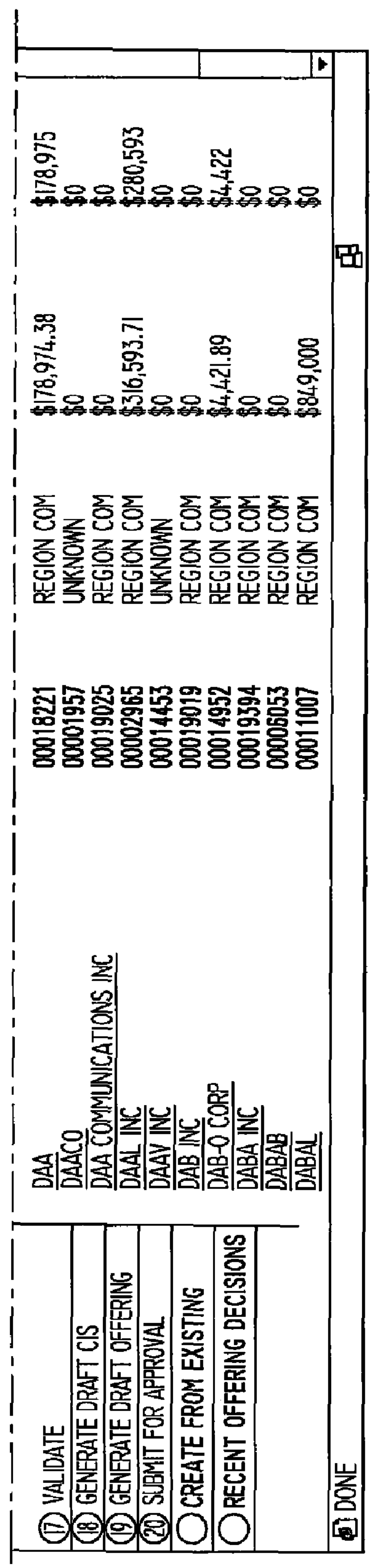
Figure 25A:
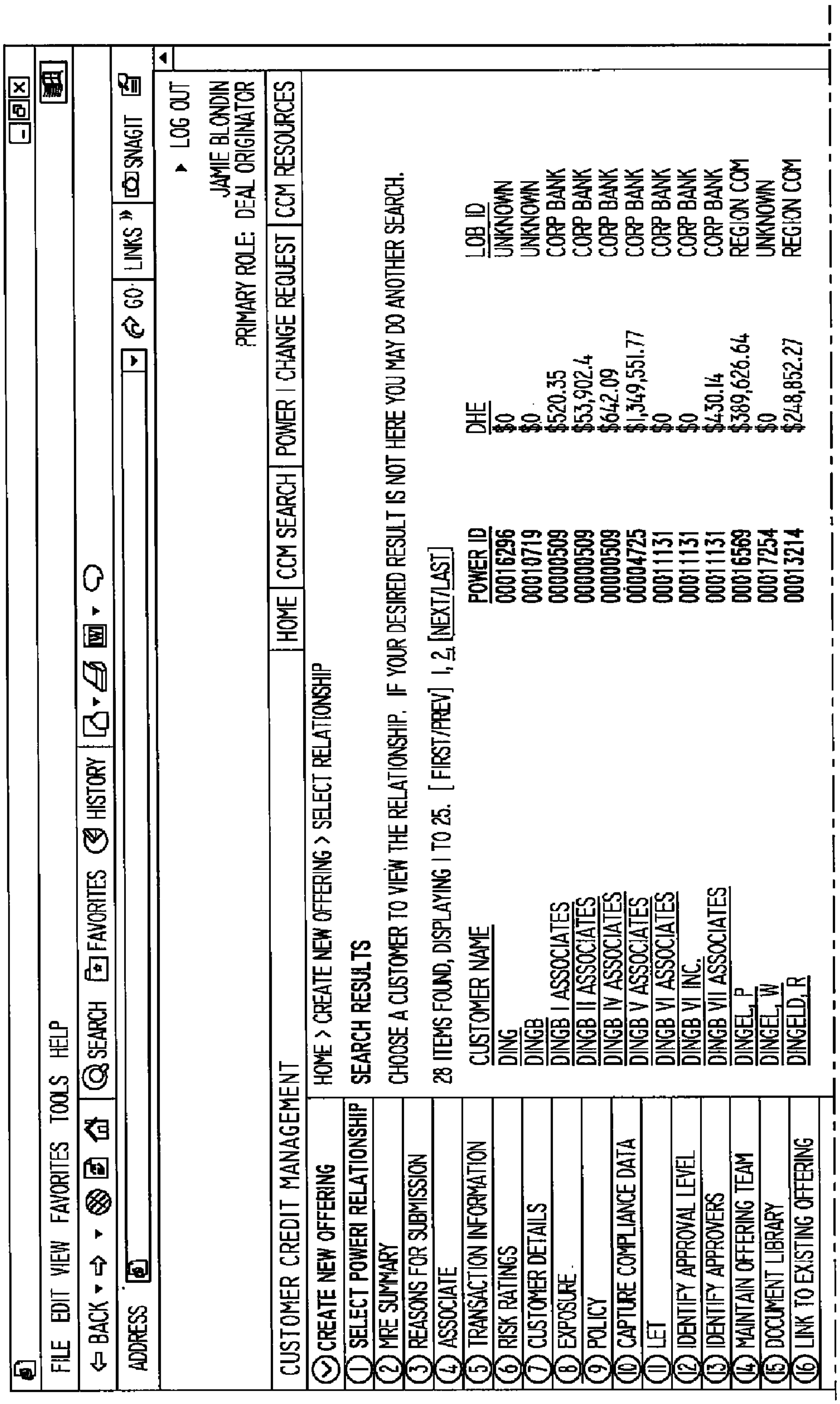
Figure 25B:
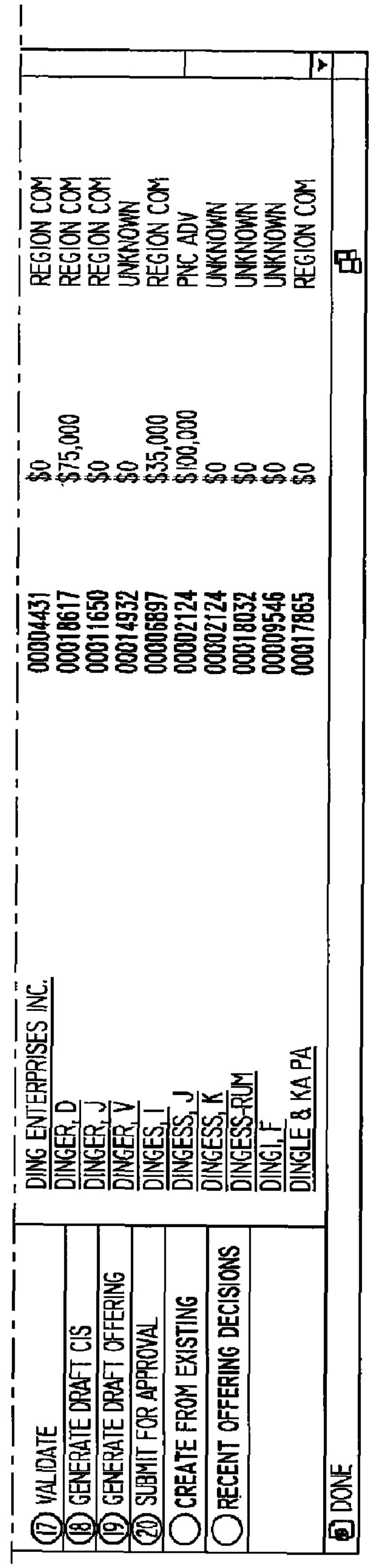
Figure 26A:
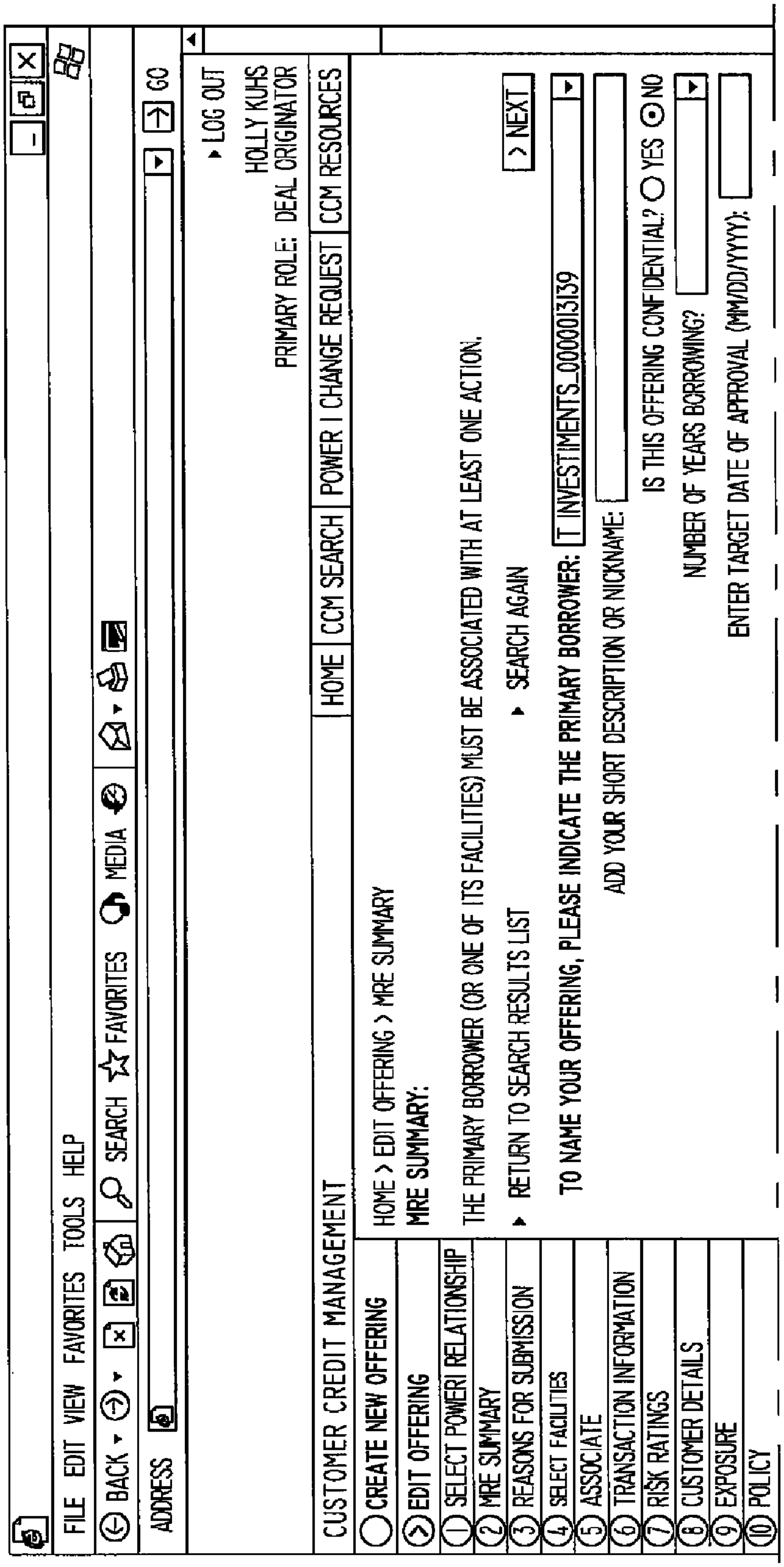
Figure 26C:
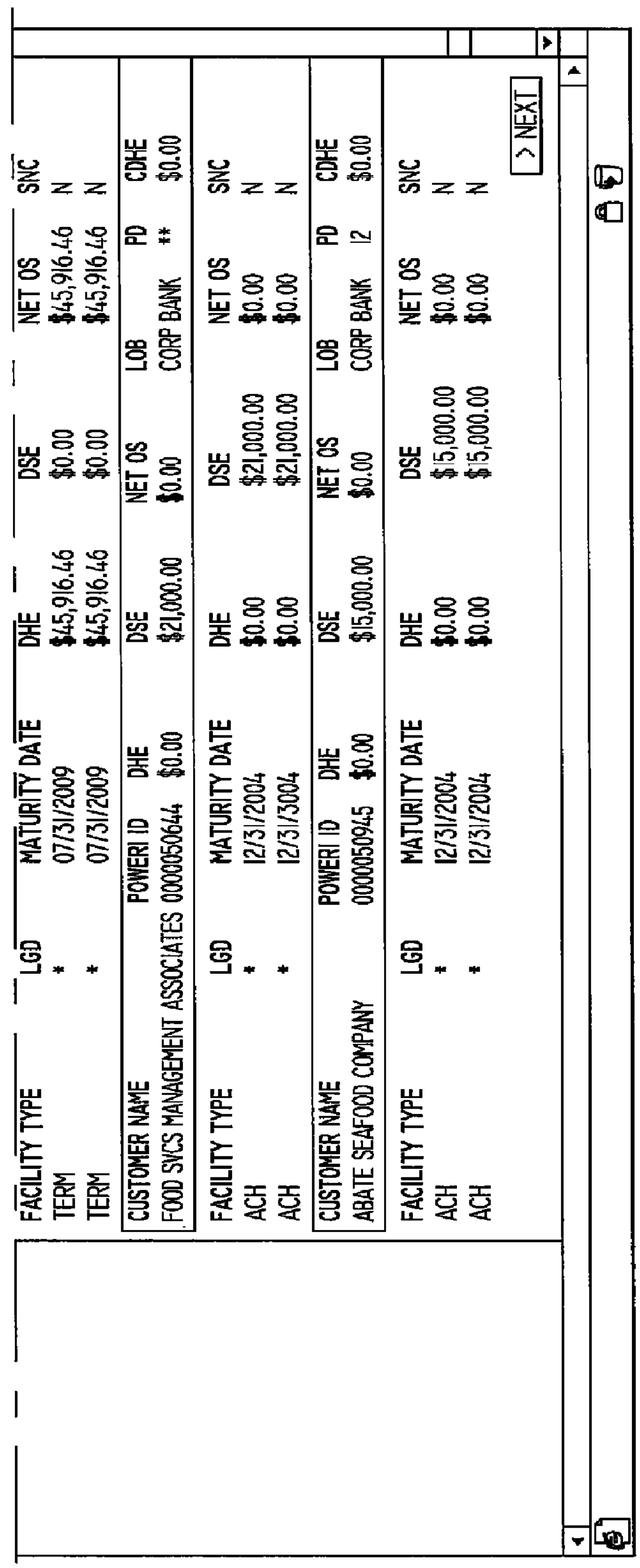
Figure 27A:
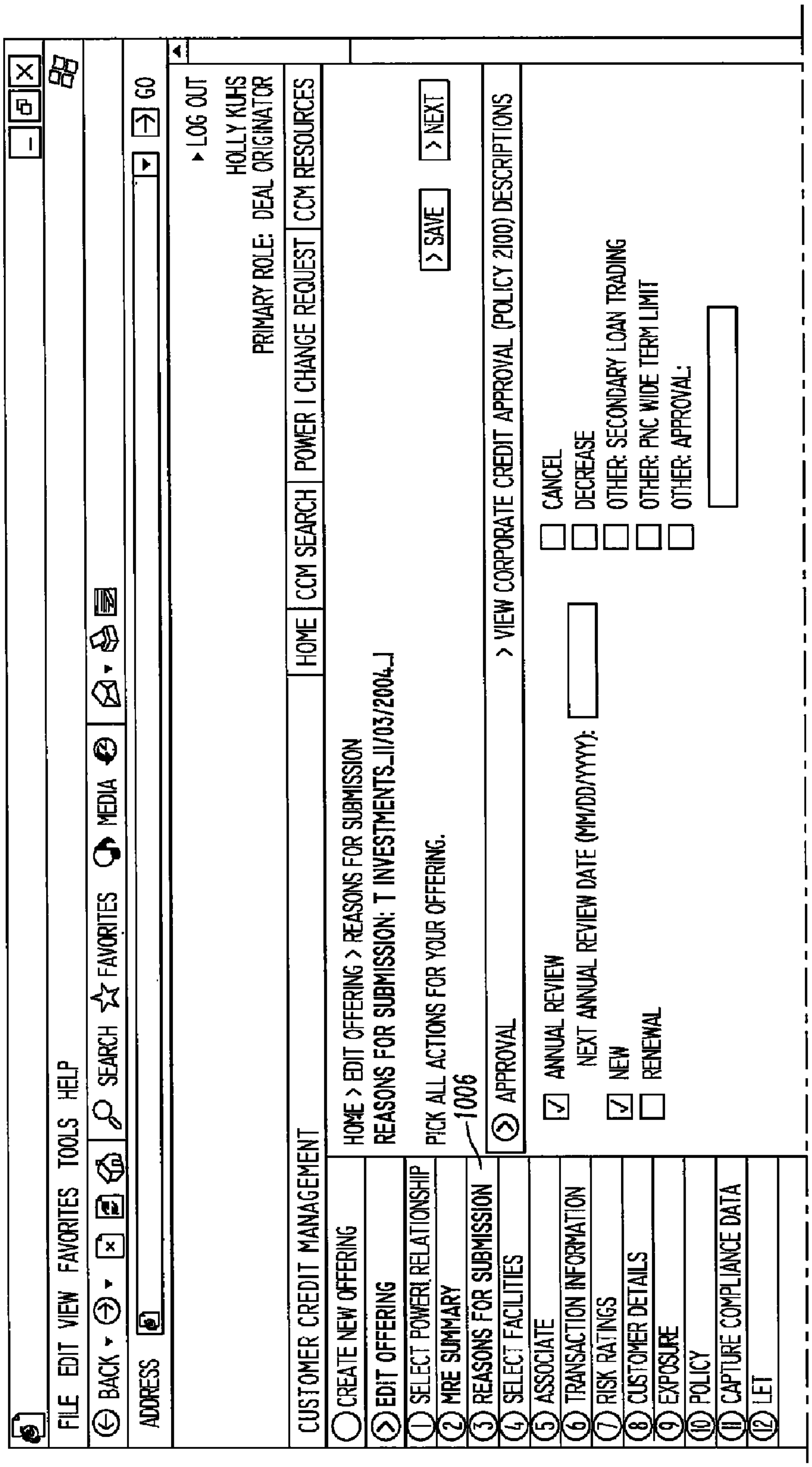
Figure 27B:
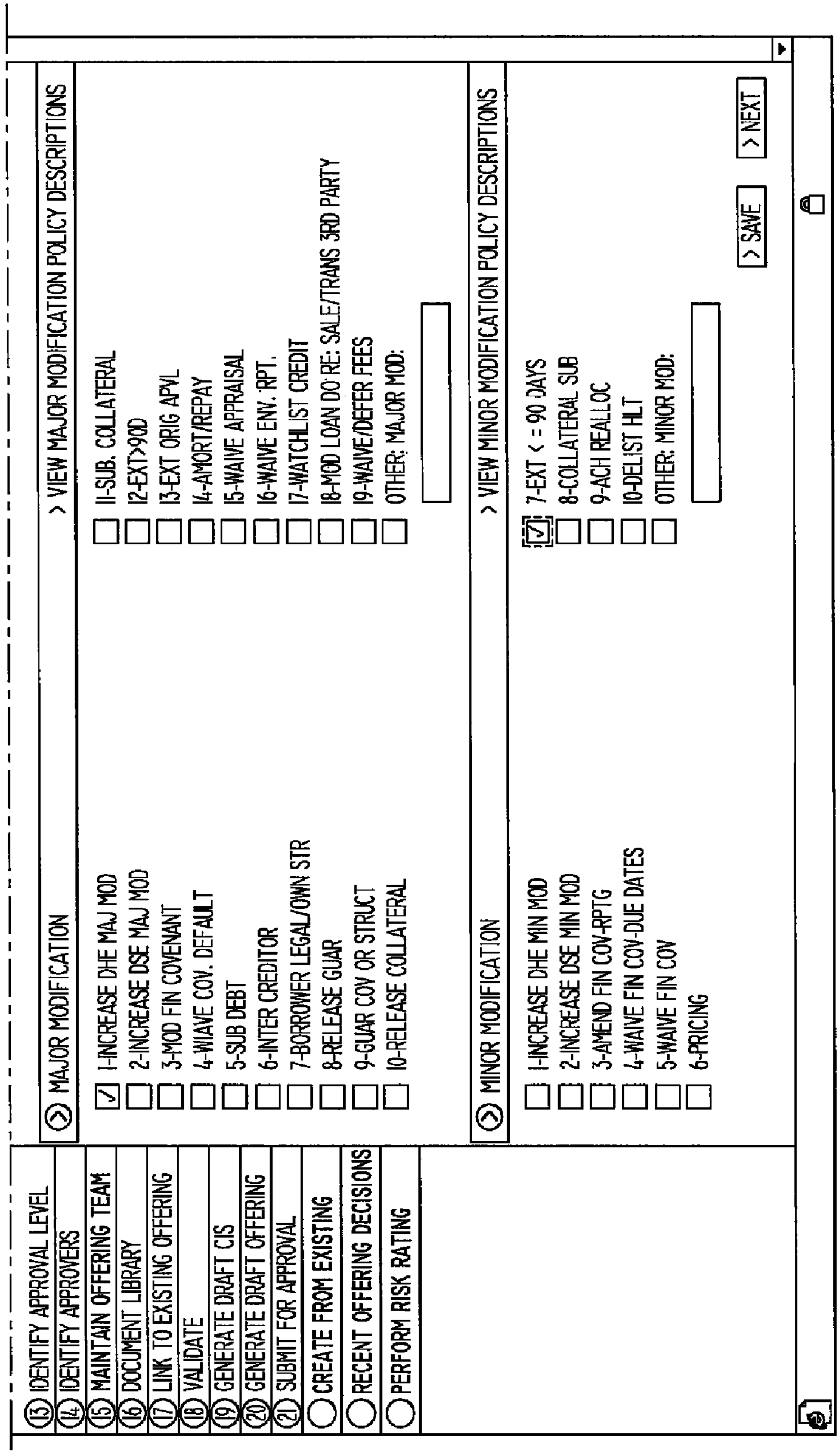

FIGS. 23A-23B show a page in which a user can start the creation of a new offering by searching for information relating to the borrower. The page in FIGS. 23A-23B results when the "create new offering" tab 1004 (FIG. 23A) is selected. FIGS. 24A-24B show the results of a search and illustrates borrowers and their offerings. FIGS. 25A-25B show another version of a search. FIGS. 26A-26C show a summary page that results when an entry is selected from a search page. FIGS. 27A-27B show the results when the "reasons for submission" tab 1006 (FIG. 27A) is selected to enable the user to select the actions that are to be taken in an offering. The action categories include approval, major modification, and minor modification.

Figure 28A:
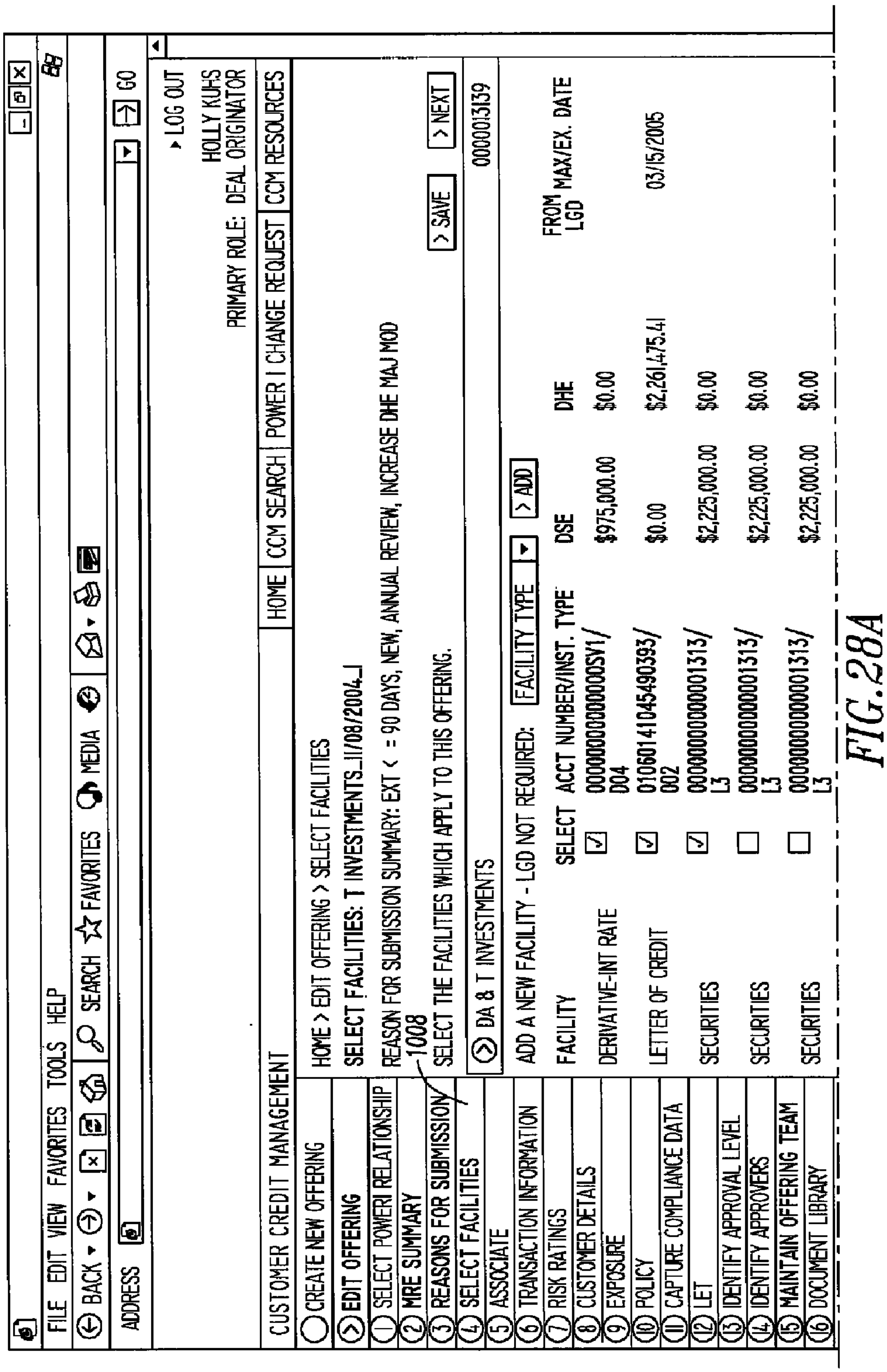
Figure 28B:
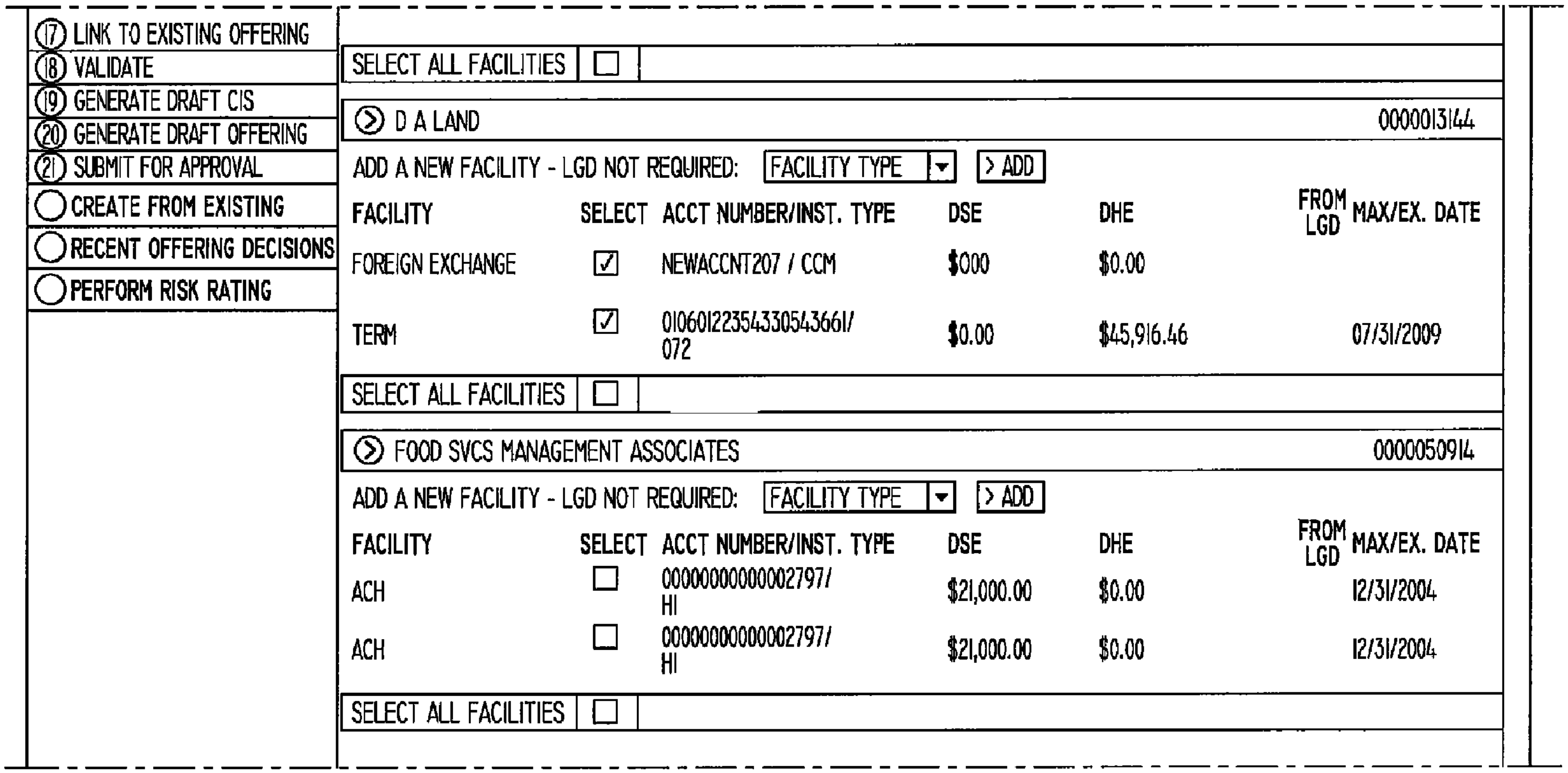
Figure 28C:
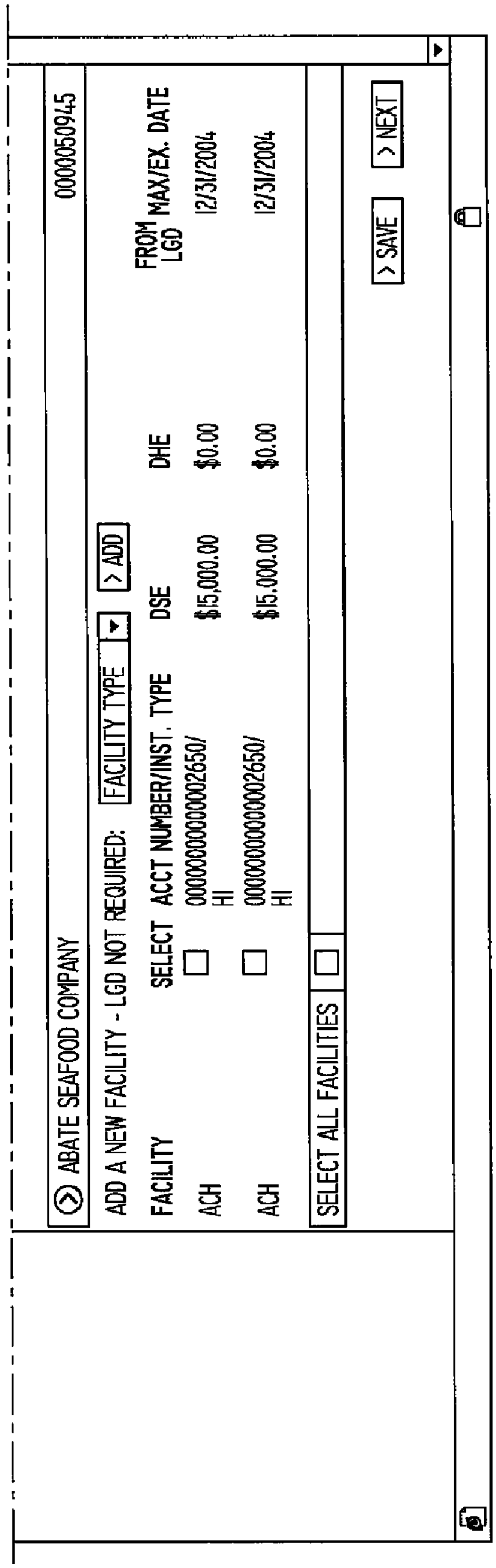
Figure 29A:
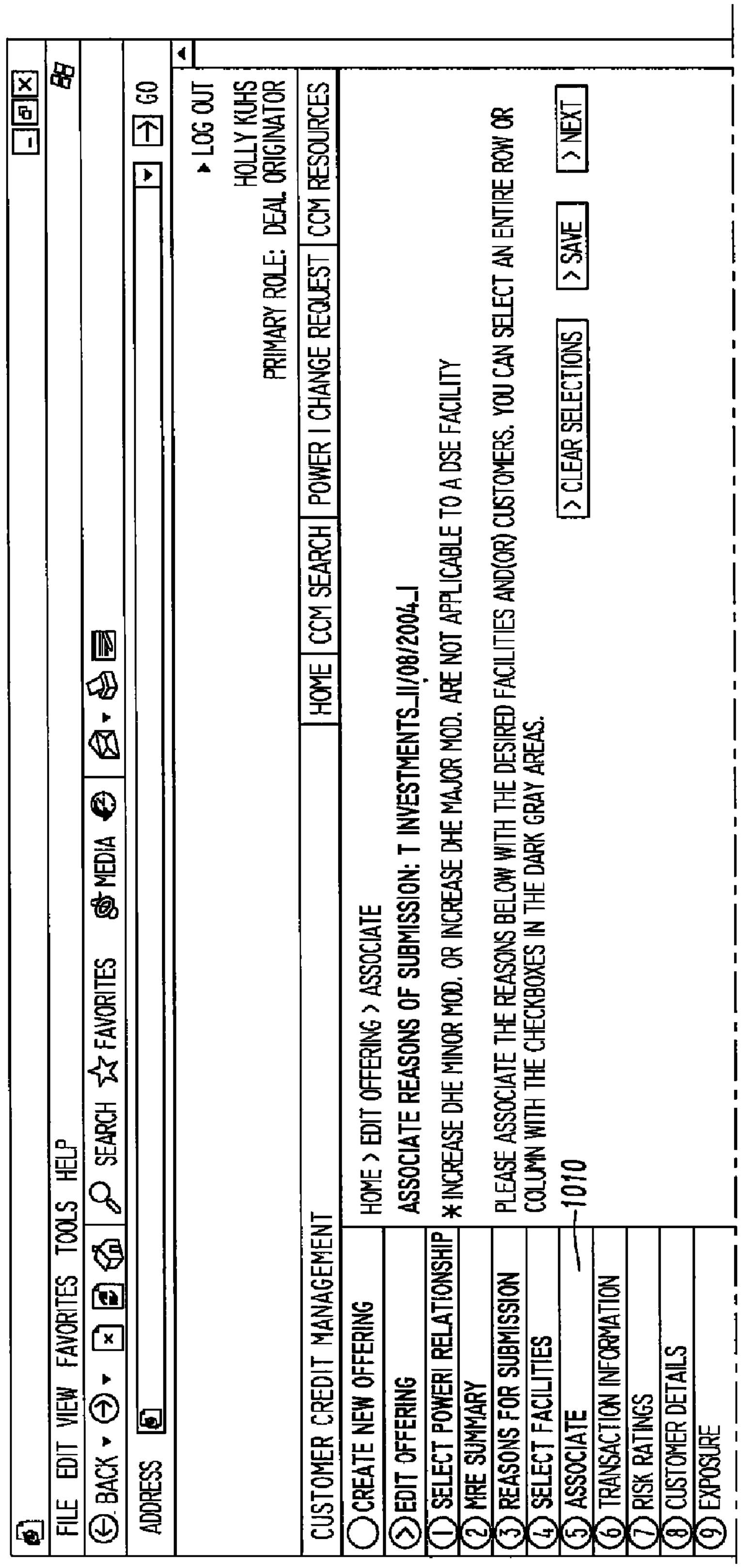
Figure 29B:
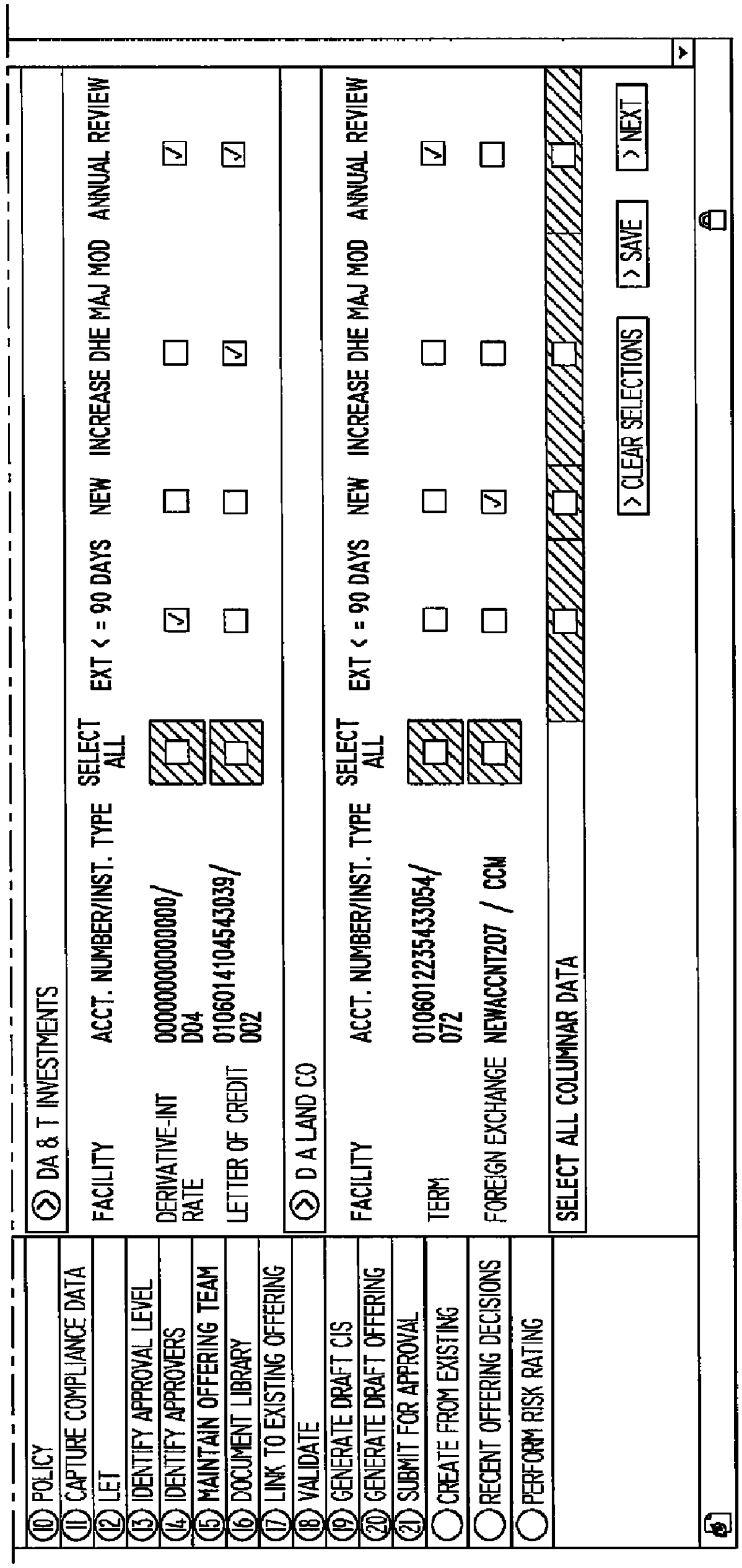
Figure 30A:
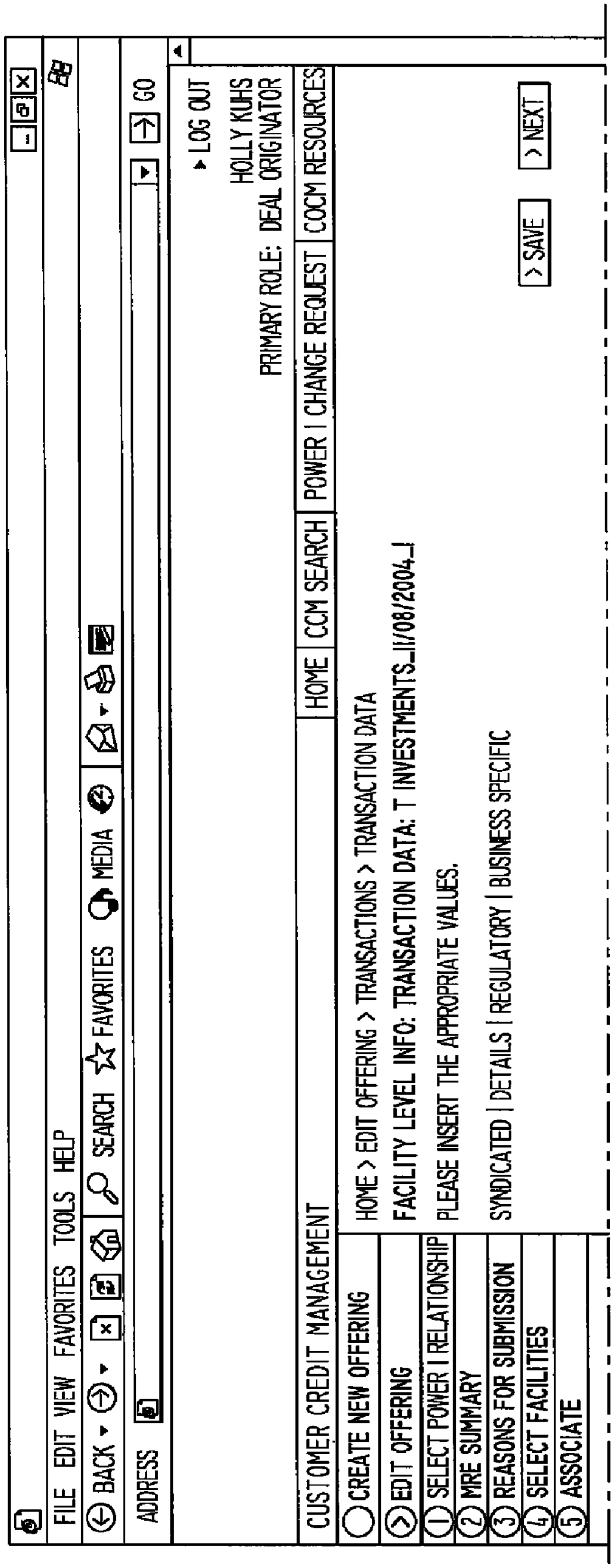
Figure 30B:
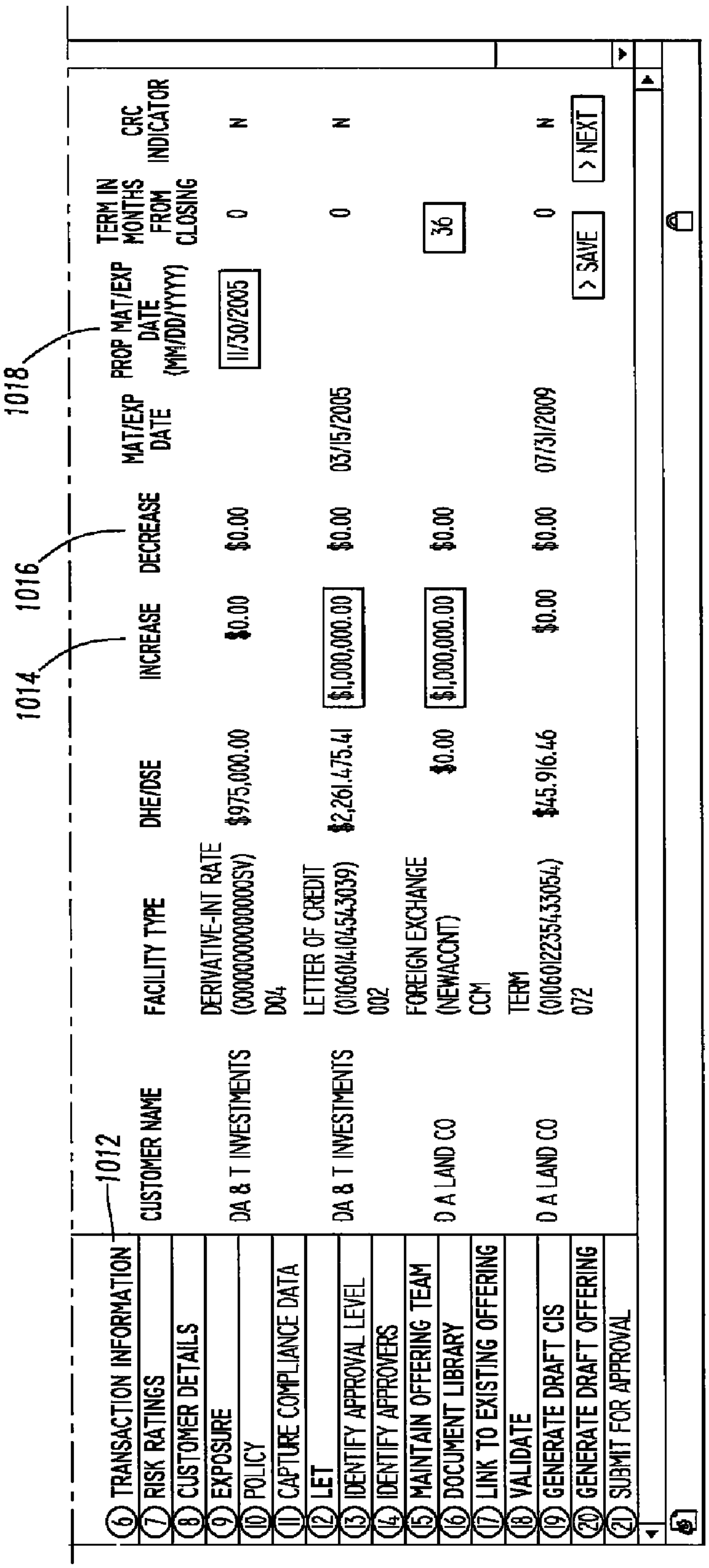

FIGS. 28A-28C show the results when the "select facilities" tab 1008 (FIG. 28A) is selected to enable the user to select the facilities/transactions to take action on in the offering. FIGS. 29A-29B show the results when the "associate" tab 1010 (FIG. 29A) is selected to enable the user to associate selected actions to specific facilities. FIGS. 30A-30B show the results when the "transaction information" tab 1012 (FIG. 30B) is selected. The screen is dynamically generated and requires input from the user for the increase field 1014, decrease field 1016, and/or the proposed maturity expiration date field 1018, all shown on FIG. 30B, as appropriate and depending on the user-selected reasons for submission.

Figure 31A:
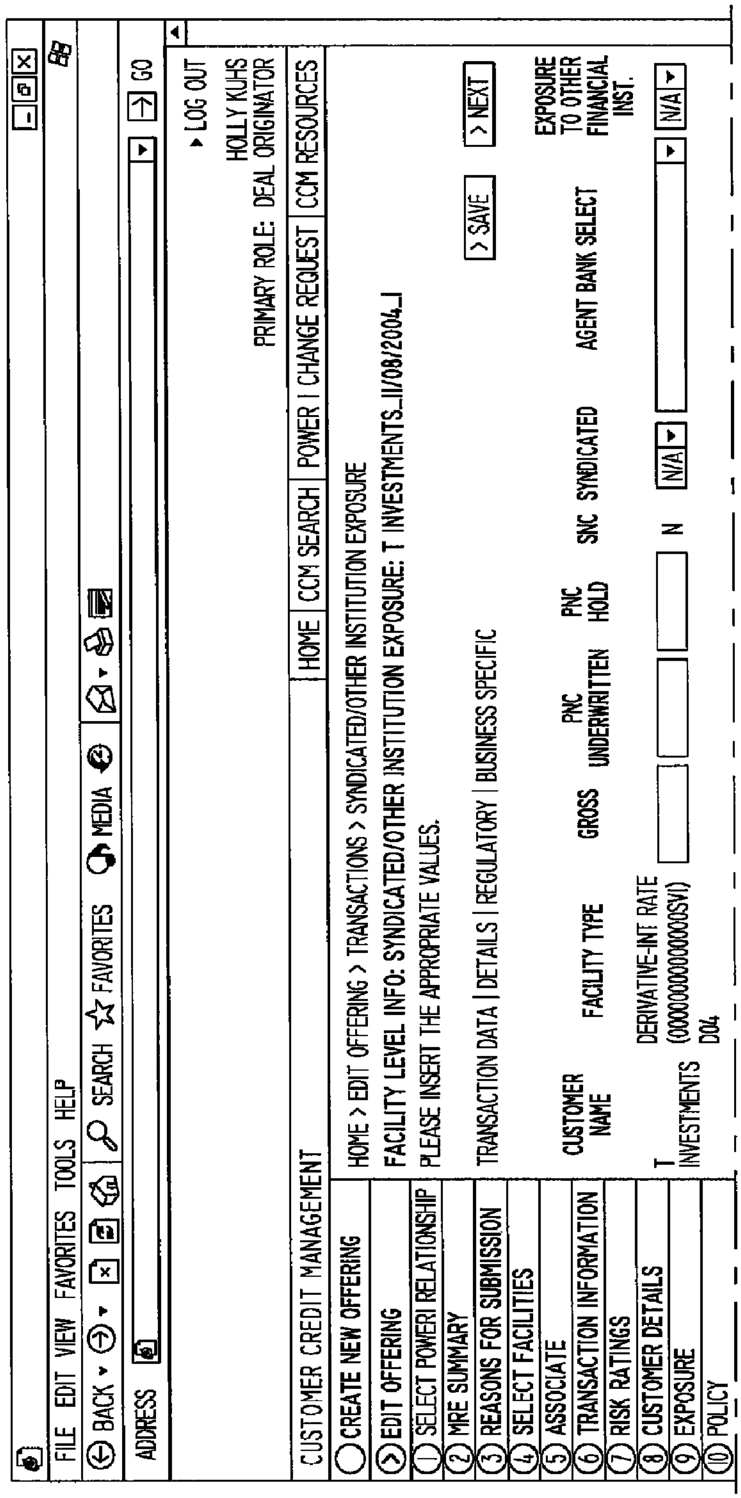
Figure 31B:
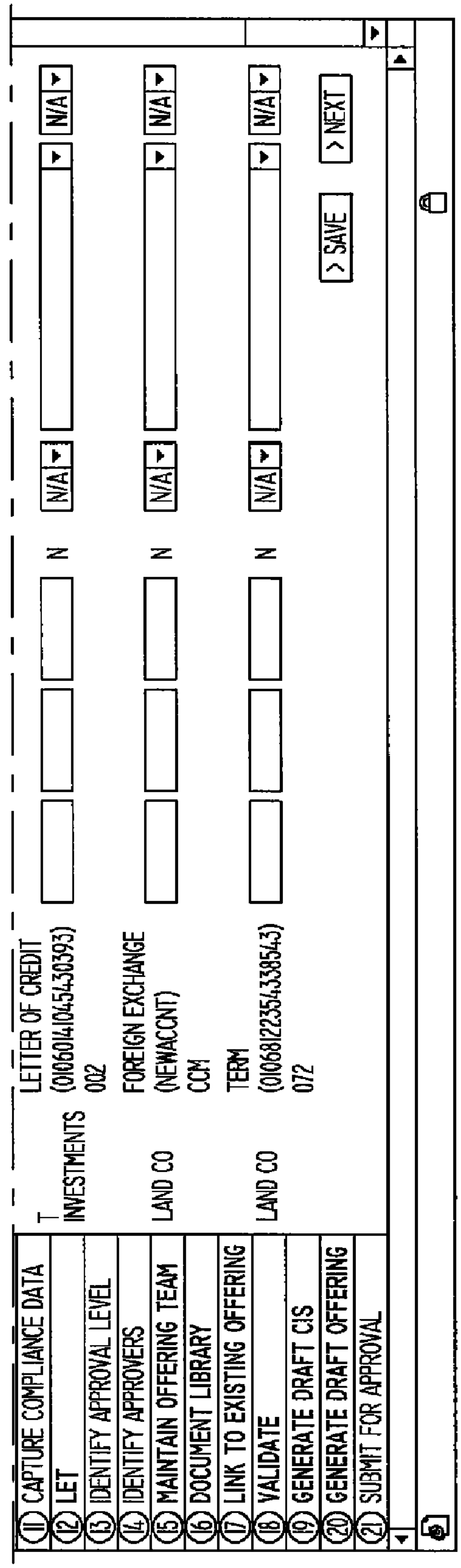
Figure 32A:
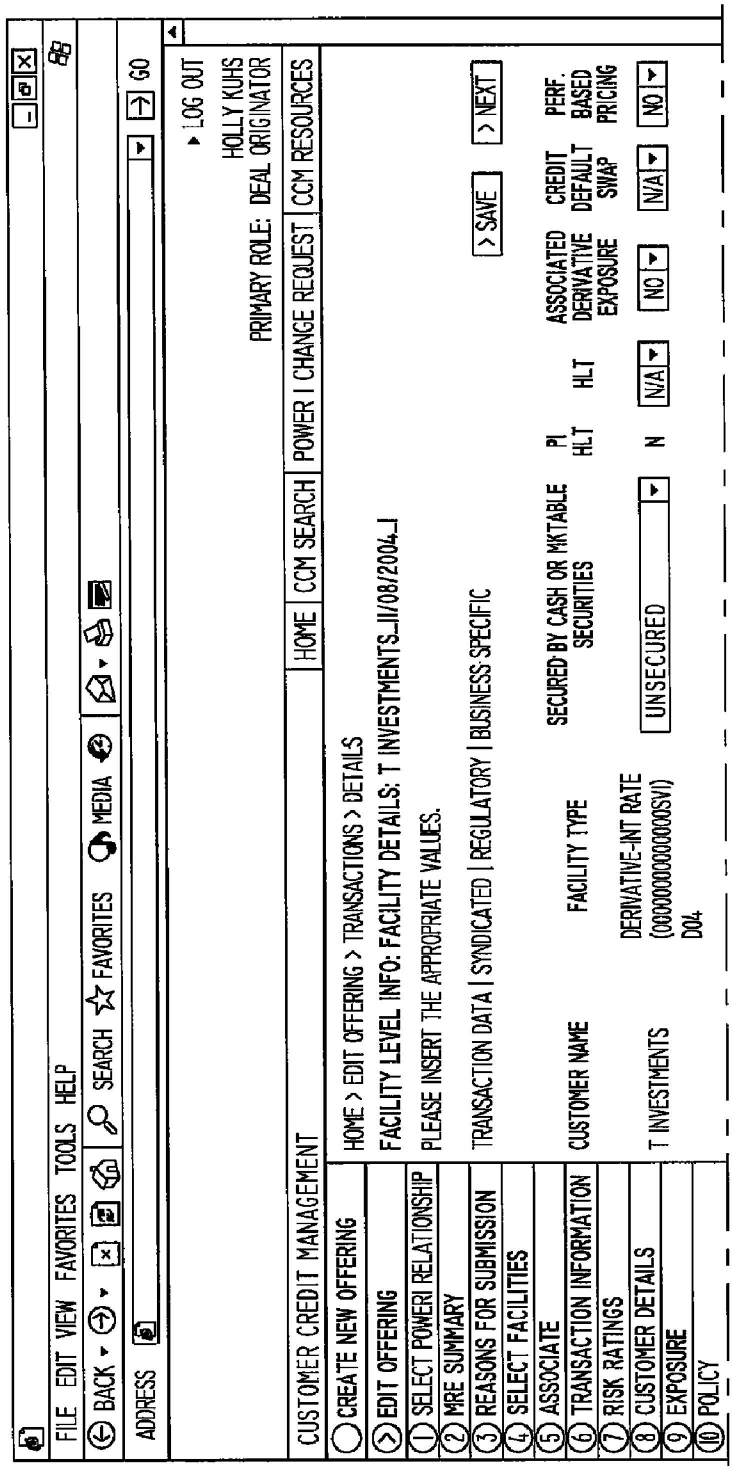
Figure 32B:
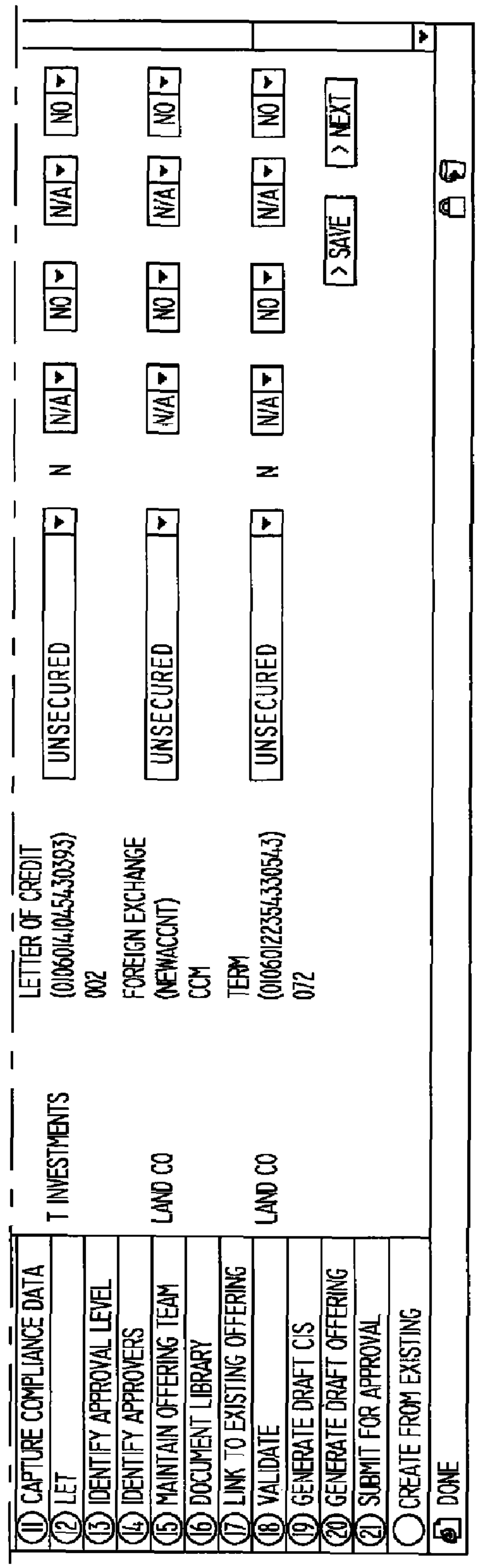
Figure 33A:
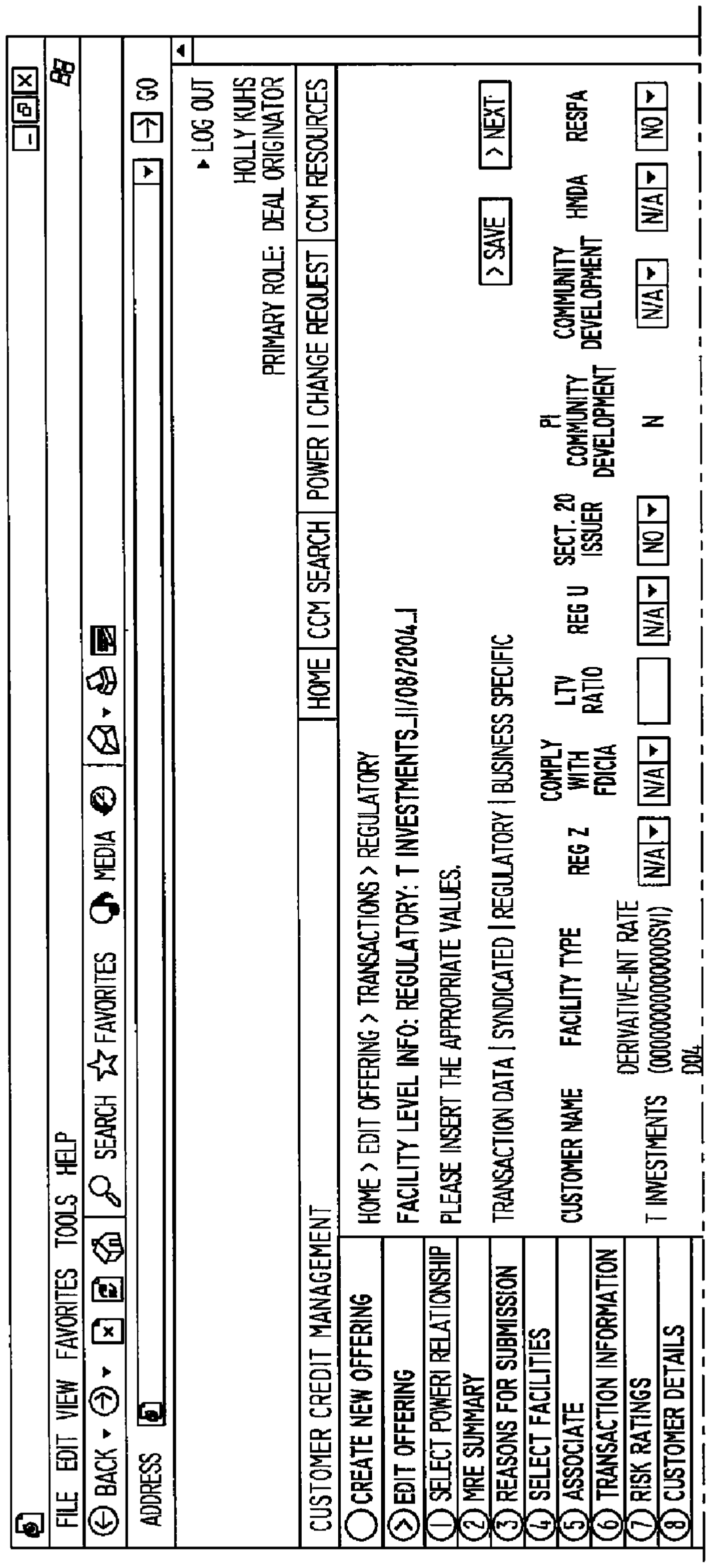
Figure 33B:
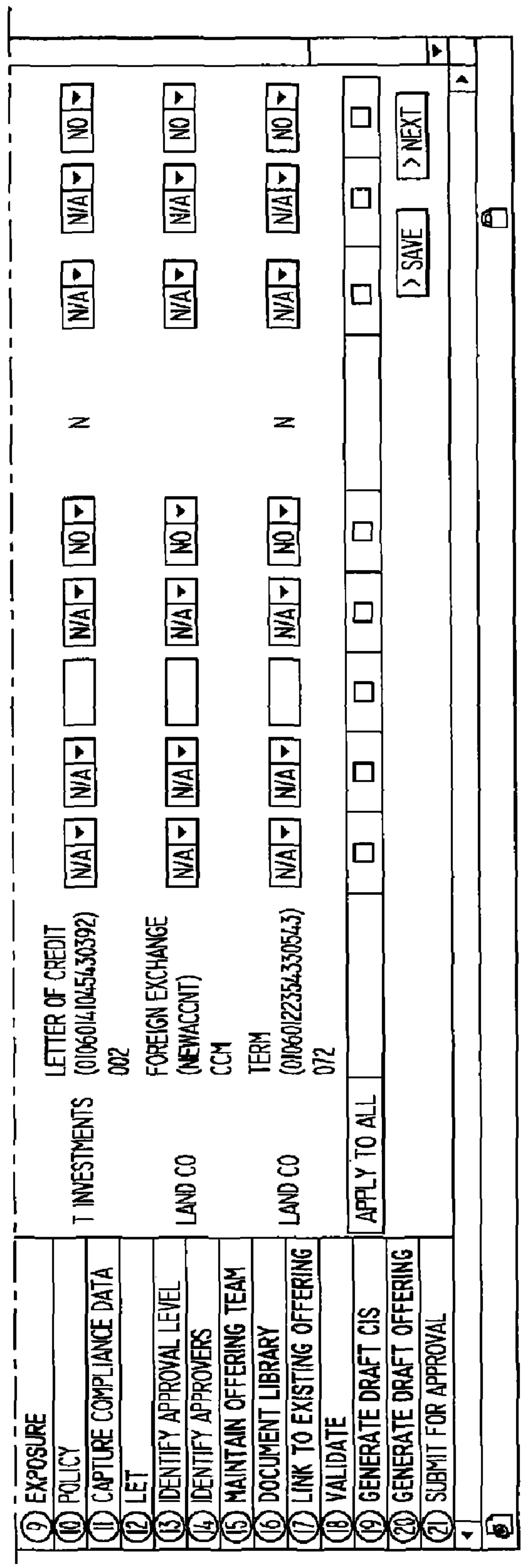
Figure 34A:
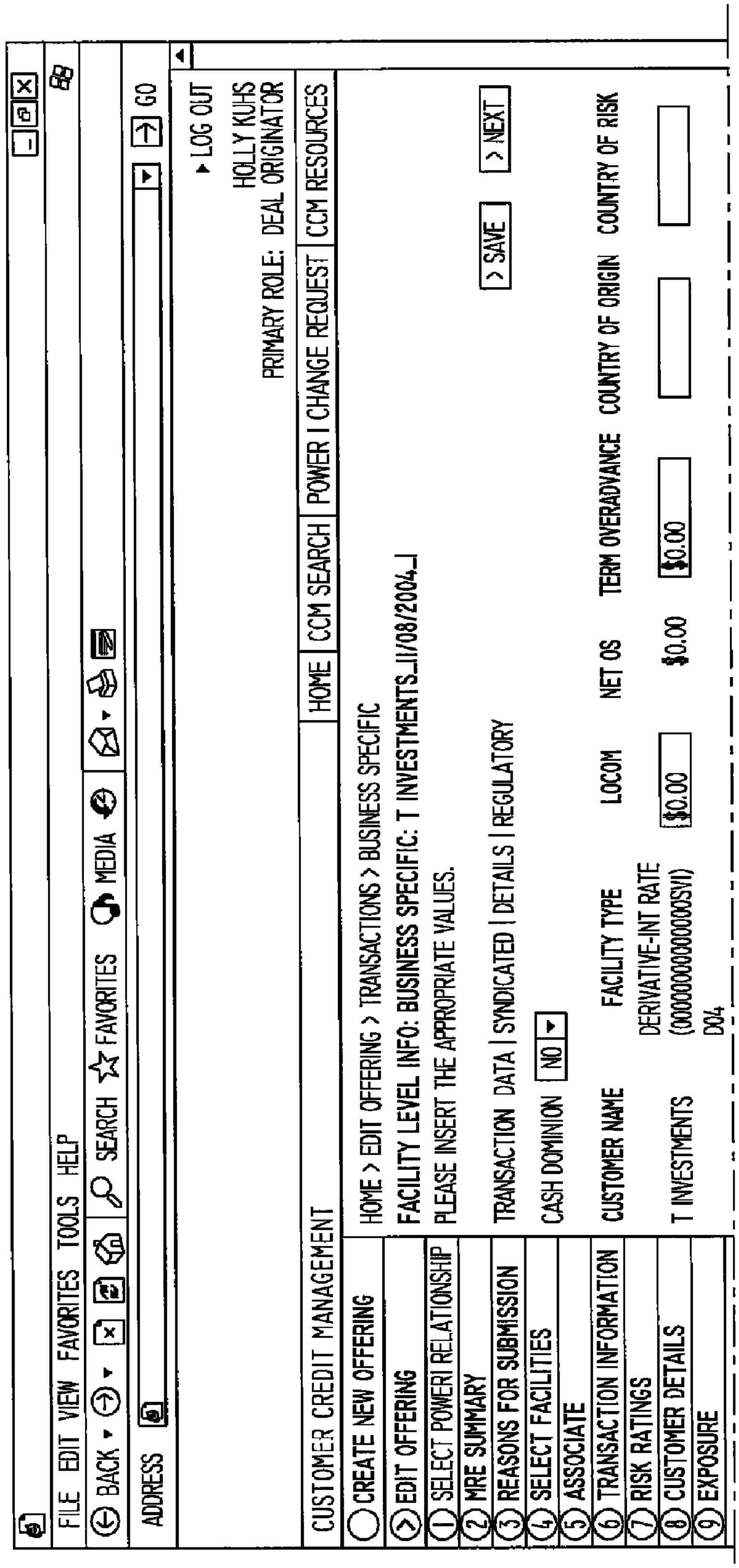
Figure 34B:
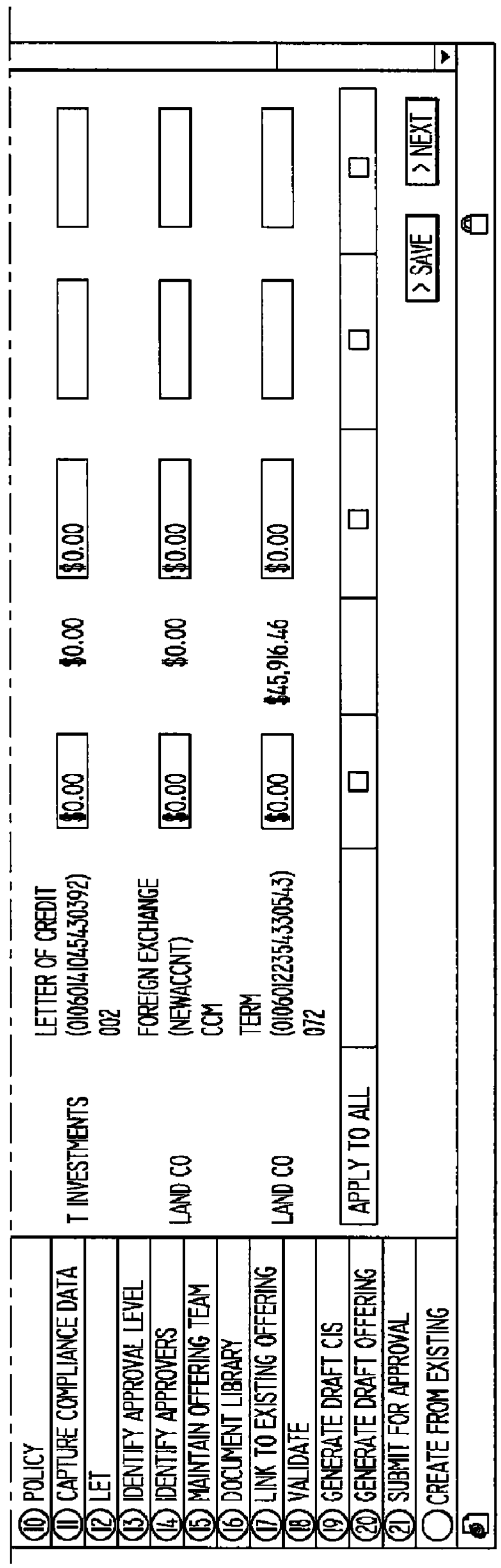

The screen illustrated in FIGS. 31A-31B also shows the result of selecting the "select facilities" tab 1008 (FIG. 28) and is used to enable the capture of syndicated information relevant to the offering. The screen illustrated in FIGS. 32A-32B also shows the result of selecting the "select facilities"

tab 1008 (FIG. 28) and is used to enable the capture of optional input fields relevant to the offering. The screen illustrated in FIGS. 33A-33B also shows the result of selecting the "select facilities" tab 1008 (FIG. 28) and is used to enable the capture of regulatory information relevant to the offering. The screen illustrated in FIGS. 34A-34B also shows the result of selecting the "select facilities" tab 1008 (FIG. 28) and is used to enable the capture of supplemental information relevant to the offering.

Figure 35A:
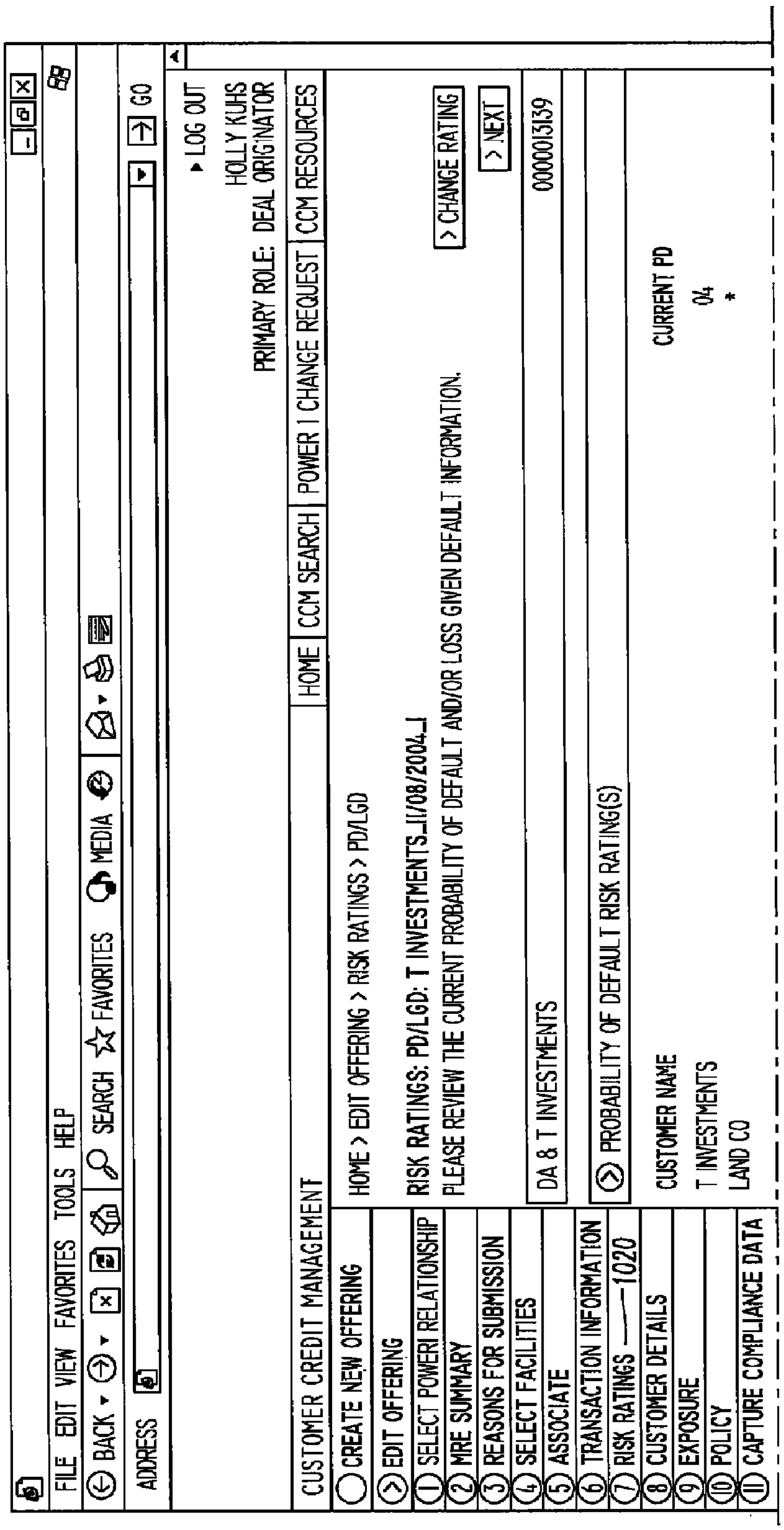
Figure 35B:
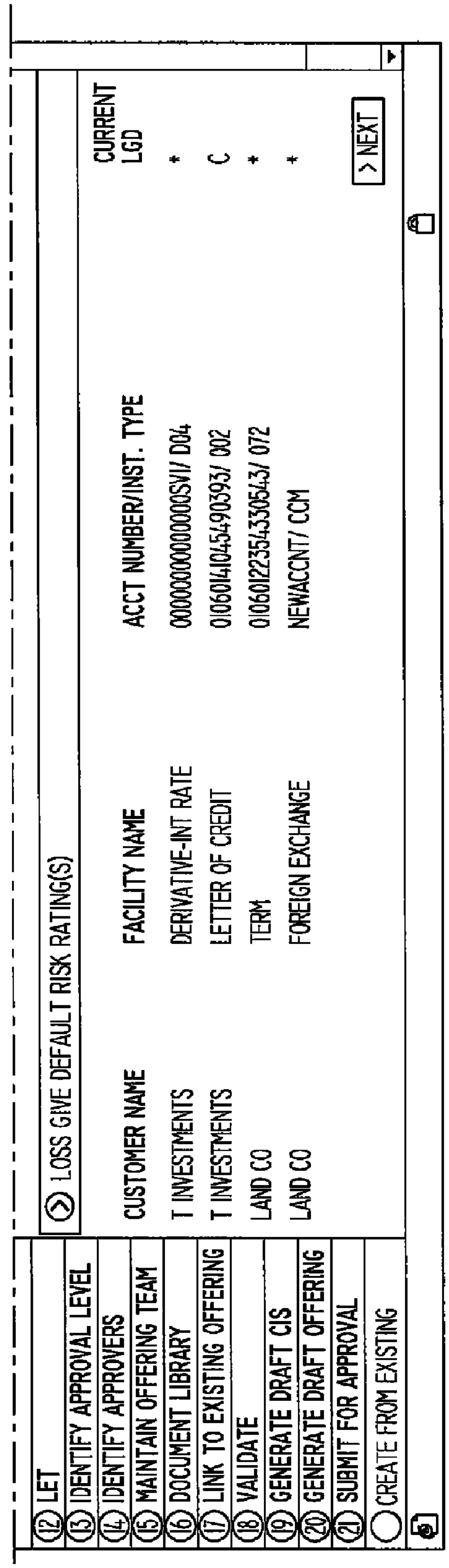
Figure 36A:
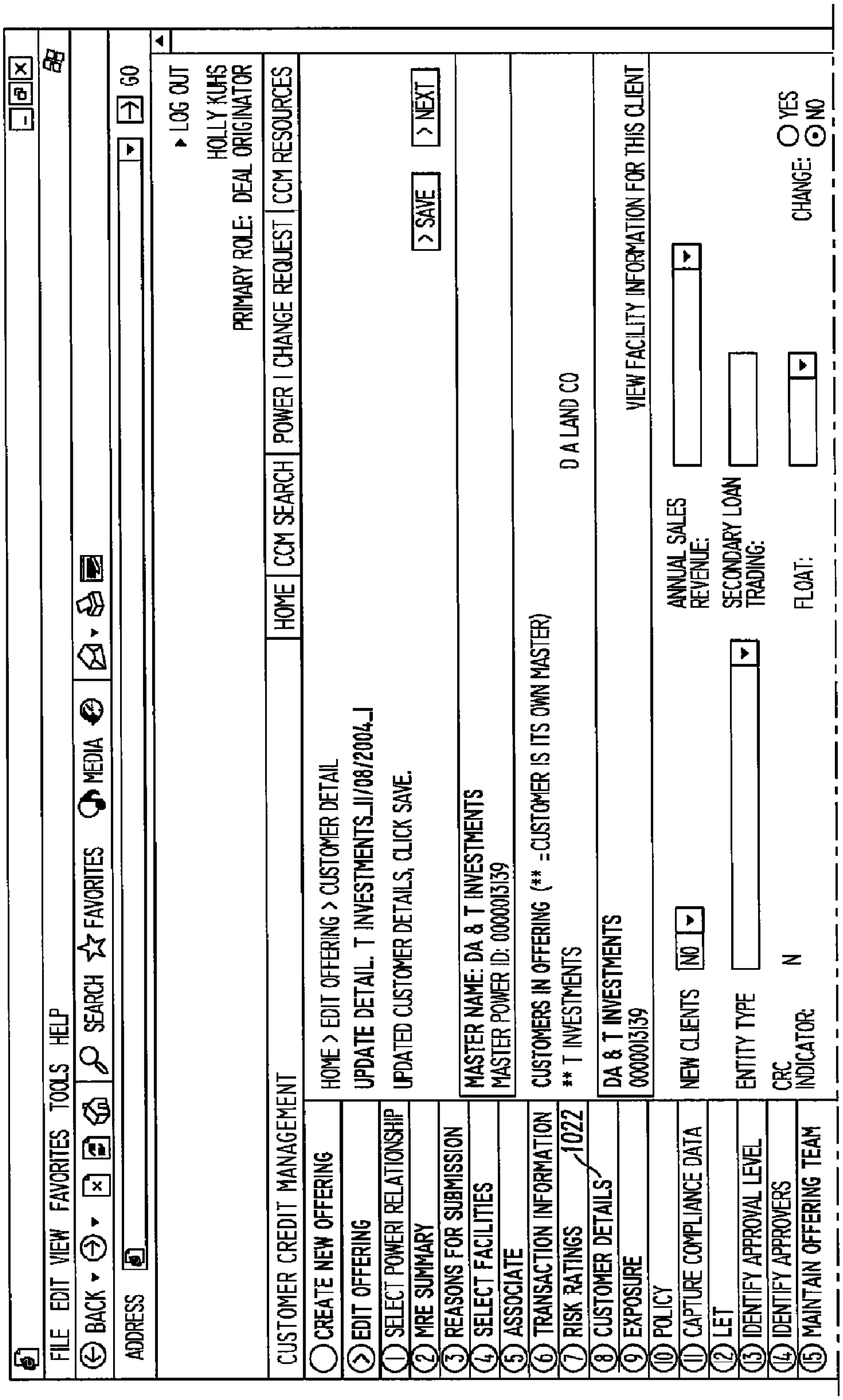
Figure 36B:
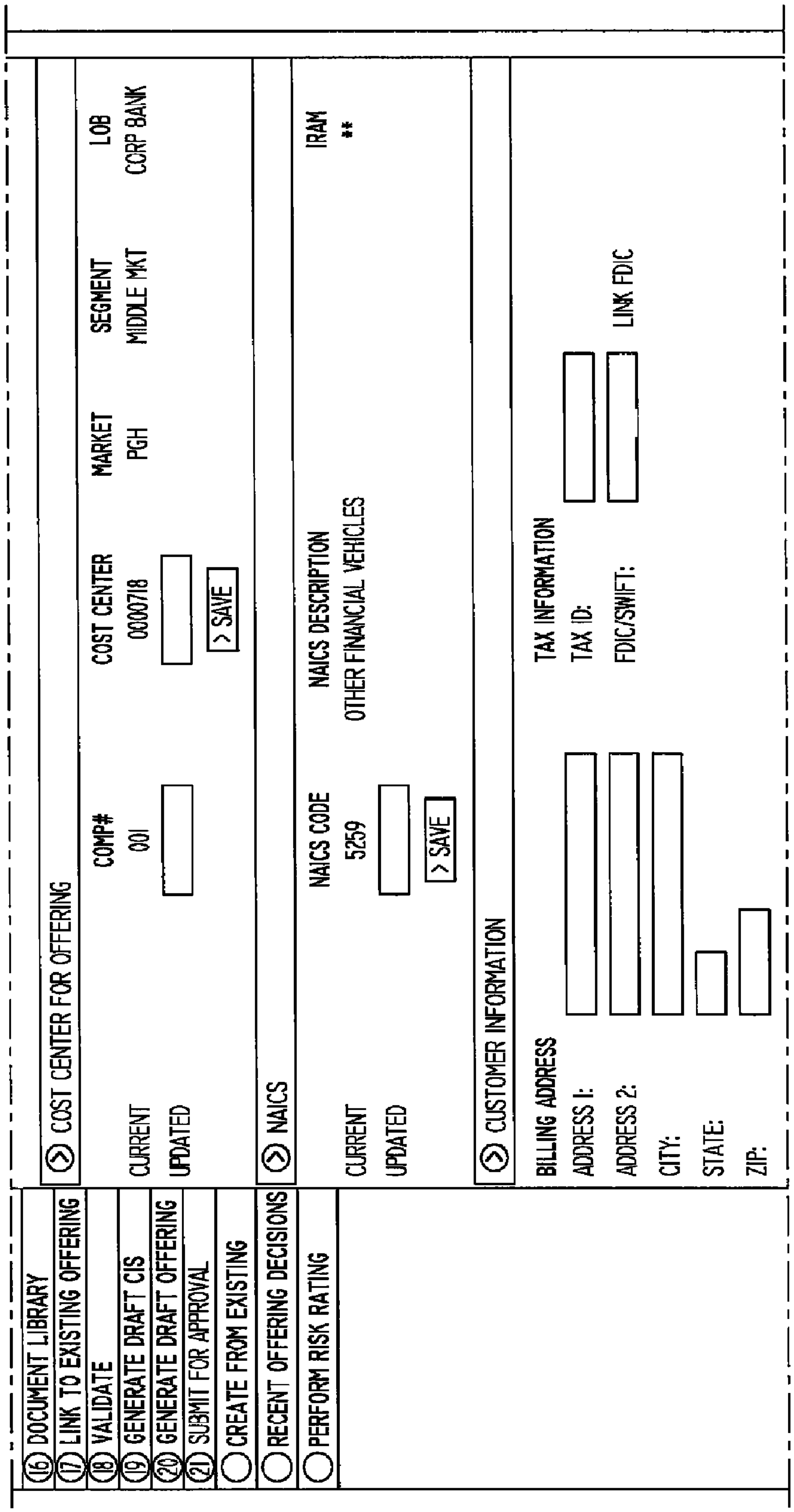
Figure 36C:
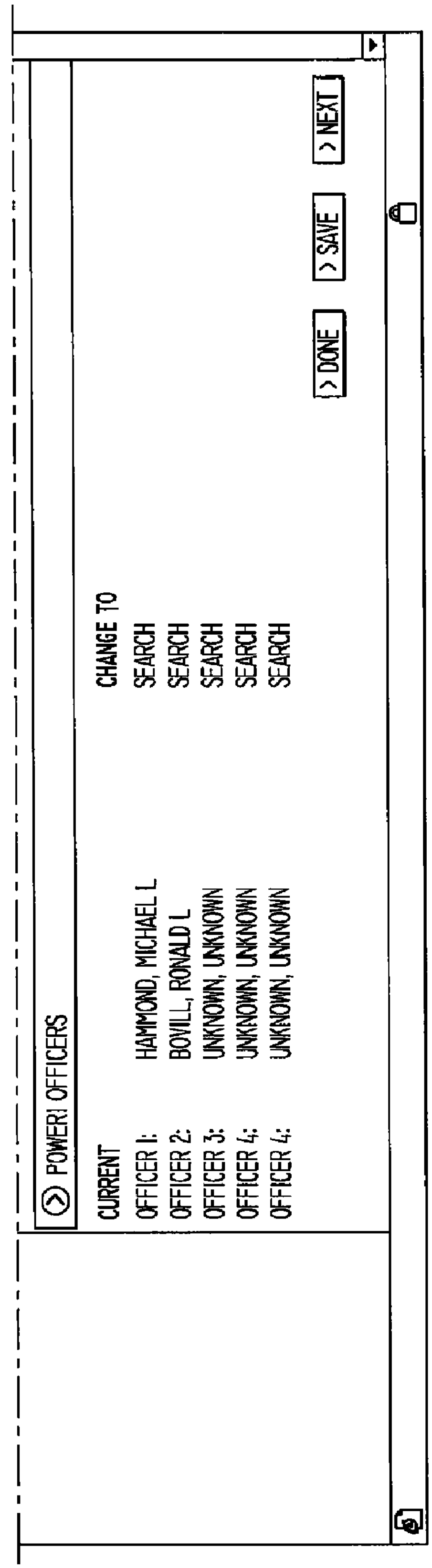
Figure 37A:
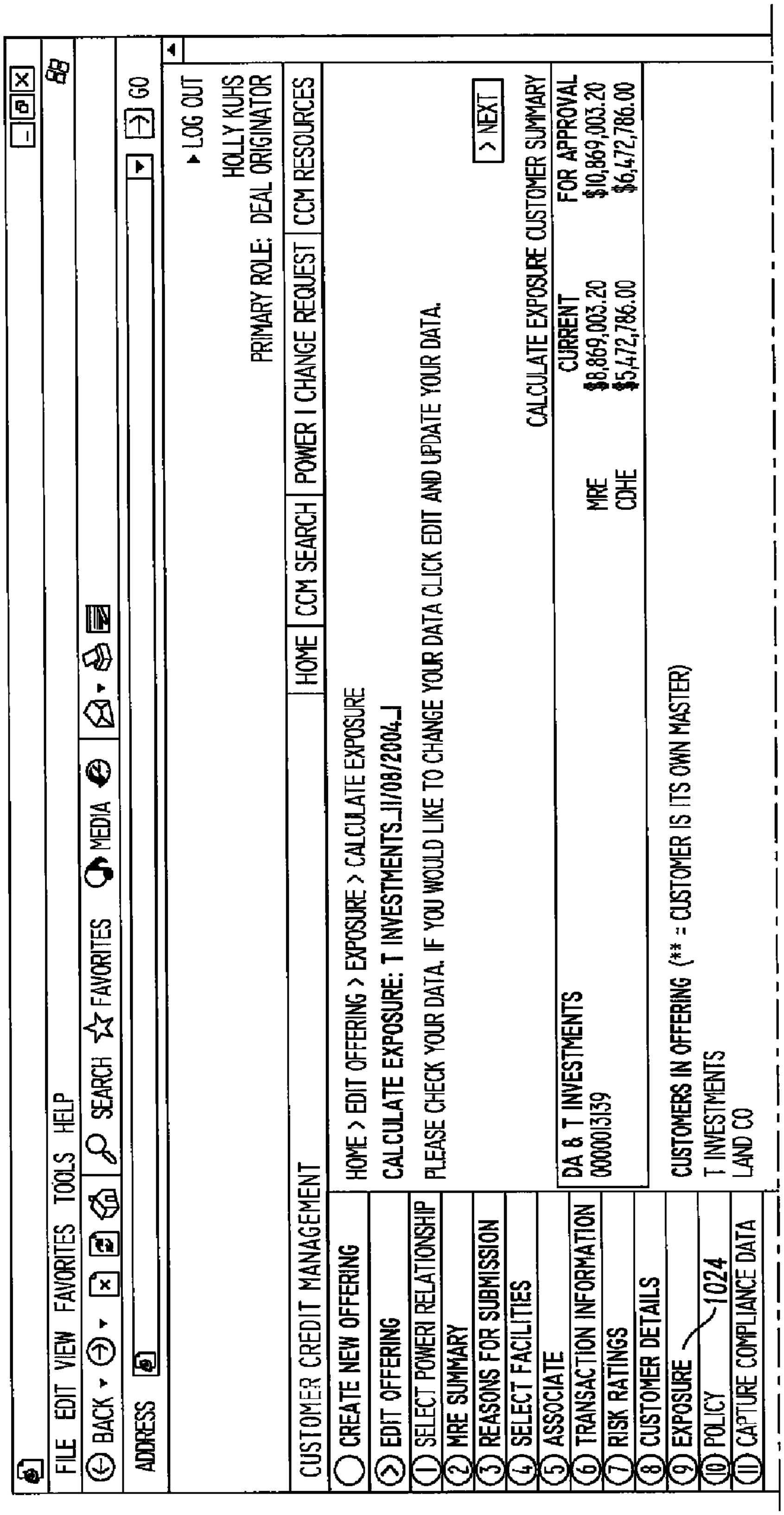
Figure 37B:
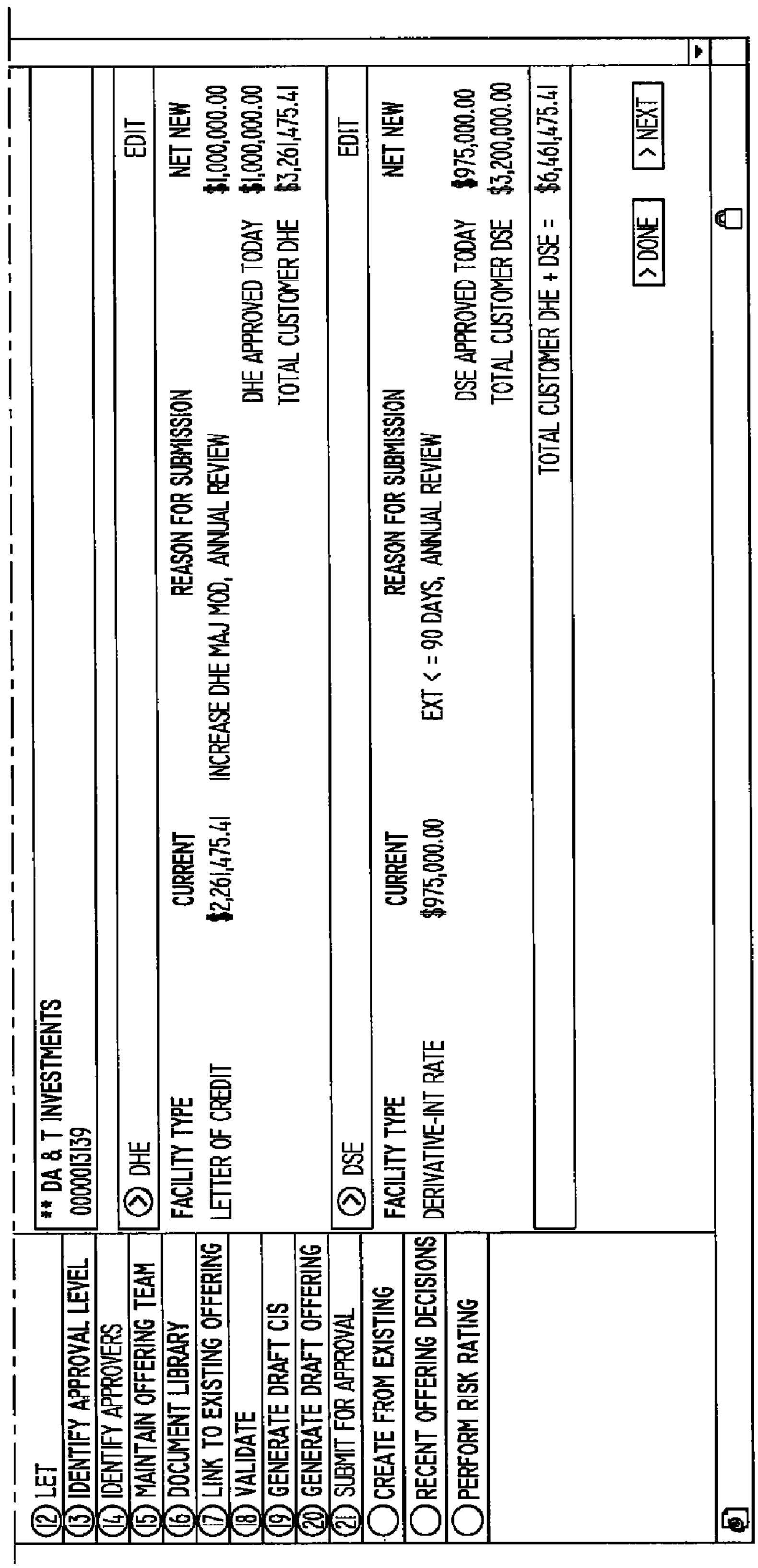
Figure 38A:
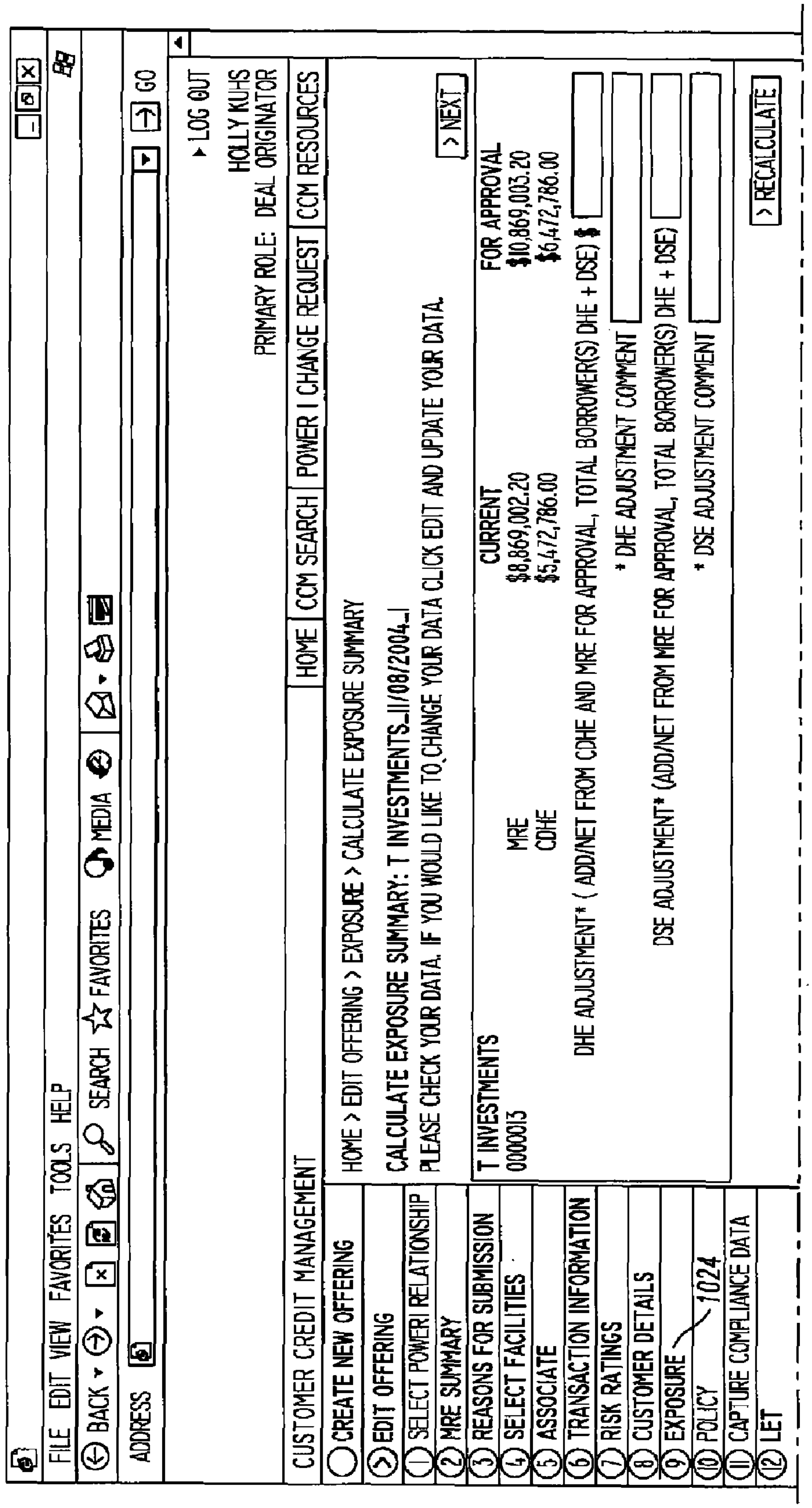
Figure 38B:
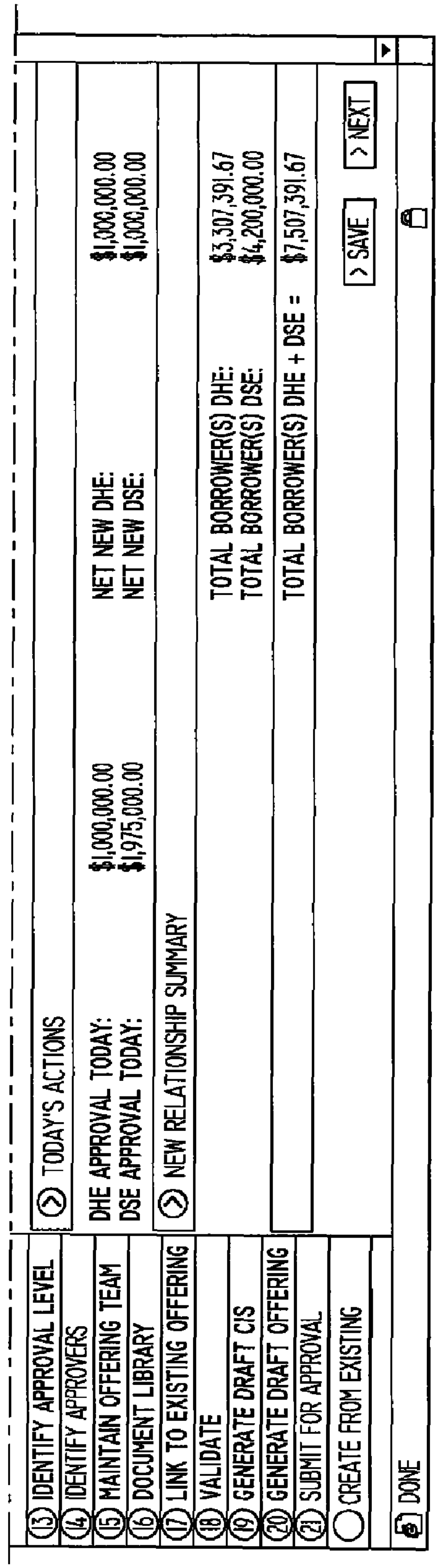

The screen illustrated in FIGS. 35A-35B shows the result of selecting the "risk ratings" tab 1020 (FIG. 35A) and is used to display the probability of default and loss given default ratings for a borrower. The screen illustrated in FIGS. 36A-36C shows the result of selecting the "customer details" tab 1022 (FIG. 36A) and provides for customer-specific information relevant to the offering. The screen illustrated in FIGS. 37A-37B shows the result of selecting the "exposure" tab 1024 (FIG. 37A) and is used to calculate various direct hard exposure (DHE) and direct soft exposure (DSE) values. The screen illustrated in FIGS. 38A-38B also shows the result of selecting the "exposure" tab 1024 (FIG. 38A) and is used to allow the user to review exposure information for the offering.

Figure 39A:
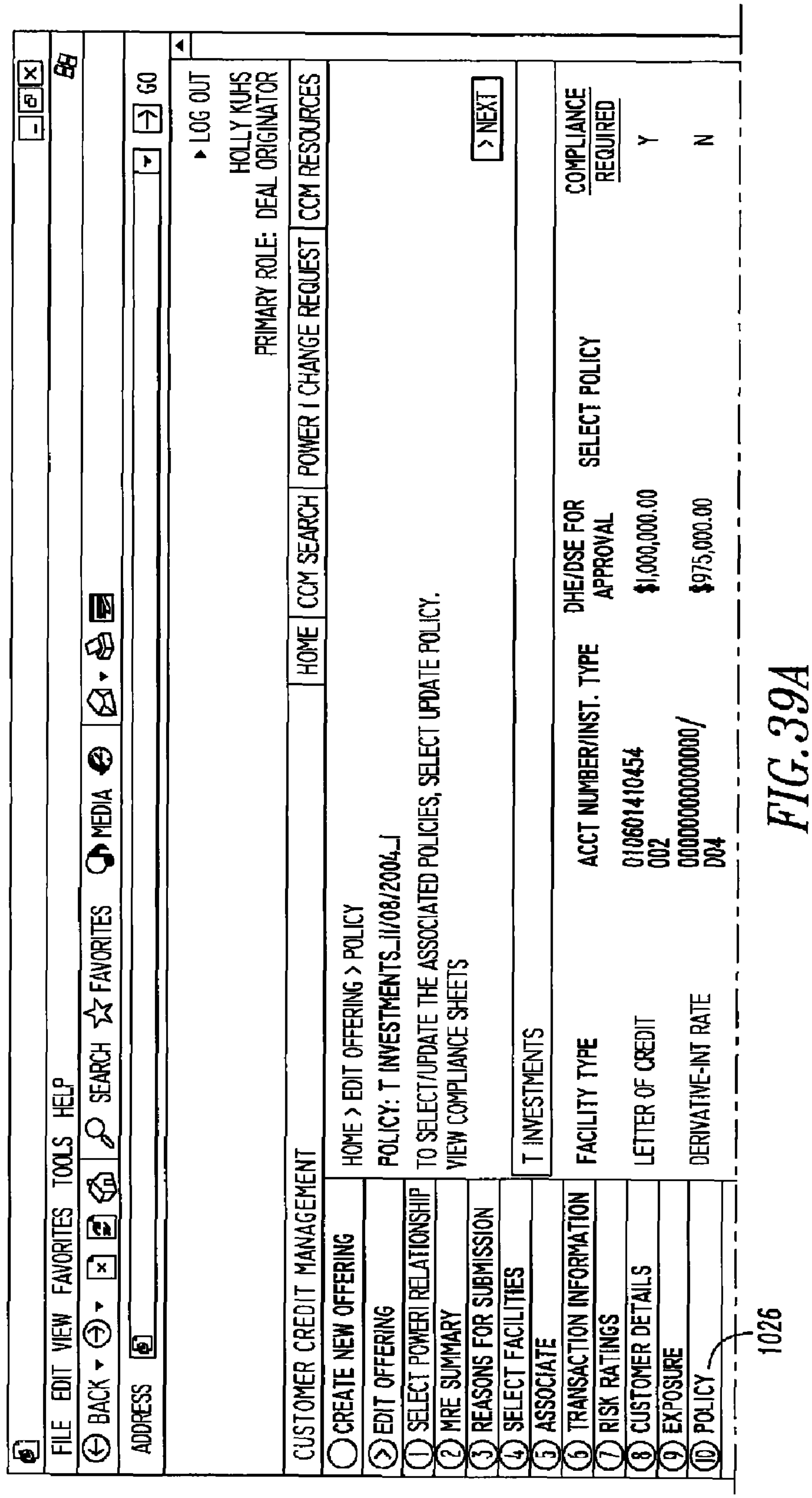
Figure 39B:
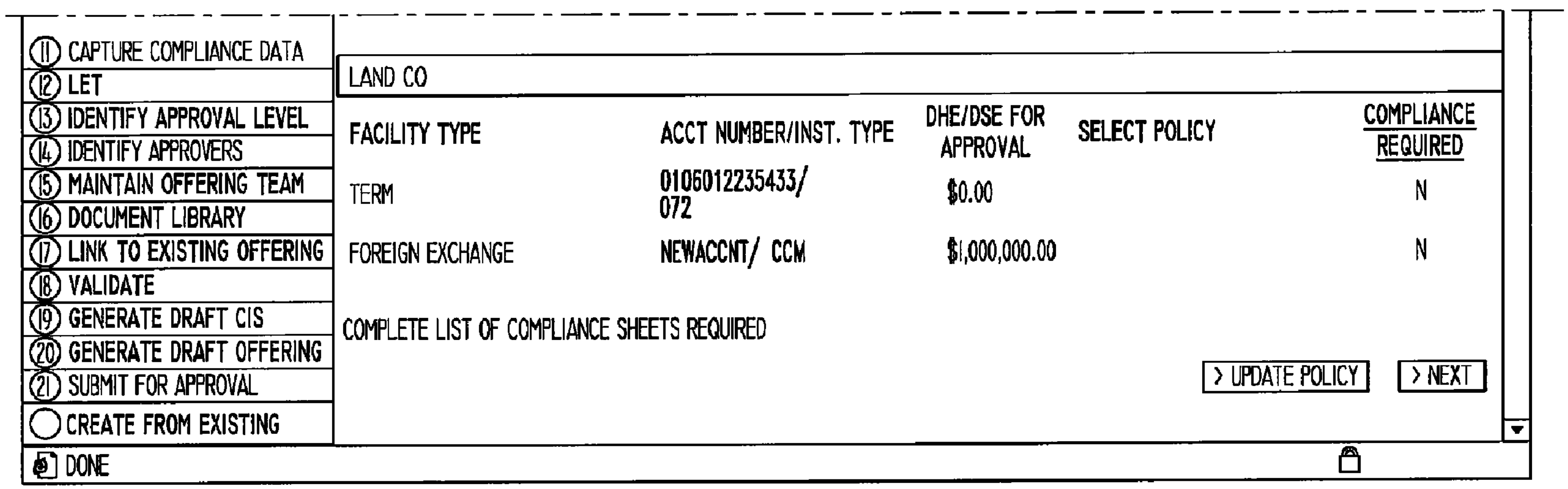
Figure 40A:
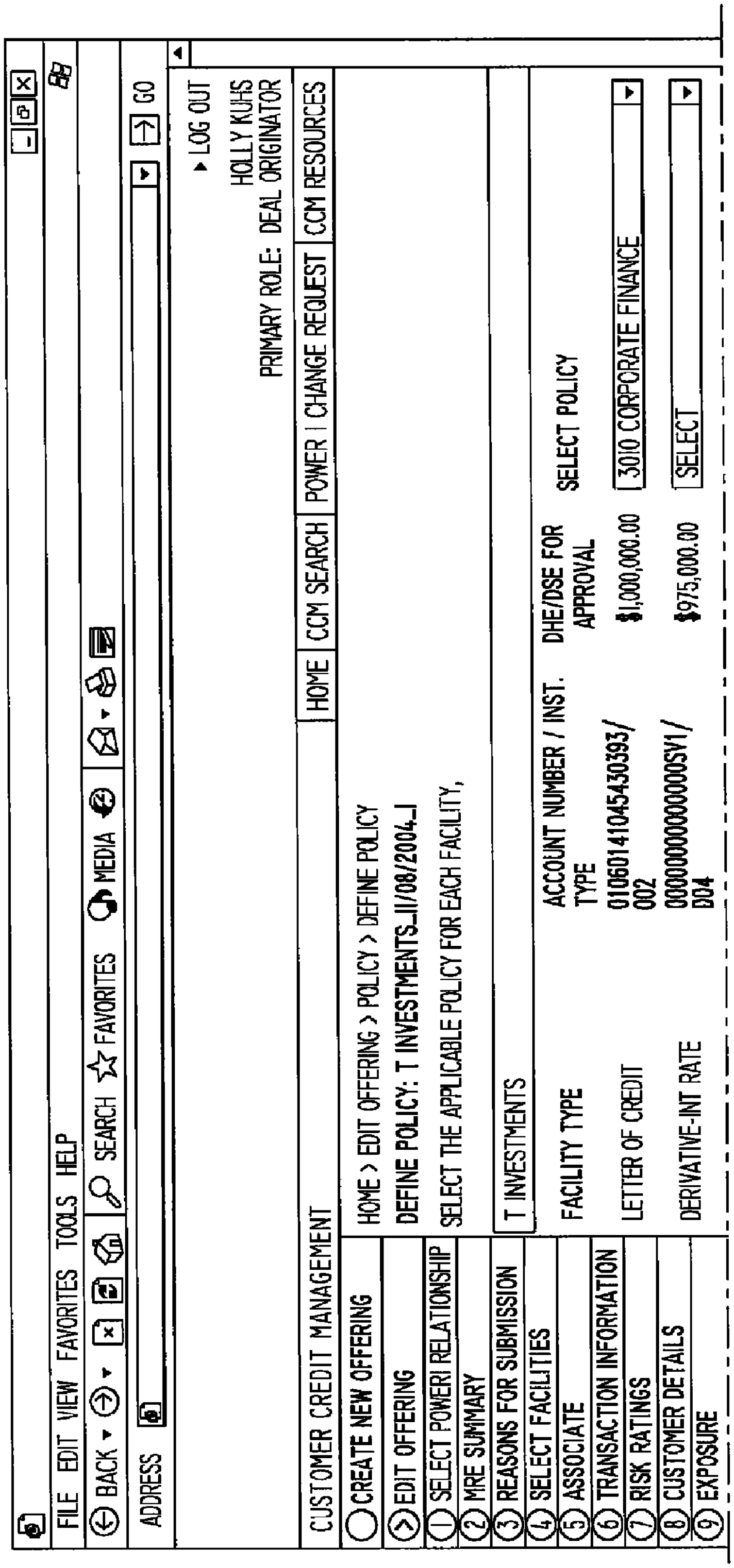
Figure 40B:
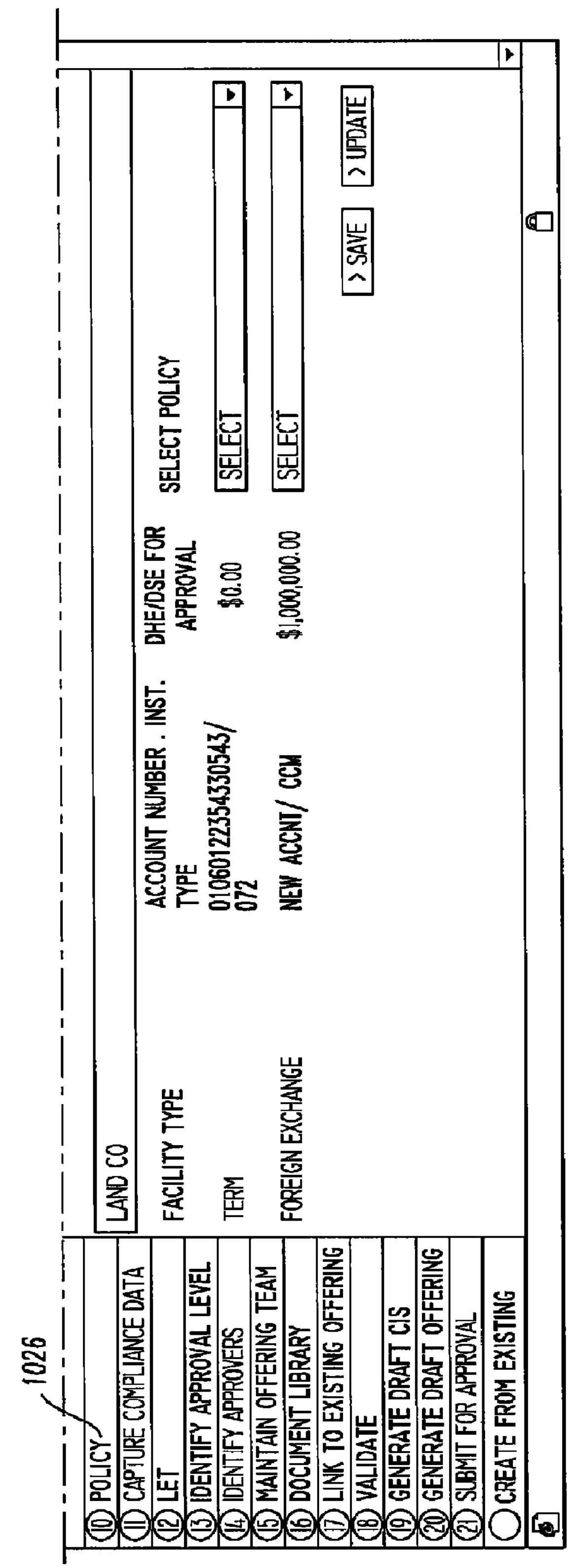
Figure 41A:
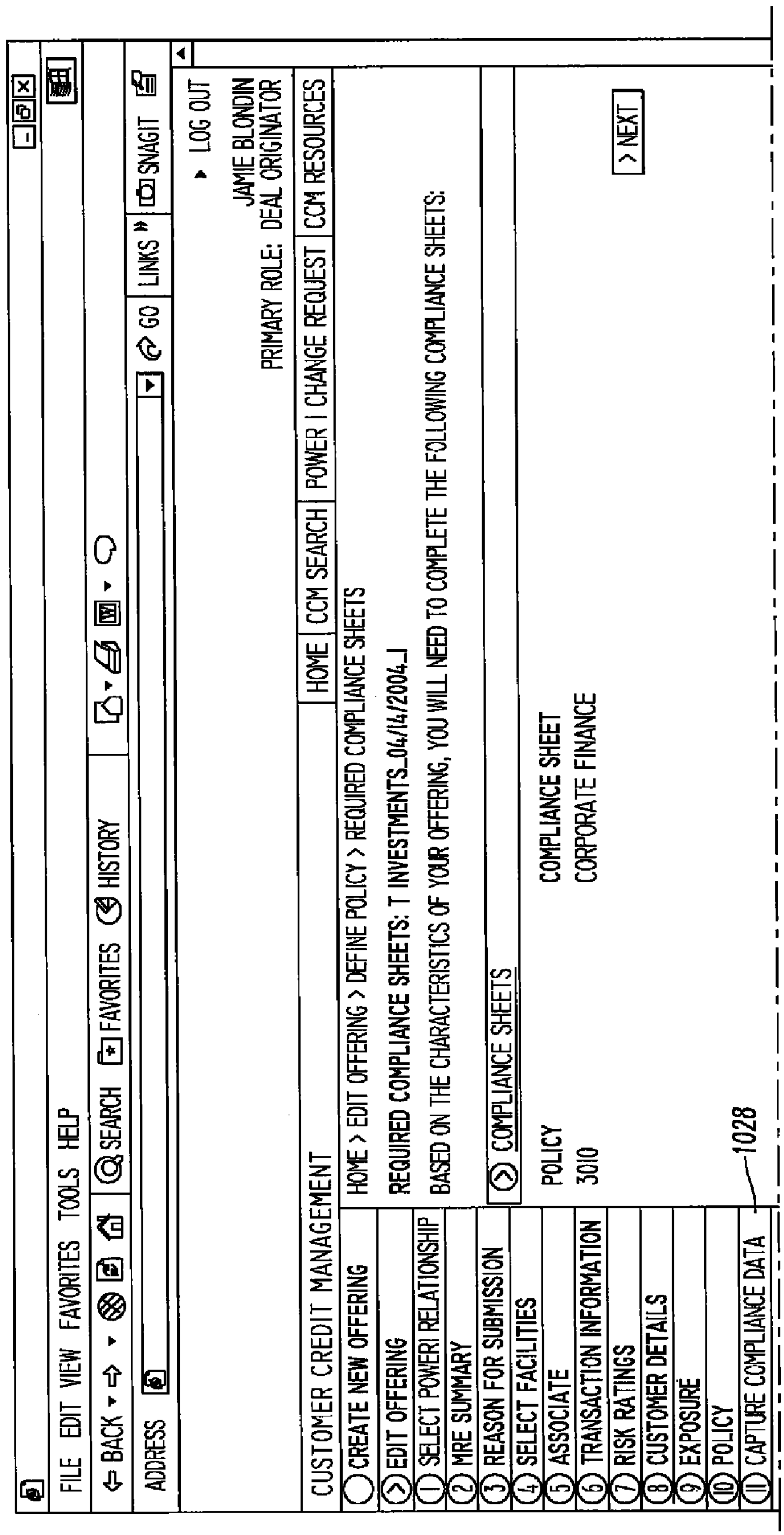
Figure 41B:
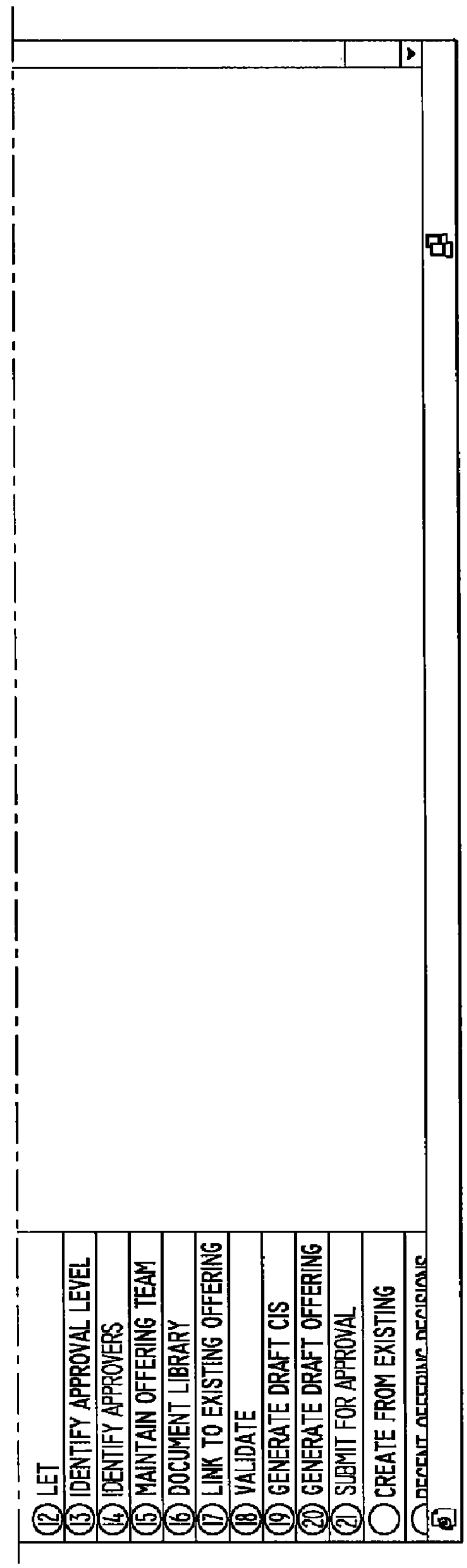
Figure 42A:
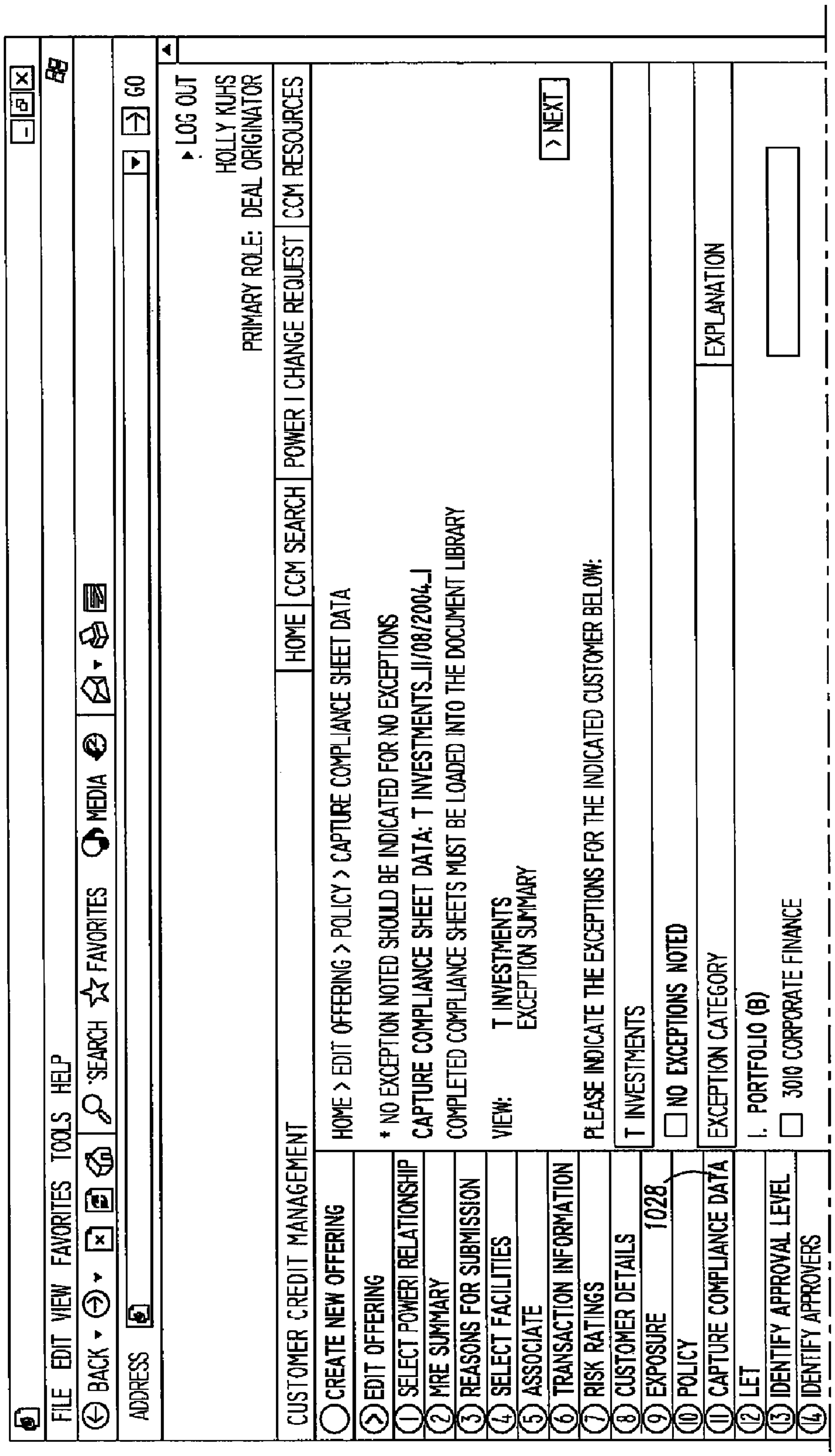
Figure 42B:
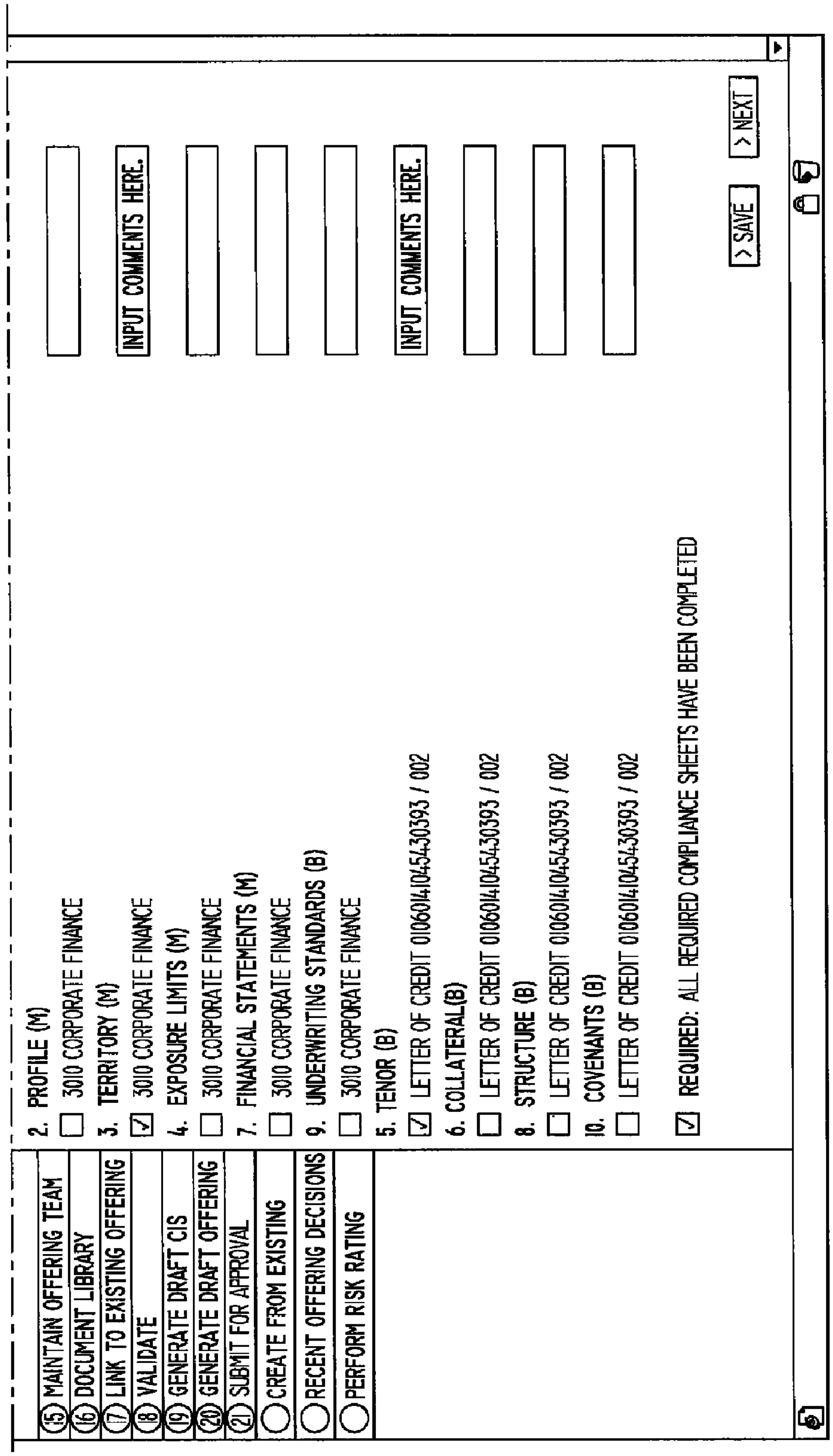
Figure 43A:
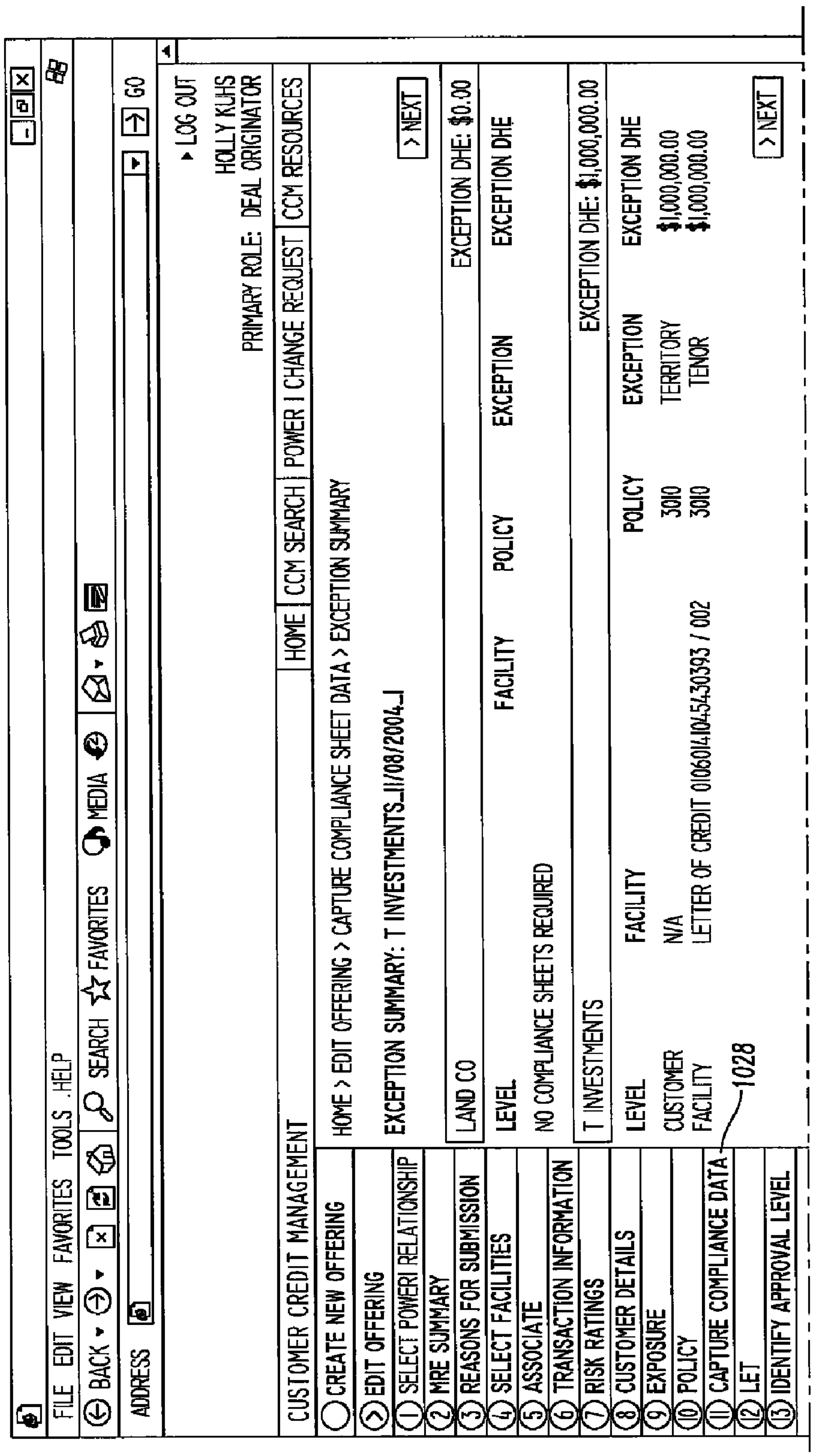
Figure 43B:
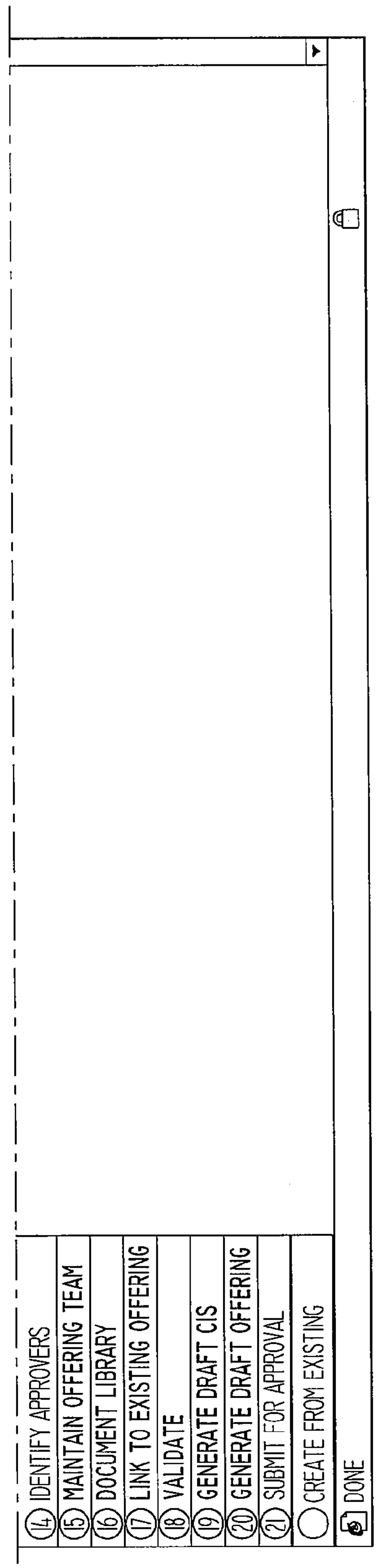

FIGS. 39A-39B shows the result of selecting the "policy" tab 1026 (FIG. 39A) and is used to display all borrowers and facilities that are part of the offering and the association of a policy to a facility. FIGS. 40A-40B also show the result of selecting the "policy" tab 1026 (FIG. 40B) and is used to enable the user to associate a facility with a policy or update an existing association. FIGS. 41A-41B show the result of selecting the "capture compliance data" tab 1028 (FIG. 41A) and is used to display a consolidated list of the compliance sheets that need to be completed for the offering. FIGS. 42A-42B also show the result of selecting the "capture compliance data" tab 1028 (FIG. 42A) and is used to provide a collection of exception data based on completed compliance sheets. FIGS. 43A-43B also show the result of selecting the "capture compliance data" tab 1028 (FIG. 43A) and is used to display a summary of exceptions in the offering and the associated exception DHE.

Figure 44A:
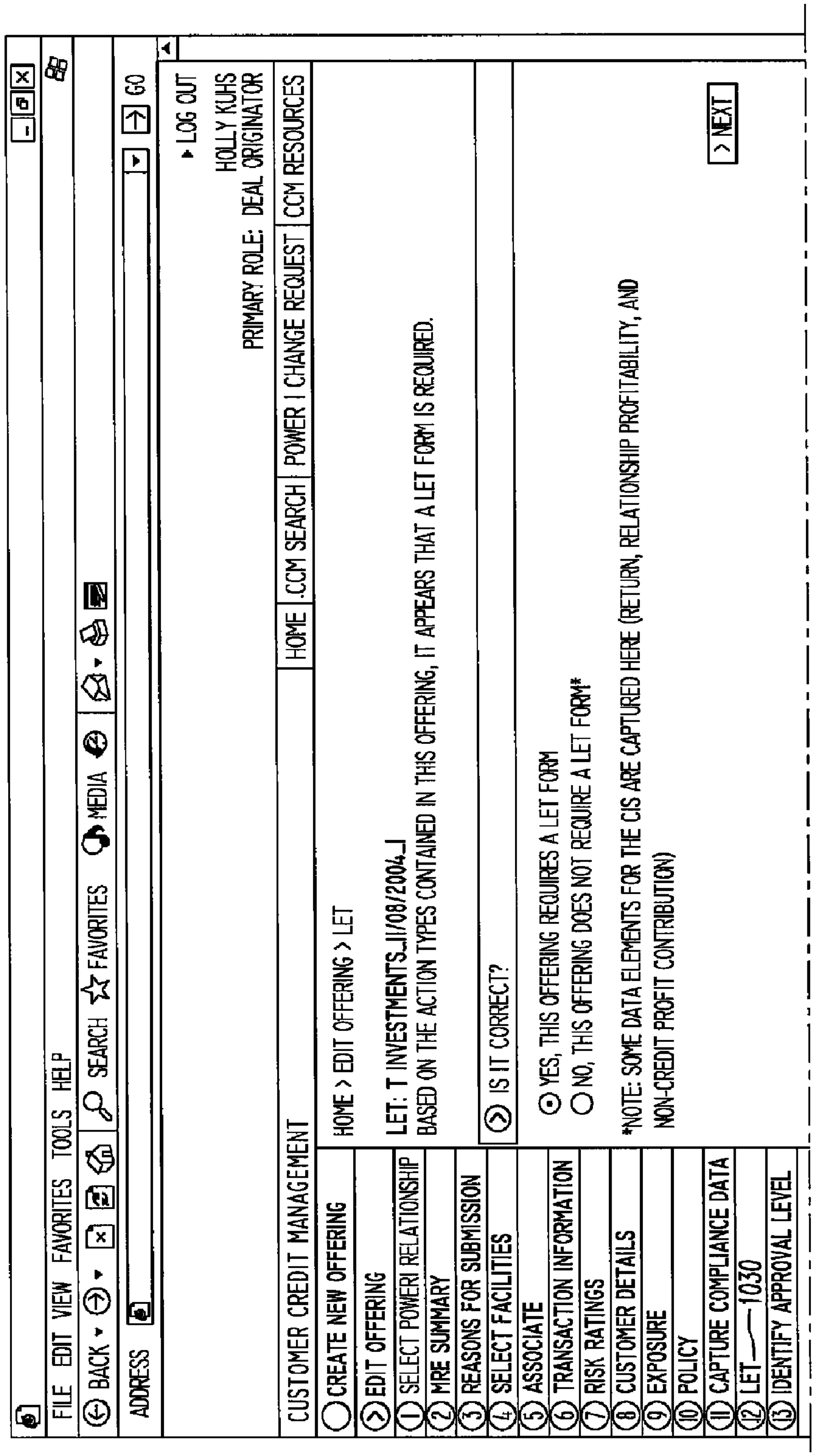
Figure 44B:
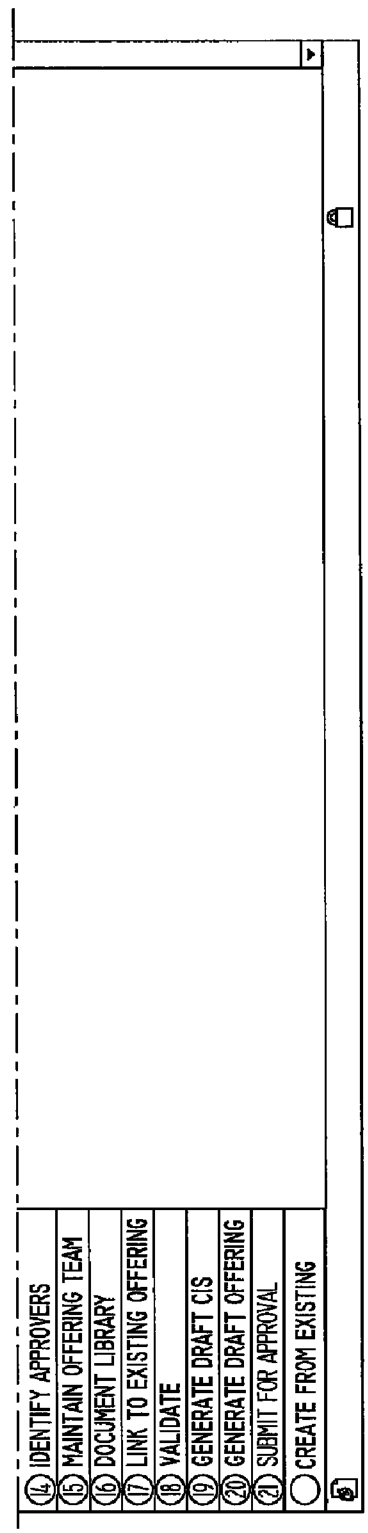
Figure 45A:
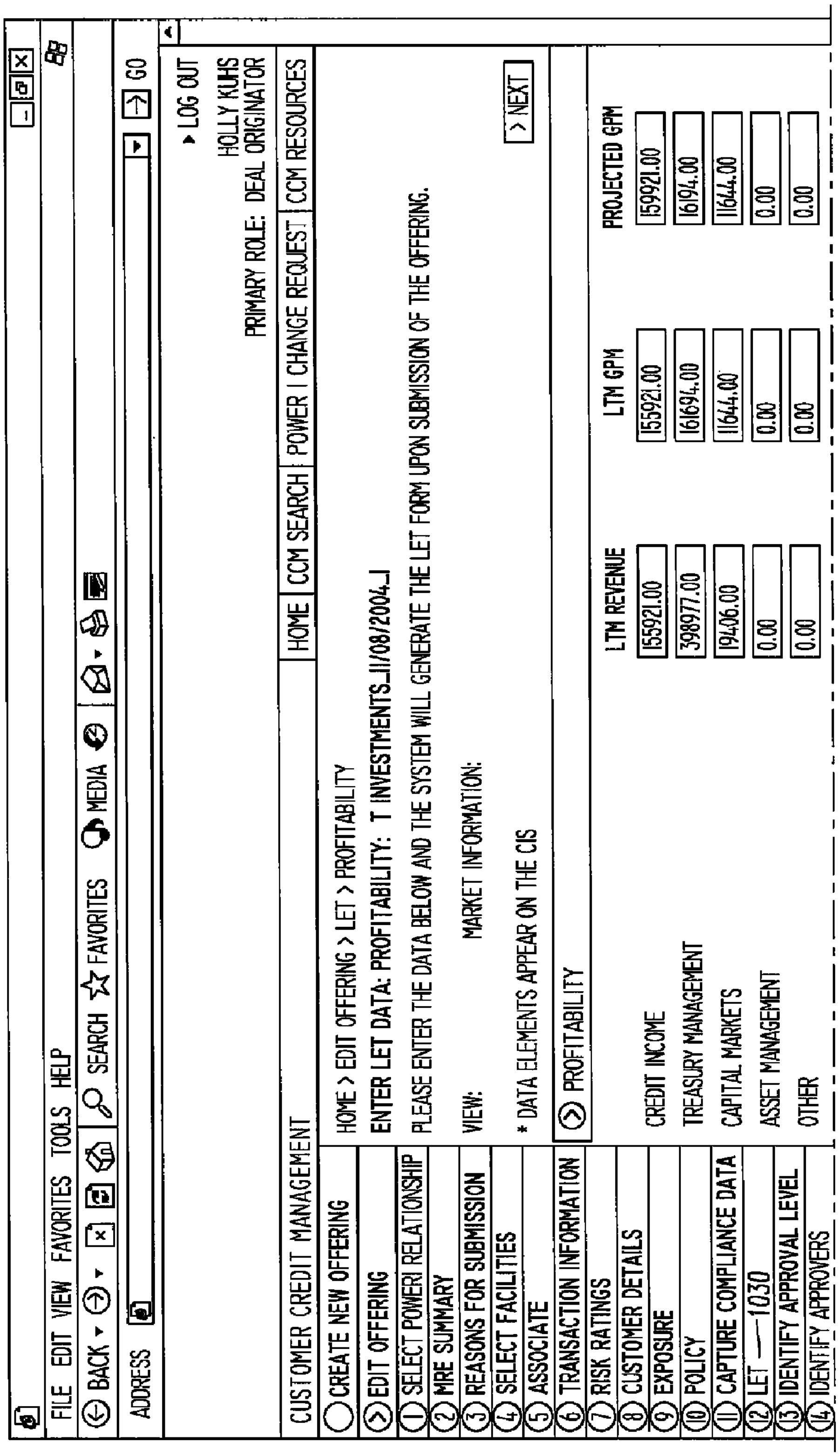
Figure 45B:
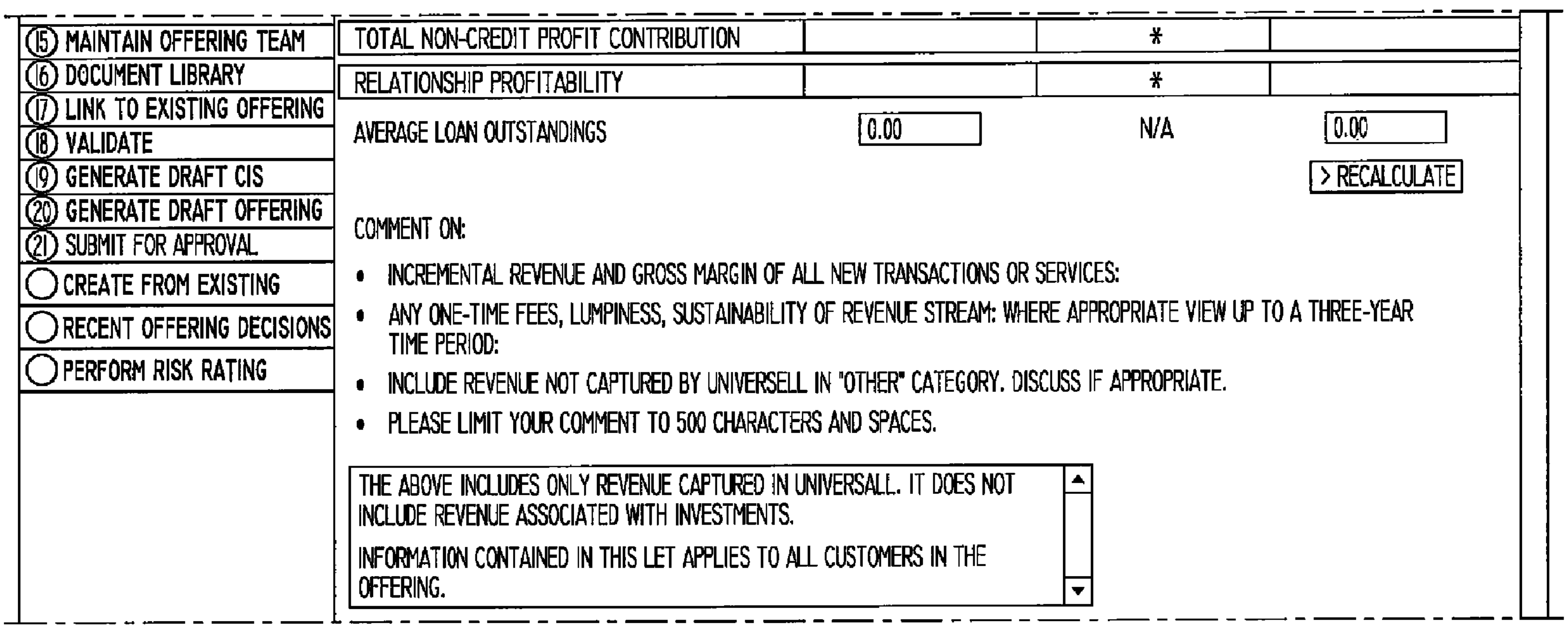
Figure 45C:
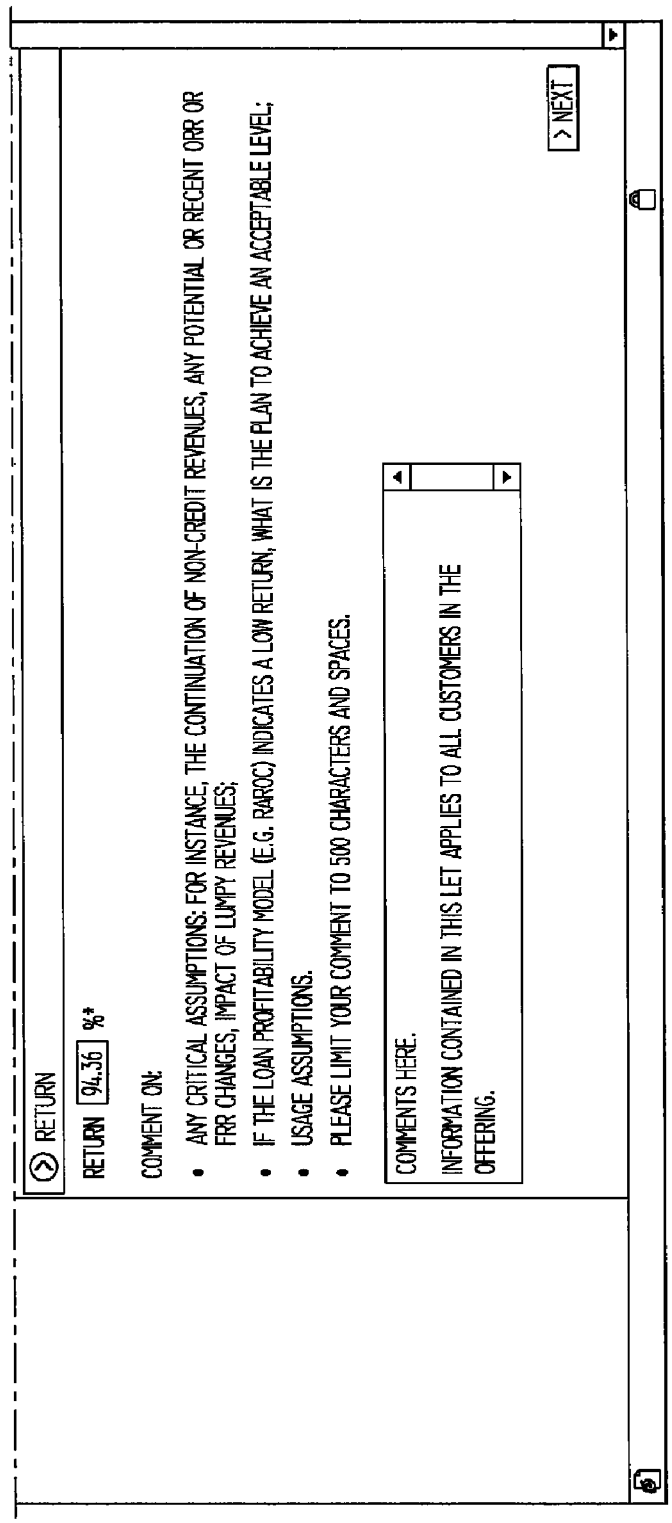
Figure 46A:
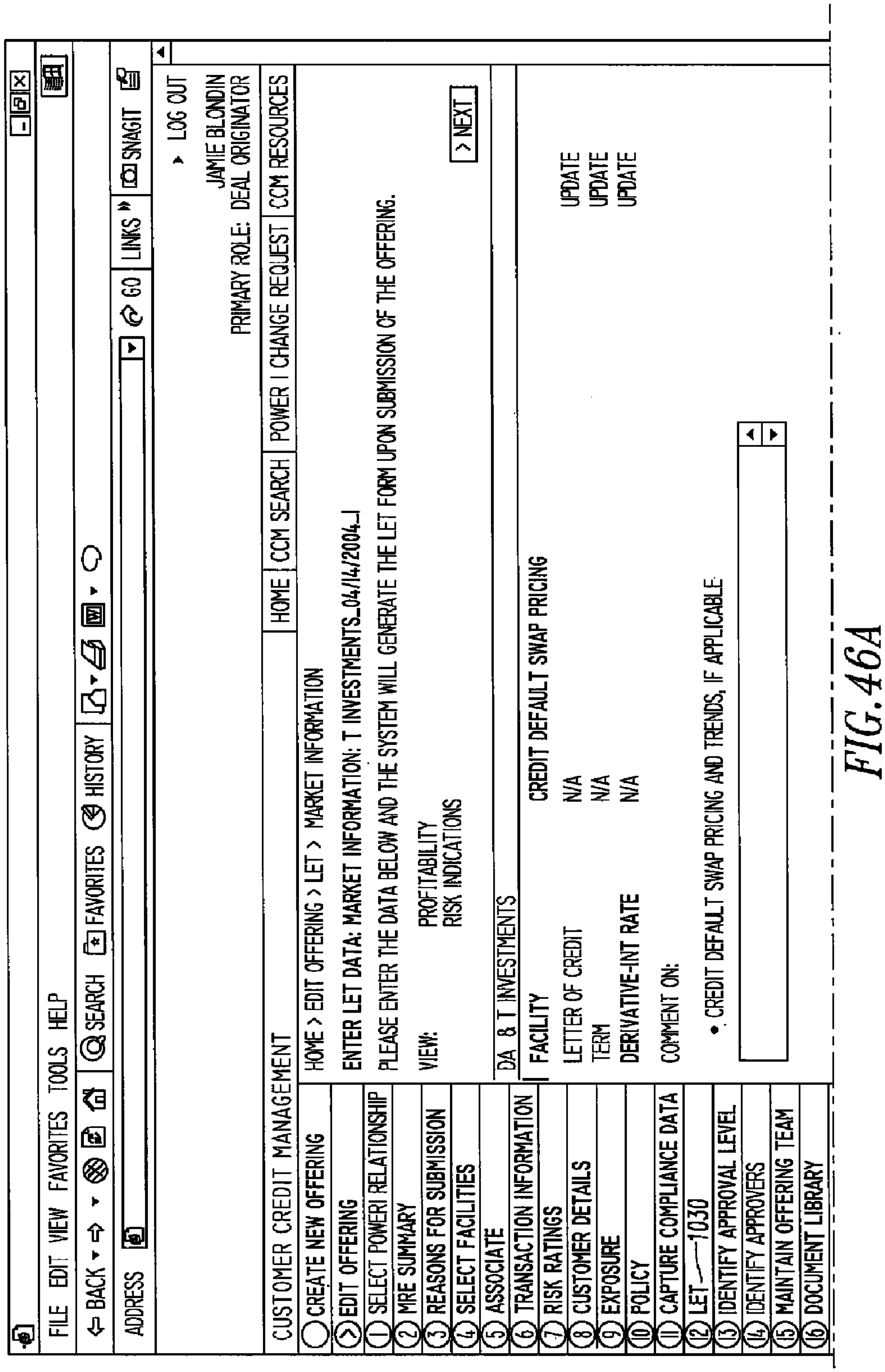
Figure 46B:
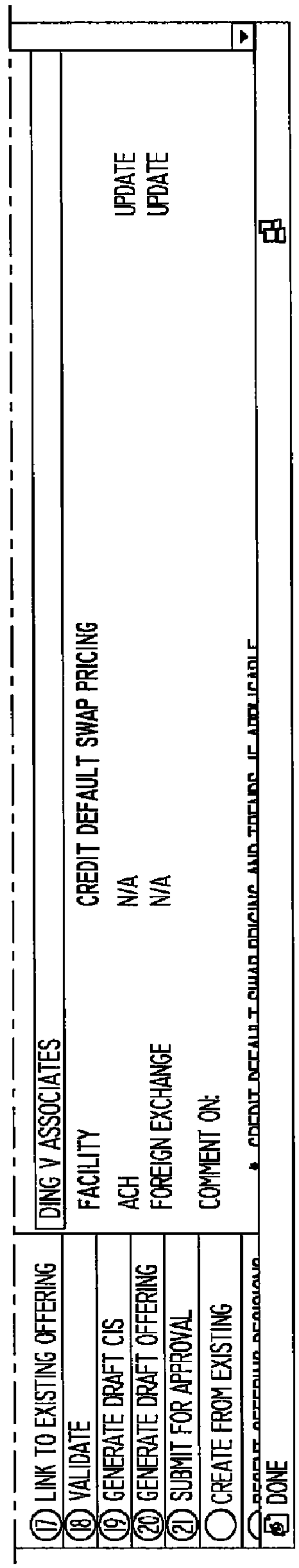

FIGS. 44A-44B show the result of selecting the "LET" tab 1030 (FIG. 44A) and is used to prompt the user as to whether loan evaluation tools (LETs) (e.g., profitability models, etc.) are needed. FIGS. 45A-45C also show the result of selecting the "LET" tab 1030 (FIG. 45A) and is used to allow input of LET profitability data by the user. FIGS. 46A-46B also show the result of selecting the "LET" tab 1030 (FIG. 46A) and is used to allow input of LET market information by the user.

Figure 47A:
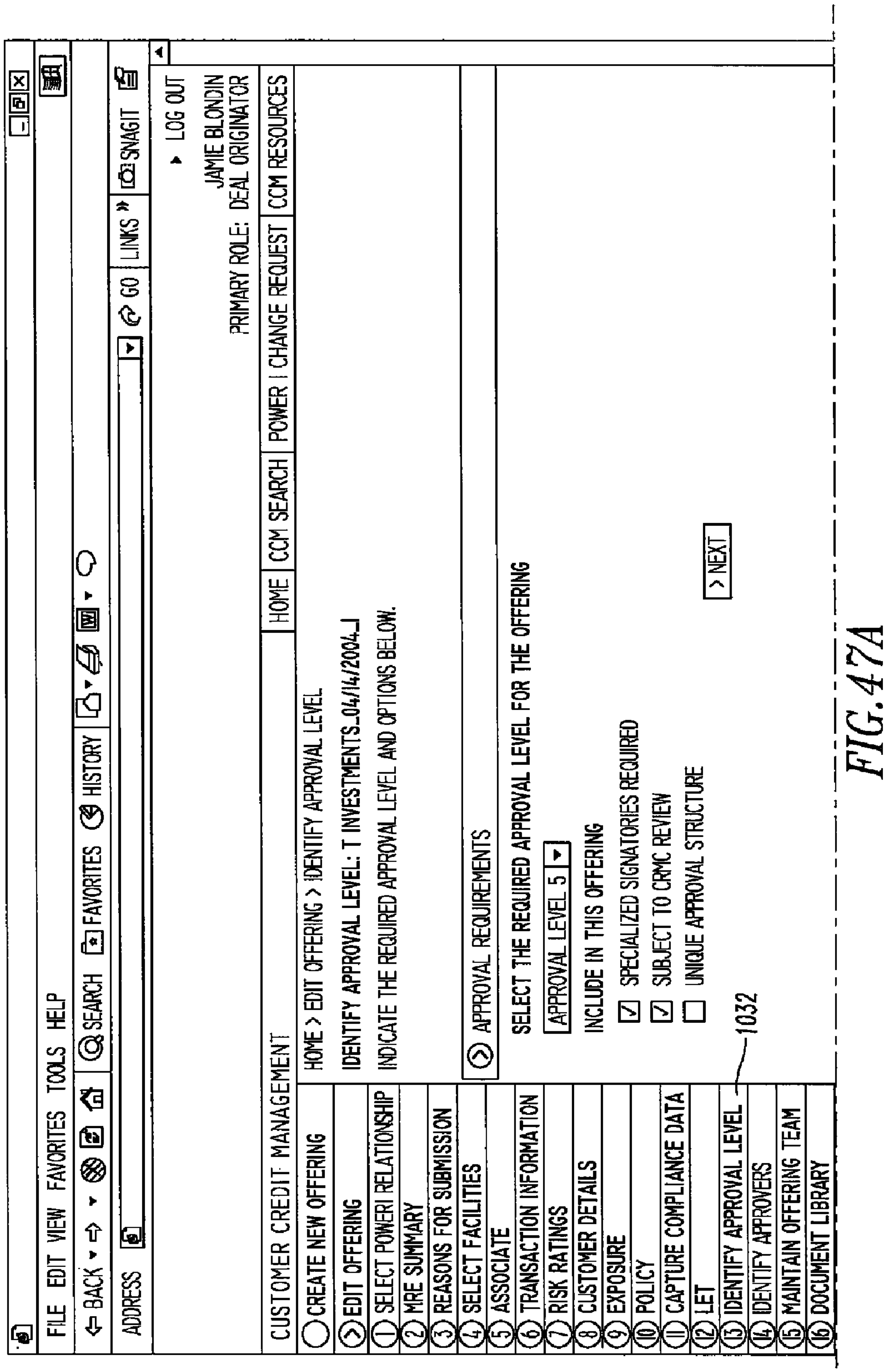
Figure 47B:
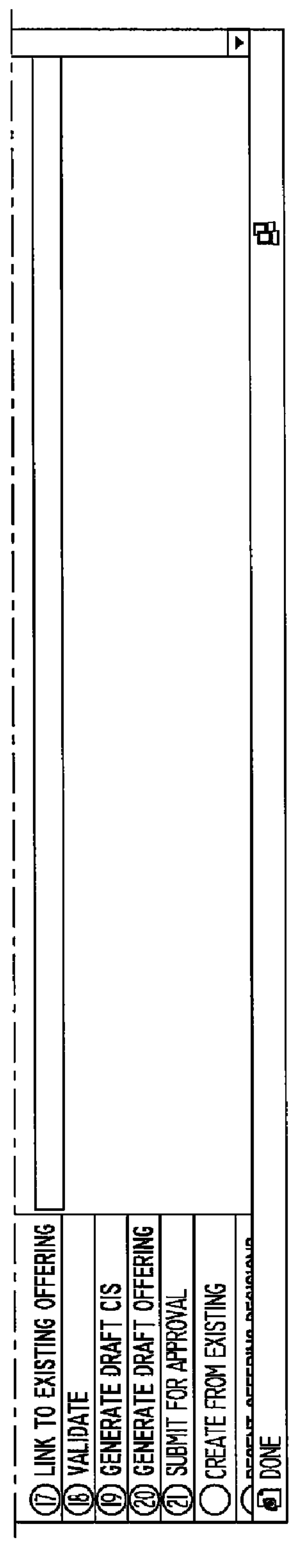
Figure 48A:
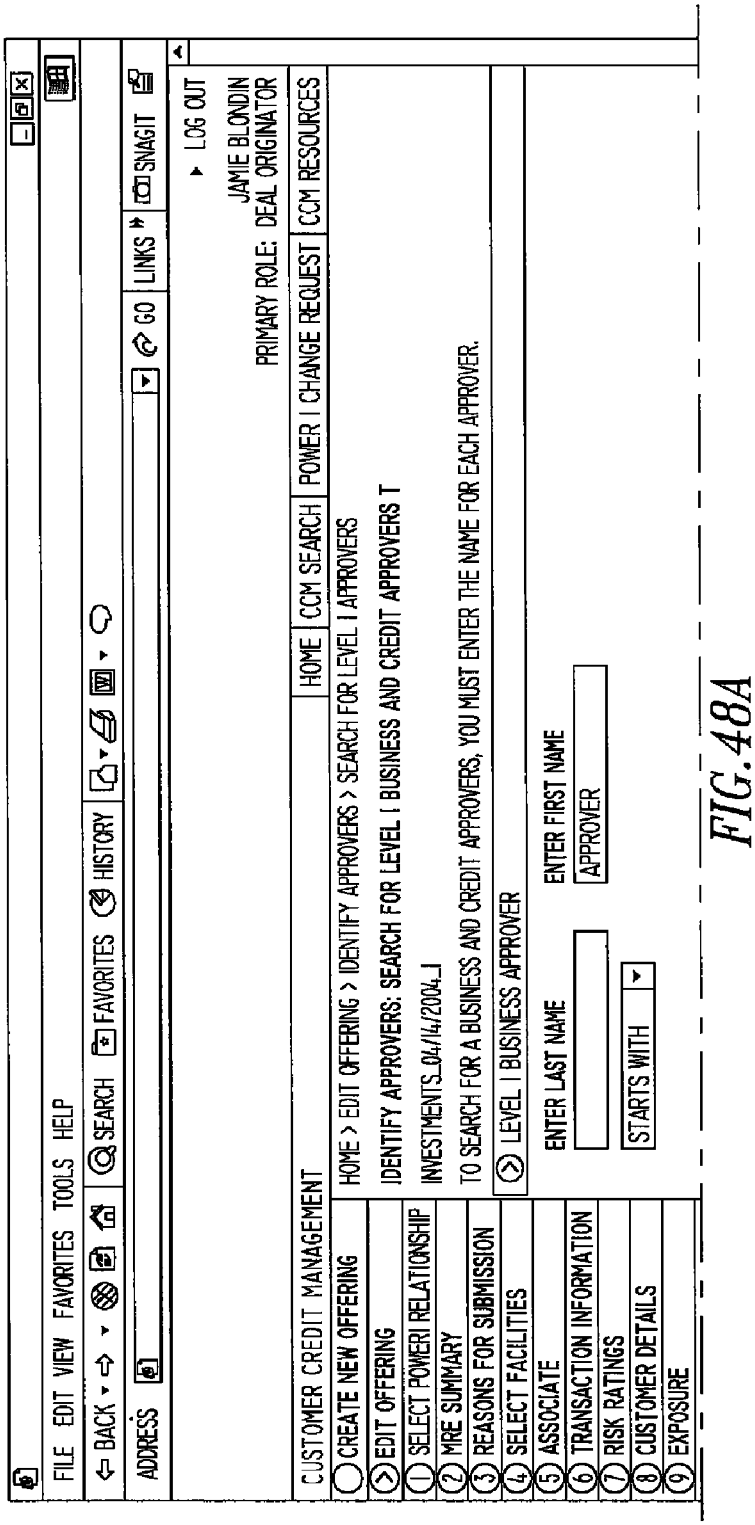
Figure 48B:
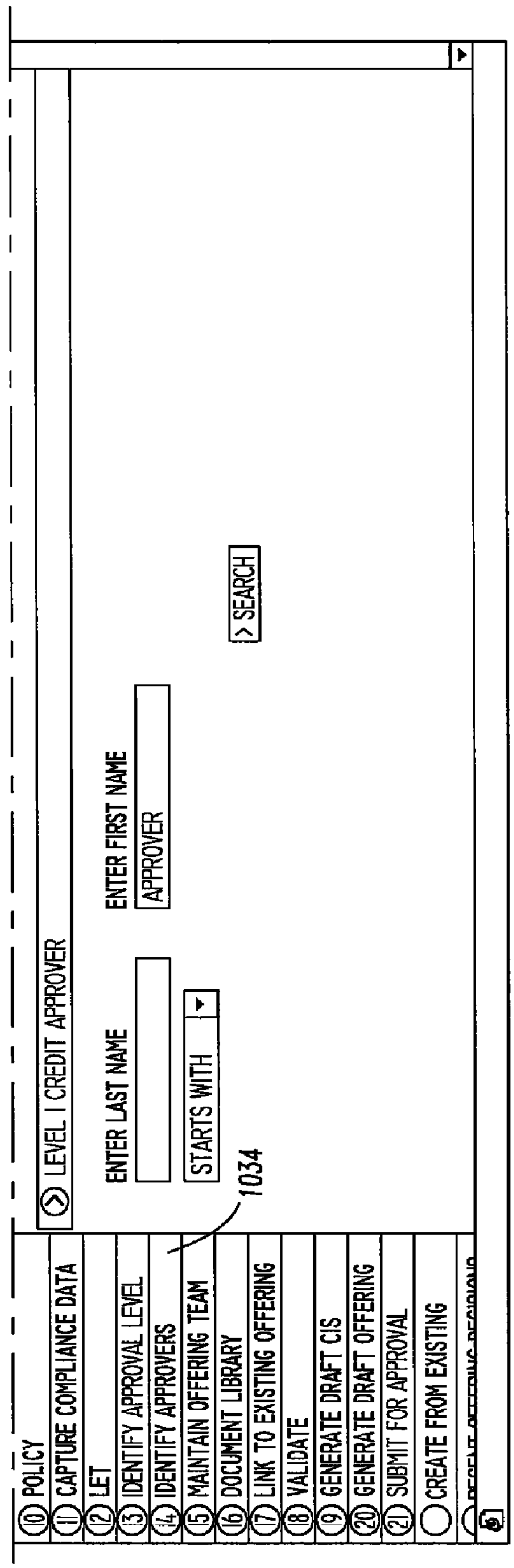
Figure 49A:
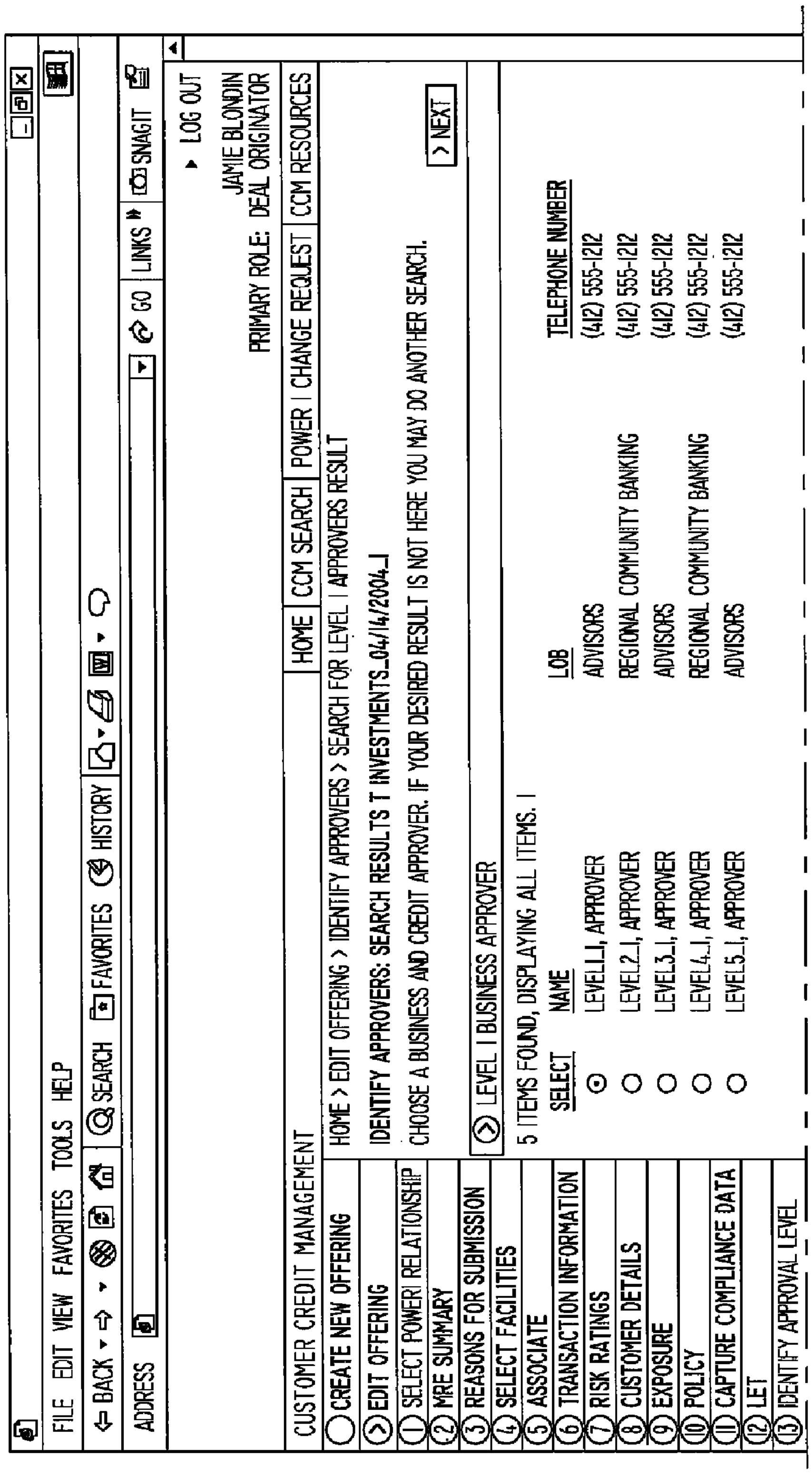
Figure 49B:
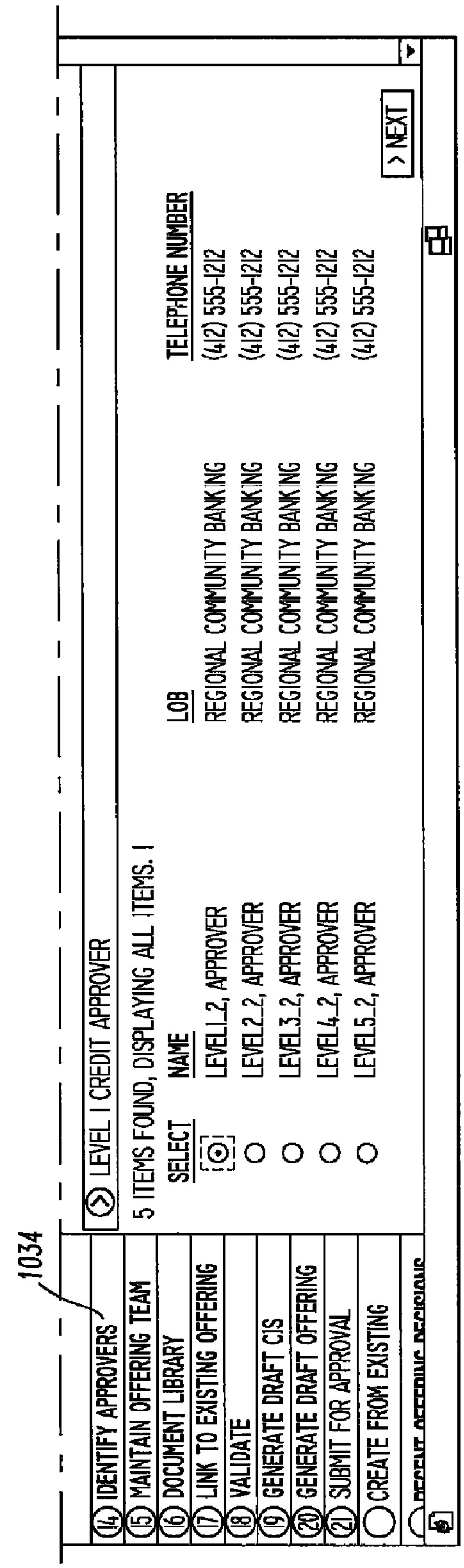
Figure 50A:
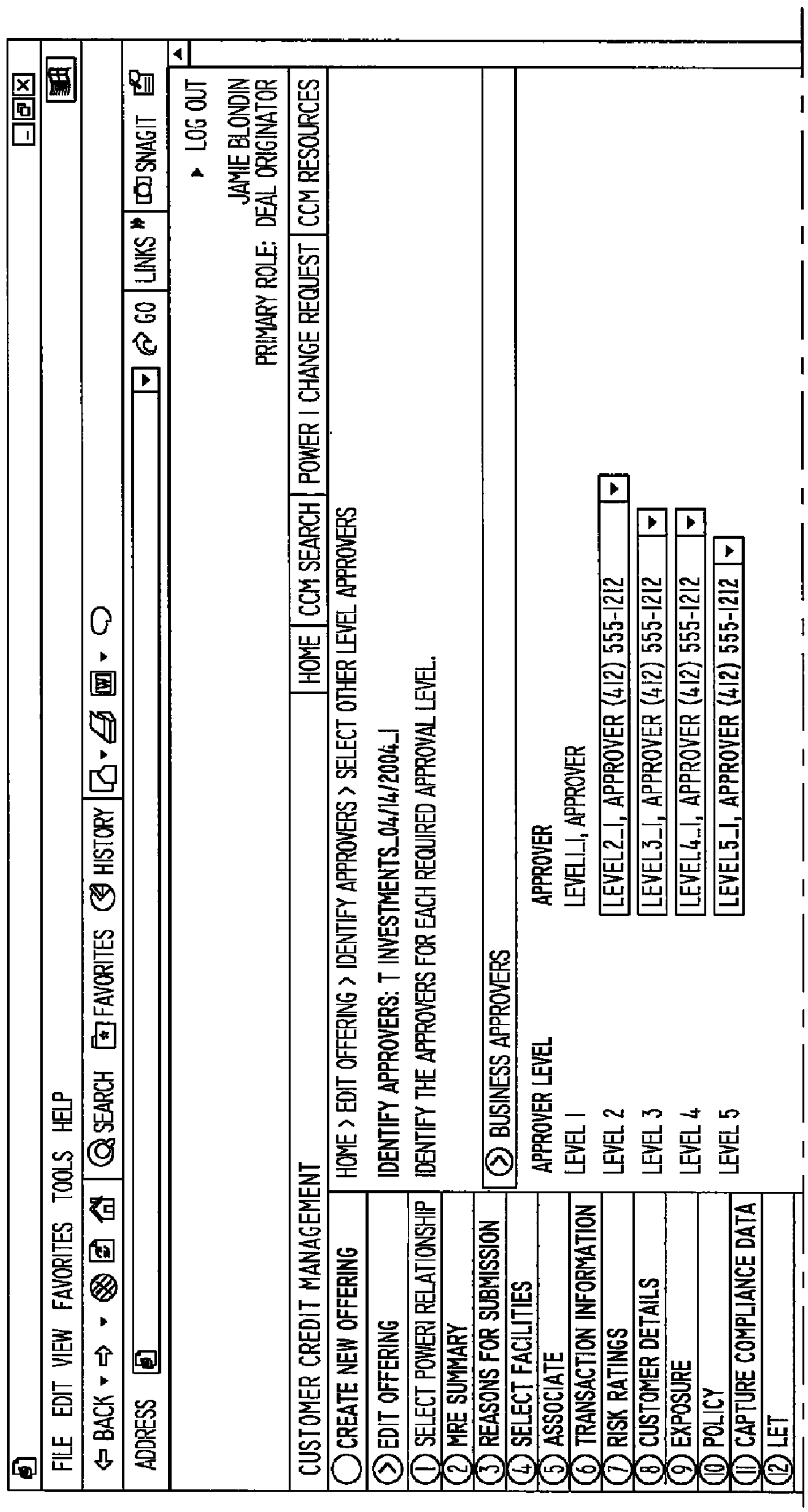
Figure 50B:
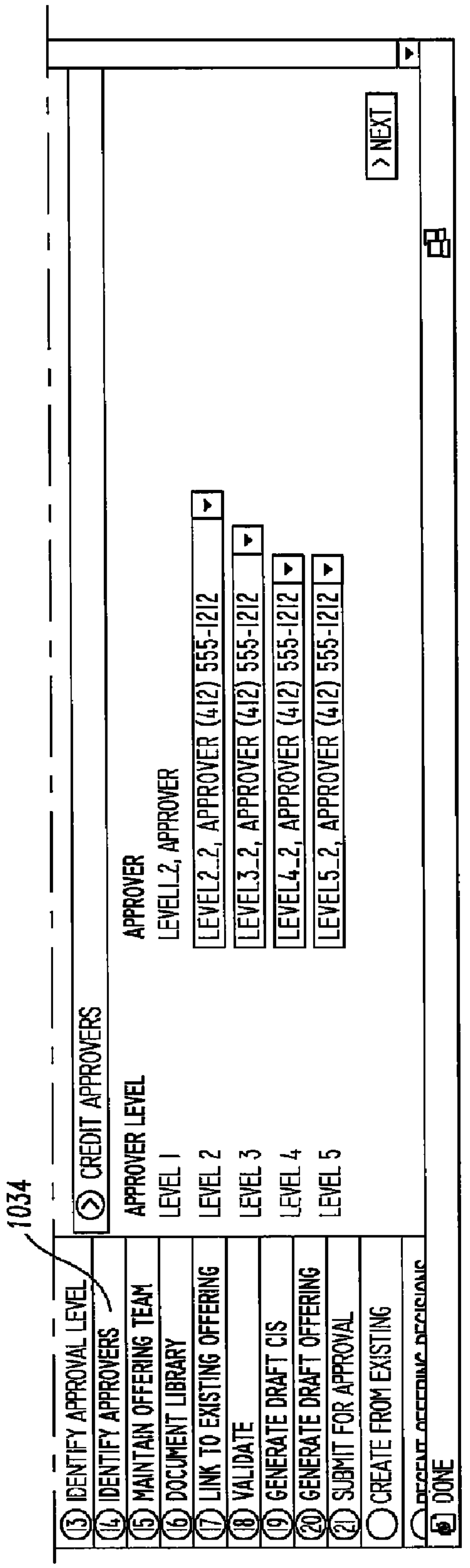

FIGS. 47A-47B show the result of selecting the "identify approval level" tab 1032 (FIG. 47A) and is used to identify the highest level of approval for the offering, indicate if specialized signatories are required, and indicate if the offering is subject to a unique approval structure. FIGS. 48A-48B show the result of selecting the "identify approvers" tab 1034 (FIG. 48B) and is used to allow the user to search for approvers who are designated as "level 1" approvers. FIGS. 49A-49B show the results of the search for Level 1 approvers from FIGS. 48A-48B. FIGS. 50A-50B also shows the result of selecting the "identify approvers" tab 1034 (FIG. 50B) and is used to allow the user to search for approvers who are designated as "level 2" through "level 4" approvers.

Figure 51A:
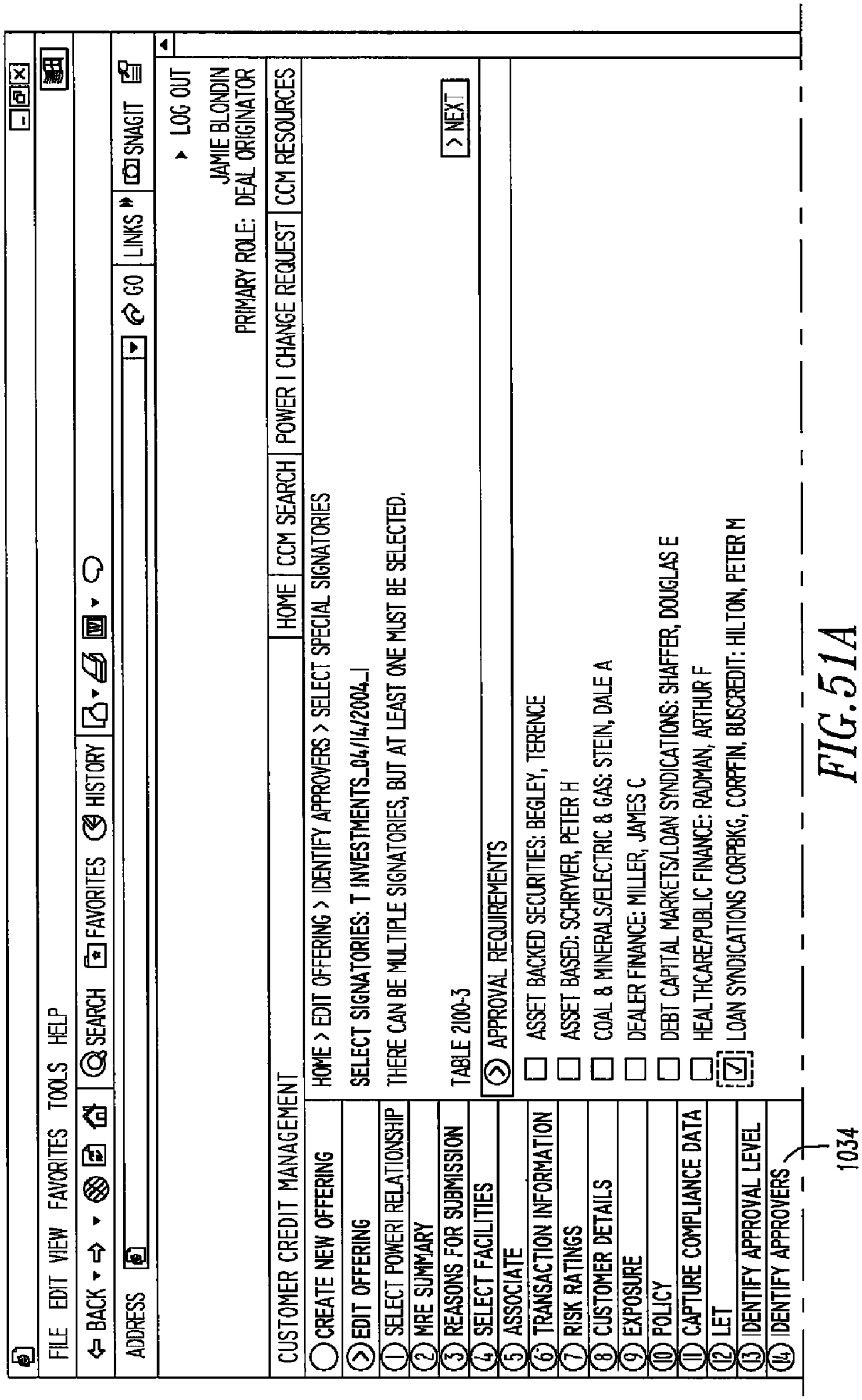
Figure 51B:
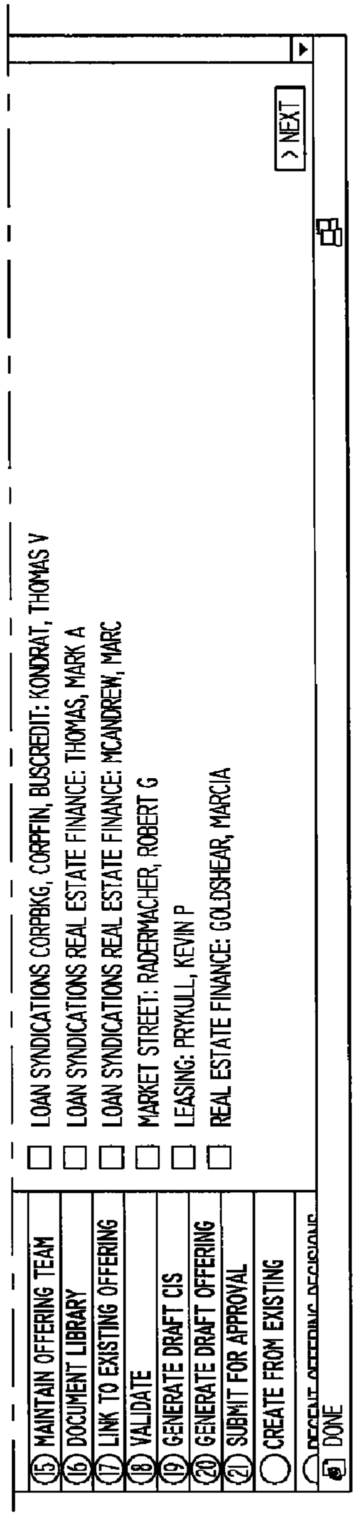
Figure 52A:
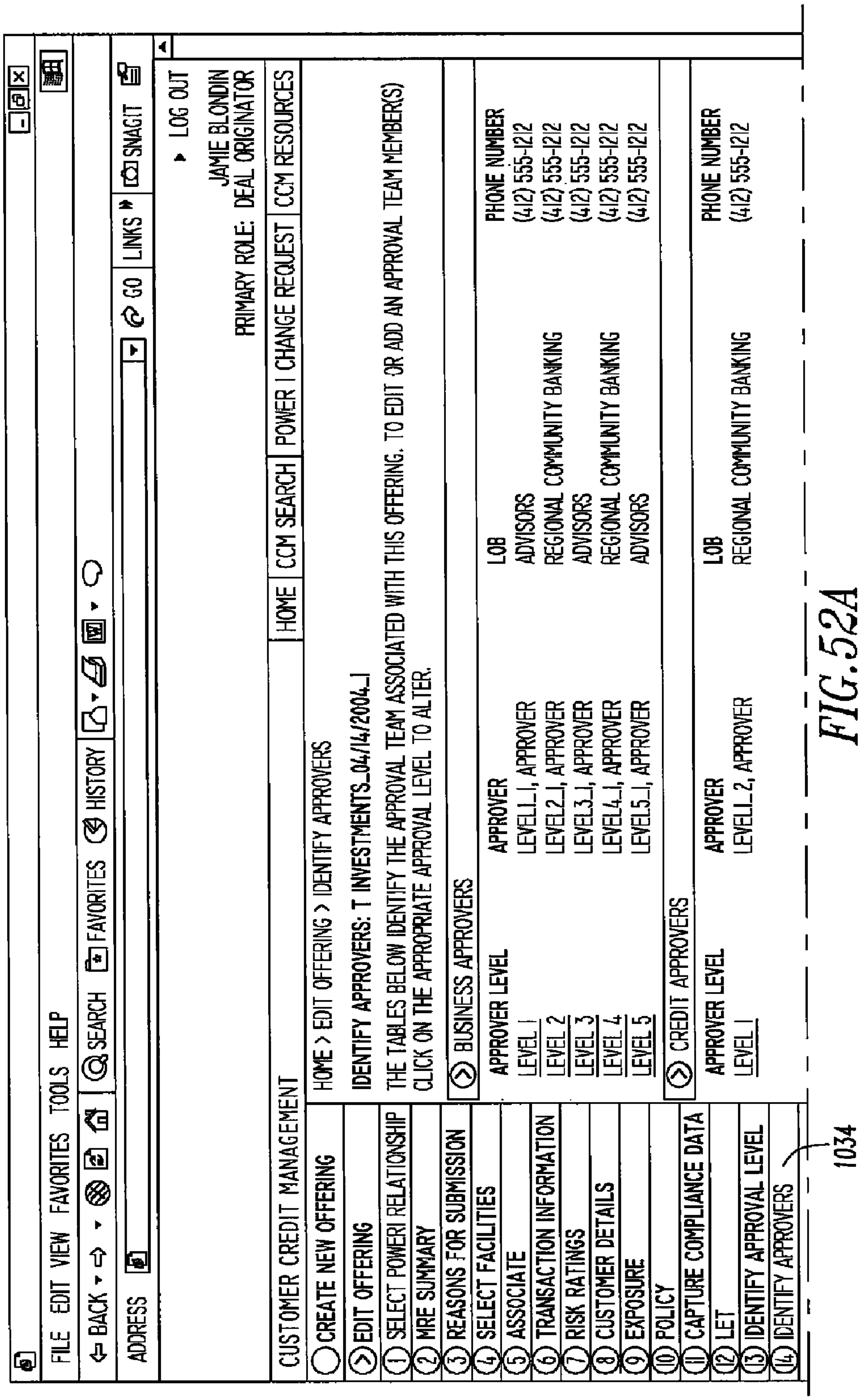
Figure 52B:
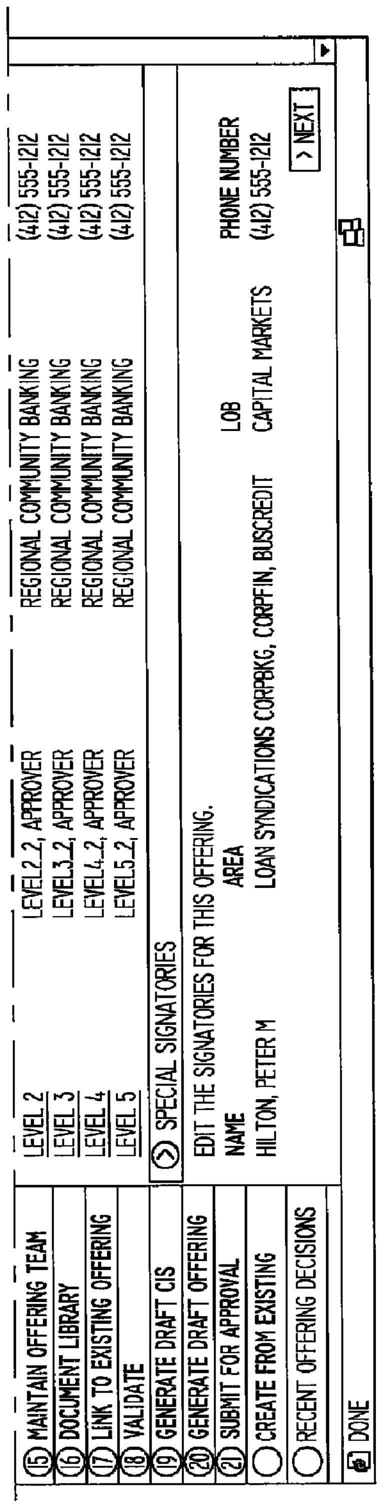
Figure 53A:
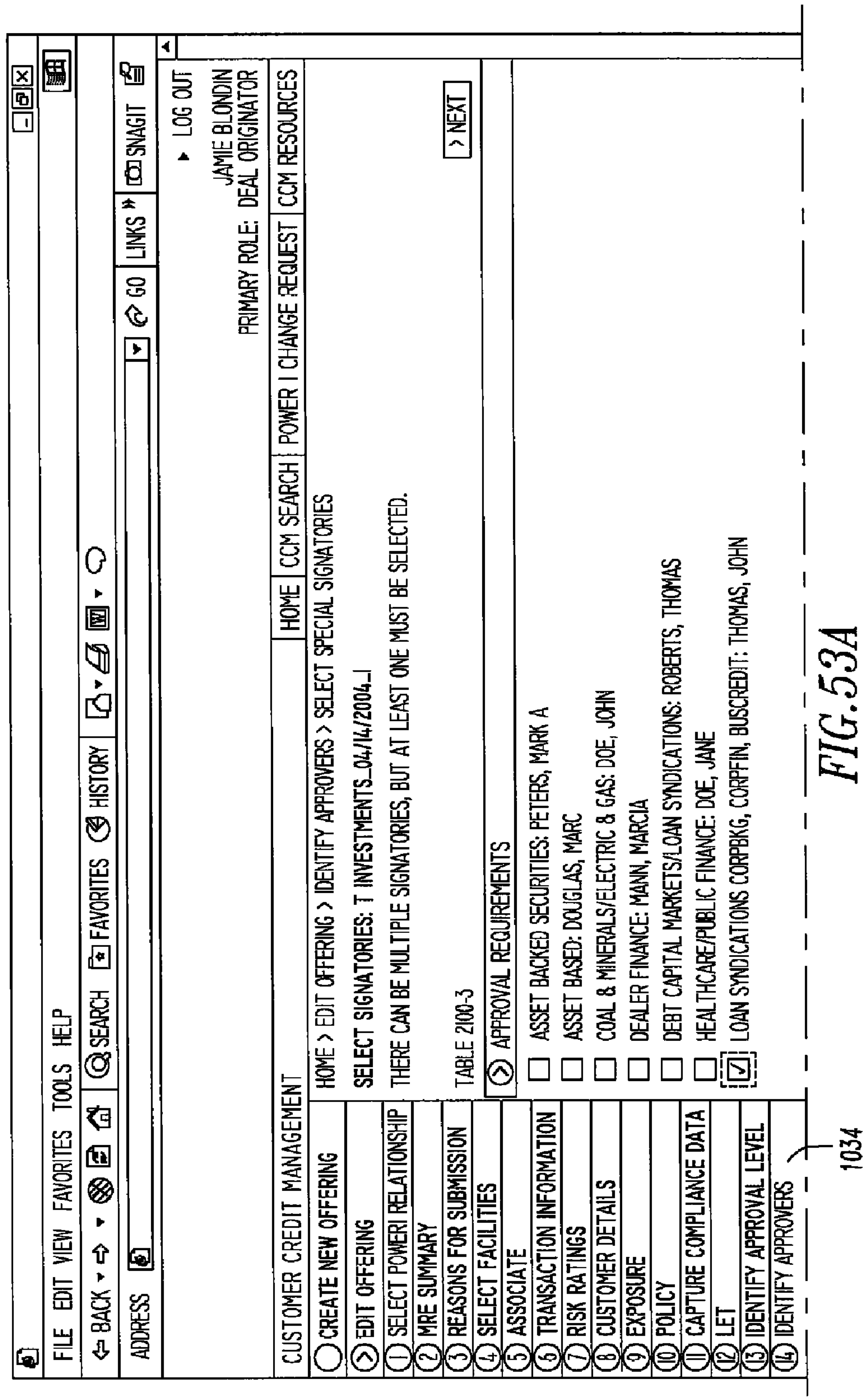
Figure 53B:
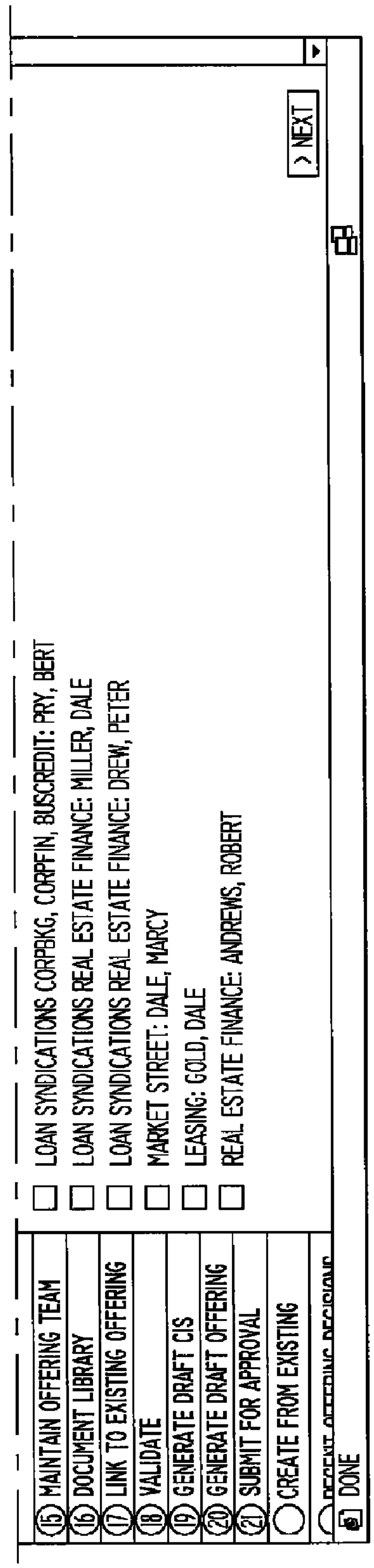
Figure 54A:
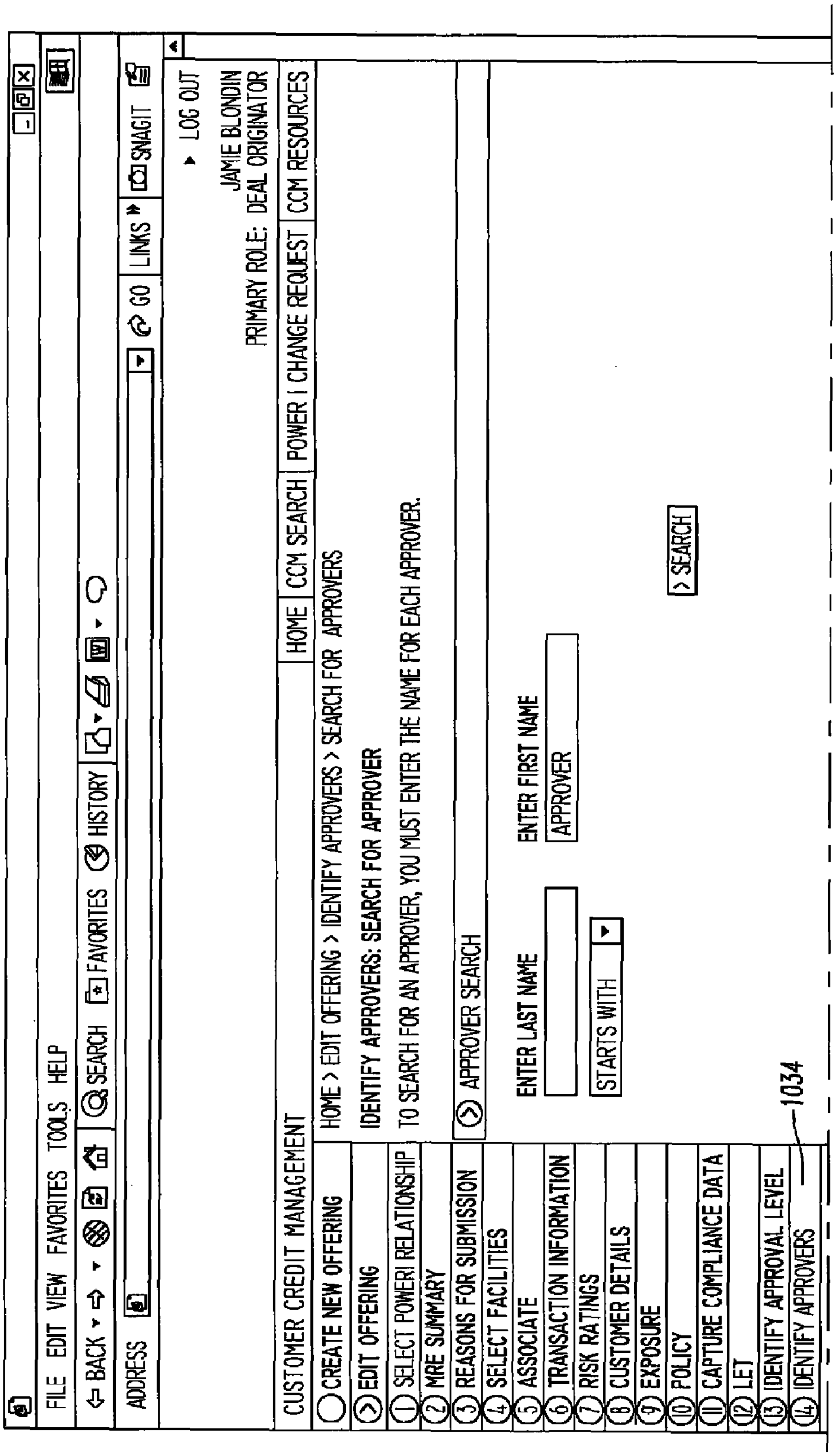
Figure 54B:
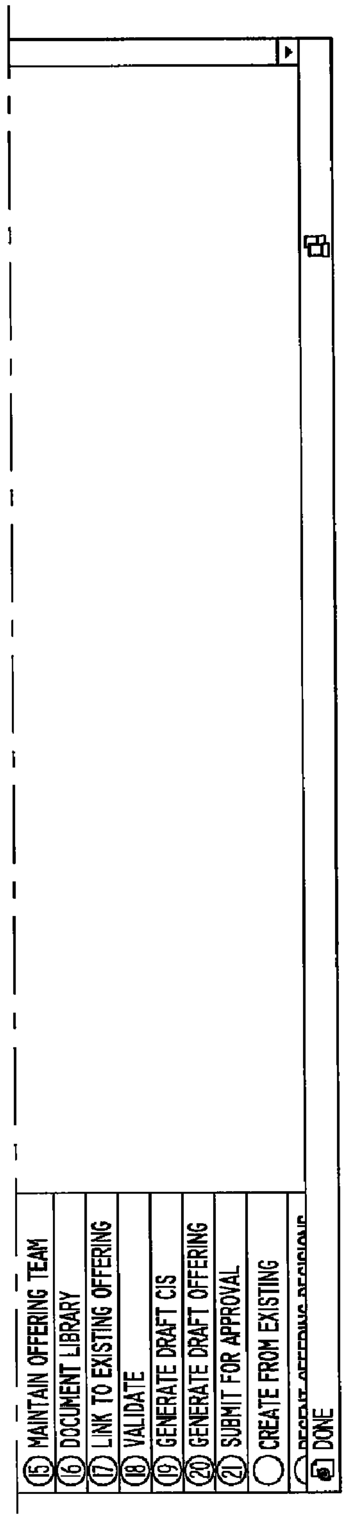
Figure 55A:
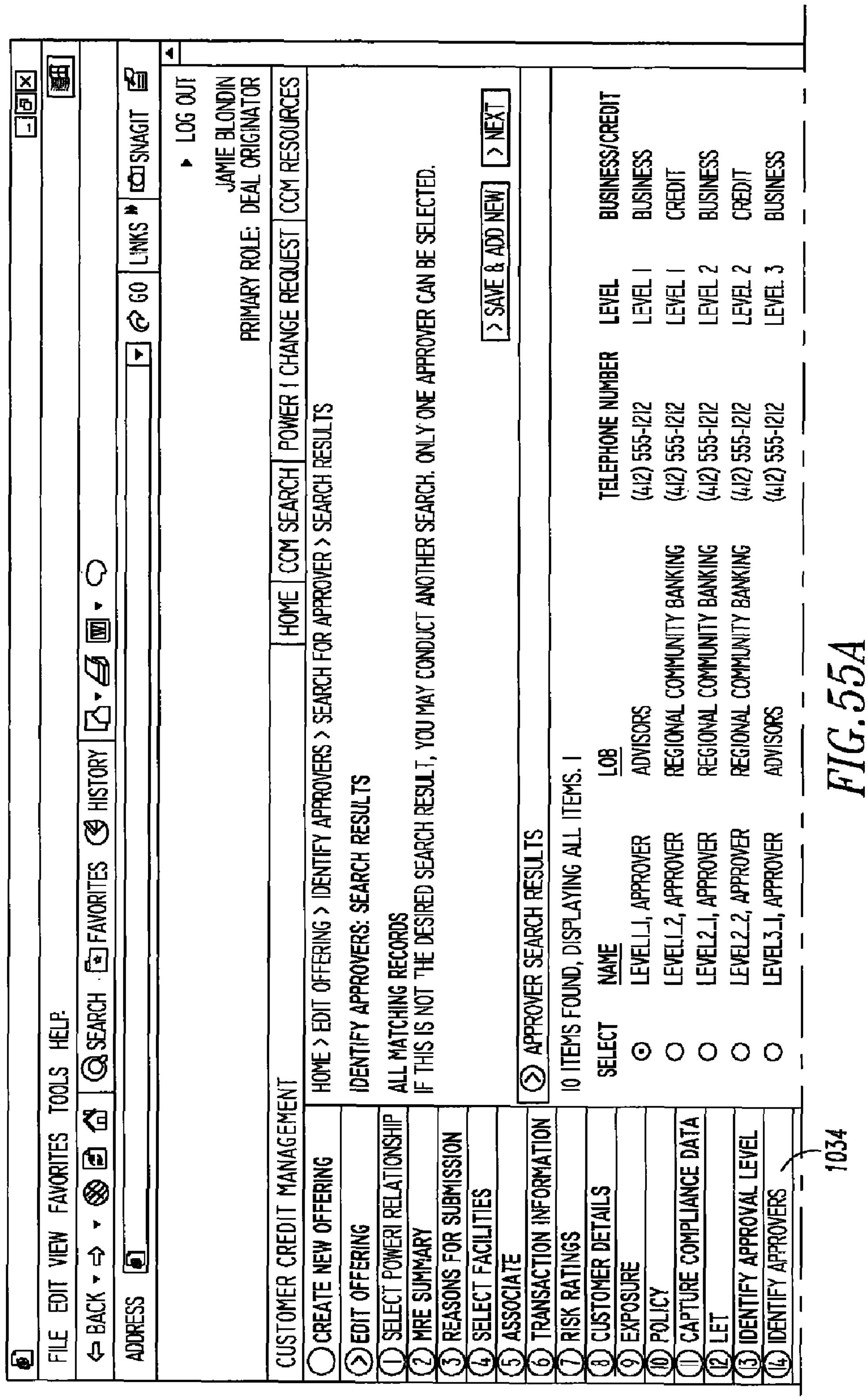
Figure 55B:
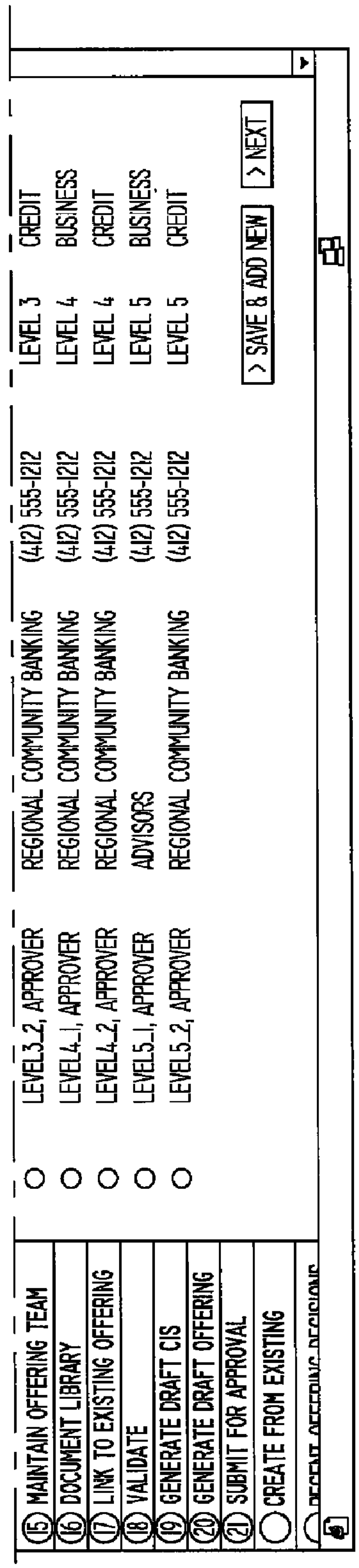
Figure 56A:
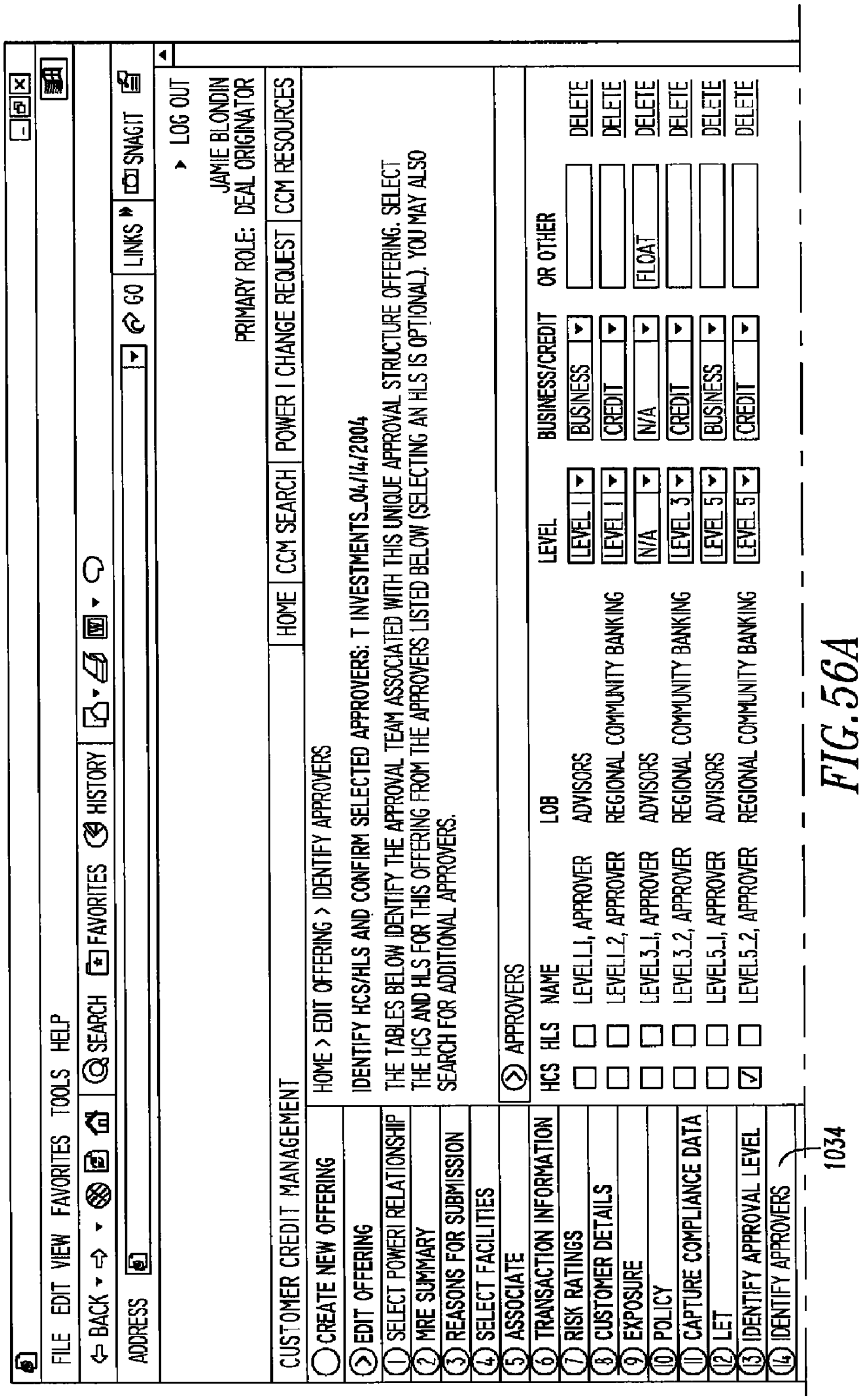
Figure 56B:
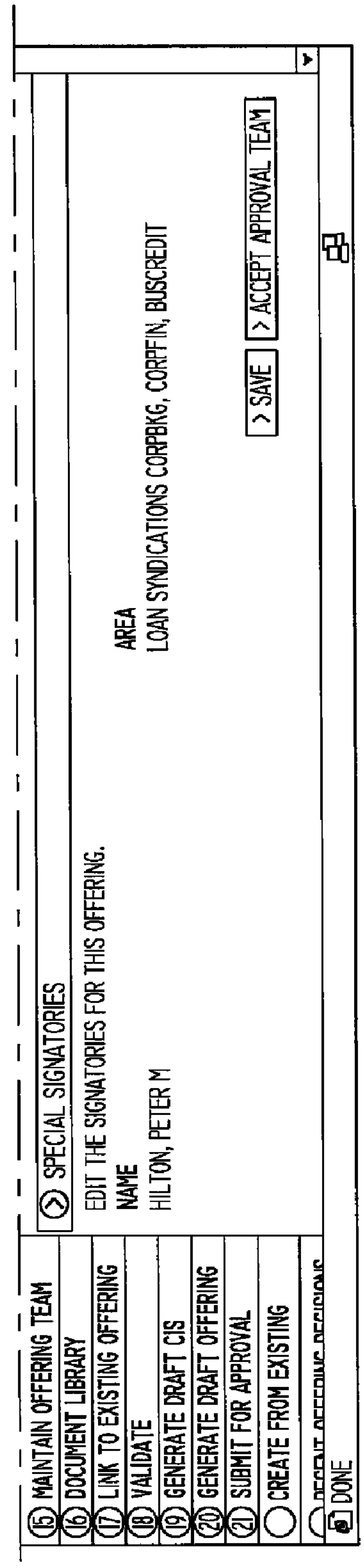

FIGS. 51A-51B also show the result of selecting the "identify approvers" tab 1034 (FIG. 51A) and is used to allow the user to select specialized signatories. FIGS. 52A-52B also show the result of selecting the "identify approvers" tab 1034 (FIG. 52A) and is used to allow the user to view and edit the approvers selected for an approval team. FIGS. 53A-53B show the result of selecting the "identify approvers" tab 1034 (FIG. 53A) and is used to allow the user to select specialized signatories. FIGS. 54A-54B also show the result of selecting the "identify approvers" tab 1034 (FIG. 54A) and is used to allow the user to search for approvers when a unique approval structure is selected and FIGS. 55A-55B show the results of the search from FIGS. 54A-54B. In FIGS. 56A-56B, the user can confirm selected "highest credit signatory" and "highest line signatory." The system also provides the capability for users with edit rights to designate alternate approvers.

Figure 57A:
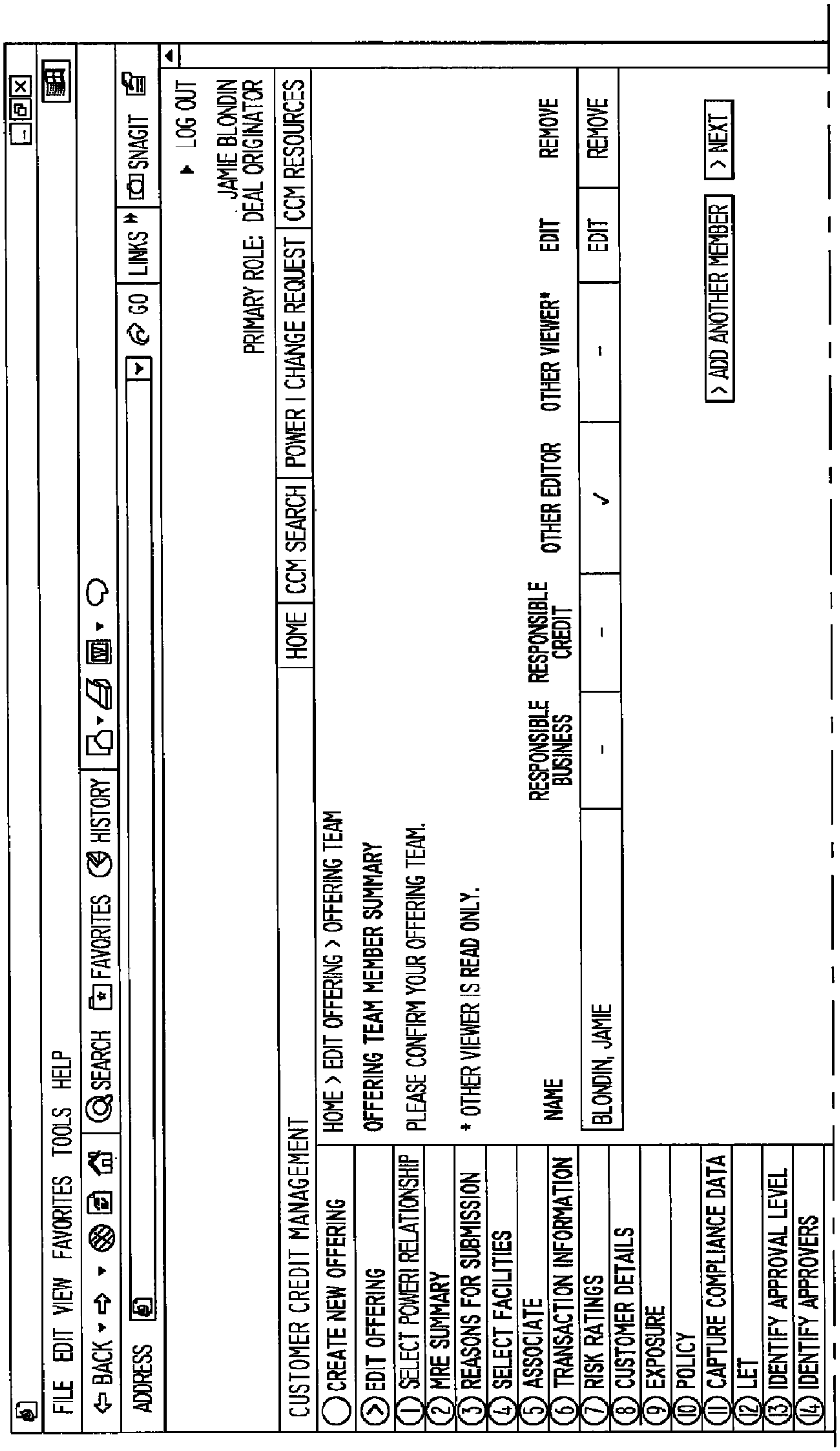
Figure 57B:
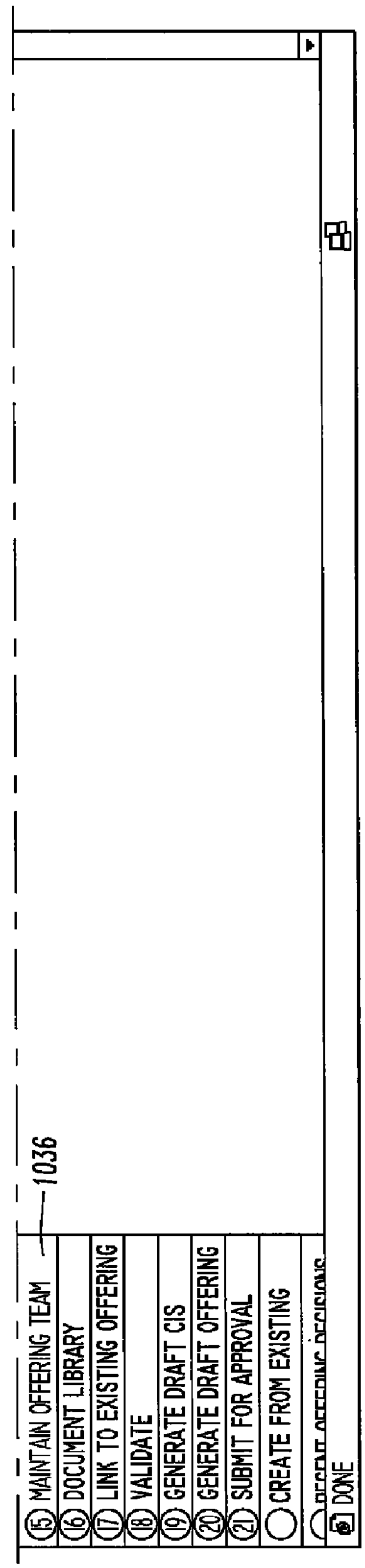
Figure 58A:
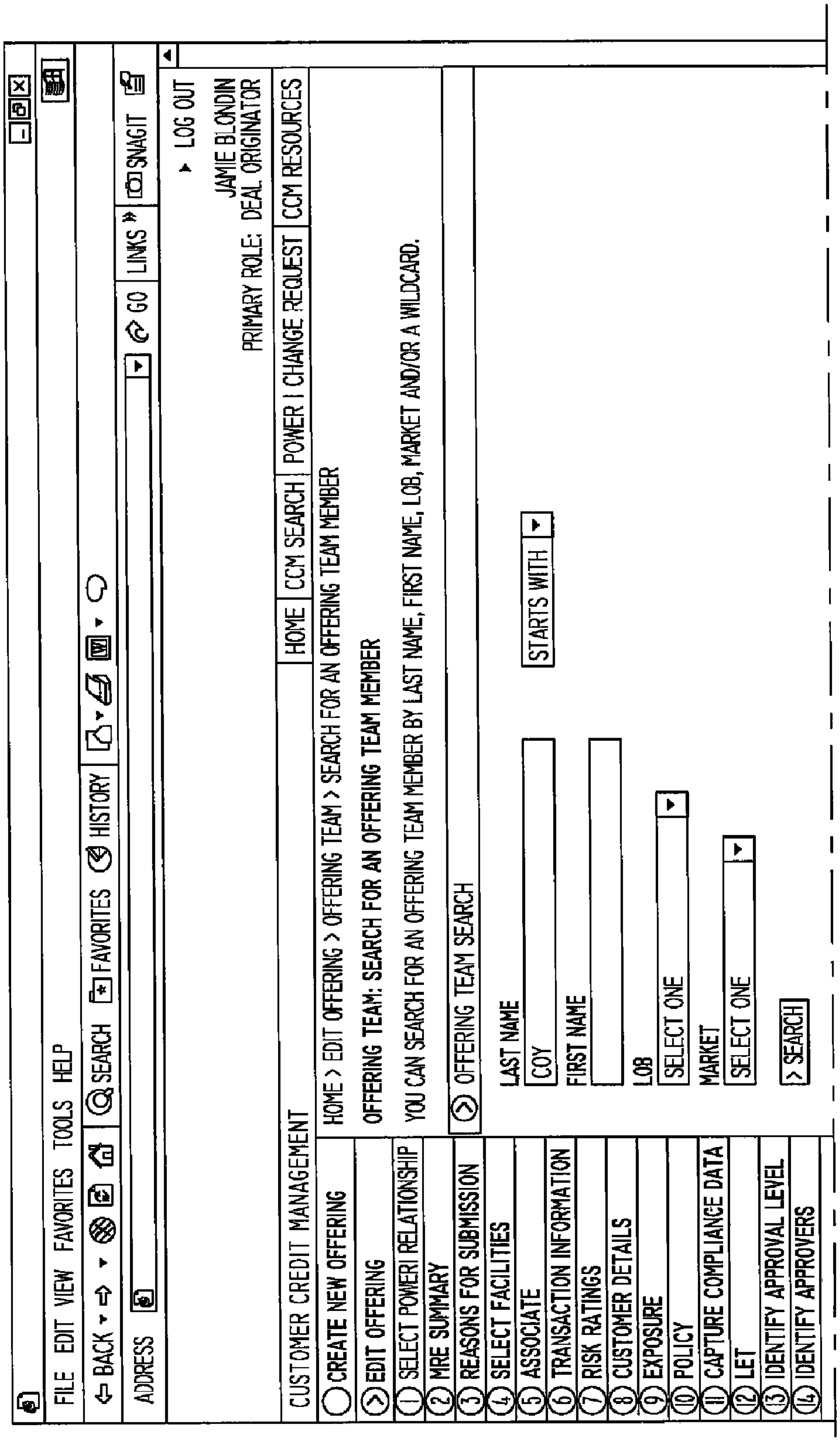
Figure 58B:
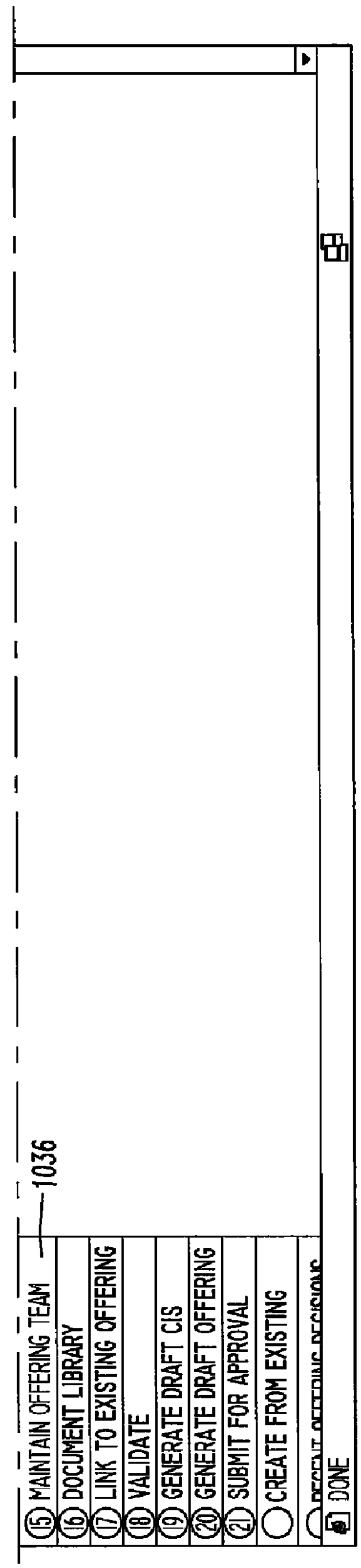
Figure 59A:
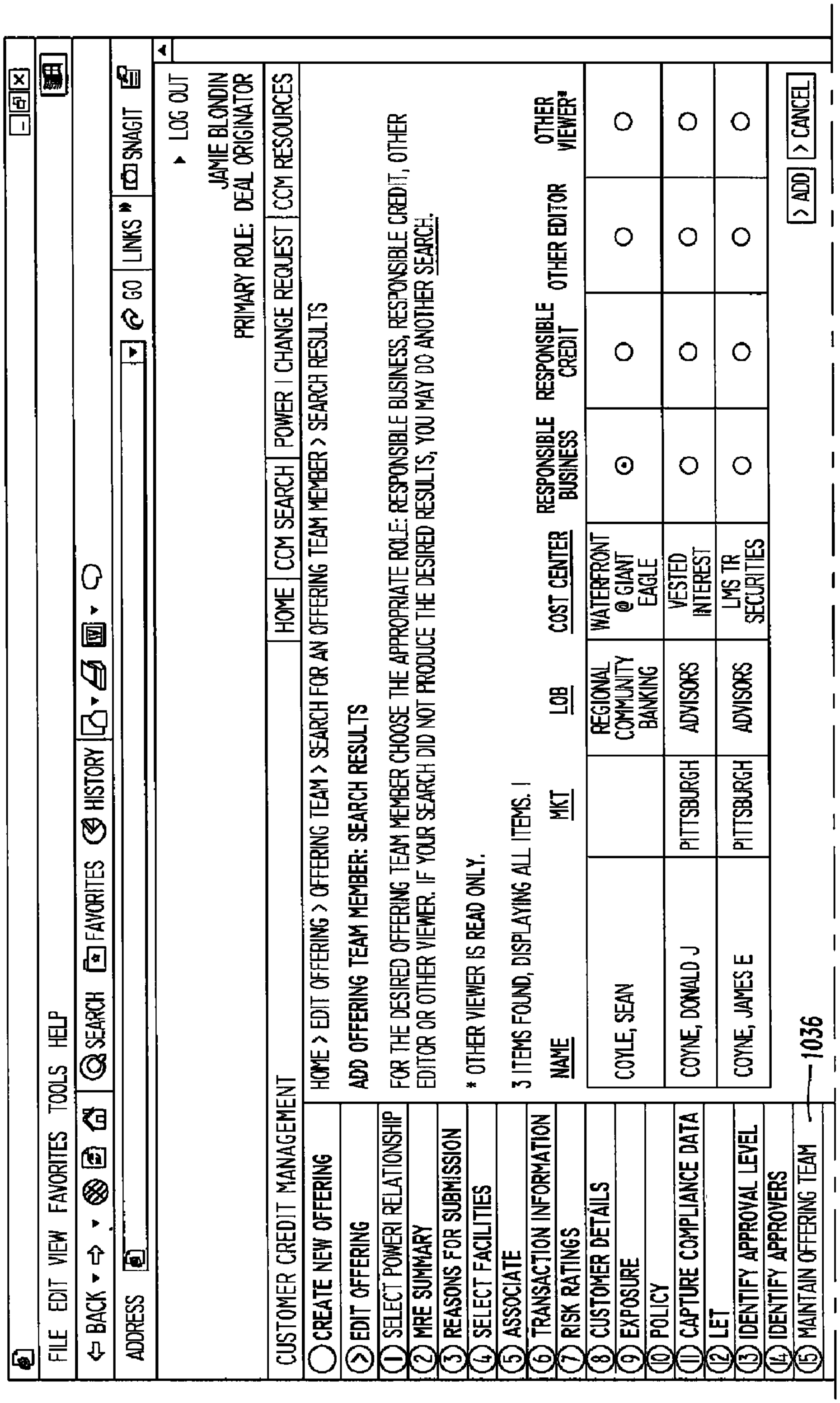
Figure 59B:
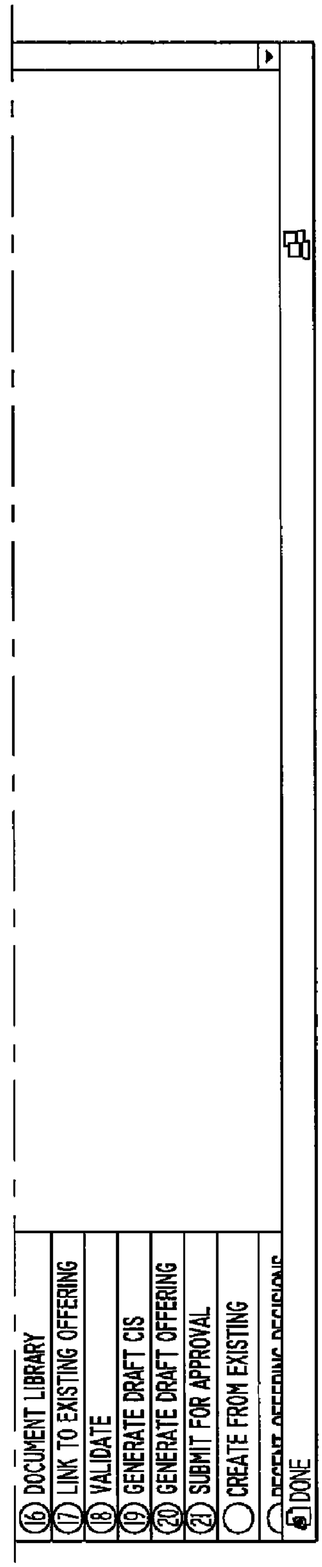
Figure 60A:
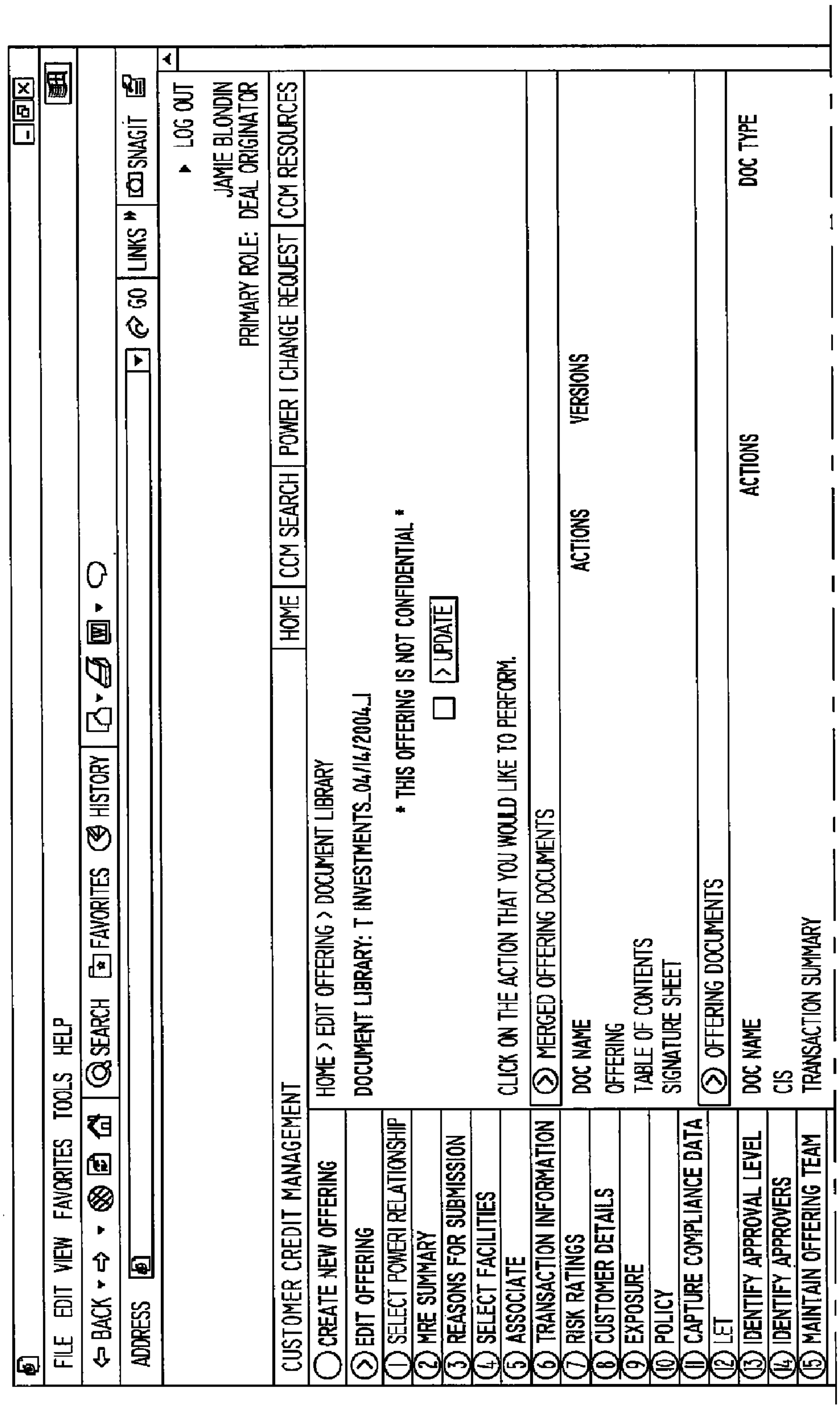
Figure 60B:
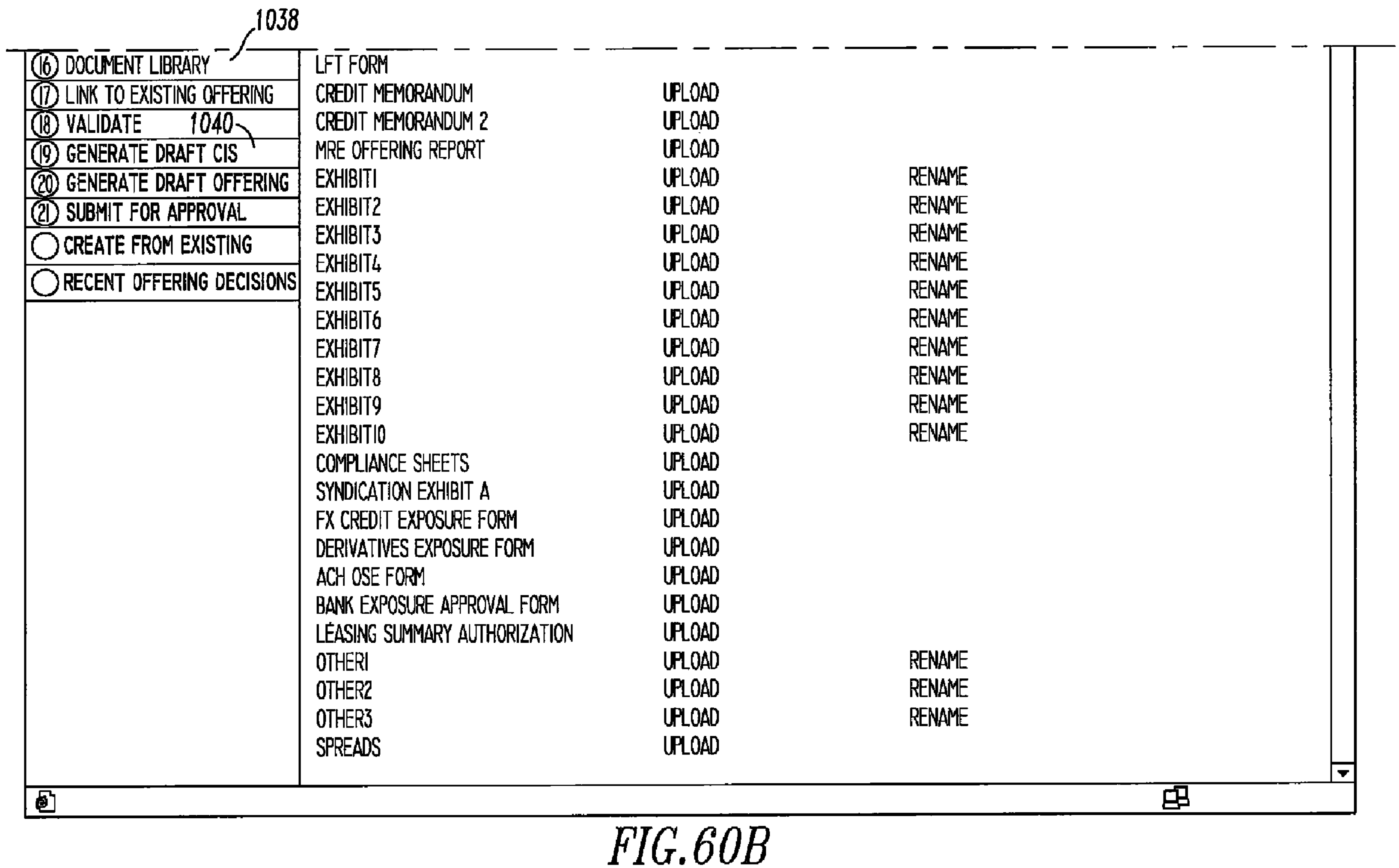

FIGS. 57A-57B show the result of selecting the "maintain offering team" tab 1036 (FIG. 57B) and is used to allow the user to designate who has access to the offering for editing and viewing purposes. FIGS. 58A-58B also show the result of selecting the "maintain offering team" tab 1036 (FIG. 58B) and is used to allow the user to search for an offering team member, and FIGS. 59A-59B shows the results of the search from FIGS. 58A-58B. FIGS. 60A-60B show the result of selecting the "document library" tab 1038 (FIG. 60B). The document library may be resident on, for example, the database 208 (FIG. 16) and may be the central repository to manage documents related to offerings.

Figure 61:
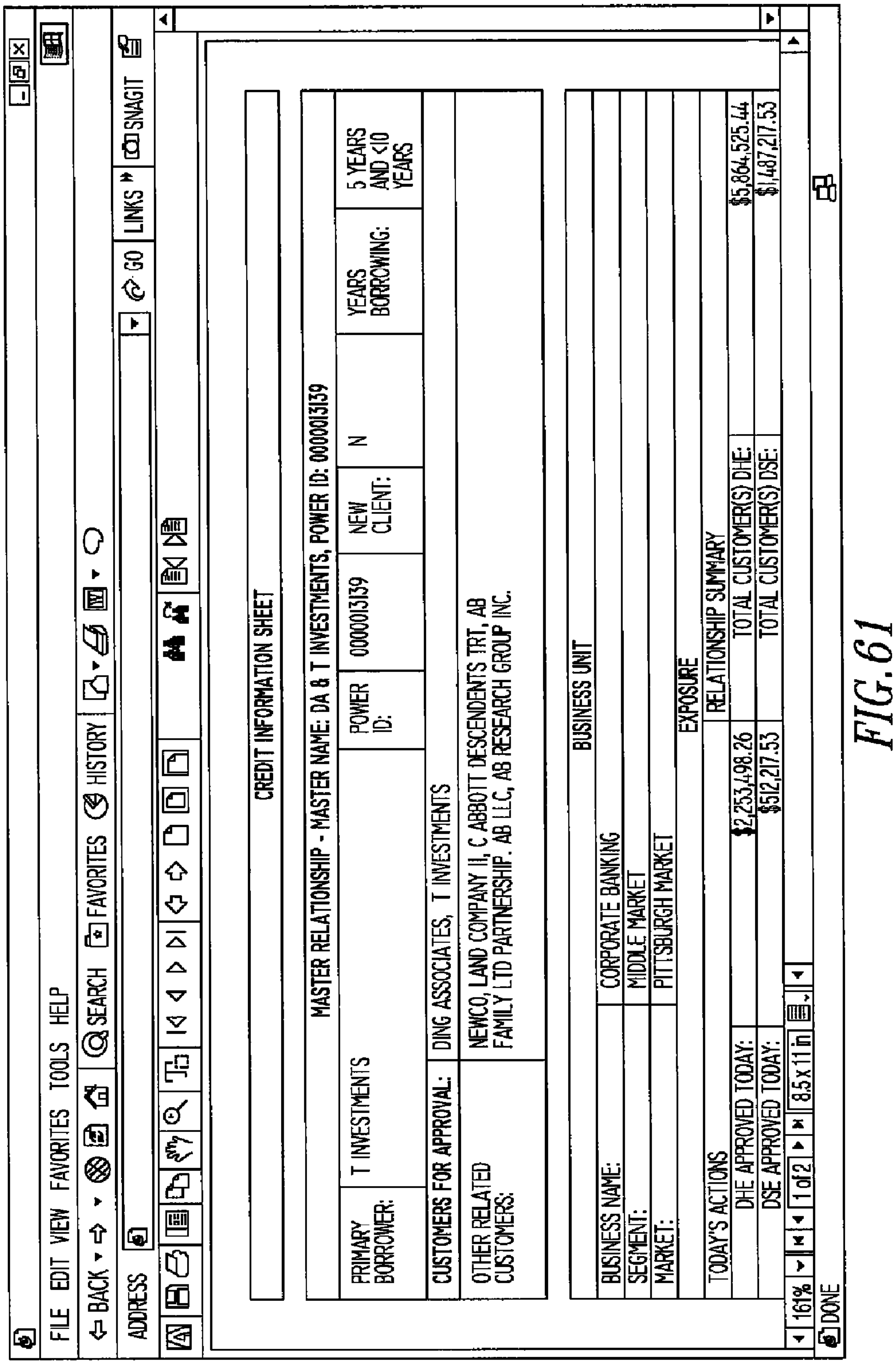
Figure 62A:
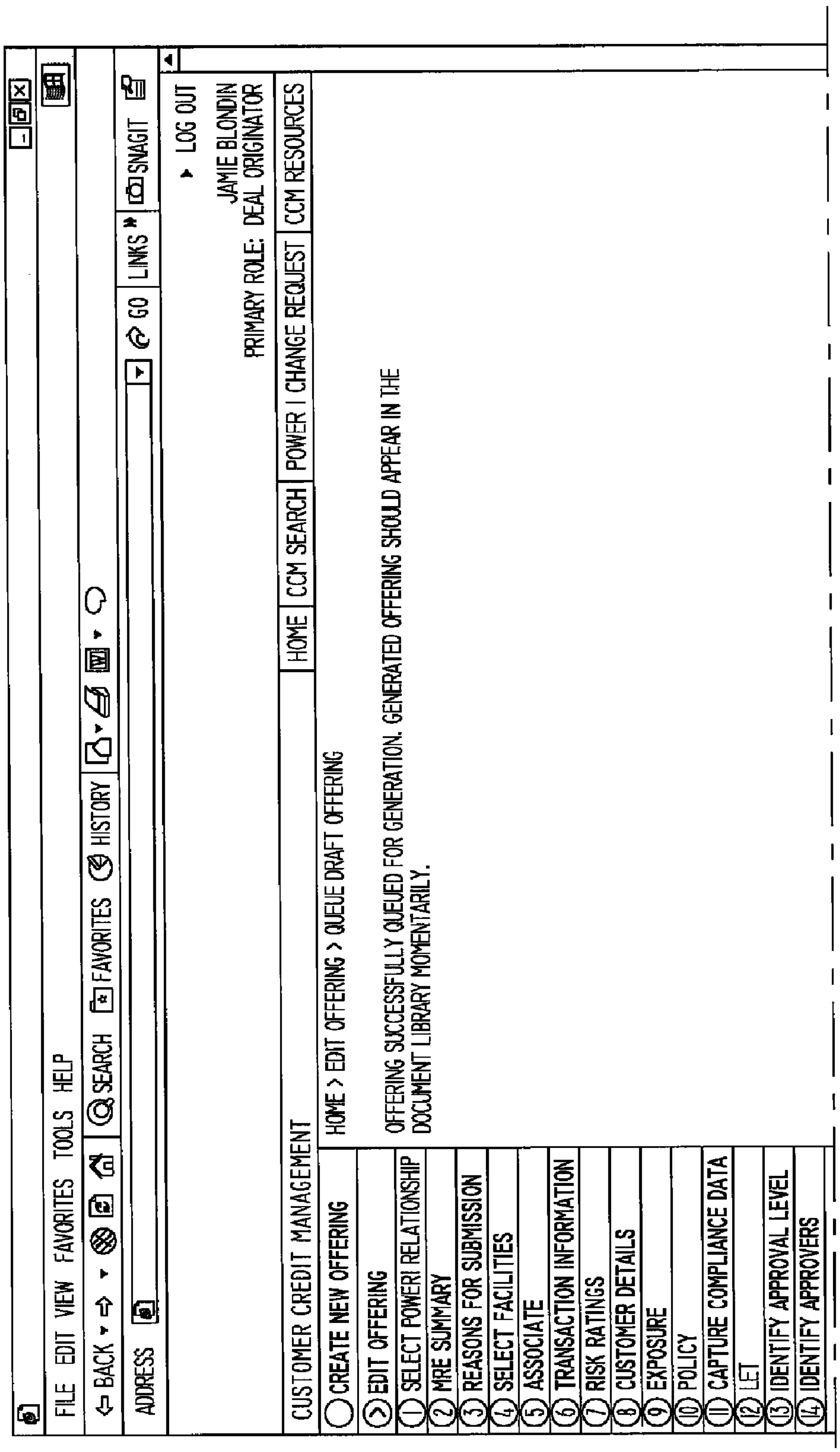
Figure 62B:
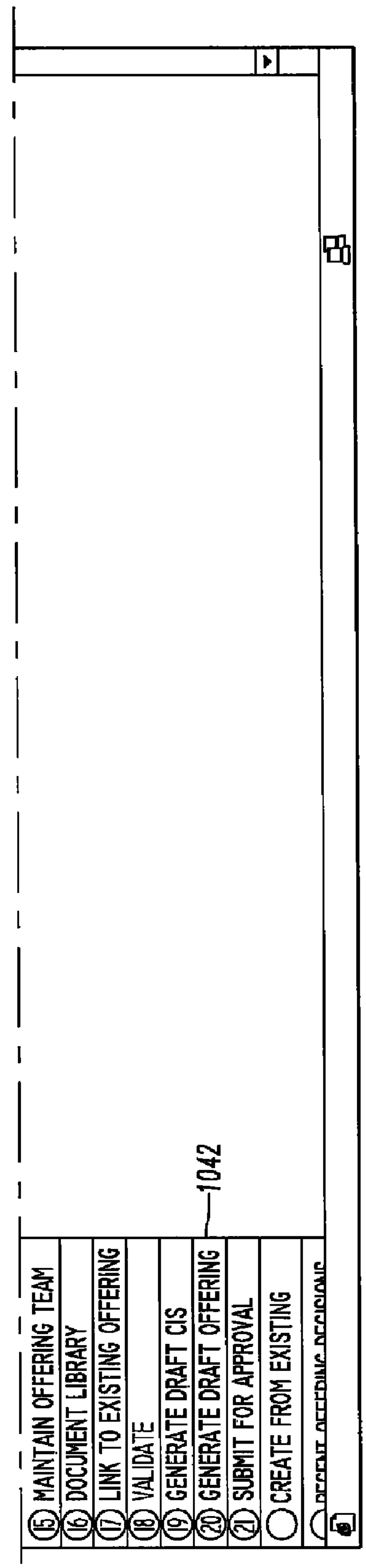

FIG. 61 shows the results of selecting the "generate draft CIS" tab 1040 (FIG. 60B) and is used to display a customer information sheet (CIS) based on the date available in the system. FIGS. 62A-62B show the results of selected the "generate draft offering" tab 1042 (FIG. 62B) and allows the user to generate a draft offering to review prior to submission for approval.

Figure 63:
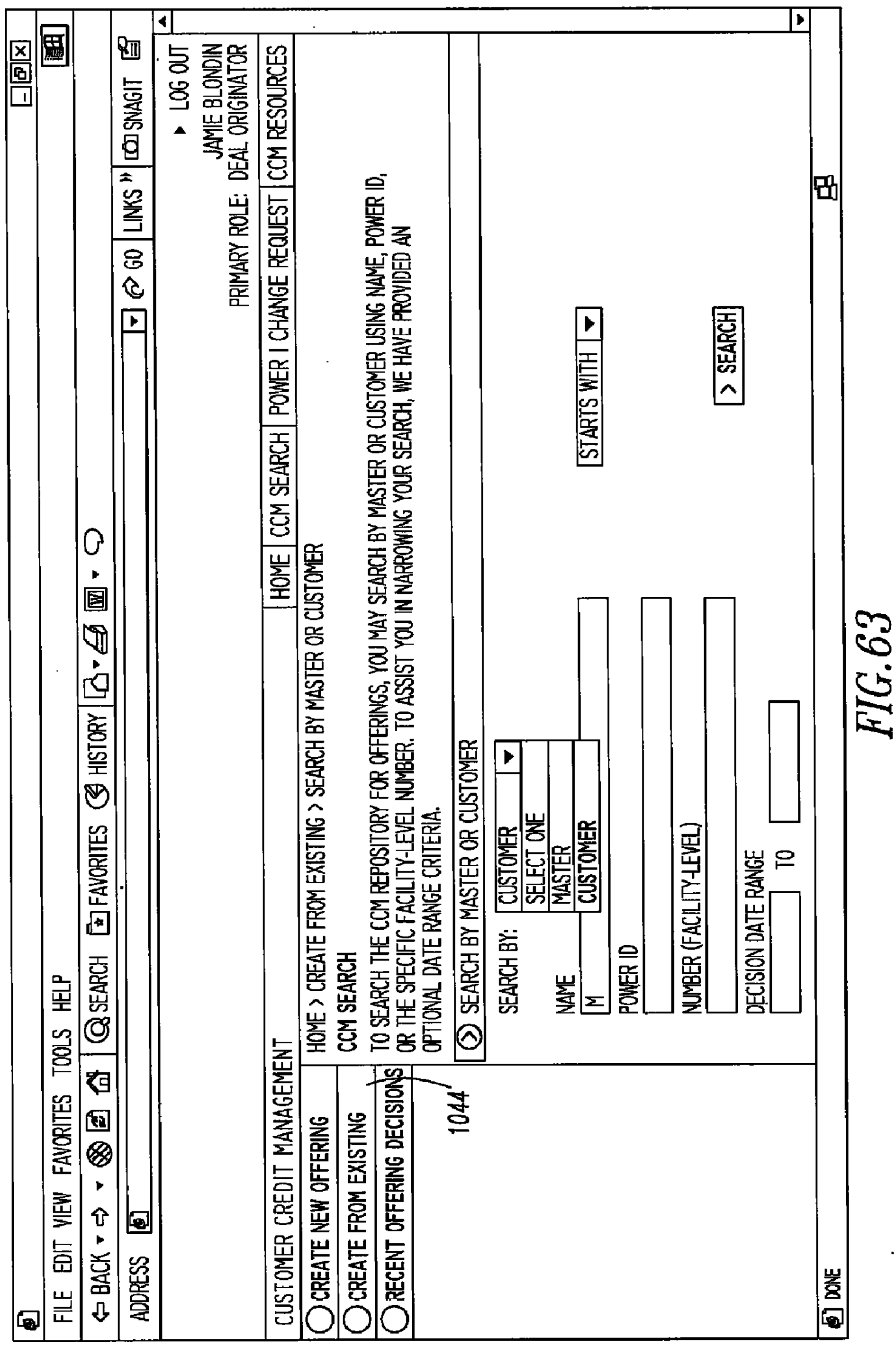
Figure 64:
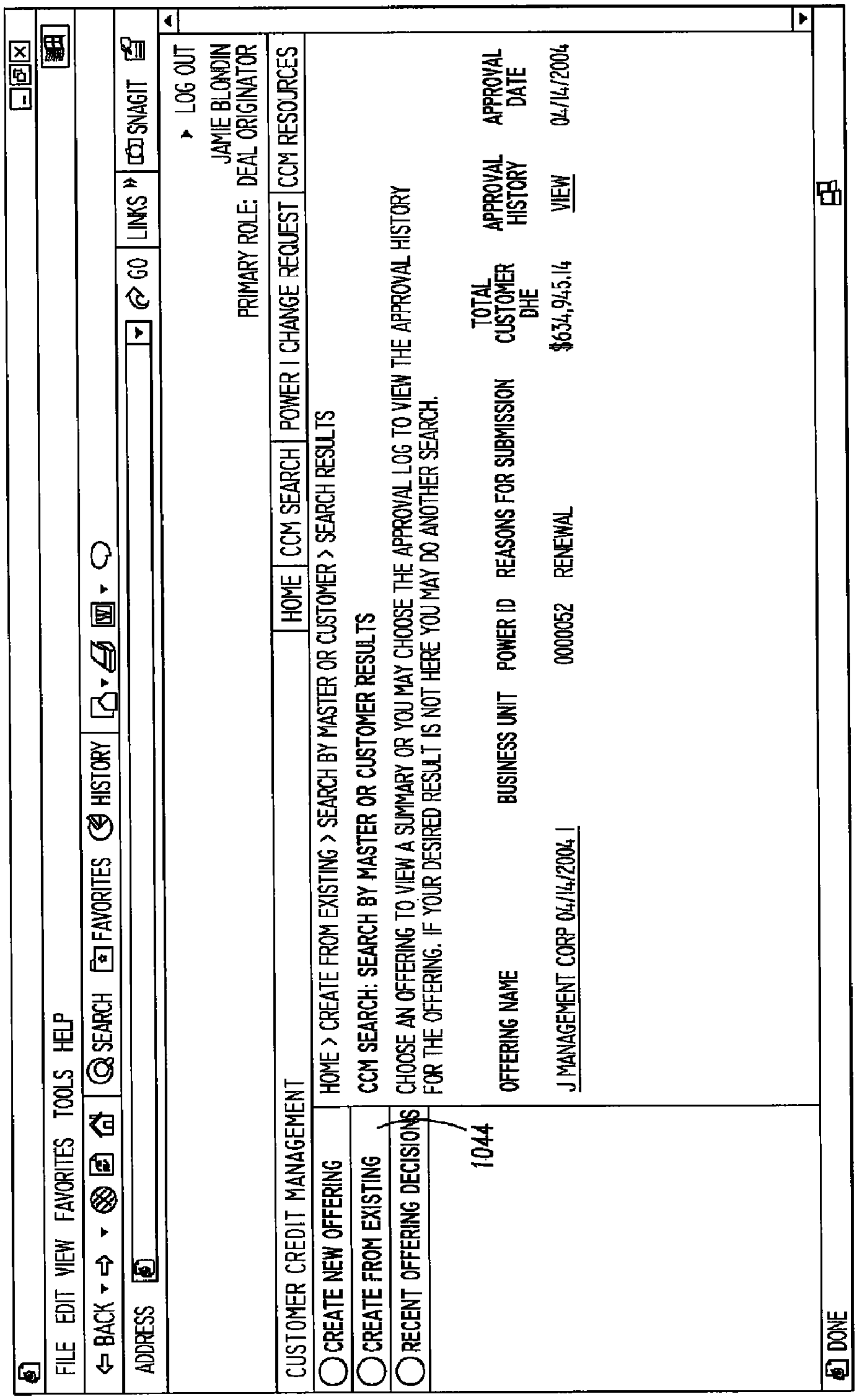
Figure 65A:
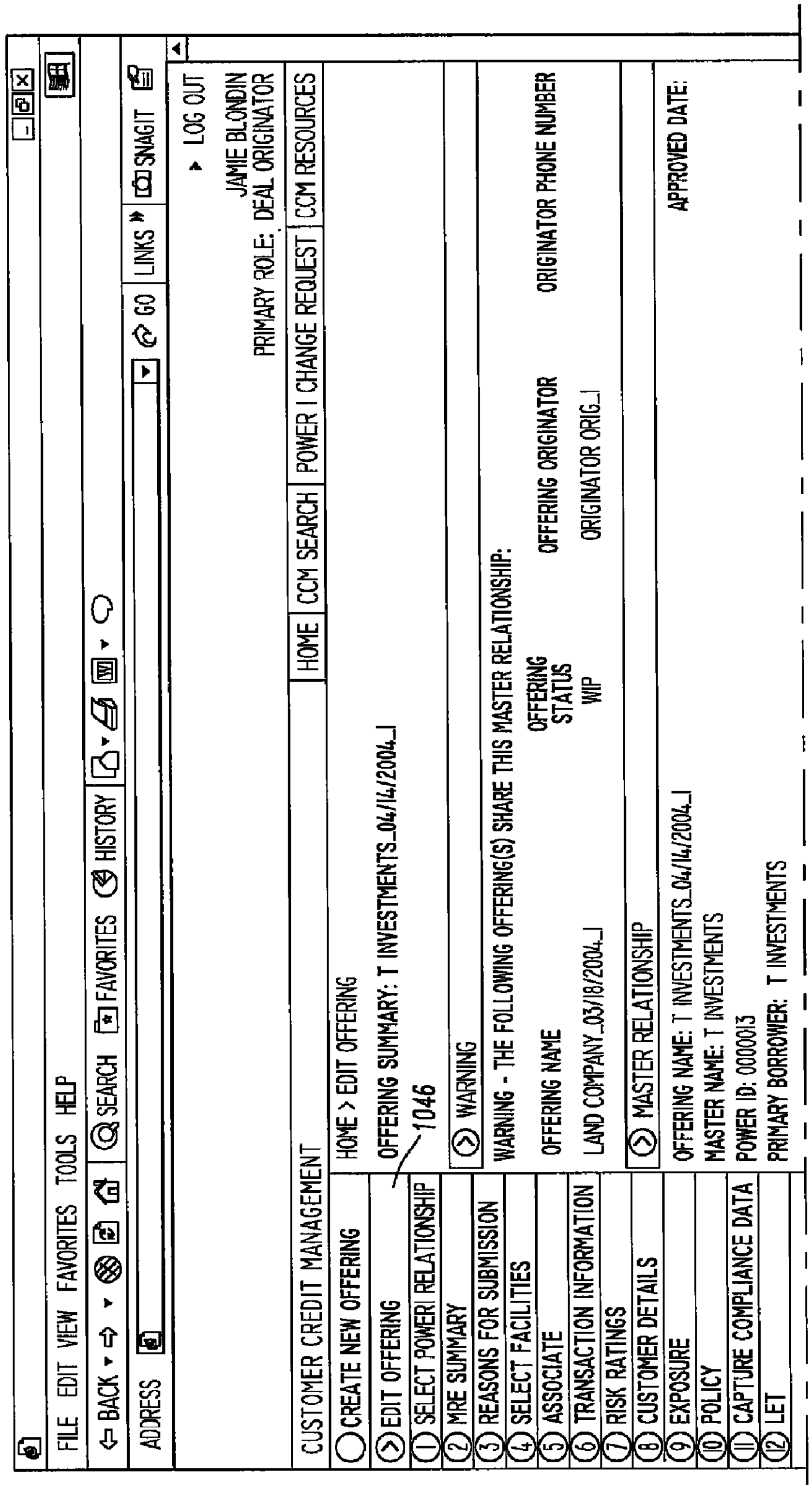
Figure 65B:
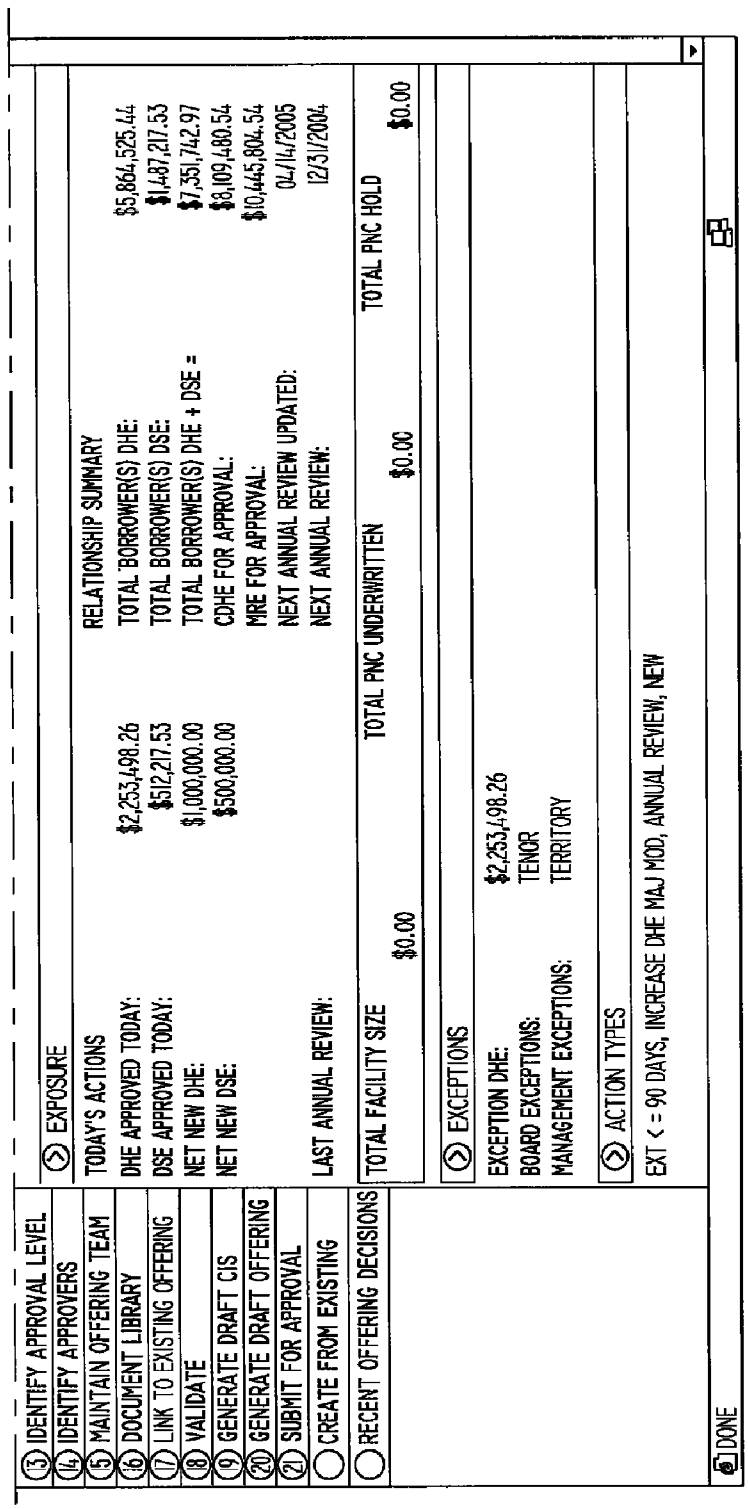

FIG. 63 shows the results of selecting the "create from existing" tab 1044 that enables the user to leverage information from a previously approved offering to create a new offering and FIG. 64 shows search results for existing offerings. FIGS. 65A-65B shows an offering summary that is obtained by selecting the "edit offering" tab 1046 (FIG. 65A) and presents a high-level overview of the offering.

Figure 66A:
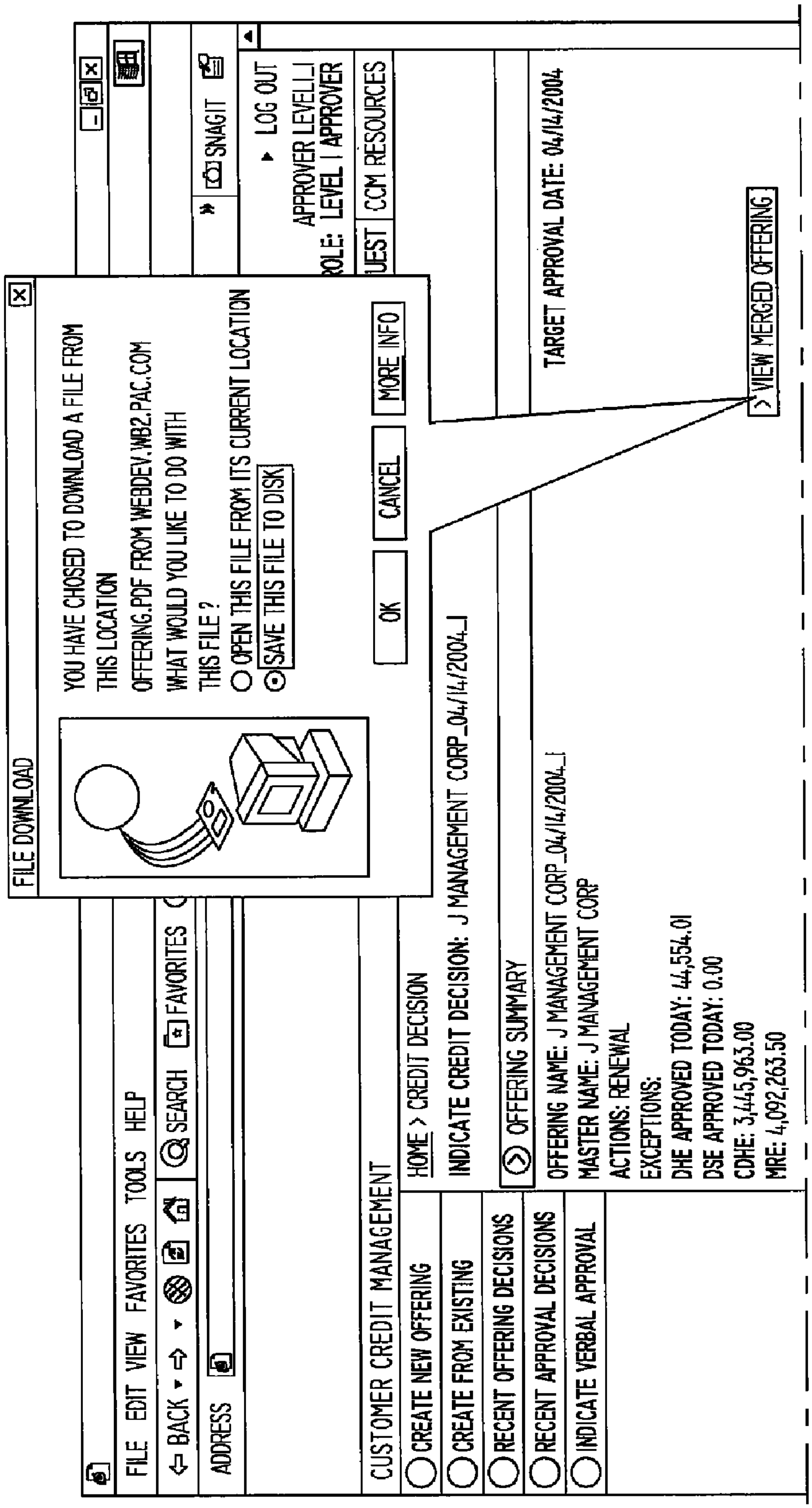
Figure 66B:
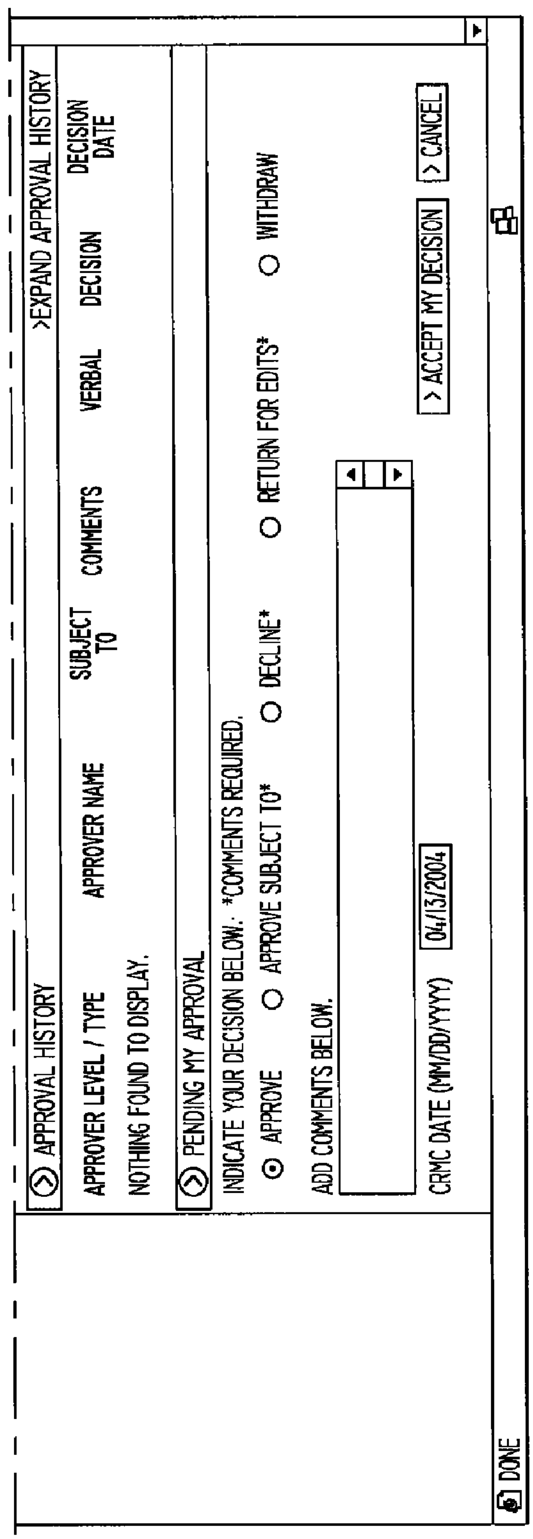
Figure 67:
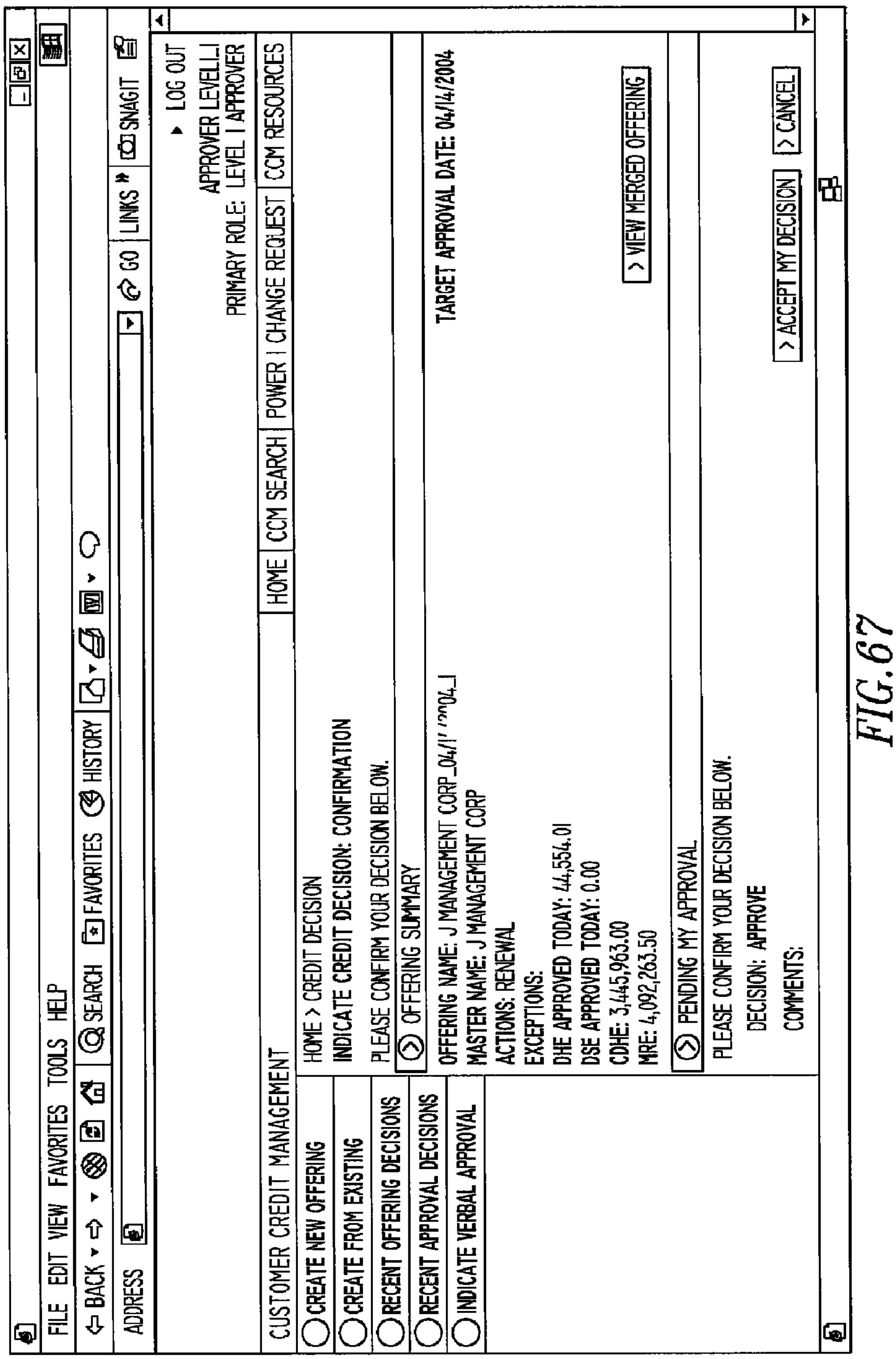
Figure 68A:
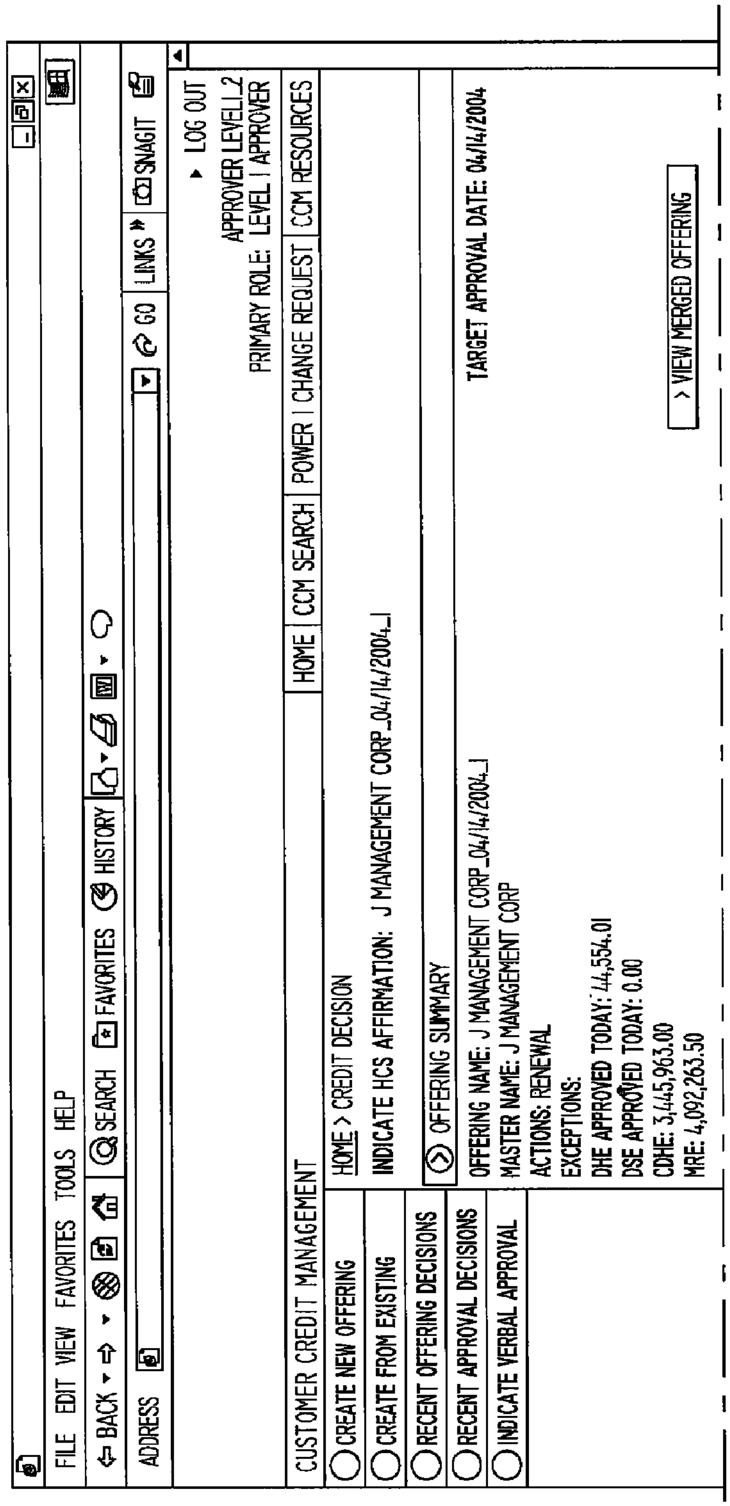
Figure 68B:
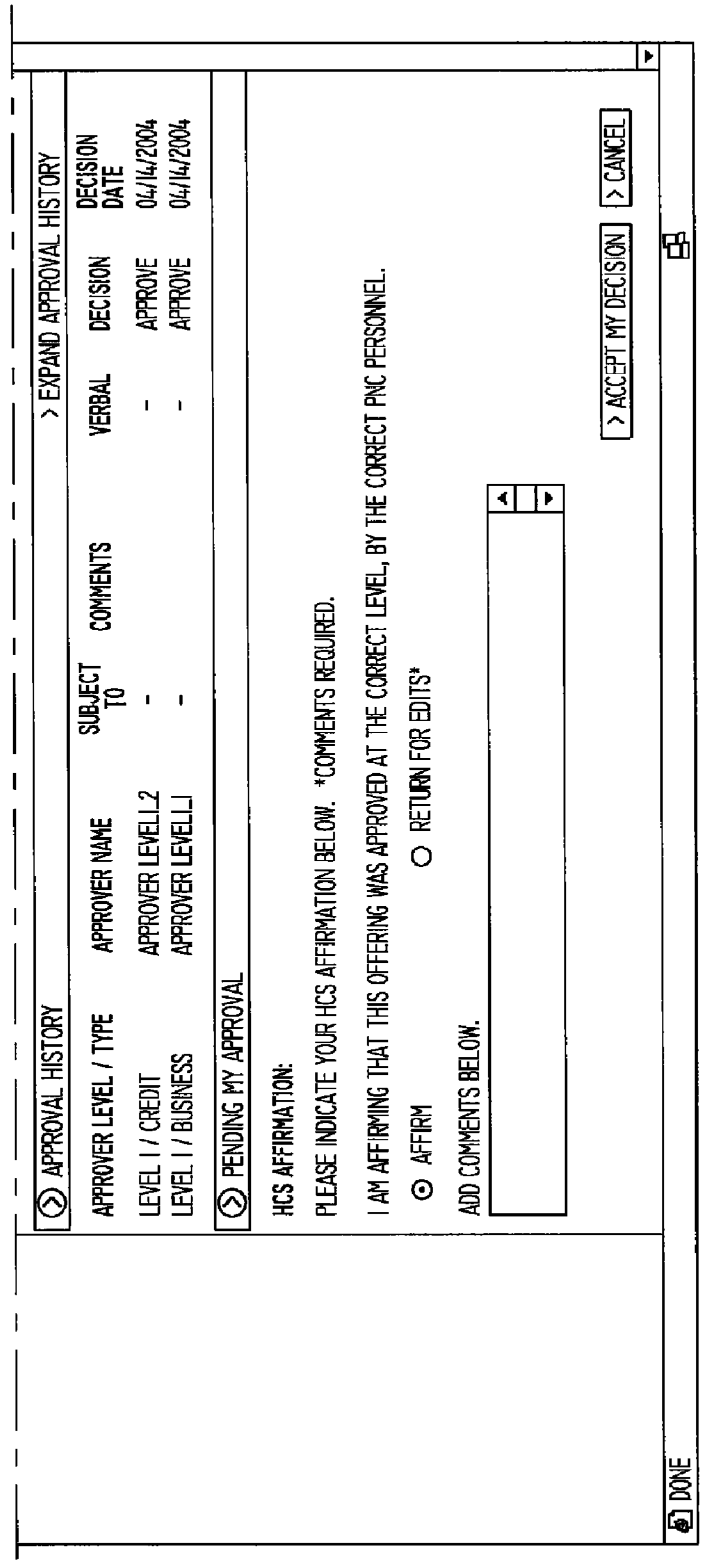
Figure 69:
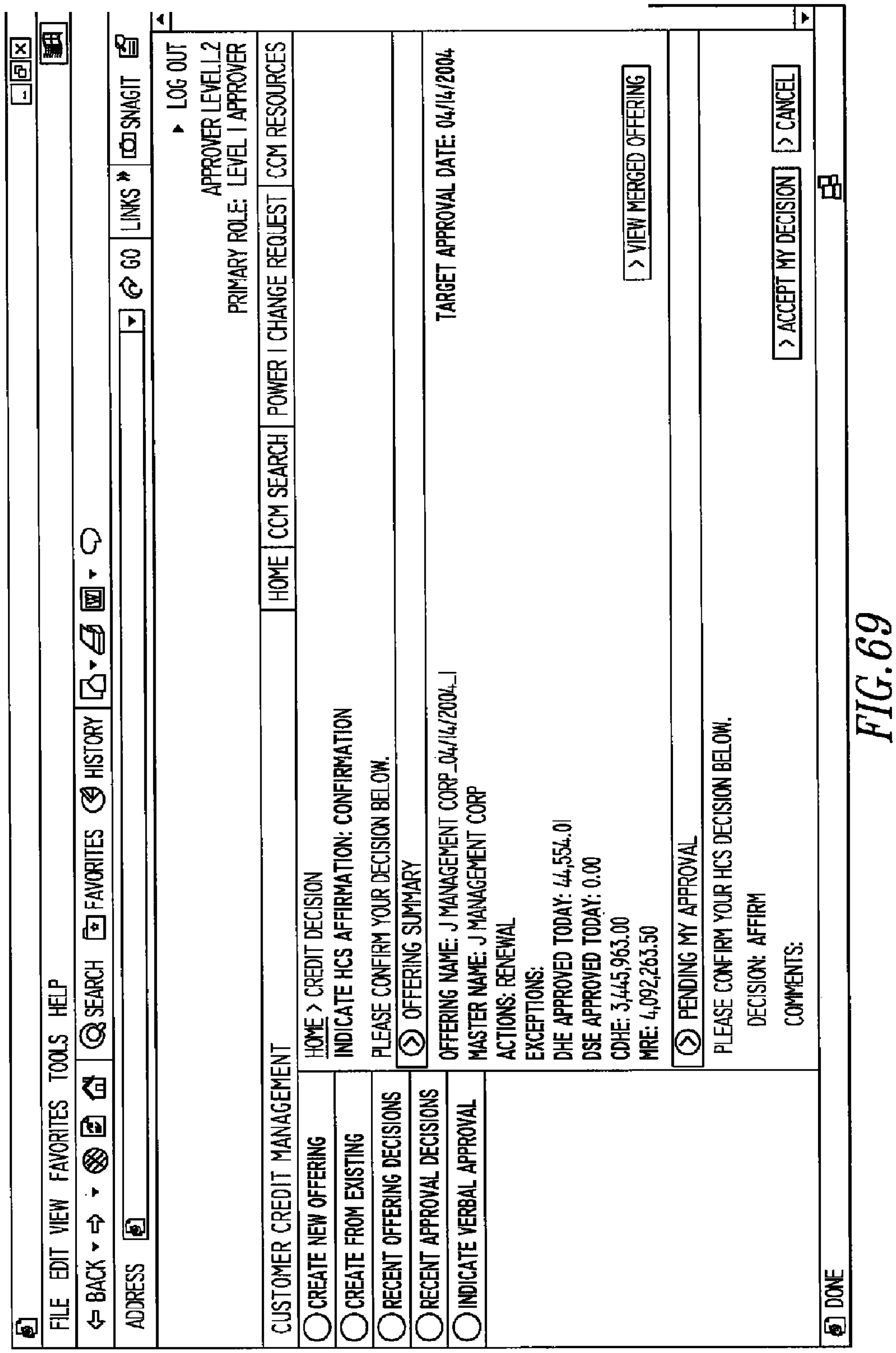

FIGS. 66A-66B show a screen from which approvers may access credit decision screens. FIG. 67 shows a screen on which an approver may review and confirm a credit decision and FIGS. 68A-68B show a screen on which the highest credit signatory (HCS) affirms that the offering was assigned at the correct approval level and that all required signatures were received. FIG. 69 enables the user to review the HCS affirmation decision.

Figure 70:
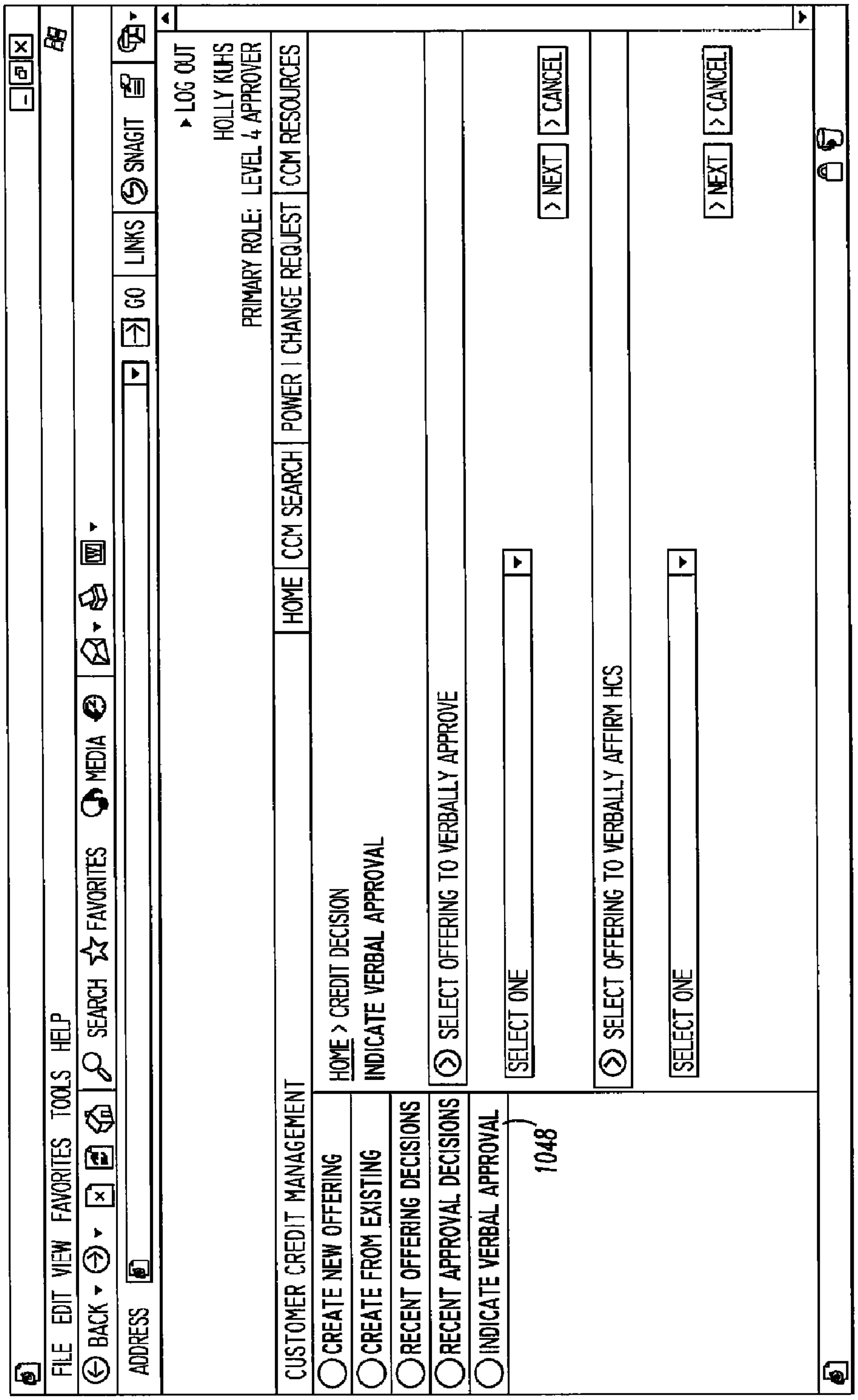
Figure 71A:
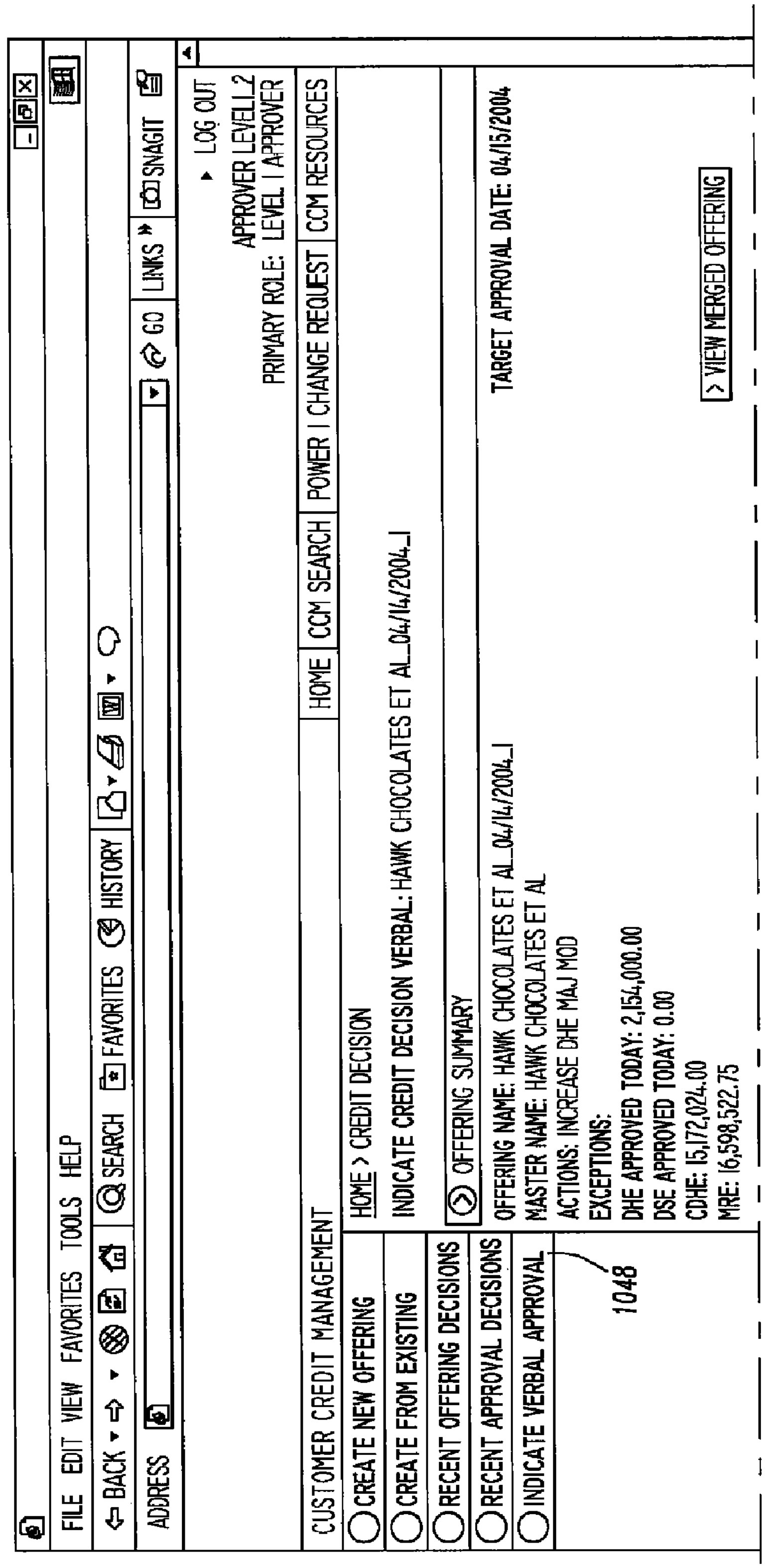
Figure 71B:
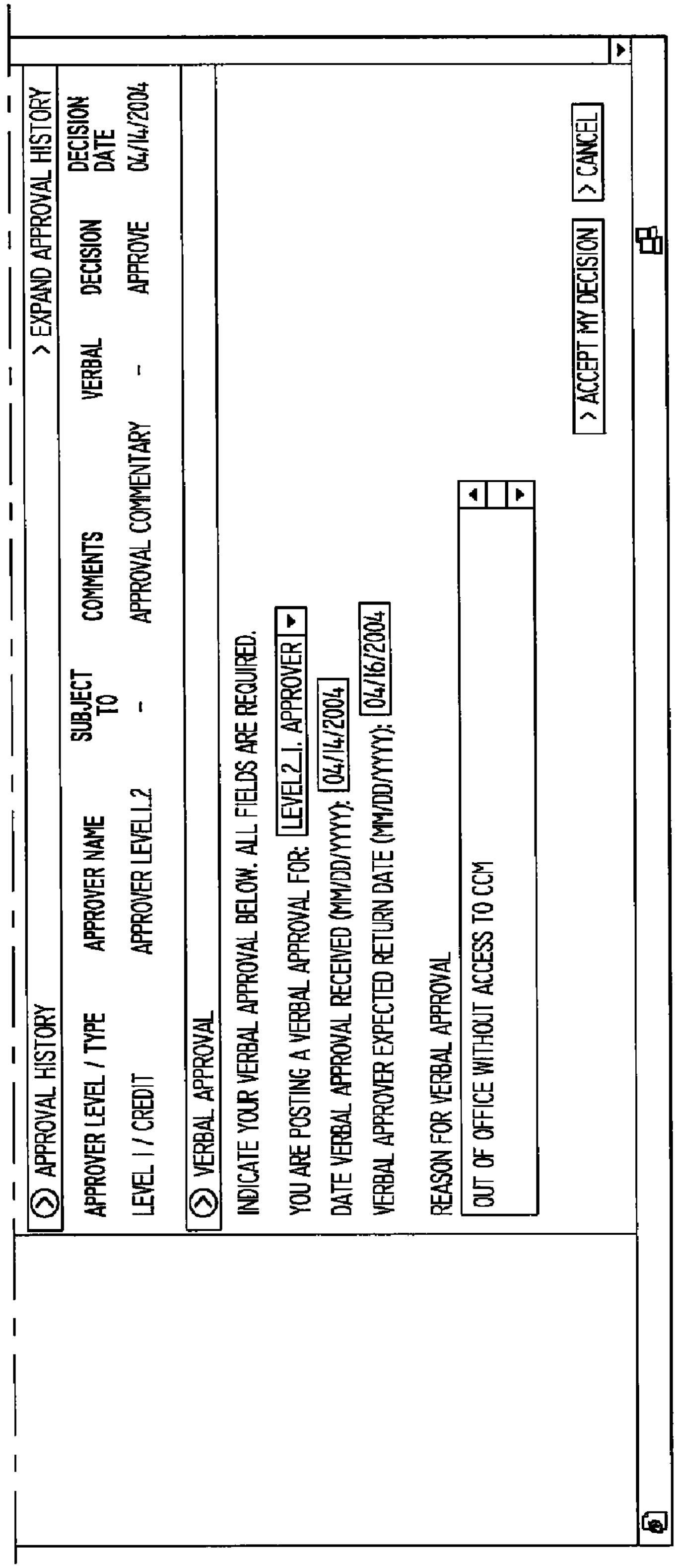
Figure 72A:
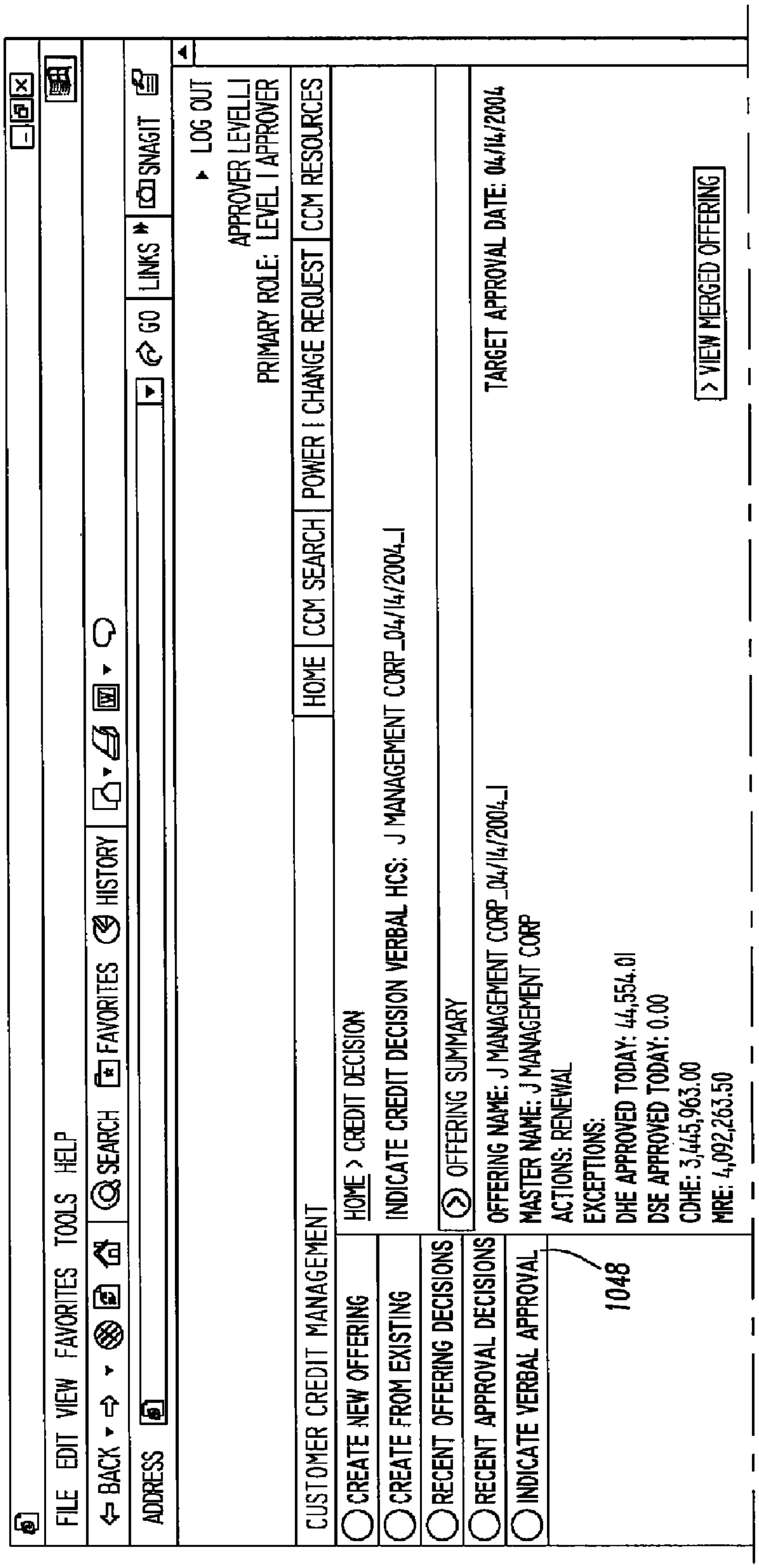
Figure 72B:
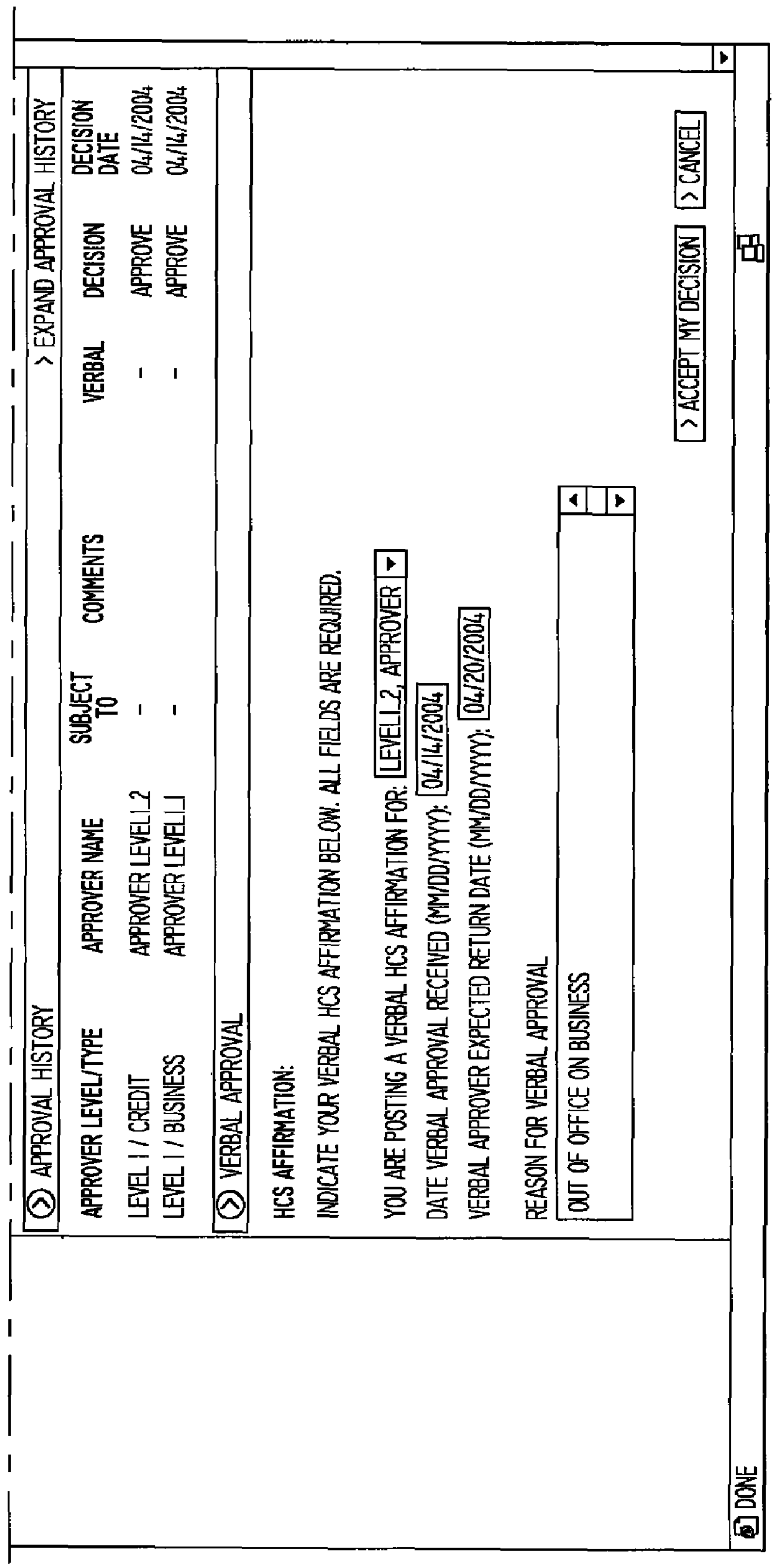
Figure 73A:
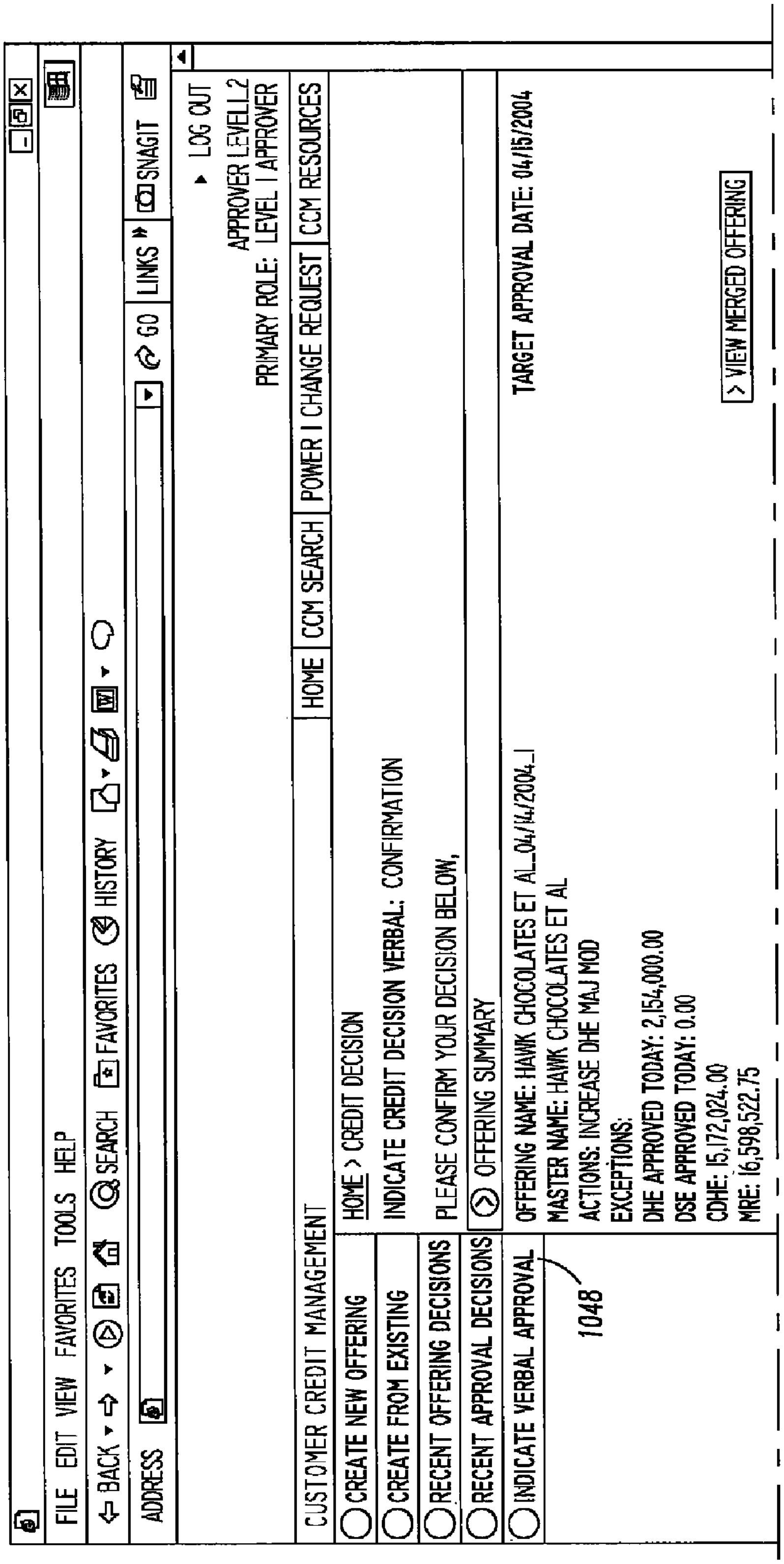
Figure 73B:
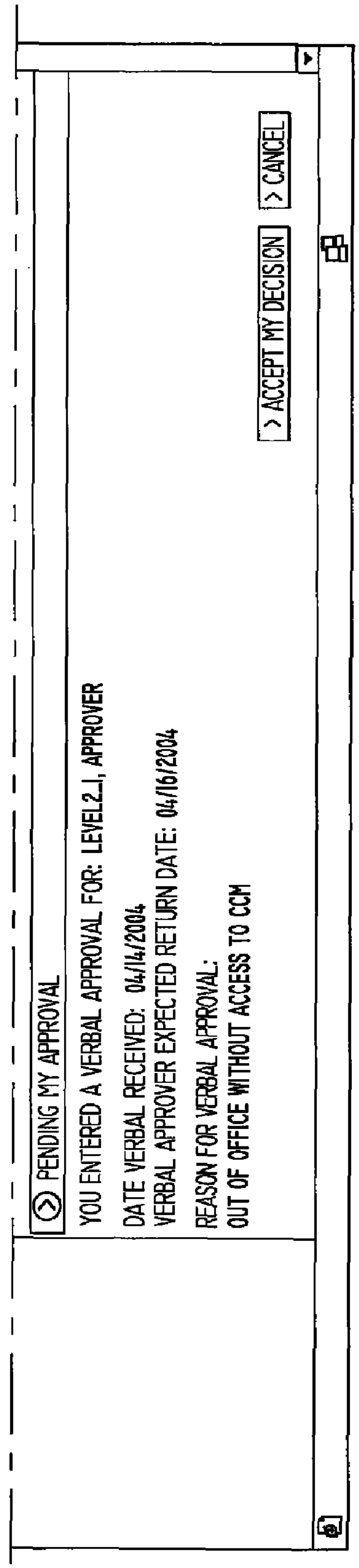
Figure 74A:
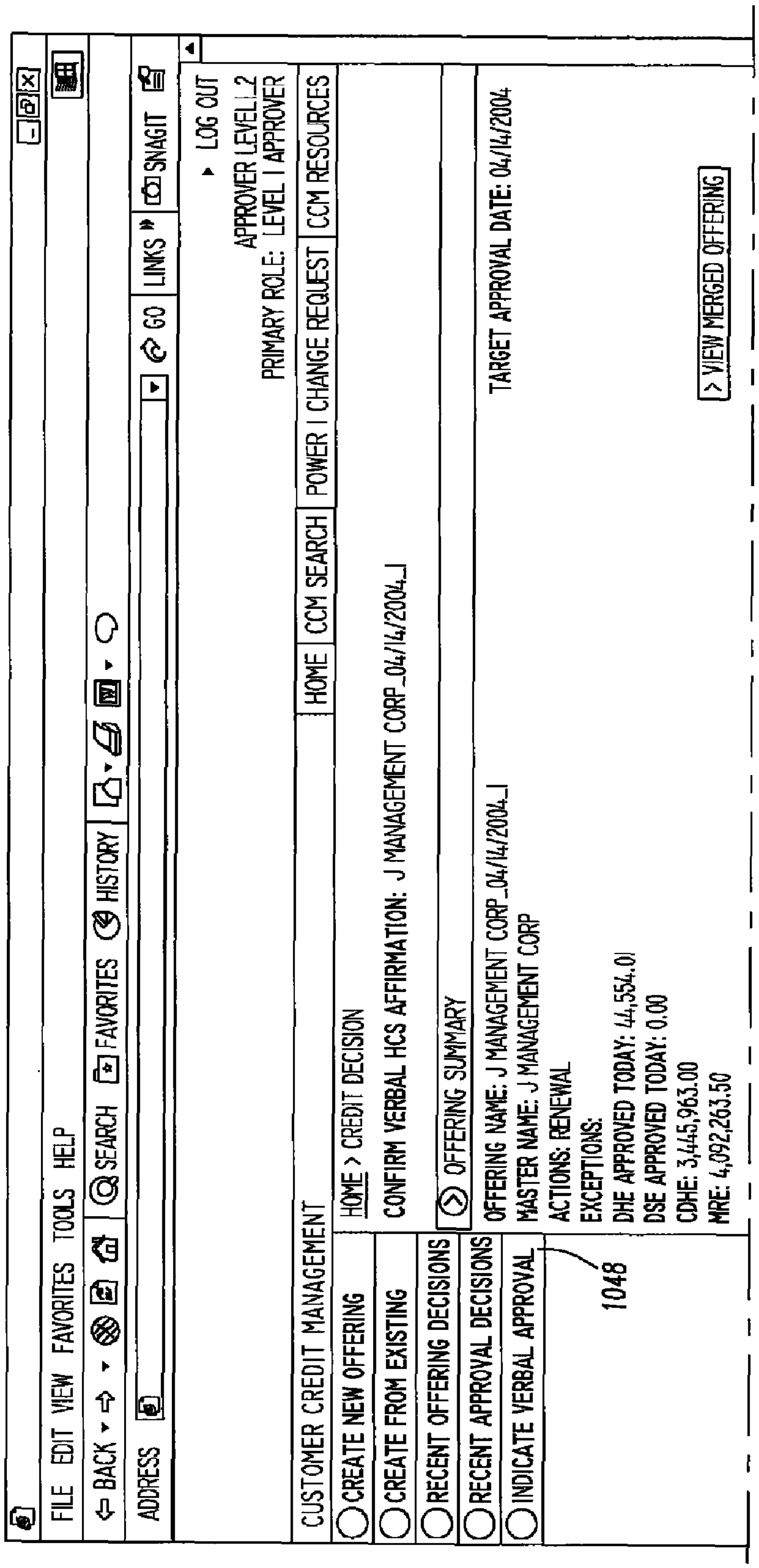
Figure 74B:
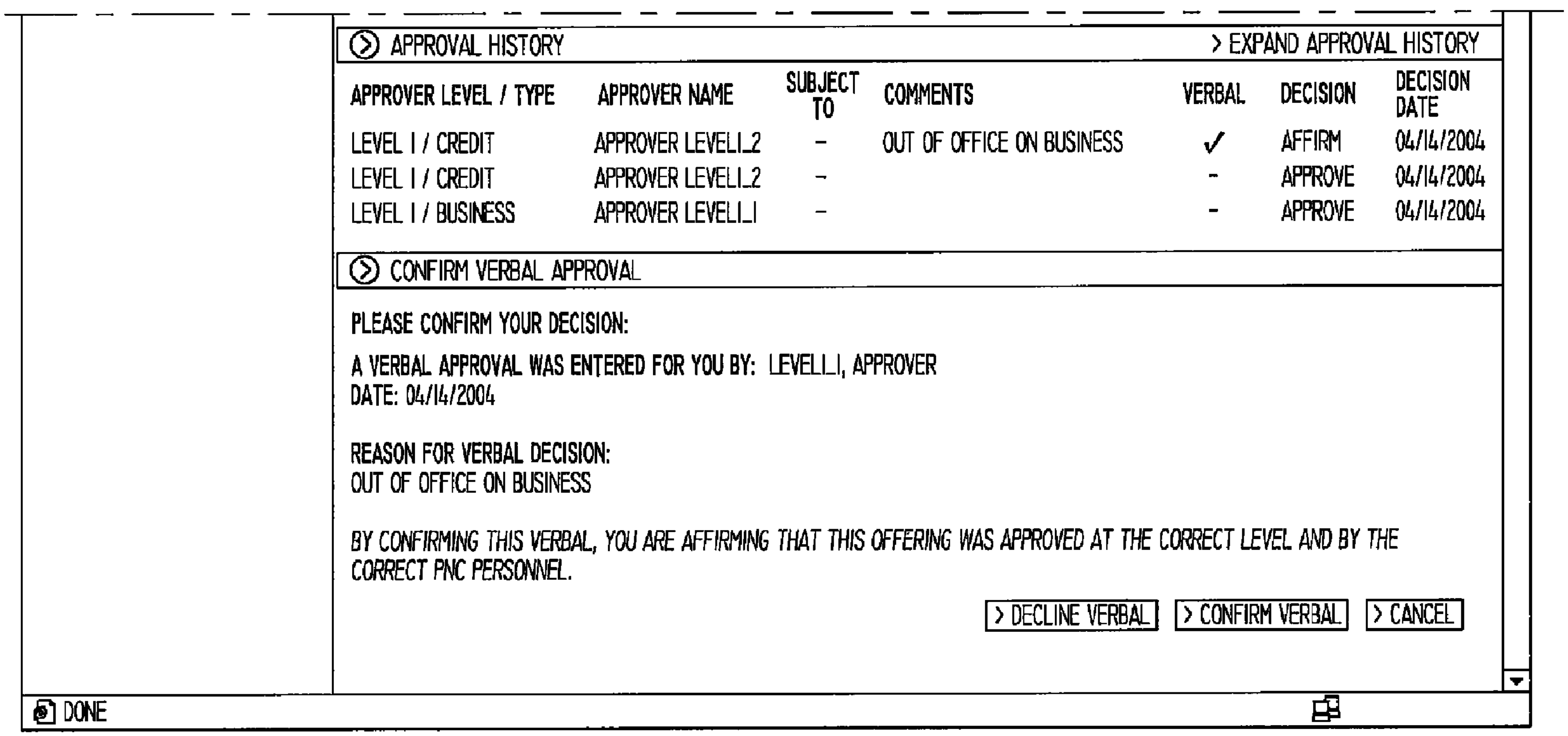
Figure 75:
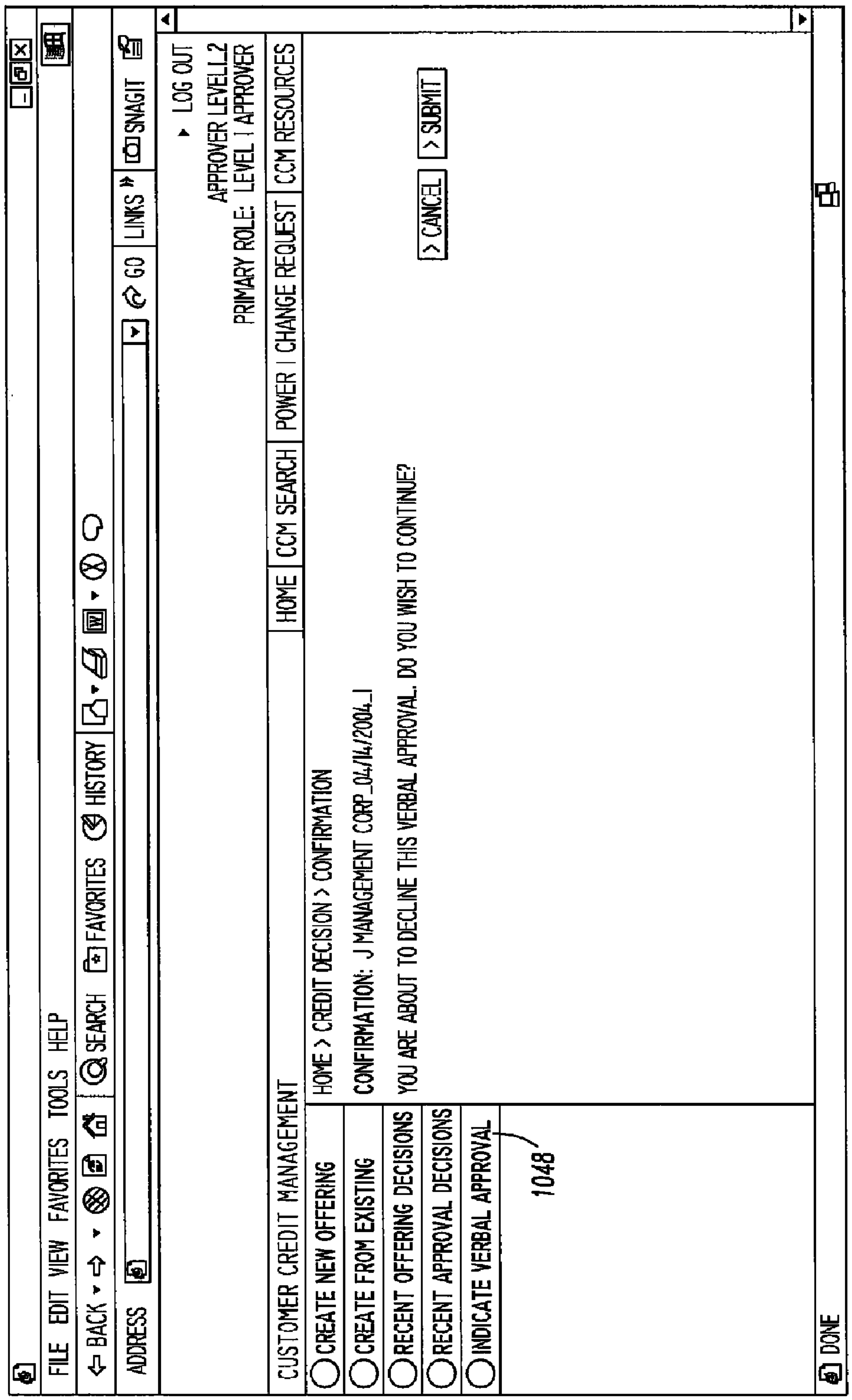

FIG. 70 shows the results of selecting the "indicate verbal approval" tab 1048 and allows the user to select an offering to verbally approve, as shown in FIGS. 71A-72B. The user can also select an offering to verbally affirm HCS, as shown in FIGS. 72A-72B. As shown in FIGS. 73A-73B, the user can review and confirm a verbal approval and, as shown in FIGS. 74A-74B, the user can review and confirm a verbal HCS affirmation. FIG. 75 shows a confirmation of a "decline" of a verbal approval. FIGS. 76A-76B shows a screen in which an expanded approval history can be viewed.

Figure 77:
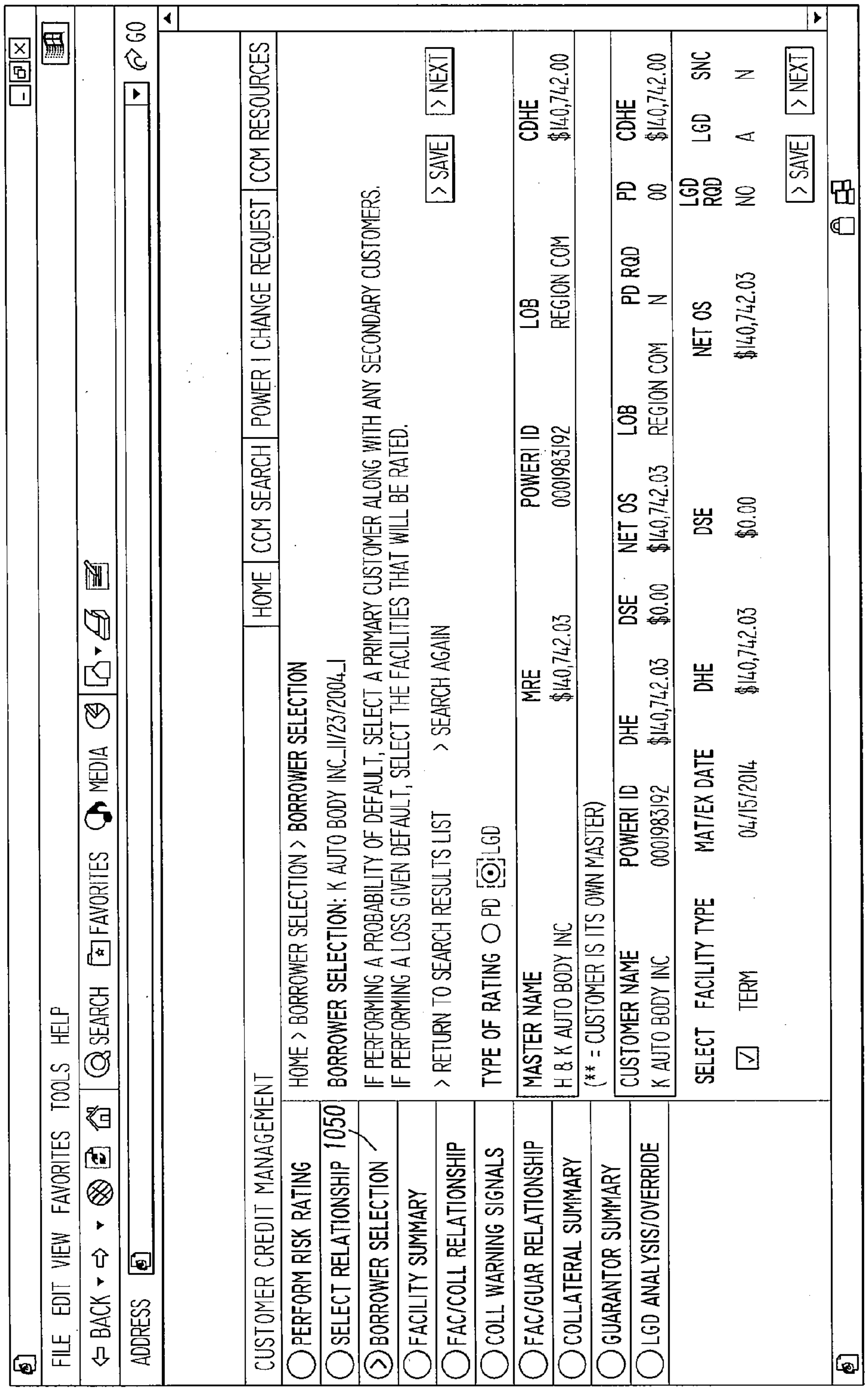
Figure 78:
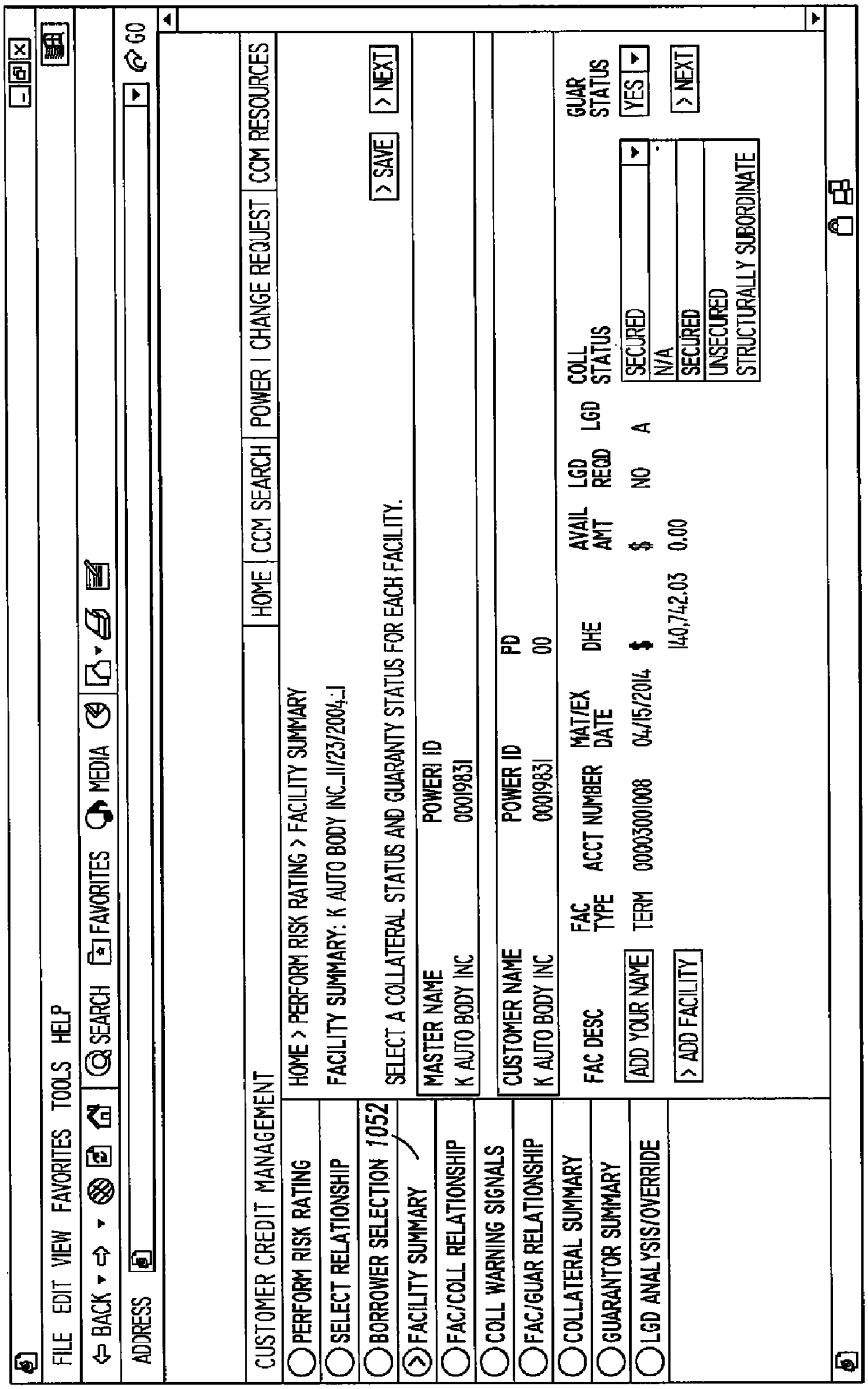
Figure 79:
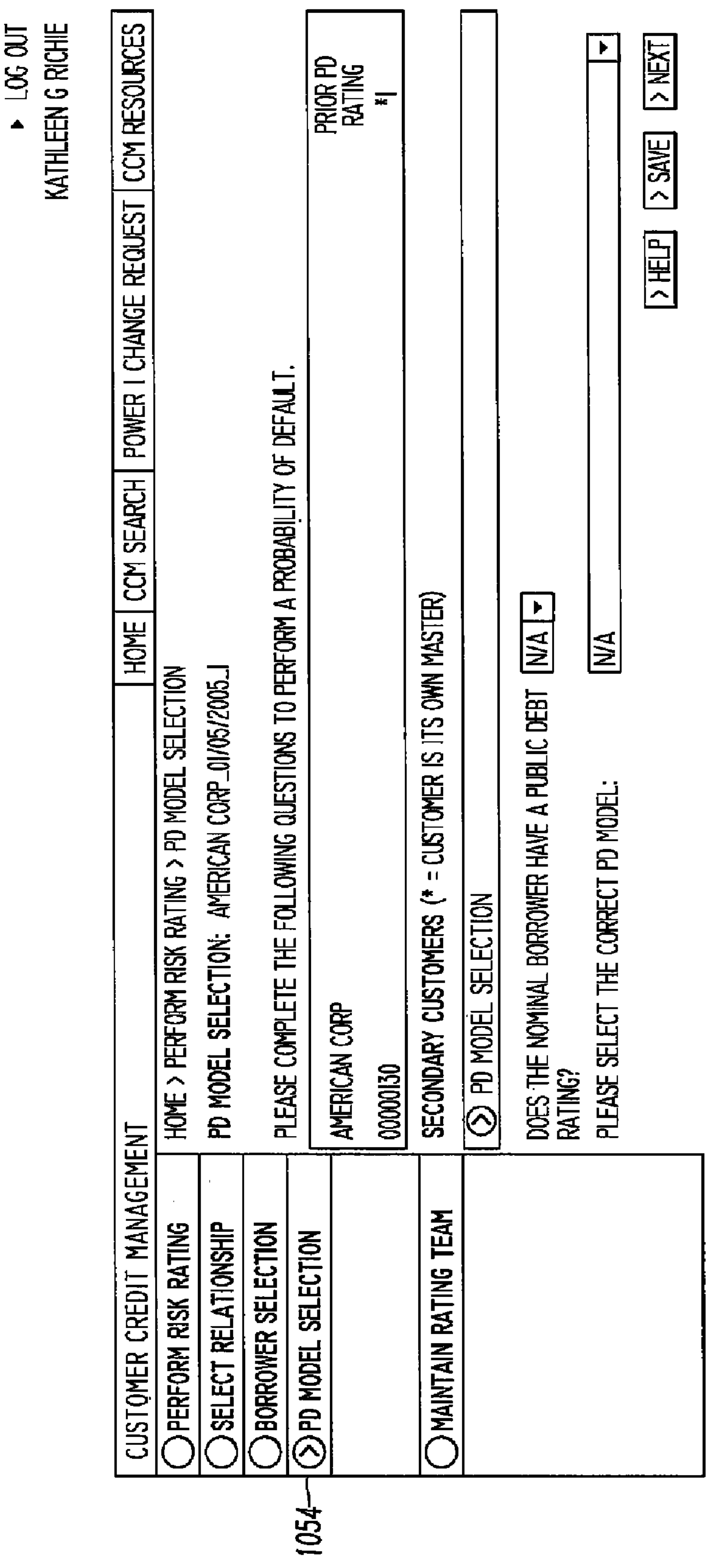

FIGS. 77 through 91B are computer screen shots illustrating an example of an implementation of the process for generating a loss given default according to various embodiments of the present invention. The computer screen shots of FIGS. 77 through 91B in various embodiments are those presented to a user at the user computer 202 (FIG. 16). FIG. 77 allows the user to select a borrower and results from selecting the "borrower selection" tab 1050 and FIG. 78 illustrates a facility summary for the borrower and results from selecting the "facility summary" tab 1052. FIG. 79 results from selecting the "PD model selection" tab 1054 and can be used to perform a probability of default analysis.

Figure 80:
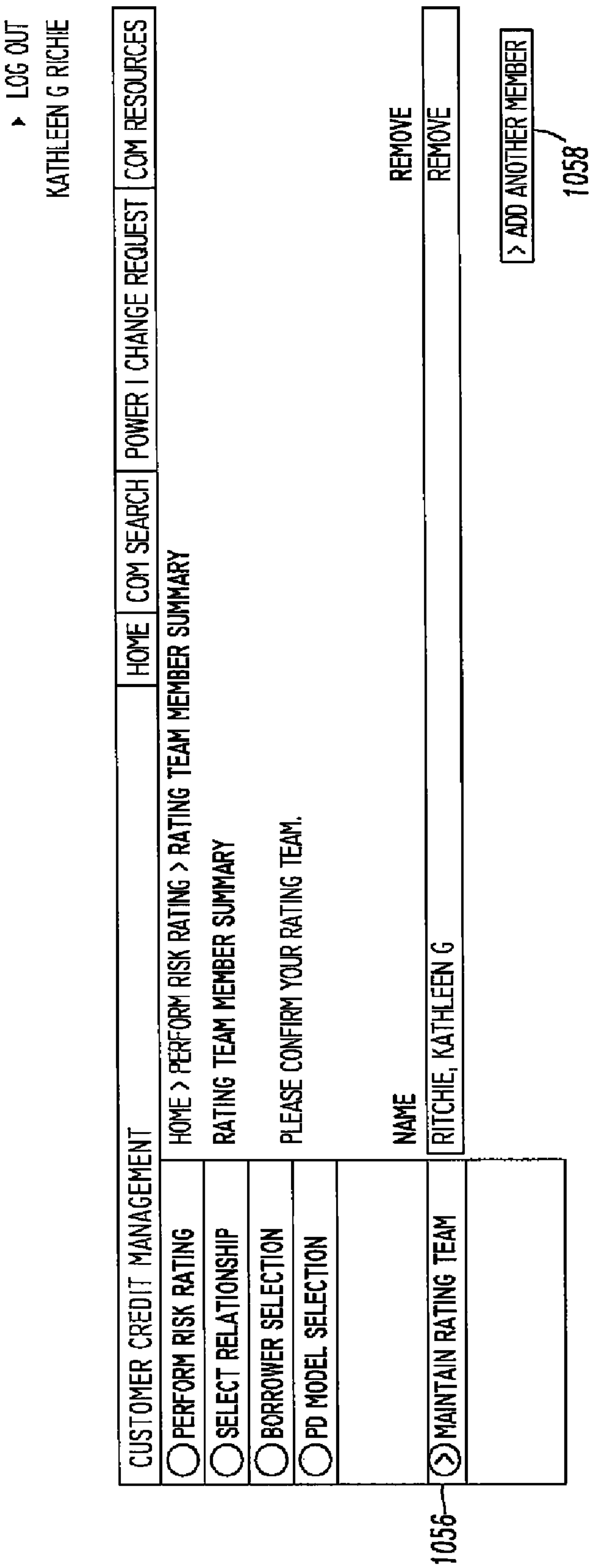
Figure 81:
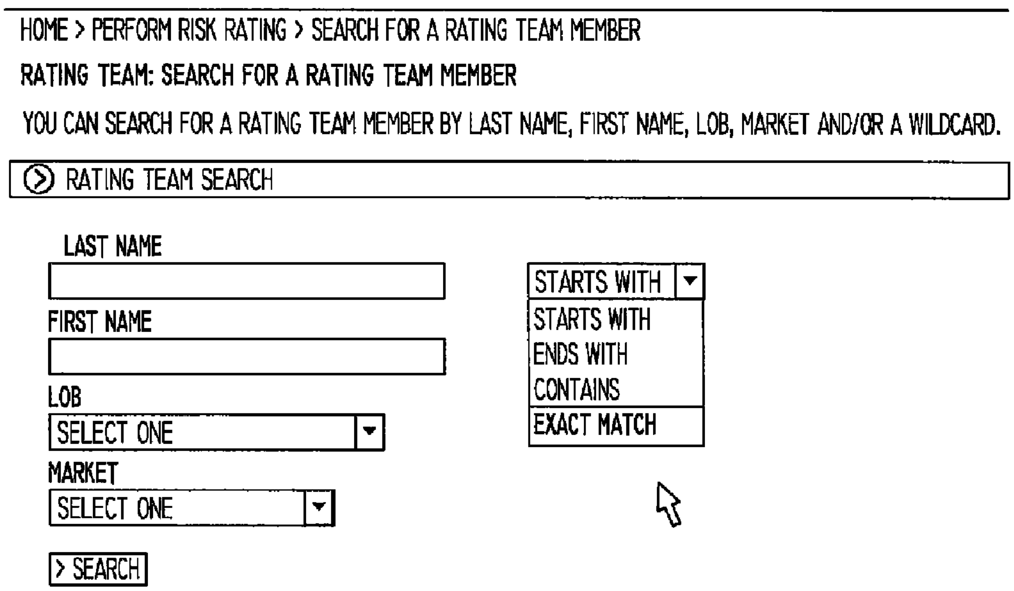
Figure 82:
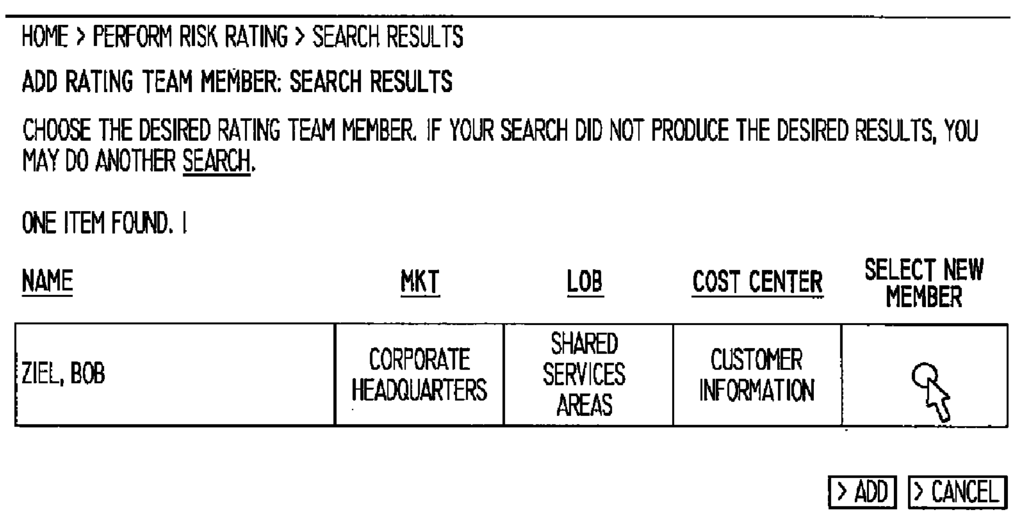
Figure 83:
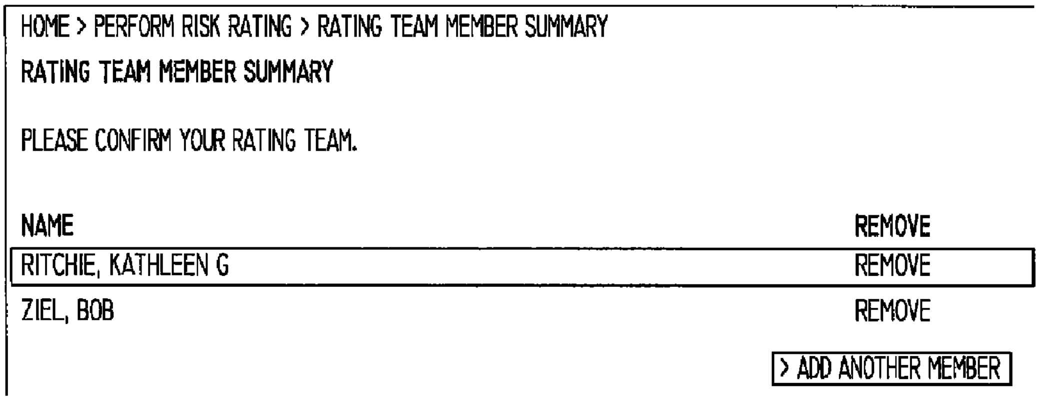

FIG. 80 shows the results of selecting the "maintain rating team" tab 1056 and is used to view and add members to the rating team. When the "add another member" tab 1058 is selected, a search screen appears as shown in FIG. 81, the search results of which are shown in FIG. 82. A summary of the rating team members is illustrated in FIG. 83.

Figure 84:
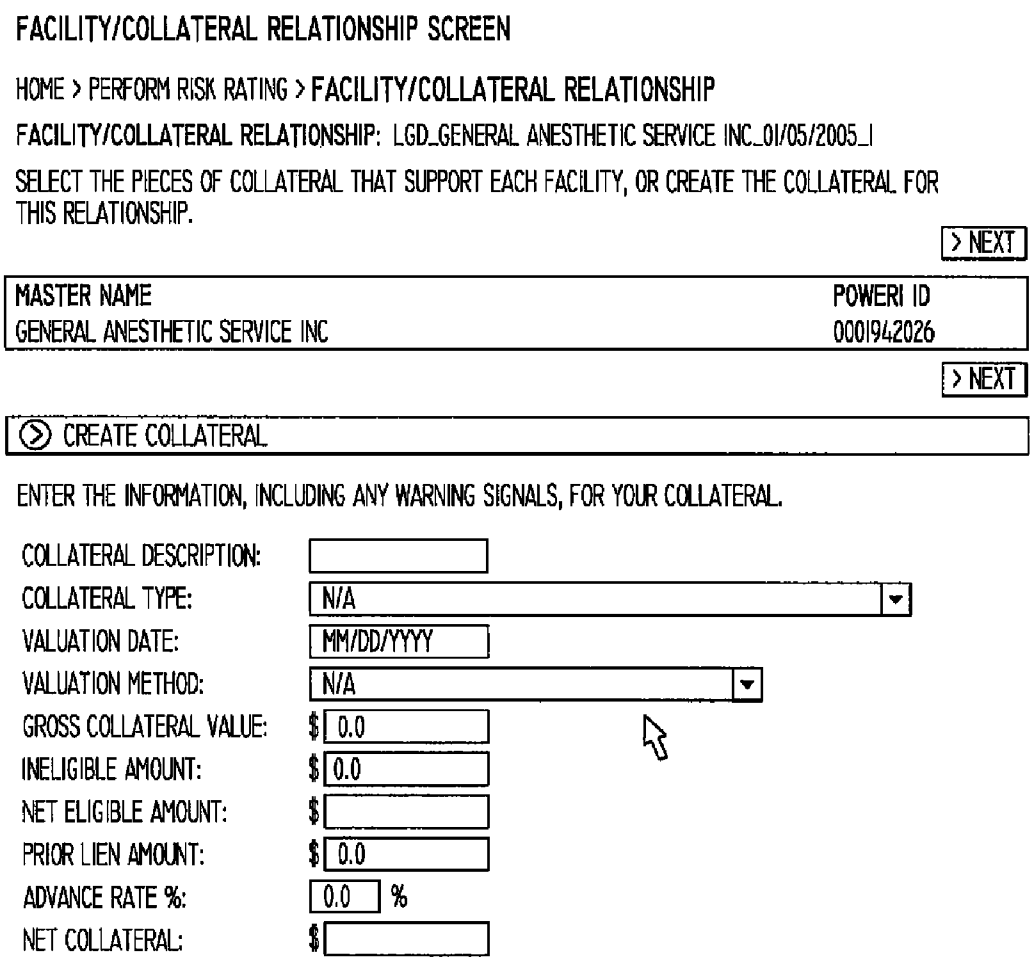

The screen in FIG. 84 allows the user to enter collateral information and evaluate collateral warning signals for each collateral type. The screen illustrated in FIG. 85 allows for warning signals to be specified and in FIG. 86, the user can associate collateral with facilities. The screen in FIGS. 87A-87B allows the user to modify the loss given default rating based on collateral warning signals.

Figure 88A:
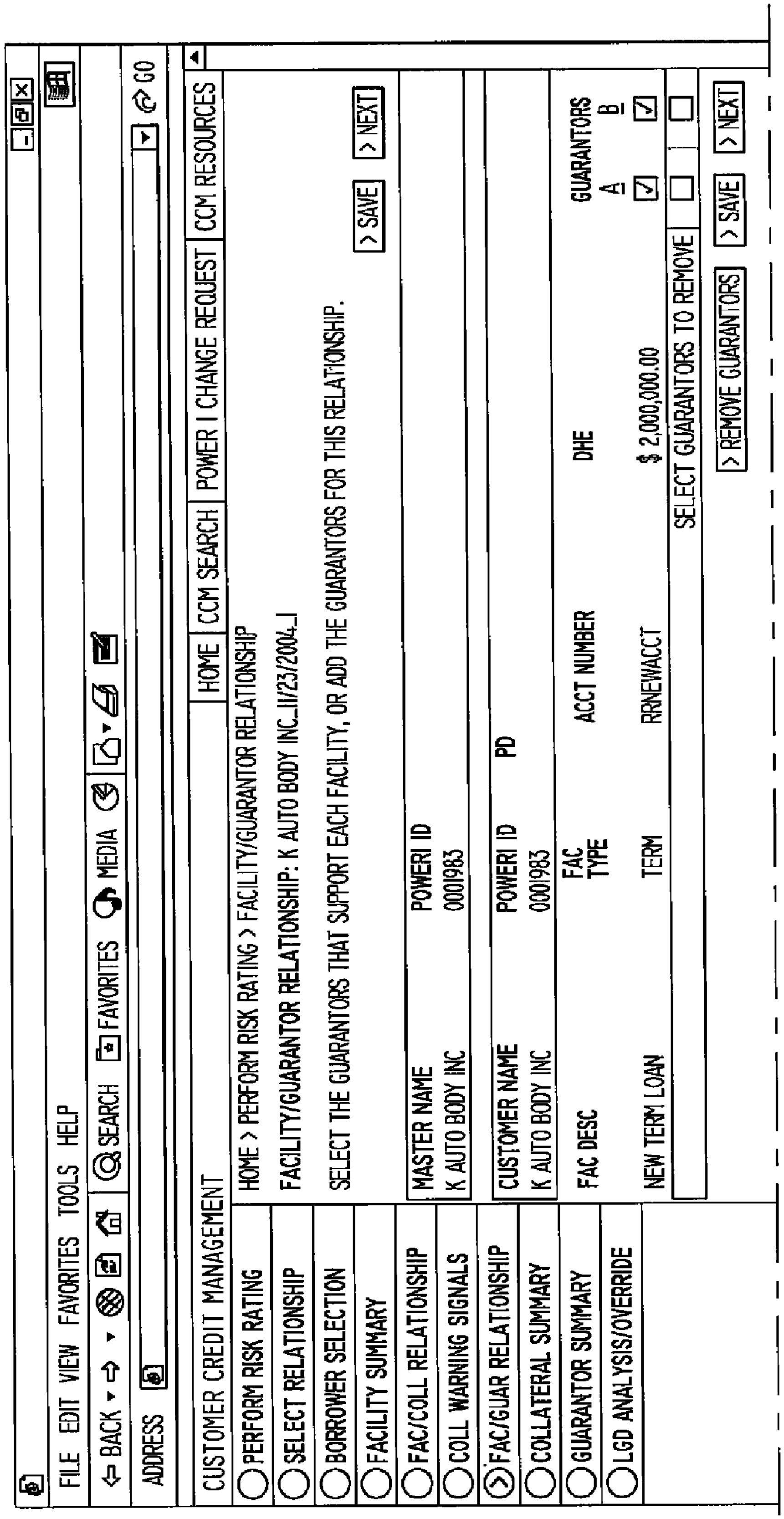
Figure 88B:
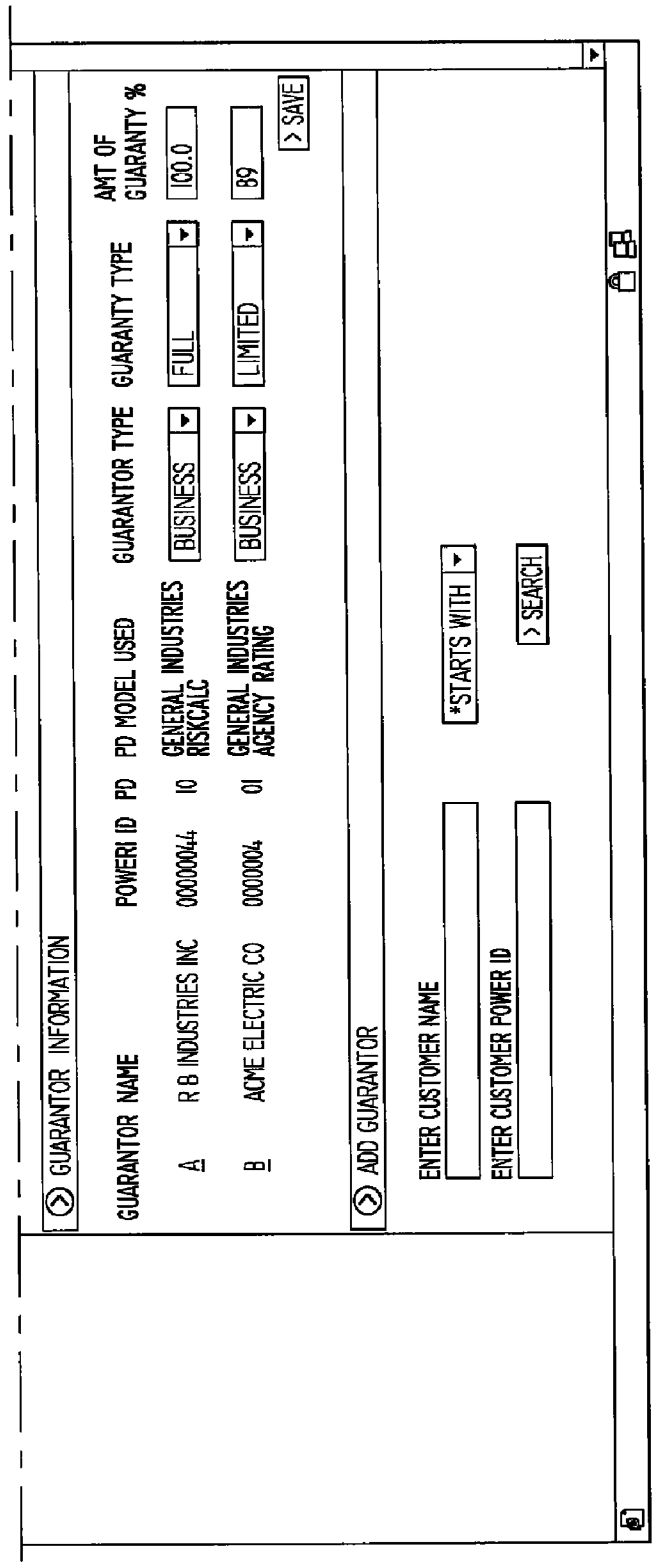
Figure 90A:
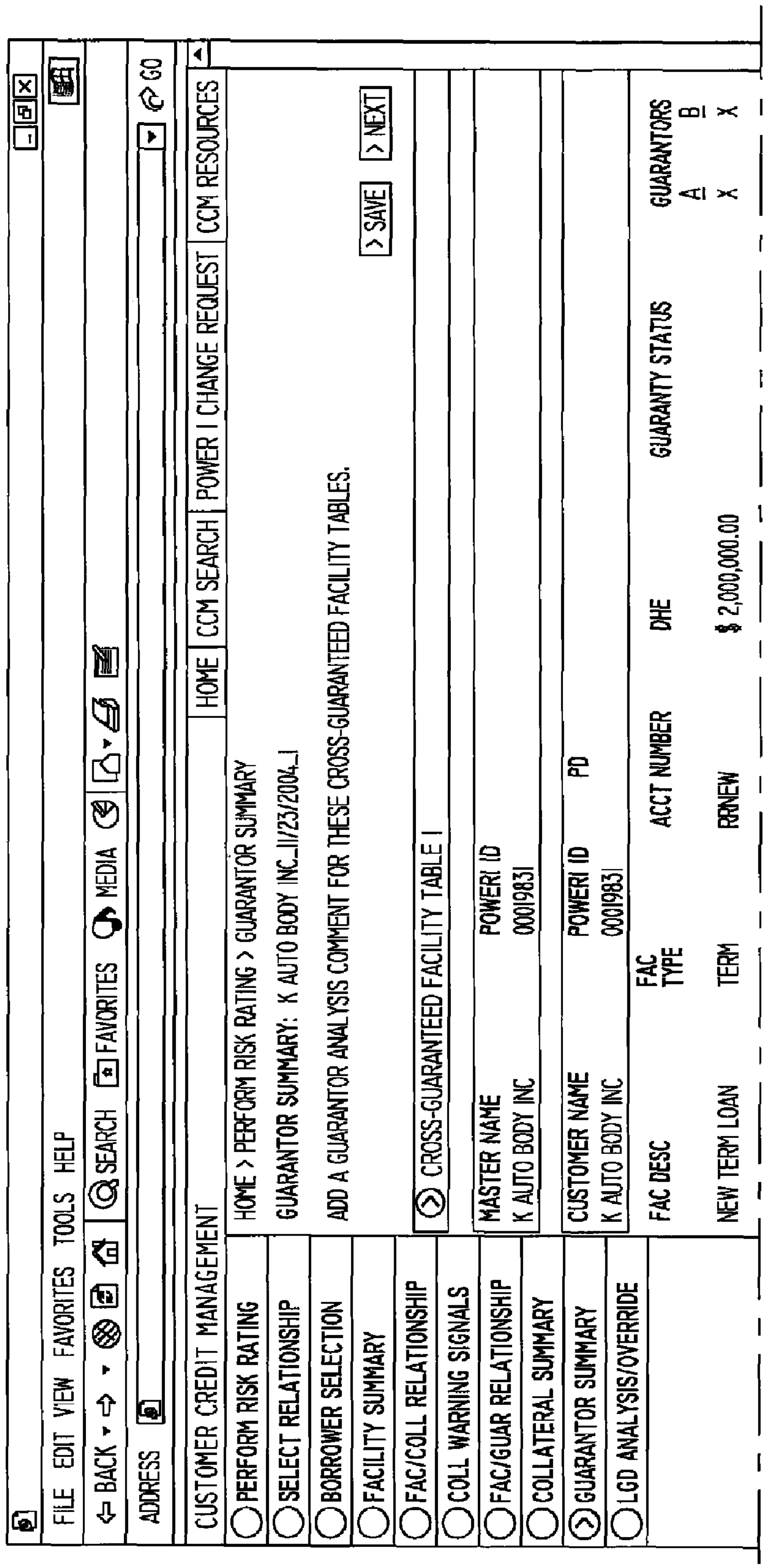
Figure 90B:
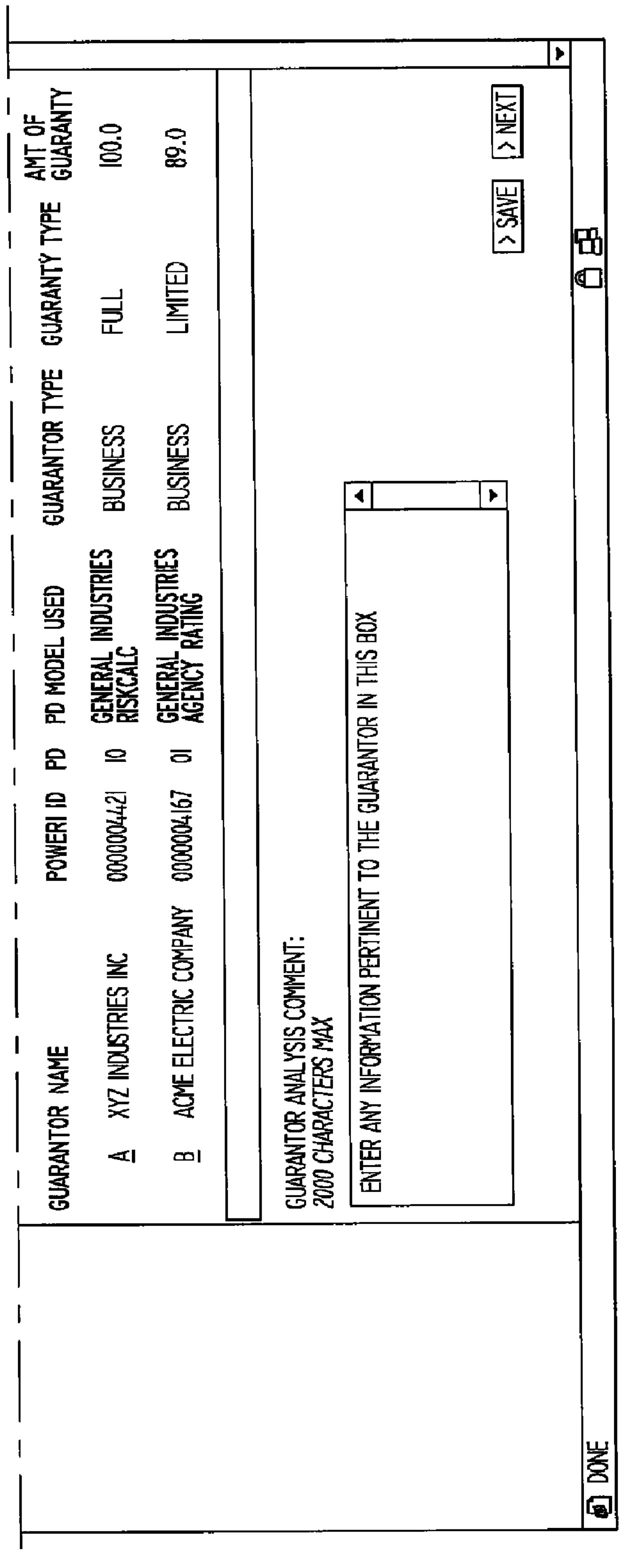
Figure 91A:
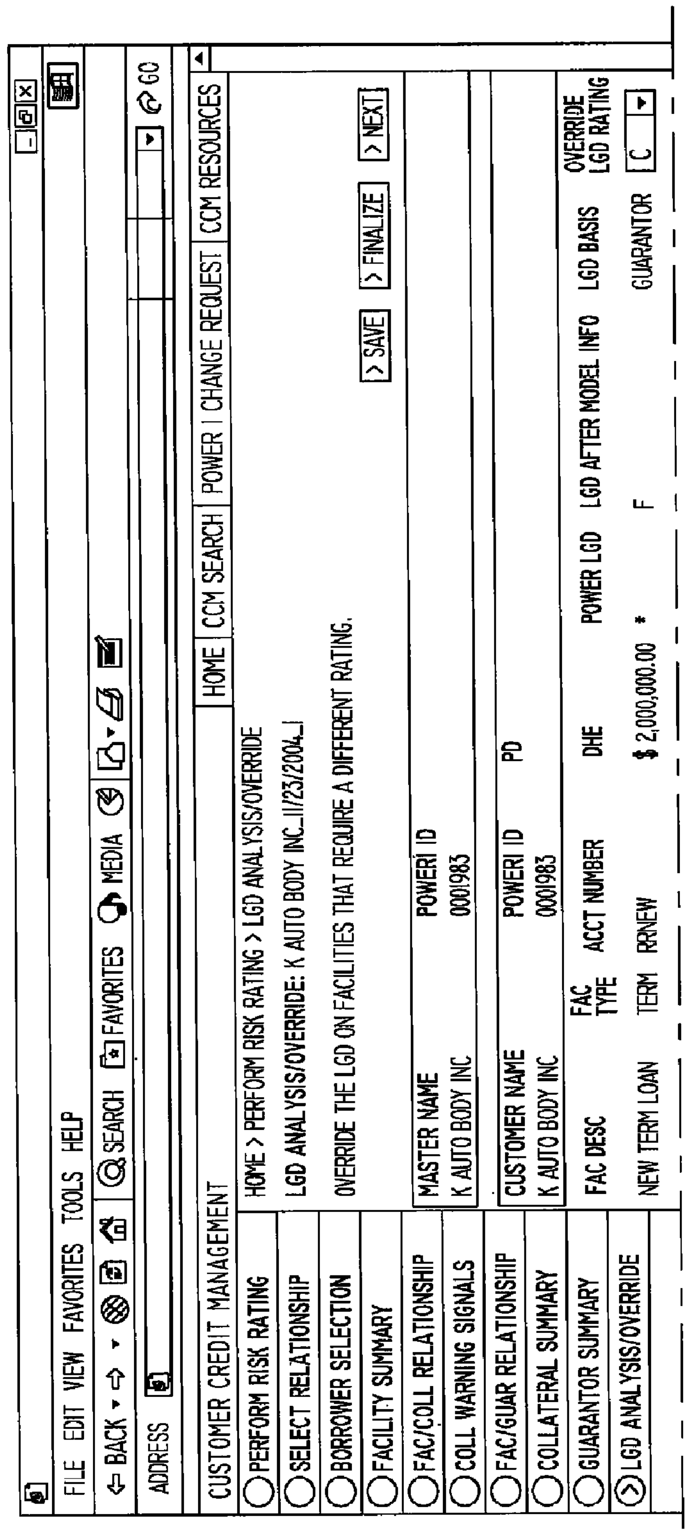
Figure 91B:
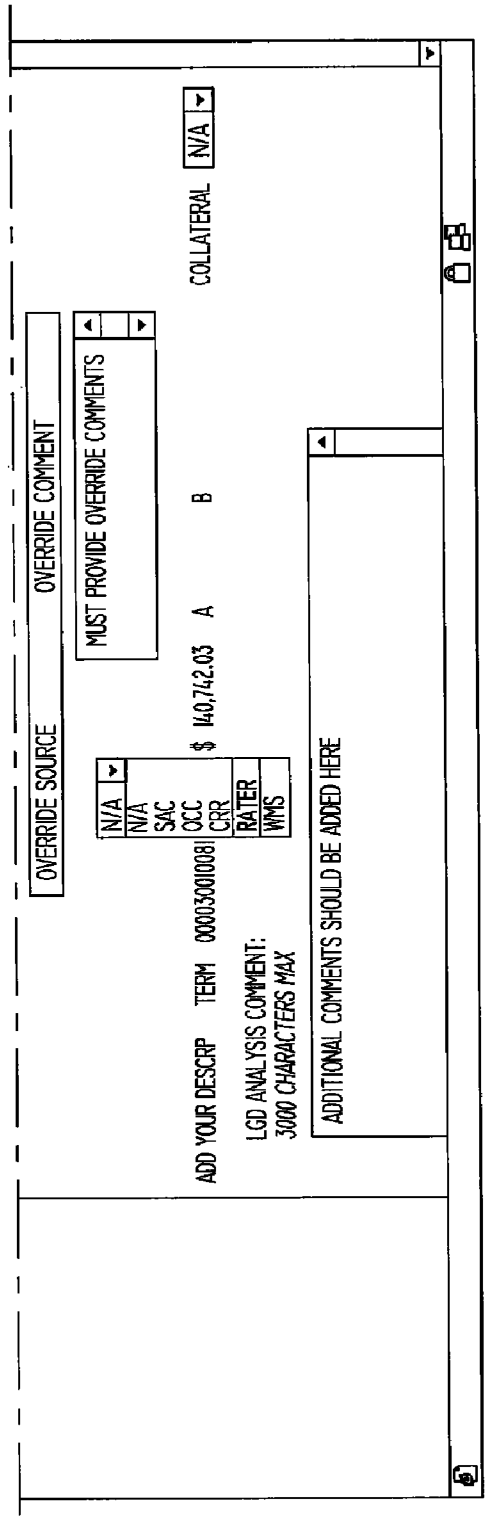

FIGS. 88A-88B illustrate a screen in which guarantors may be selected. FIG. 89 illustrates a screen that presents a summary screen of the collateral so that the user can ensure that the collateral information has been entered correctly and FIGS. 90A-90B illustrate a screen that presents a summary screen of the guarantor information so that the user can ensure that the information has been entered correctly. The screen shown in FIGS. 91A-91B enables the user to make any final comments relating to the loss given default rating or to override the rating.

Figure 92:
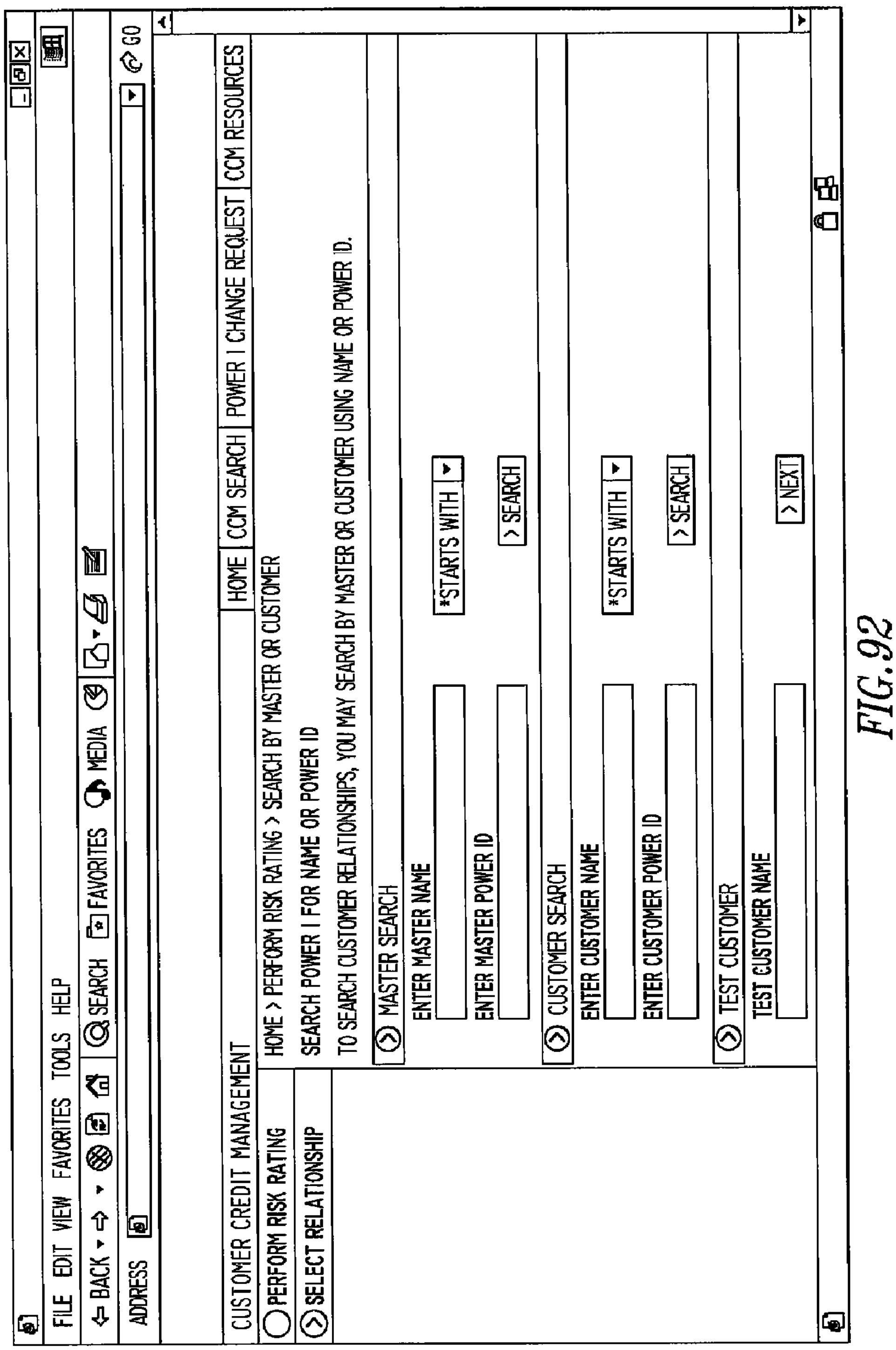
Figure 93:
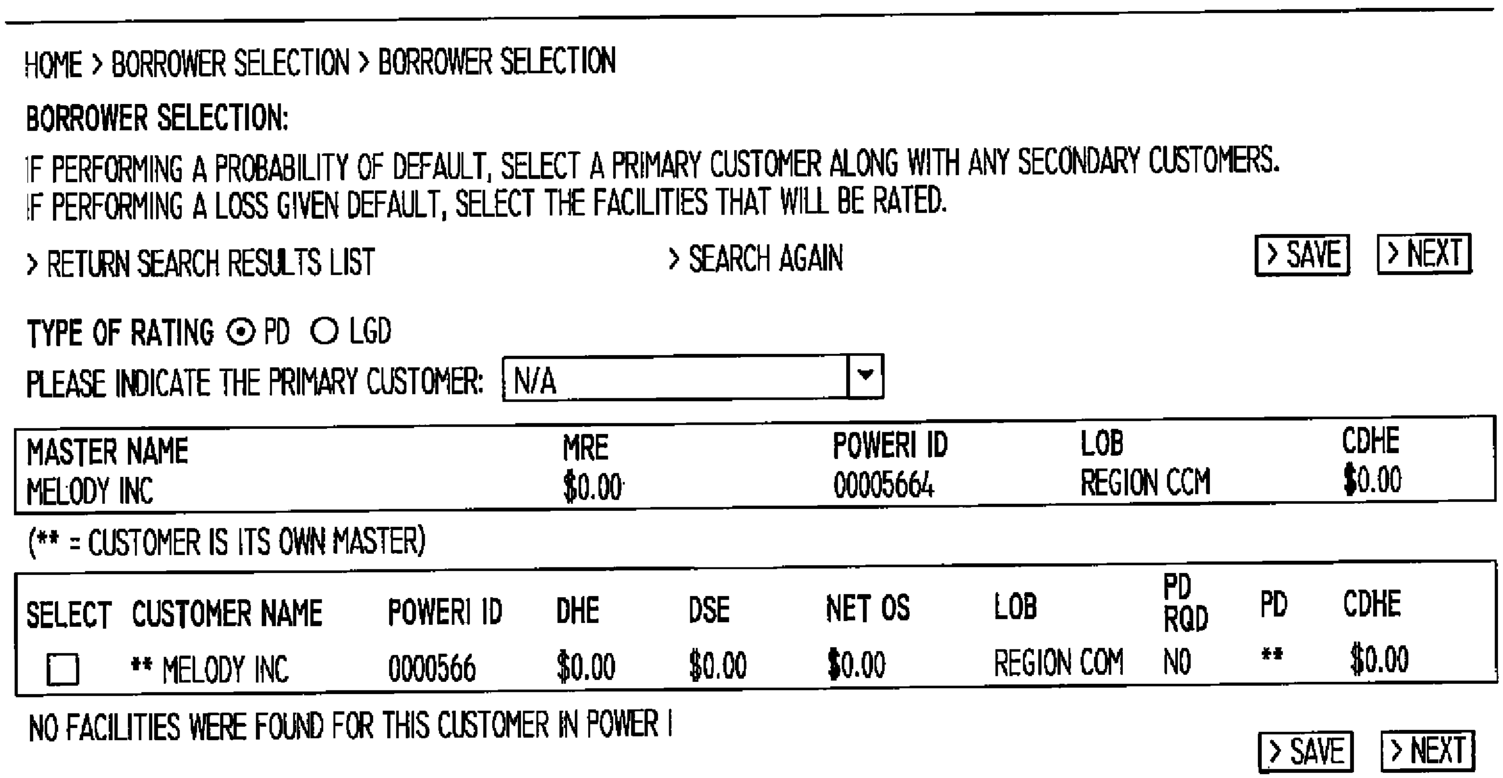
Figure 94:
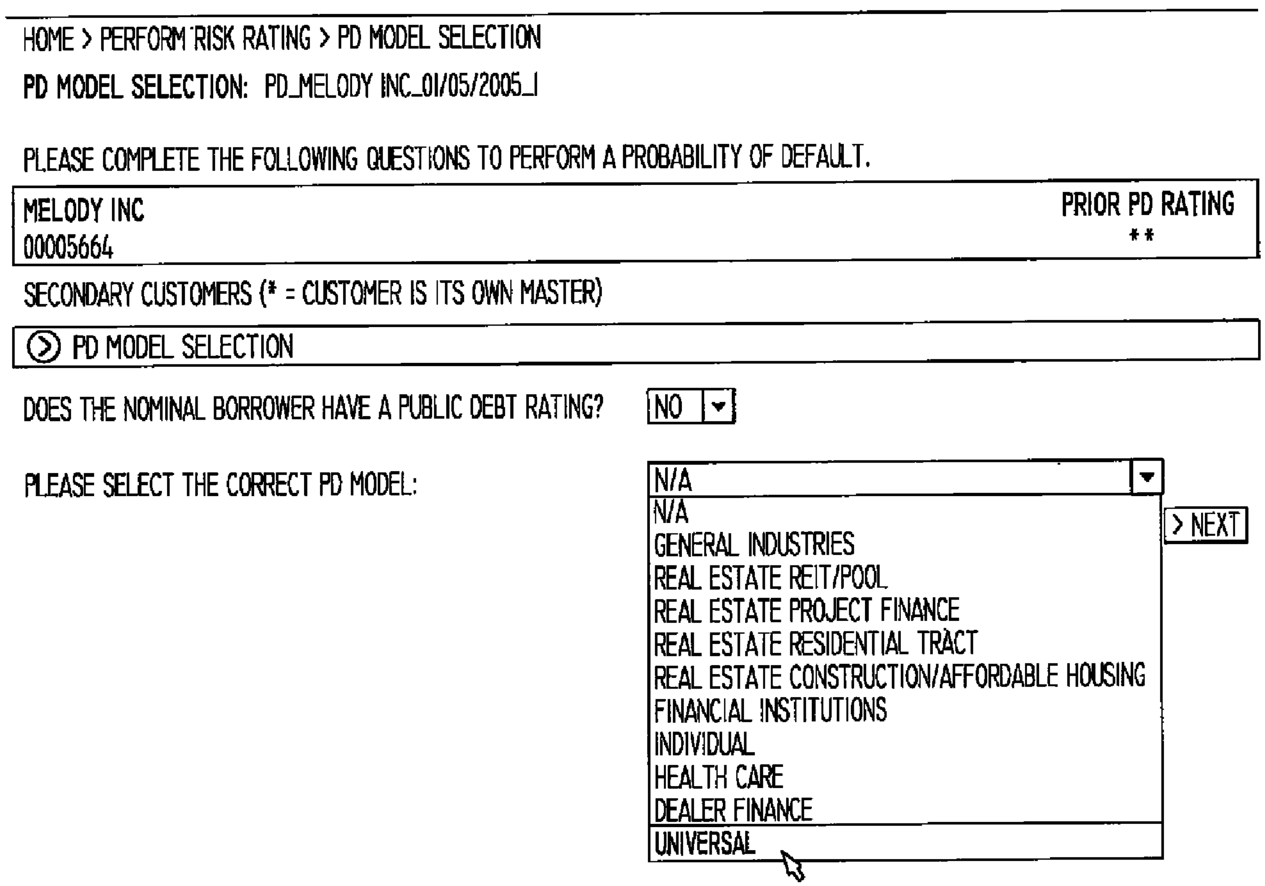

FIGS. 92 through 104B are computer screen shots illustrating an example of an implementation of the process for generating a probability of default rating according to various embodiments of the present invention. The computer screen shots of FIGS. 92 through 104B in various embodiments are those presented to a user at the user computer 202 (FIG. 16). As shown in FIG. 92, the user may search for borrowers and, in the screen illustrated in FIG. 93, can select whether the rating is for a probability of default or a loss given default rating. For the screen illustrated in FIG. 94, the user can indicate whether the borrower has public debt and can select the proper model type to use. The model type depends on the nature of the borrower.

Figure 95:
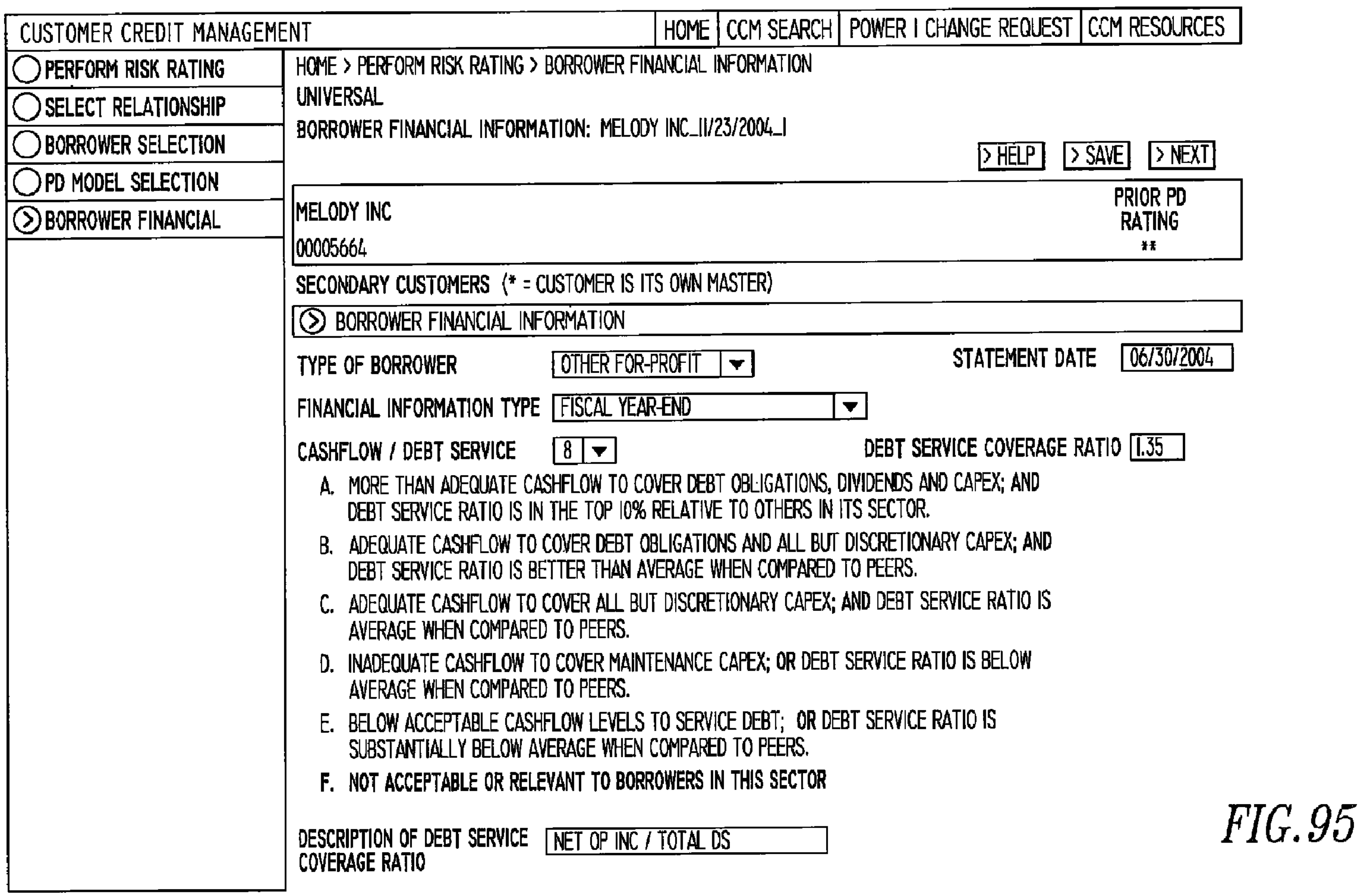
Figure 97:
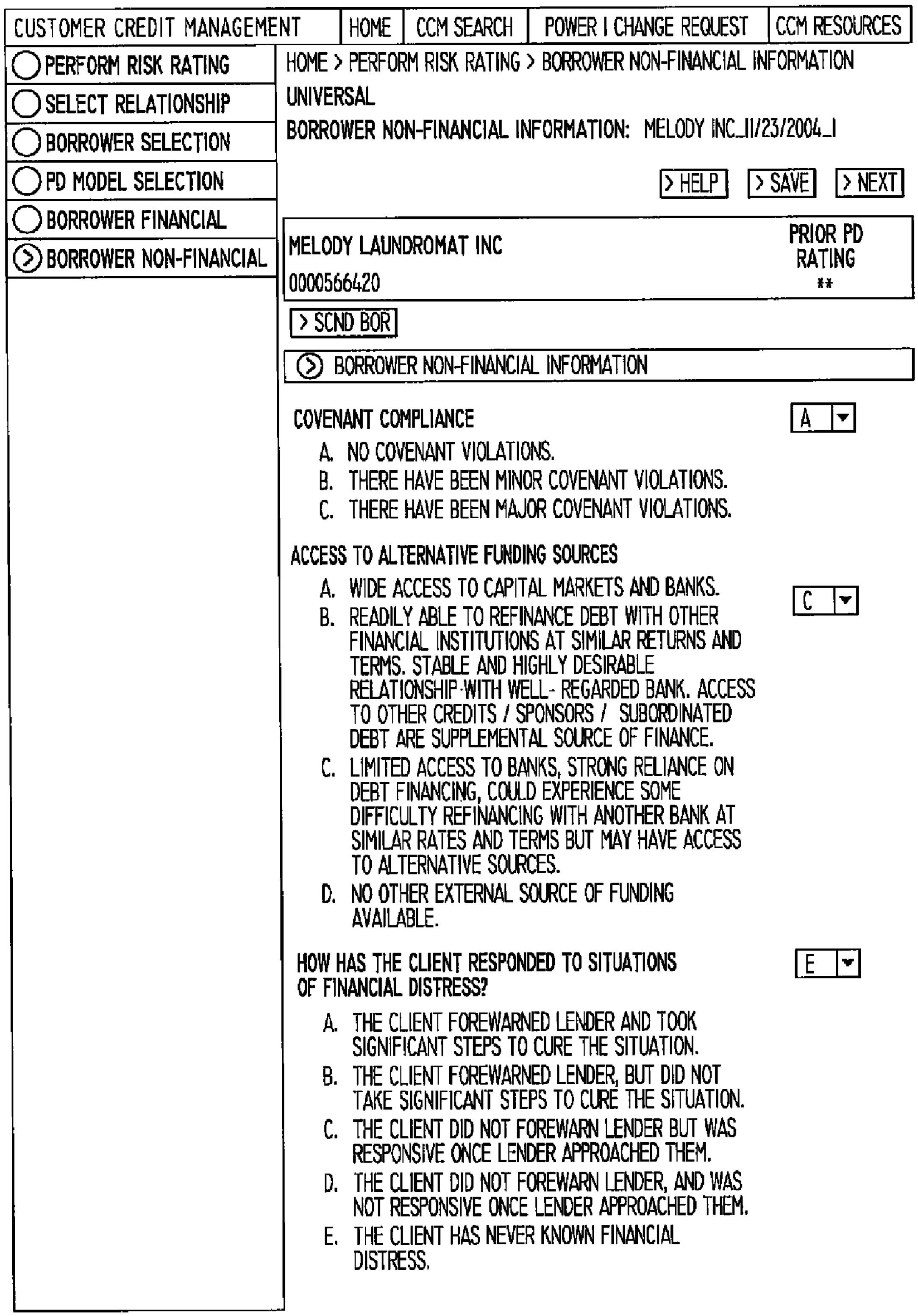
Figure 99A:
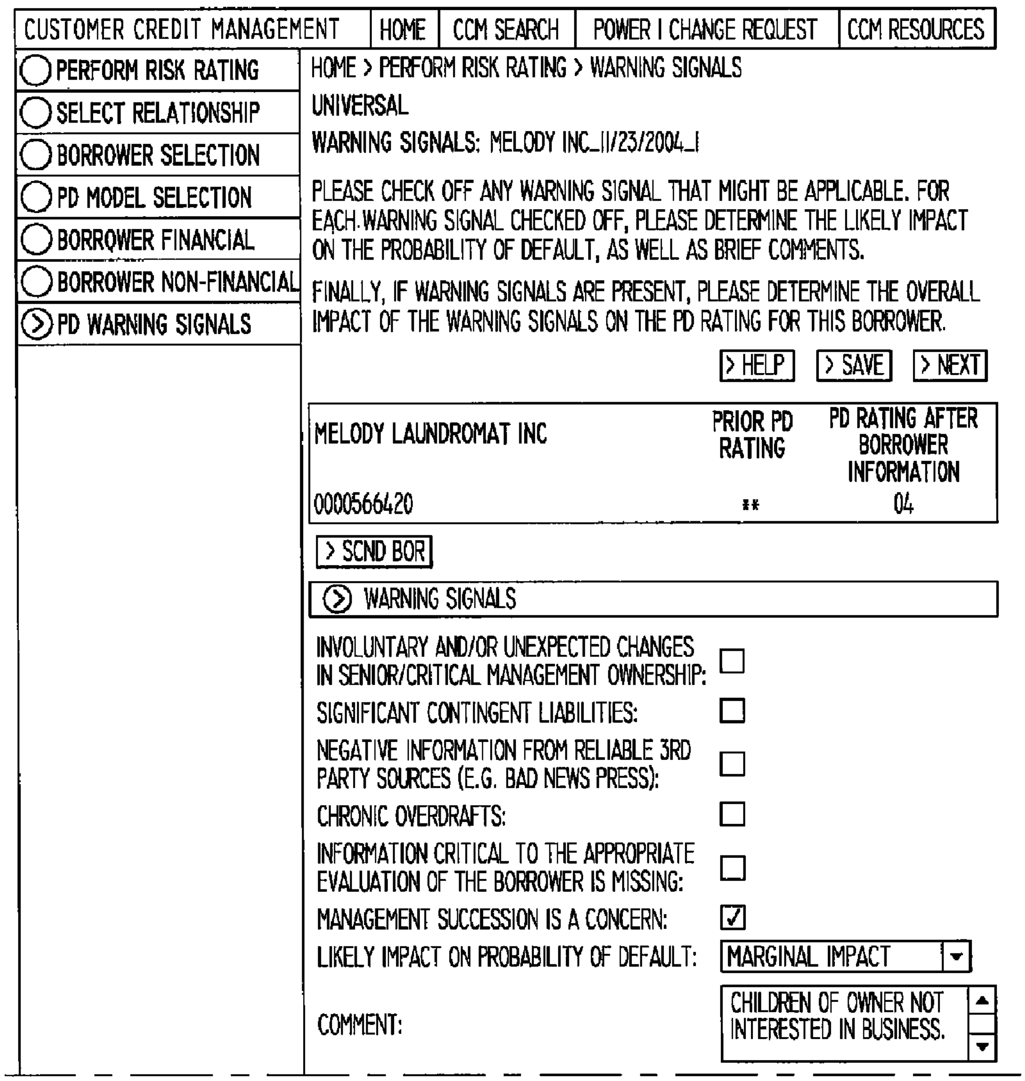
Figure 100:
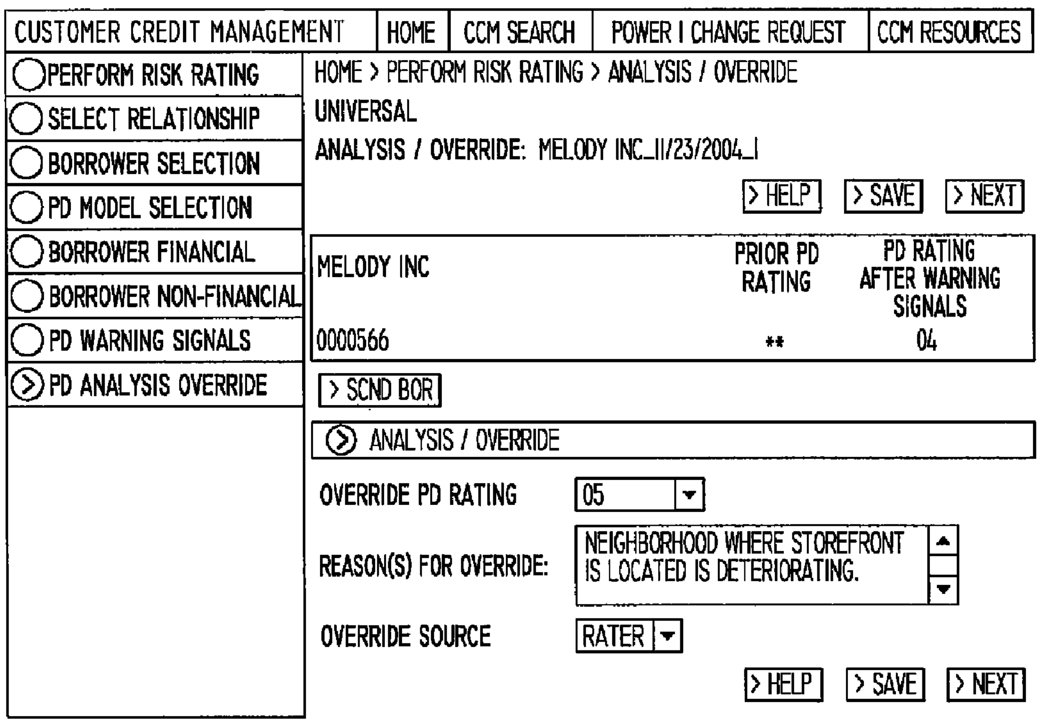
Figure 101:
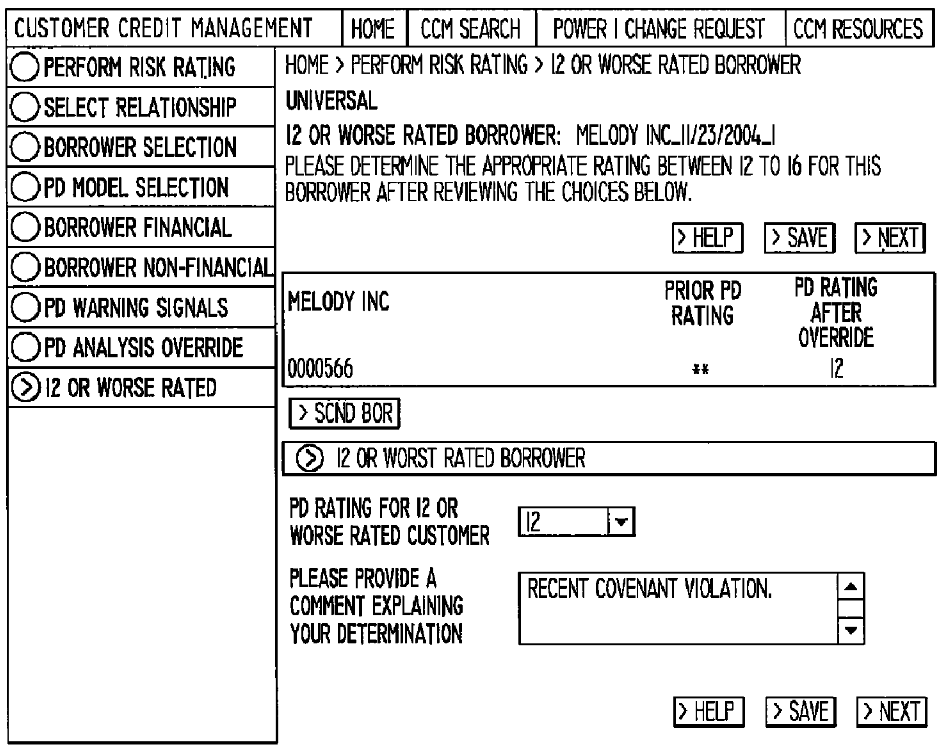
Figure 102A:
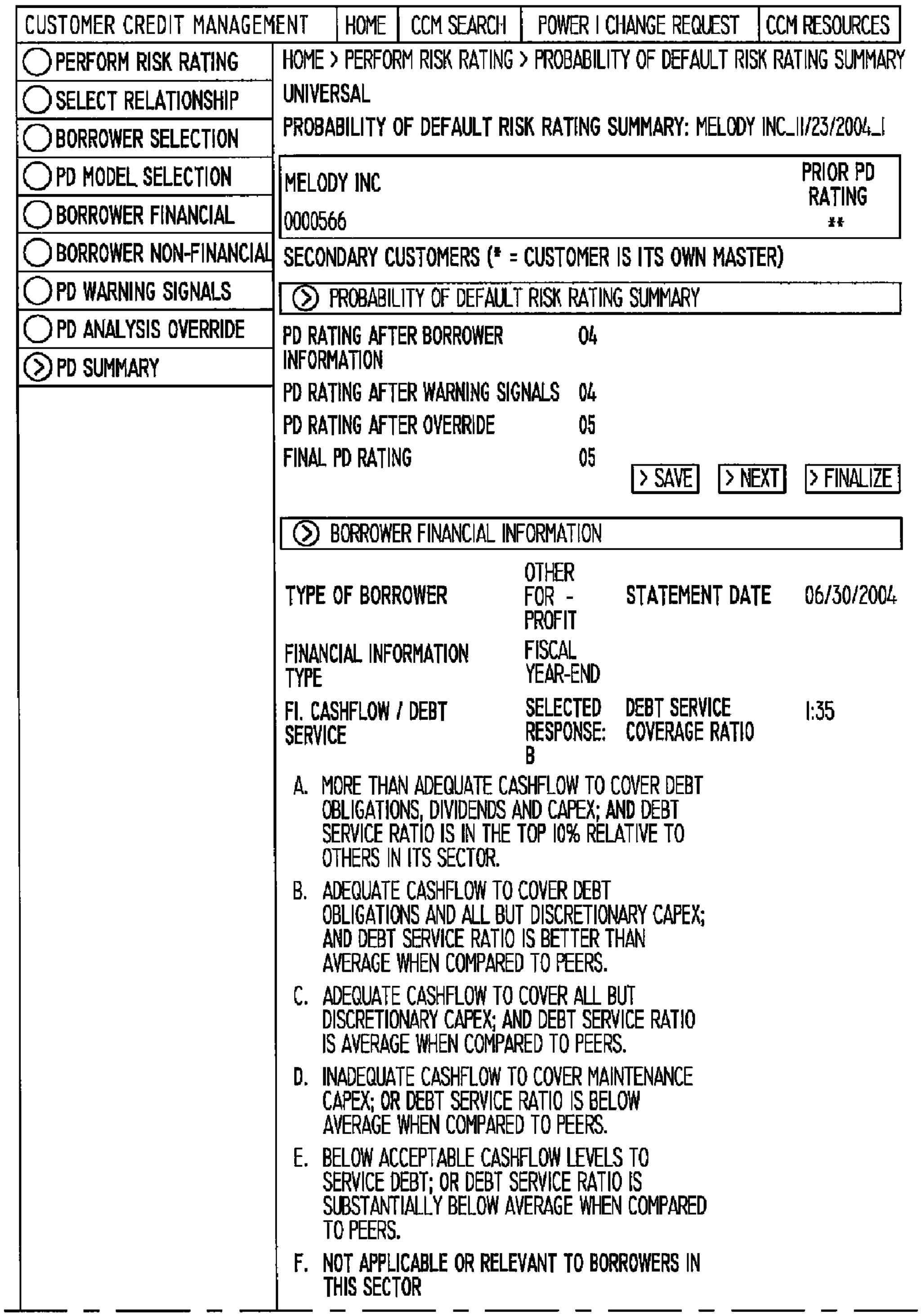

In the screens illustrated in FIGS. 95, 96A, and 96B, the user can answer various financial questions relating to the borrower and in FIGS. 97 and 98 the user can answer various non-financial questions relating to the borrower. In the screen illustrated in FIGS. 99A-99B, the user can select the applicable warning signals. In the screen illustrated in FIG. 100, the user can override the probability of default rating and, when the borrower's probability of default rating is 12 or worse, the user can enter a value between 12 and 16 on the screen illustrated in FIG. 101. FIGS. 102A through 104B illustrate a summary of a probability of default rating.

In various embodiments of the present invention, the methods and modules described herein are embodied in, for example, computer software code that is coded in any suitable programming language such as, for example, visual basic, C, C++, or microcode. Such computer software code may be embodied in a computer readable medium or media such as, for example, a magnetic storage medium such as a floppy disk or an optical storage medium such as a CD-ROM.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of evaluating a credit offering to a borrower, the method comprising:

electronically displaying on an electronic computing device a plurality of qualitative questions regarding the borrower, wherein at least some of the plurality of qualitative questions are based on an entity type of the borrower, wherein each answer is assigned a score representative of a portion of the borrower's creditworthiness, and wherein the electronic computing device is in electronic communication with an electronic database via an electronic computer network;

receiving financial information, non-financial information, and sector information regarding the borrower from the scores of the answers to the plurality of qualitative questions;

calculating, by the electronic computing device, a first financial factor based on the financial information, a second non-financial factor based on the non-financial information, and a third sector factor based on the sector information, wherein at least a portion of the sector information is specific to the entity type of the borrower;

calculating, by the electronic computing device, a preliminary probability of default rating of the borrower based on the first financial factor, the second non-financial factor, and the third sector factor, wherein the first financial factor is given a first weight, the second non-financial factor is given a second weight, and the third sector factor is given a third weight;

generating, by the electronic computing device, at least one warning signal based on the answers to the plurality of qualitative questions and the entity type of the borrower;

electronically displaying on the electronic computing device the at least one warning signal, wherein the at least one warning signal highlights a potential credit vulnerability of the borrower that is not present in the financial information, the non-financial information, and the sector information;

calculating, by the electronic computing device, a probability of default rating of the borrower based on the preliminary probability of default and the at least one generated warning signal;

calculating, by the electronic computing device, a loss given default rating for the borrower;

integrating, by the electronic computing device, the probability of default rating and the loss given default rating with other information relating to the credit offering to produce a credit memorandum; and automatically outputting, by the electronic computing device, the credit memorandum, wherein the credit memorandum comprises a recommendation associated with the evaluation of the credit offering.

2. The method of claim 1, wherein calculating the probability of default rating further includes:

deriving a process probability of default rating after evaluating the at least one warning signal; and overriding, when necessary, the process probability of default rating to create a final probability of default rating.

3. The method of claim 1, wherein calculating the probability of default rating includes:

determining whether the borrower has a public debt rating; and calculating the preliminary probability of default rating based on at least one of the public debt rating and an answer to at least one of the plurality of qualitative questions.

4. The method of claim 3, wherein calculating the probability of default rating further includes:
evaluating the at least one warning signal relating to the borrower; and
determining a process probability of default rating based on the evaluation of the at least one warning signal and a default frequency.

5. The method of claim 4, wherein calculating the probability of default rating further includes selecting a final probability of default rating when the process probability of default rating is worse than a threshold value.

6. The method of claim 1, wherein calculating the loss given default rating for the borrower includes:
calculating a collateral loss given default rating based on collateral information; and
calculating a guarantee loss given default rating based on guarantee information.

7. The method of claim 6, wherein calculating the loss given default rating further includes calculating a collateral recovery amount.

8. The method of claim 6, wherein calculating the loss given default rating further includes deriving a loss given default grade based on the collateral loss given default rating.

9. The method of claim 6, wherein calculating the loss given default rating further includes overriding, by a user, an automatically generated loss given default rating.

10. The method of claim 1, wherein calculating the probability of default rating of the borrower includes calculating the probability of default rating of the borrower using quantitative and qualitative information.

11. A system of evaluating a credit offering to a borrower, the system comprising:
an electronic user computer; and
an electronic server in communication with the electronic user computer via a network, the server configured to execute software instructions to:
electronically display on the electronic user computer a plurality of qualitative questions regarding the borrower, wherein at least some of the plurality of qualitative questions are based on an entity type of the borrower, wherein each answer is assigned a score representative of a portion of the borrower's creditworthiness, and wherein the electronic user computer is in electronic communication with an electronic database via a computer network;
receive financial information, non-financial information, and sector information regarding the borrower from the scores of the answers to the plurality of qualitative questions;
calculate a first financial factor based on the financial information, a second non-financial factor based on the non-financial information, and a third sector factor based on the sector information, wherein at least a portion of the sector information is specific to the entity type of the borrower;
calculate a preliminary probability of default rating of the borrower based on the first financial factor, the second non-financial factor, and the third sector factor, wherein the first financial factor is given a first weight, the second non-financial factor is given a second weight, and the third sector factor is given a third weight;
generate at least one warning signal based on the answers to the plurality of qualitative questions and the entity type of the borrower;
display the at least one warning signal to a user, wherein the at least one warning signal highlights a potential credit vulnerability of the borrower that is not present in the financial information, the non-financial information, and the sector information;
calculate a probability of default rating of the borrower based on the preliminary probability of default and the at least one generated warning signal;
calculate a loss given default rating for the borrower;
integrate the probability of default rating and the loss given default rating with other information relating to a credit offering to produce a credit memorandum; and
automatically output the credit memorandum, wherein the credit memorandum comprises a recommendation associated with the evaluation of the credit offering.

12. The system of claim 11, further comprising a database in communication with the server.

13. The system of claim 11, wherein the server is configured to execute instructions to:
calculate a collateral loss given default rating based on collateral information; and
calculate a guarantee loss given default rating based on guarantee information.

14. A computer readable medium having stored thereon instructions which, when executed by a processor, cause the processor to:
electronically display a plurality of questions regarding a borrower, wherein at least some of the plurality of questions are based on an entity type of the borrower, wherein each answer is assigned a score representative of a portion of the borrower's creditworthiness, and wherein the electronic computing device is in electronic communication with an electronic database via a computer network;
receive financial information, non-financial information, and sector information regarding the borrower from the scores of the answers to the questions;
calculate a first financial factor based on the financial information, a second non-financial factor based on the non-financial information, and a third sector factor based on the sector information;
calculate a preliminary probability of default rating of the borrower based on the first financial factor, the second non-financial factor, and the third sector factor, wherein the first financial factor is given a first weight, the second non-financial factor is given a second weight, and the third sector factor is given a third weight;
generate at least one warning signal based on the answers to the plurality of questions and the entity type of the borrower;
display the at least one warning signal to a user, wherein the at least one warning signal highlights a potential credit vulnerability of the borrower that is not present in the financial information, the non-financial information, and the sector information;
calculate a probability of default rating of the borrower based on the preliminary probability of default and the at least one generated warning signal;
calculate a loss given default rating for the borrower;
integrate the probability of default rating and the loss given default rating with other information relating to a credit offering to produce a credit memorandum; and
automatically output the credit memorandum, wherein the credit memorandum comprises a recommendation associated with an evaluation of a credit offering to the borrower.

15. The computer readable medium of claim 14 having stored thereon instructions which, when executed by a processor, cause the processor to:

calculate a collateral loss given default rating based on collateral information; and calculate a guarantee loss given default rating based on guarantee information.

16. A method of evaluating a credit offering to a borrower, the method comprising:

electronically displaying on an electronic computing device a plurality of qualitative questions regarding the borrower, wherein at least some of the plurality of qualitative questions are based on an entity type of the borrower, wherein each answer is assigned a score representative of a portion of the borrower's creditworthiness, and wherein the electronic computing device is in electronic communication with an electronic database via a computer network;

receiving financial information, non-financial information, and sector information regarding the borrower from the scores of the answers to the plurality of qualitative questions;

calculating, by the electronic computing device, a first financial factor based on the financial information, a second non-financial factor based on the non-financial information, and a third sector factor based on the sector information, wherein at least a portion of the sector information is specific to the entity type of the borrower;

calculating, by the electronic computing device, a preliminary probability of default rating of the borrower based on the first financial factor, the second non-financial factor, and the third sector factor, wherein the first financial factor is given a first weight, the second non-financial factor is given a second weight, and the third sector factor is given a third weight;

generating, by the electronic computing device, at least one warning signal based on the answers to the plurality of qualitative questions and the entity type of the borrower;

electronically displaying on a display screen the at least one warning signal, wherein the at least one warning signal highlights a potential credit vulnerability of the borrower that is not present in the financial information, the non-financial information, and the sector information;

calculating, by the electronic computing device, a probability of default rating of the borrower based on the preliminary probability of default and the at least one generated warning signal;

calculating, by the electronic computing device, a loss given default rating for the borrower;

integrating, by the electronic computing device, the probability of default rating and the loss given default rating with other information relating to the credit offering to produce a credit memorandum; and automatically outputting, by the electronic computing device, the credit memorandum, wherein the credit memorandum comprises a recommendation associated with the evaluation of the credit offering.

* * * * *